US005586329A

United States Patent [19]

Knudsen et al.

[11] Patent Number: 5,586,329

[45] Date of Patent: Dec. 17, 1996

[54] PROGRAMMABLE COMPUTER WITH AUTOMATIC TRANSLATION BETWEEN SOURCE AND OBJECT CODE WITH VERSION CONTROL

[75] Inventors: Helge Knudsen, Oakville; Daniel T. Chong, Woodbridge; John Yaffe, Mississauga; James E. Taugher, Mississauga; Michael Robertson, Mississauga; Zbigniew Plazak, Etobicoke, all of Canada

[73] Assignee: Amdahl Corporation, Sunnyvale, Calif.

[21] Appl. No.: 424,234

[22] Filed: Apr. 18, 1995

Related U.S. Application Data

[60] Continuation of Ser. No. 29,908, Mar. 11, 1993, abandoned, which is a division of Ser. No. 968,237, Oct. 29, 1992, abandoned, which is a continuation of Ser. No. 830,548, Jan. 31, 1992, abandoned, which is a continuation of Ser. No. 450,298, Dec. 13, 1989, abandoned, which is a continuation-in-part of Ser. No. 402,862, Sep. 1, 1989, abandoned.

[51] Int. Cl.[6] .................................................. G06F 9/45

[52] U.S. Cl. .......................... 395/702; 395/611; 395/705

[58] Field of Search ............................................ 395/700

[56] References Cited

U.S. PATENT DOCUMENTS

| | | | |
|---|---|---|---|
| 4,099,230 | 7/1978 | Mead . | |
| 4,667,290 | 5/1987 | Goss et al. | 364/300 |
| 5,005,152 | 4/1991 | Knutsen | 364/900 |

FOREIGN PATENT DOCUMENTS

| | | |
|---|---|---|
| 0243110 | 10/1987 | European Pat. Off. . |
| 2126761 | 3/1984 | United Kingdom . |

OTHER PUBLICATIONS

"Table Storage Architecture for the OS/2 Extended Edition Database Manager", IBM Technical Disclosure Bulletin, vol. 32, No. 5A, Oct. 1989, pp. 30–32.

M. Papazoglou, "An Extensible DBMS for Small and Medium Systems", IEEE Micro, vol. 2, No. 9, Apr. 1989, pp. 52–68.

A. Brown et al., "Data Base Management for HP Precision Architecture Computers", Hewlett–Packard Journal, vol. 37, No. 12, Dec. 1986, pp. 33–48.

D. J. Haderle et al., "IBM Database 2 Overview", IBM Systems Journal, vol. 23, No. 2, 1984, pp. 112–125.

Hintz et al., "Design of an Incremental Compiler and Interactive Interpreter Utilizing a Hybrid Token–Threaded Code", IBM Technical Disclosure Bulletin, vol. 26, No. 10A, Mar. 1984, pp. 5301–5302.

*Primary Examiner*—Kevin A. Kriess
*Assistant Examiner*—Kakali Chaki
*Attorney, Agent, or Firm*—Fliesler, Dubb, Meyer & Lovejoy

[57] ABSTRACT

A computer which executes rules which are defined according to a language having a valid grammar. The computer comprises input means for receiving and temporarily storing a first source code representation of a rule; object code translation means for translating the first source code representation into a first object code representation executable by the computer; storage means for storing the object code representations of rules; discard means for automatically discarding from the input means the first source code representation upon the storing of the first object code representation in the storage means; source code translation means for translating the first object code representation into a second source code representation where the second source code representation has lines of text; edit means for editing the second source code representation by deleting, adding, or changing one or more of the lines of text of the second source code representation; second object code translation means for translating the second source code representation, as edited, into a new object code representation of the edited rule for storage in the storage means; and the discard means discarding the first object code and second source code representations automatically upon the storing of the new object code representation of the edited rule in the storage means. The computer thereby minimizes the storage required in the storage means for storing rules and maintains version control over the object code representations of rules stored in the storage means.

4 Claims, 30 Drawing Sheets

OVERVIEW OF RULE EDITOR COMPONENTS

TABLE DEFINITION FOR: TABLES

```
---------------- TABLES ----------------
SUMMARY  :
UNIT     : DIC
KEYWORDS :
```

NAME :
TYPE :
UNIT :
SOURCE TABLE :
SELECTION :

ORDERING= FIELD : SEQ:
FIELD : SEQ:

APPENDAGE TABLE:

PARAMETERS OF TABLES :

| PARAMETER NAME | TYPE | SYNTAX | LENGTH | DECIMAL | SOURCE PARM |
|---|---|---|---|---|---|

FIELDS OF TABLES :

| FIELD NAME | TYPE | SYNTAX | LENGTH | DECIMAL | KEYTYPE | SOURCE |
|---|---|---|---|---|---|---|
| NAME | I | C | 16 | 0 | P | |
| TYPE | S | C | 3 | 0 | | |
| IDGEN | L | C | 1 | 0 | | |
| UNIT | S | C | 8 | 0 | | |
| FIX | L | C | 1 | 0 | | |
| SOURCE | I | C | 16 | 0 | | |
| APPENDAGE | I | C | 16 | 0 | | |
| CREATED | S | C | 6 | 0 | | |
| AUTHOR | S | C | 8 | 0 | | |
| MODIFIED | S | C | 6 | 0 | | |
| MODIFIER | S | C | 8 | 0 | | |
| SUMMARY | S | V | 62 | 0 | | |
| KEYWORDS | S | C | 45 | 0 | | |

FIG.-3

TABLE DEFINITION FOR: FIELDS

FIELDS

SUMMARY :
UNIT : DIC
KEYWORDS :

NAME : FIELDS
TYPE :
UNIT : DIC
SOURCE TABLE :
SELECTION :

ORDERING= FIELD : SEQ:
FIELD : SEQ:

APPENDAGE TABLE:

PARAMETERS OF FIELDS :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF FIELDS :

| FIELD NAME | TYPE | SYNTAX | LENGTH | DECIMAL | KEYTYPE | SOURCE |
|---|---|---|---|---|---|---|
| NAME | I | C | 16 | 0 | P | |
| TYPE | S | C | 1 | 0 | | |
| SYNTAX | S | C | 1 | 0 | | |
| LENGTH | C | B | 2 | 0 | | |
| DECIMAL | C | B | 2 | 0 | | |
| NUMBER | C | B | 2 | 0 | | |
| KEYTYPE | S | C | 1 | 0 | | |
| SOURCE | S | C | 1 | 0 | | |
| SOURCENAME | I | C | 16 | 0 | | |
| | I | C | 16 | 0 | | |
| DEFAULT | S | V | 18 | 0 | | |
| REQUIRED | L | C | 1 | 0 | | |

FIG.-4

TABLE DEFINITION FOR: PARMS

PARMS

SUMMARY :
UNIT : DIC
KEYWORDS :

NAME : PARMS
TYPE : TDS
UNIT : DIC
SOURCE TABLE :
SELECTION :

ORDERING= FIELD : SEQ:
FIELD : SEQ:

APPENDAGE TABLE:

PARAMETERS OF PARMS :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF PARMS :

| FIELD NAME | TYPE | SYNTAX | LENGTH | DECIMAL | KEYTYPE | SOURCE |
|---|---|---|---|---|---|---|
| NUMBER | I | B | 2 | 0 | P | |
| NAME | I | C | 16 | 0 | | |
| TYPE | S | C | 1 | 0 | | |
| SYNTAX | S | C | 1 | 0 | | |
| LENGTH | C | B | 2 | 0 | | |
| DECIMAL | C | B | 2 | 0 | | |
| SOURCENAME | I | C | 16 | 0 | | |

FIG.-5

TABLE DEFINITION FOR:SELECTION

----- SELECTION -----

SUMMARY :
UNIT : DIC
KEYWORDS :

NAME : SELECTION
TYPE : TDS
UNIT : DIC
SOURCE TABLE :
SELECTION :

ORDERING= FIELD : SEQ:
FIELD : SEQ:

APPENDAGE TABLE:

PARAMETERS OF SELECTION :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF SELECTION :

| FIELD NAME | TYPE | SYNTAX | LENGTH | DECIMAL | KEYTYPE | SOURCE |
|---|---|---|---|---|---|---|
| RECORD# | I | B | 2 | 0 | P | |
| DATA | S | C | 64 | 0 | | |

FIG.-6

TABLE DEFINITION FOR: ORDERING

ORDERING

SUMMARY :
UNIT : DIC
KEYWORDS :

NAME : ORDERING
TYPE : TDS
UNIT : DIC
SOURCE TABLE :
SELECTION :

ORDERING= FIELD : SEQ:
FIELD : SEQ:

APPENDAGE TABLE:

PARAMETERS OF ORDERING :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF ORDERING :

| FIELD NAME | TYPE | SYNTAX | LENGTH | DECIMAL | KEYTYPE | SOURCE |
|---|---|---|---|---|---|---|
| NUMBER | I | B | 2 | 0 | P | |
| SEQUENCE | S | C | 1 | 0 | | |
| FIELDNAME | S | C | 16 | 0 | | |

FIG.-7

TABLE DEFINITION FOR: EVENTRULES

EVENTRULES

SUMMARY :
UNIT : DIC
KEYWORDS :

NAME : EVENTRULES
TYPE : TDS
UNIT : DIC
SOURCE TABLE :
SELECTION :

ORDERING= FIELD : SEQ:
FIELD : SEQ:

APPENDAGE TABLE:

PARAMETERS OF EVENTRULES :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF EVENTRULES :

| FIELD NAME | TYPE | SYNTAX | LENGTH | DECIMAL | KEYTYPE | SOURCE |
|---|---|---|---|---|---|---|
| NUMBER | I | B | 2 | 0 | P | |
| TYPE | S | C | 1 | 0 | | |
| ACCESS | S | C | 1 | 0 | | |
| RULE | I | C | 16 | 0 | | |

FIG.-8

TABLE DEFINITION FOR: @RULESLIBRARY

@RULESLIBRARY

SUMMARY :
UNIT : DIC
KEYWORDS :

| | | | |
|---|---|---|---|
| NAME | : @RULESLIBRARY | ORDERING= FIELD : | SEQ: |
| TYPE | : OBJ | FIELD : | SEQ: |
| UNIT | : DIC | | |
| SOURCE TABLE | : | | |
| SELECTION | : | APPENDAGE TABLE: | |

PARAMETERS OF @RULESLIBRARY :

| PARAMETER NAME | TYPE | SYNTAX | LENGTH | DECIMAL | SOURCE PARM |
|---|---|---|---|---|---|
| LIBRARY | S | C | 8 | 0 | |

FIELDS OF @RULESLIBRARY :

| FIELD NAME | TYPE | SYNTAX | LENGTH | DECIMAL | KEYTYPE | SOURCE |
|---|---|---|---|---|---|---|
| RULENAME | S | C | 16 | 0 | P | |
| DATE | S | C | 6 | 0 | | |
| TIME | S | C | 4 | 0 | | |
| RULEBODY | S | V | 2200 | 0 | | |

FIG.-9

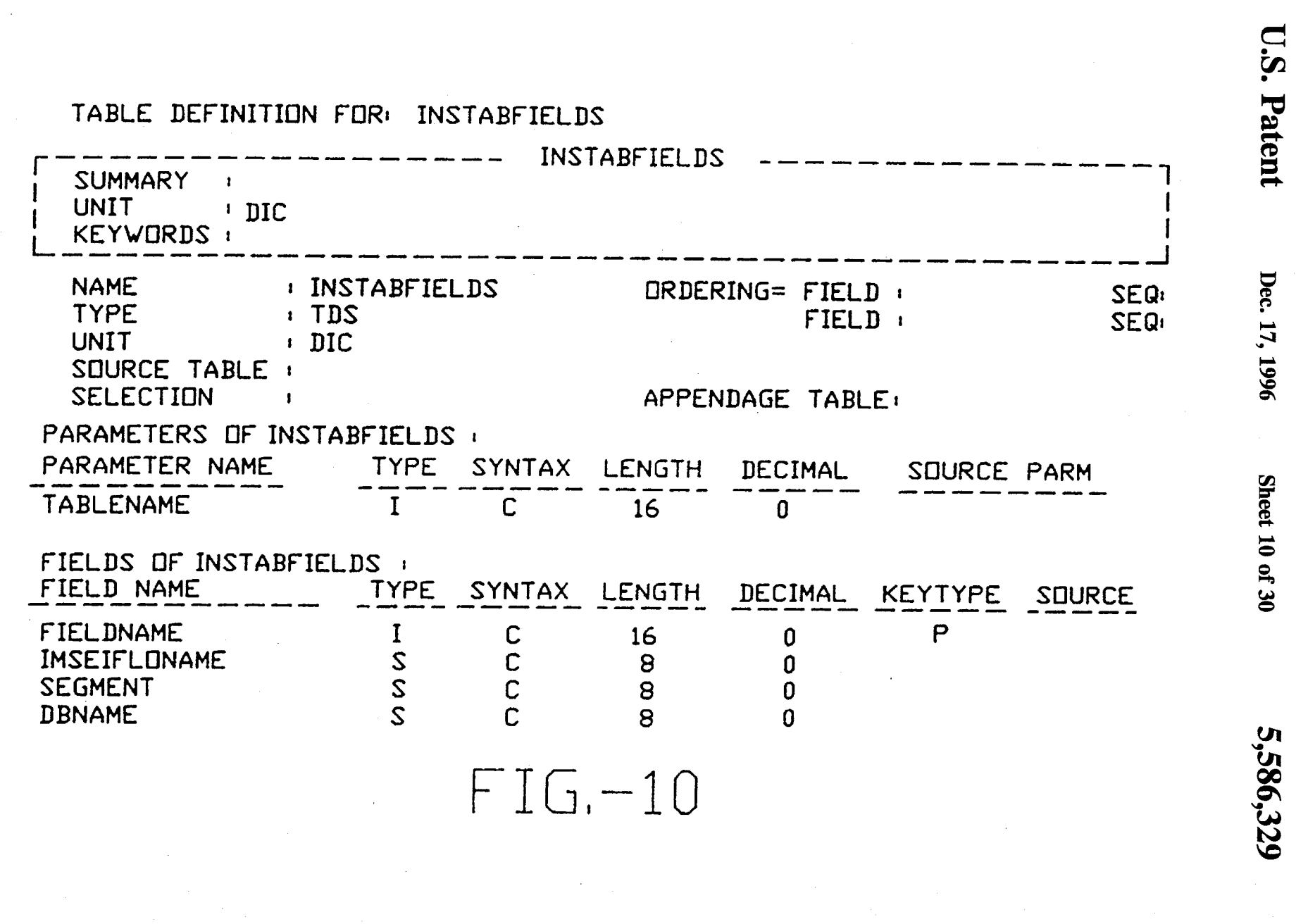

```
TABLE DEFINITION FOR: INSTABFIELDS

---------------------- INSTABFIELDS ----------------------
  SUMMARY  :
  UNIT     : DIC
  KEYWORDS :
----------------------------------------------------------
  NAME          : INSTABFIELDS        ORDERING= FIELD :      SEQ:
  TYPE          : TDS                           FIELD :      SEQ:
  UNIT          : DIC
  SOURCE TABLE  :
  SELECTION     :                     APPENDAGE TABLE:
```

PARAMETERS OF INSTABFIELDS :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF INSTABFIELDS :

| FIELD NAME | TYPE | SYNTAX | LENGTH | DECIMAL | KEYTYPE | SOURCE |
|---|---|---|---|---|---|---|
| FIELDNAME | I | C | 16 | 0 | P | |
| IMSEIFLONAME | S | C | 8 | 0 | | |
| SEGMENT | S | C | 8 | 0 | | |
| DBNAME | S | C | 8 | 0 | | |

FIG.-10

```
TABLE DEFINITION FOR: IMSSEGFIELDS

┌------------------- IMSSEGFIELDS ---------------------┐
  SUMMARY  :
  UNIT     : DIC
  KEYWORDS :
└------------------------------------------------------┘
  NAME          : IMSSEGFIELDS      ORDERING= FIELD :        SEQ:
  TYPE          : TDS                         FIELD :        SEQ:
  UNIT          : DIC
  SOURCE TABLE  :
  SELECTION     :                   APPENDAGE TABLE:
```

PARAMETERS OF IMSSEGFIELDS :

| PARAMETER NAME | TYPE | SYNTAX | LENGTH | DECIMAL | SOURCE PARM |
|---|---|---|---|---|---|
| DBNAME | I | C | 8 | 0 | |
| SEGNAME | I | C | 8 | 0 | |

FIELDS OF IMSSEGFIELDS :

| FIELD NAME | TYPE | SYNTAX | LENGTH | DECIMAL | KEYTYPE | SOURCE |
|---|---|---|---|---|---|---|
| NAME | I | C | 8 | 0 | P | |
| TYPE | S | C | 1 | 0 | | |
| SYNTAX | S | C | 1 | 0 | | |
| OFFSET | C | B | 2 | 0 | | |
| LENGTH | C | B | 2 | 0 | | |
| DECIMAL | C | B | 2 | 0 | | |

FIG.-11

TABLE DEFINITION FOR: IMSACCESS

IMSACCESS

SUMMARY :
UNIT : DIC
KEYWORDS :

NAME : IMSACCESS
TYPE : TDS
UNIT : DIC
SOURCE TABLE :
SELECTION :

ORDERING= FIELD : SEQ:
FIELD : SEQ:

APPENDAGE TABLE:

PARAMETERS OF IMSACCESS :

| PARAMETER NAME | TYPE | SYNTAX | LENGTH | DECIMAL | SOURCE PARM |
|---|---|---|---|---|---|
| TABLENAME | I | C | 16 | 0 | |

FIELDS OF IMSACCESS :

| FIELD NAME | TYPE | SYNTAX | LENGTH | DECIMAL | KEYTYPE | SOURCE |
|---|---|---|---|---|---|---|
| LEVEL | I | B | 2 | 0 | P | |
| DBNAME | S | C | 8 | 0 | | |
| SEGMENT | S | C | 8 | 0 | | |
| ACCESSTYPE | S | C | 1 | 0 | | |
| IAM_ACCESS_NAME | S | C | 16 | 0 | | |
| IMS_ACCESS_NAME | S | C | 8 | 0 | | |
| ACCESSVALUE | S | V | 255 | 0 | | |

FIG.-12

TABLE DEFINITION FOR: SCREENS

SCREENS

SUMMARY :
UNIT : DIC
KEYWORDS :

NAME : SCREENS
TYPE : TDS
UNIT : DIC
SOURCE TABLE :
SELECTION :

ORDERING= FIELD : SEQ:
FIELD : SEQ:

APPENDAGE TABLE:

PARAMETERS OF SCREENS :

| PARAMETER NAME | TYPE | SYNTAX | LENGTH | DECIMAL | SOURCE PARM |
|---|---|---|---|---|---|

FIELDS OF SCREENS :

| FIELD NAME | TYPE | SYNTAX | LENGTH | DECIMAL | KEYTYPE | SOURCE |
|---|---|---|---|---|---|---|
| NAME | I | C | 16 | 0 | P | |
| UNIT | S | C | 8 | 0 | | |
| LEFT_KEY | C | B | 2 | 0 | | |
| RIGHT_KEY | C | B | 2 | 0 | | |
| UP_KEY | C | B | 2 | 0 | | |
| DOWN_KEY | C | B | 2 | 0 | | |
| EXIT_KEY | C | B | 2 | 0 | | |
| SCROLL_TABLE | S | C | 16 | 0 | | |
| SCROLL_FIELD | S | C | 16 | 0 | | |
| CURSOR_TABLE | S | C | 16 | 0 | | |
| CURSOR_FIELD | S | C | 16 | 0 | | |
| CREATED | S | C | 6 | 0 | | |
| AUTHOR | S | C | 8 | 0 | | |
| MODIFIED | S | C | 6 | 0 | | |
| MODIFIER | S | C | 8 | 0 | | |
| SUMMARY | S | V | 62 | 0 | | |
| KEYWORDS | S | C | 45 | 0 | | |

FIG.-13

TABLE DEFINITION FOR: SCREENTABLES

```
------------------ SCREENTABLES ------------------
SUMMARY  :
UNIT     : DIC
KEYWORDS :
--------------------------------------------------
```

```
NAME          : SCREENTABLES      ORDERING= FIELD :        SEQ:
TYPE          : TDS                         FIELD :        SEQ:
UNIT          : DIC
SOURCE TABLE  :
SELECTION     :                   APPENDAGE TABLE:
```

PARAMETERS OF SCREENTABLES :

| PARAMETER NAME | TYPE | SYNTAX | LENGTH | DECIMAL | SOURCE PARM |
|---|---|---|---|---|---|
| SCREEN | I | C | 16 | 0 | |

FIELDS OF SCREENTABLES :

| FIELD NAME | TYPE | SYNTAX | LENGTH | DECIMAL | KEYTYPE | SOURCE |
|---|---|---|---|---|---|---|
| NAME | I | C | 16 | 0 | P | |
| SCROLL_TYPE | S | C | 1 | 0 | | |
| FIRST_ROW | C | B | 2 | 0 | | |
| FIRST_COL | C | B | 2 | 0 | | |
| MAX_OCCUR | C | B | 2 | 0 | | |
| VALIDATION | S | C | 16 | 0 | | |
| HEADINGS | C | B | 2 | 0 | | |
| FOOTNOTES | C | B | 2 | 0 | | |
| FIXED_COL | C | B | 2 | 0 | | |
| LAST_ROW | C | B | 2 | 0 | | |
| LAST_COL | C | B | 2 | 0 | | |
| BOUND_FROW | S | C | 1 | 0 | | |
| BOUND_FCOL | S | C | 1 | 0 | | |
| BOUND_LROW | S | C | 1 | 0 | | |
| BOUND_LCOL | S | C | 1 | 0 | | |

FIG.-14

TABLE DEFINITION FOR: SCREENFIELDS

SCREENFIELDS

SUMMARY :
UNIT : DIC
KEYWORDS :

NAME : SCREENFIELDS ORDERING= FIELD : SEQ:
TYPE : TDS FIELD : SEQ:
UNIT : DIC
SOURCE TABLE :
SELECTION : APPENDAGE TABLE:

PARAMETERS OF SCREENFIELDS :

| PARAMETER NAME | TYPE | SYNTAX | LENGTH | DECIMAL | SOURCE PARM |
|---|---|---|---|---|---|
| SCREENTABLES | I | C | 16 | 0 | |

FIELDS OF SCREENFIELDS :

| FIELD NAME | TYPE | SYNTAX | LENGTH | DECIMAL | KEYTYPE | SOURCE |
|---|---|---|---|---|---|---|
| NAME | I | C | 16 | 0 | P | |
| ROW | C | B | 2 | 0 | | |
| COL | C | B | 2 | 0 | | |
| LENGTH | C | B | 2 | 0 | | |
| JUST | S | C | 1 | 0 | | |
| FILL | S | C | 1 | 0 | | |
| LITERAL | L | C | 1 | 0 | | |
| INTENSITY | S | C | 1 | 0 | | |
| PROTECT | L | C | 1 | 0 | | |
| SKIP | L | C | 1 | 0 | | |
| NULLFILL | S | C | 1 | 0 | | |
| DETECT | L | C | 1 | 0 | | |
| REQUIRED | L | C | 1 | 0 | | |
| VALUE | S | V | 42 | 0 | | |

FIG.-15

TABLE TYPES VS. TABLE OPS

| | F | G | I | R | D | SRC |
|---|---|---|---|---|---|---|
| TDS | ✓ | ✓ | ✓ | ✓ | ✓ | ① |
| OBJ | | ✓ | ✓ | ✓ | ✓ | |
| IMS | ✓ | ✓ | ✓ | ✓ | ✓ | ② |
| TEM | ✓ | ✓ | ✓ | ✓ | ✓ | |
| SUB ①/② | ✓ | ✓ | | | | |
| PRM | ✓ | ✓ | | | | |
| SCR | ✓ | ✓ | ✓ | ✓ | ✓ | |
| IMP* | ✓ | | | | | |
| EXP* | | | ✓ | | | |
| HDS | | ✓ | ✓ | ✓ | ✓ | |

* PARM1 = PDS MEMBER

LONG STRINGS

| INDEX | STRING | TYPE | LEW | DEC |
|---|---|---|---|---|
| 1 | THIS IS A LONG STRING | Q | 21 | 0 |

CALL R ( 'THIS IS A LONG STRNG; 45, T.F) ;

1000

TOKENS (–)

| INDEX | STRING | TYPE | LEN | DEC | TABLE F. MNK |
|---|---|---|---|---|---|
| 1 | CALL | R | 4 | 0 | N |
| 2 | R | I | 1 | 0 | N |
| 3 | ( | S | 1 | 0 | N |
| 4 | 'S' | L | 1 | 0 | N |
| 5 | , | S | 1 | 0 | N |
| 6 | 45 | N | 2 | 0 | N |
| 7 | , | S | 1 | 0 | N |
| 8 | T | I | 1 | 0 | Y |
| 9 | . | S | 1 | 0 | N |
| 10 | F | I | 1 | 0 | Y |
| 11 | ) | S | 1 | 0 | N |
| 12 | ; | S | 1 | 0 | N |

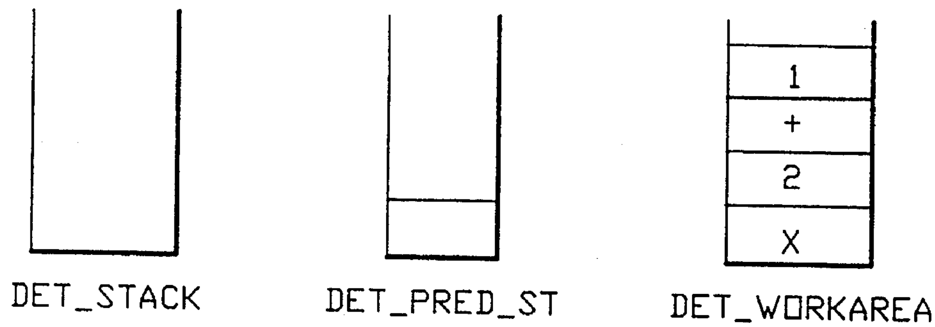
FIG.-33C
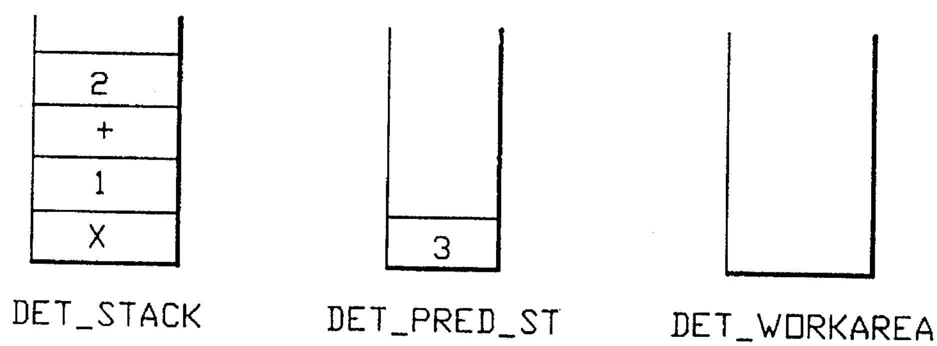
FIG.-34A
| | | | | | |
|---|---|---|---|---|---|
| 1 | L | I | 1 | 0 | N |
| 2 | = | □ | 1 | 0 | N |
TOKENS ( - )
FIG.-34B

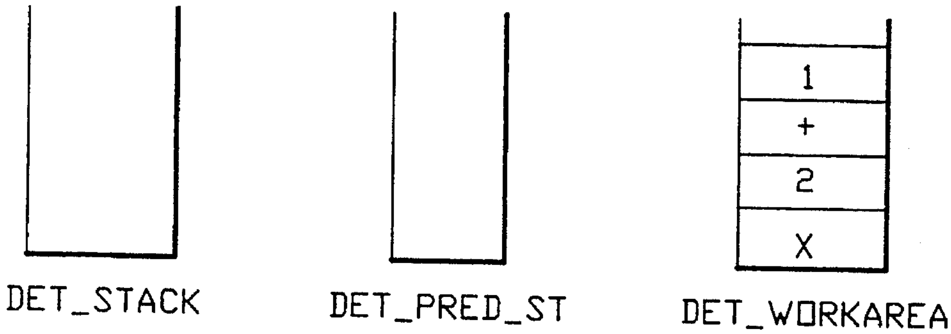
FIG.-34C
| | | | | | |
|---|---|---|---|---|---|
| 1 | L | I | 1 | 0 | N |
| 2 | = | □ | 1 | 0 | N |
| 3 | 1 | N | 1 | 0 | N |
| 4 | + | □ | 1 | 0 | N |
| 5 | 2 | N | 1 | 0 | N |
| 6 | ; | S | 1 | 0 | N |
TOKENS ( – )
FIG.-34D
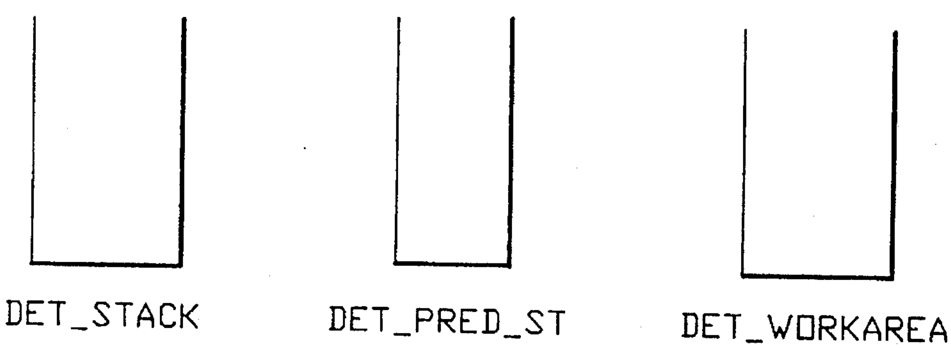
FIG.-34E

PROGRAMMABLE COMPUTER WITH AUTOMATIC TRANSLATION BETWEEN SOURCE AND OBJECT CODE WITH VERSION CONTROL

CROSS-REFERENCE TO RELATED APPLICATIONS

This application is a continuation of Ser. No. 08/029,908, filed Mar. 11, 1993, now abandoned, which is a divisional of Ser. No. 07/968,237, filed Oct. 29, 1992, now abandoned, which is a continuation of Ser. No. 07/830,548, filed Jan. 31, 1992, now abandoned, which is a continuation of Ser. No. 07/450,298, filed Dec. 13, 1989, now abandoned, which is a continuation-in-part of Ser. No. 07/402,862, filed Sep. 1, 1989.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a computer which executes rules defined according to a language having a valid grammer.

DESCRIPTION OF RELATED ART

The development of applications programs by software engineers is a complicated task. This complication arises in part because of environmental parameters, like the variety of data types, hardware types, operating system types, program auditing techniques, and other details. Computer programming languages have developed to handle all of these environmental parameters, usually by requiring explicit recognition of the parameters in the code. Thus, the typical application programmer must contend with data definitions, editing and validation of input data, selection and ordering of data available to the program, looping constraints on the system for the program, output editing and validation conventions, error processing, program auditing, and other complicated tasks in addition to the basic algorithm for accomplishing the application in mind.

These environmental parameters also complicate the running of programs written with high level languages. These programs must be compiled or loaded prior to execution, during which time all the physical resources, data, and rules associated with the application must be bound together.

This binding of resources required for a given application at compile time or load time, makes it difficult to implement truly event driven, or data driven, programs.

Attempts have been made to make some programming languages interpretive. That is, to allow them to bind certain resources to the program while it is being run. However, these interpretive programs have very limited performance and have not gained widespread acceptance in the industry.

Accordingly, there is a need for an operating system, data base, and data access method which will allow application programmers to be free of complications caused by environmental parameters.

SUMMARY OF THE INVENTION

The present invention provides an operating system, data base, and access method which pushes data definitions, input editing and validation, selection and ordering, looping, output editing and validation, error processing, and auditing down into the data access method, thereby freeing the application programmer of explicit recognition in his program of these environmental parameters.

The system comprises a virtual stack machine, which operates based on a simple instruction set to execute programs of instructions. In addition, a data base having a unique access structure stores all the dictionary information required for binding during run time of objects stored in the data base to the program being executed. Finally, a data access method, optimized for the access structure, performs all the access functions on the dictionary, sub-routines, and data to be used by the program being executed. The system performs the binding during run time of objects retrieved through the access method during execution of a current program. In addition, the system includes servers for display screens, storage subsystems based on other data access structures, such as IMS, and other peripheral subsystems. These servers again are dynamically bound to a given program at run time.

The access structure consists of a plurality of tables, each table having a plurality of rows, and each row having a plurality of fields. Each row in the access structure is identified by a unique primary key in one of the fields of the row and by a table identifier. Objects that are retrievable through the access structure are stored as fields in the tables. Tables in the access structure can be further divides into subtables, where each subtable is identified by a table parameter. Tables are identified by a table name and any table parameters that have been assigned to the table.

The access method maintains indexes into the tables stored in the access structure. The indexes are first ordered on the table name, and then ordered on the parameter or parameters associated with a given table. Finally, the indexes are ordered on the primary key of each row within a table.

A subset of the tables stored in the access structure consists of dictionary data or metadata, which is utilized for binding objects stored in the data base with a program currently being executed. The dictionary data includes event rules which are executed in response to data access events, selection criteria by which access to objects within the data base can be controlled, ordering algorithms, by which objects within the access structure can be ordered during access events, and a plurality of peripheral device servers.

The implementation of servers within the access method allows the extended common view of objects available to the data processing system to be processed through a single interface. Thus, objects in the native store of the access method stored in other systems, such as IMS, DB2, or other data base management systems, are viewed according to a single access structure by the programmer.

Furthermore, the operating system, according to the present invention, operates based on an isomorphic programming representation. The high level language correlates one to one with internal representation of programs which are directly executed on the virtual stack machine. Thus, only one copy of a given program module is stored within the data base. According to this aspect, a translator/detranslator is utilized by application programmers who perform program development functions. Whenever the programming is being done, the internal representation is translated to a high level source. Whenever the resulting program is stored, the source is translated back to the internal representation. This provides for great mobility of programs from system to system, and eliminates many problems associated with maintaining a consistent view of a program which may be operated by a number of users.

Other aspects and advantages of the present invention can be seen upon review of the figures, the detailed description, and the claims which follow.

BRIEF DESCRIPTION OF THE FIGURES

FIG. 3 is a table definition for: TABLES.

FIG. 4 is a table definition for: FIELDS.

FIG. 5 is a table definition for: PARMS.

FIG. 6 is a table definition for: SELECTION.

FIG. 7 is a table definition for: ORDERING.

FIG. 8 is a table definition for: EVENTRULES.

FIG. 9 is a table definition for: @RULESLIBRARY.

FIG. 10 is a table definition for: IMSTABFIELDS.

FIG. 11 is a table definition for: IMSSEGFIELDS.

FIG. 12 is a table definition for: IMSACCESS.

FIG. 13 is a table definition for: SCREENS.

FIG. 14 is a table definition for: SCREENTABLES.

FIG. 15 is a table definition for: SCREENFIELDS.

FIG. 22 is a table showing the table types and the table operands which work for a given table type.

FIG. 30 shows the TOKENS and the LONG_STRINGS tables used by the rule editor.

FIGS. 31, 32, 33A–33C, and 34A–34E illustrate operation of the detranslator according to the present invention.

DETAILED DESCRIPTION

A detailed description of a preferred embodiment of the present invention is disclosed with reference to the figures. First, an overview of the data processing system according to the present invention is provided. Next, a description of the rule language used by application programmers in the system is described. Next, the specification of the manner in which data is stored in the system is provided.

After setting out the application programmer's view of the system, a specification of the object level representation of the rules is provided. From this specification, a description of the virtual machines which make up the data processing system are described. These systems include a virtual stack machine which executes the object level rules, a table access method which provides an interface between the virtual stack machine and the data storage systems. Finally, a description of the native data storage system, known as the table data store, is disclosed.

In addition, the mechanism for translating from the rule language to the internal object level representation of the rules, and for detranslating from the object representation of the rules to the rule language according to the present invention is described.

I. System Overview

Figure 1:
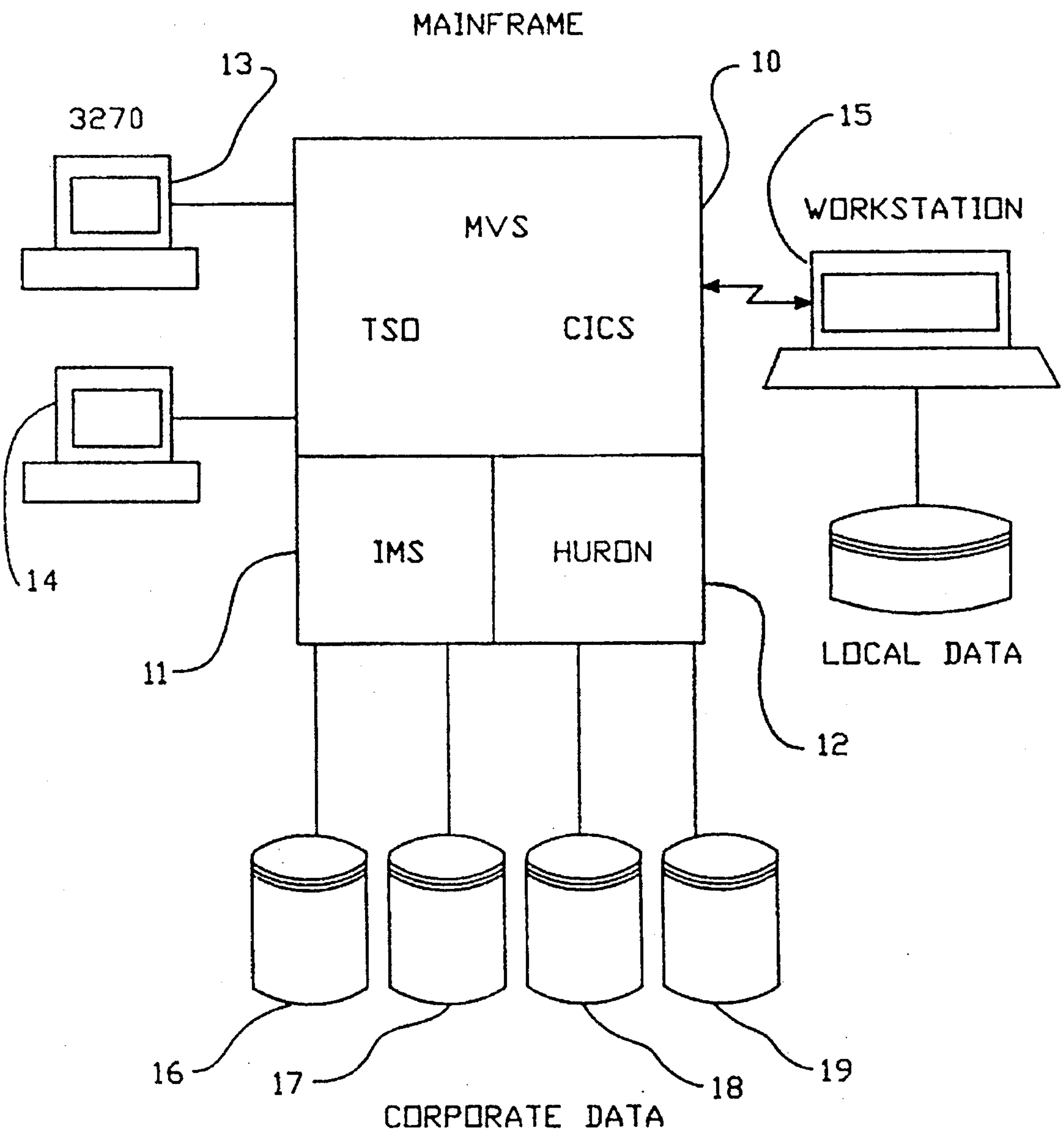
FIG. 1 is an overview block diagram of a data processing system implementing the present invention.

FIG. 1 illustrates the basic implementation of the data processing system according to the present invention. This system is implemented as a virtual machine on a main frame computer 10. The main frame computer runs a host operating system, MVS in the preferred system. Under the host operating system, a data base access system, such as IMS 11, can run. At the same time, the data processing system according to the present invention, known as HURON 12, runs under MVS. Coupled with the main frame are a plurality of user terminals 13, 14, such as the Model 3270's. Also, work stations 15 running other operating systems, such as UNIX, could be coupled to the main frame 10.

Connected with the main frame data server, such as IMS 11, are direct access storage devices 16 and 17 storing corporate data. Also, direct access storage devices 18 and 19 are coupled with the HURON system 12.

Figure 2:
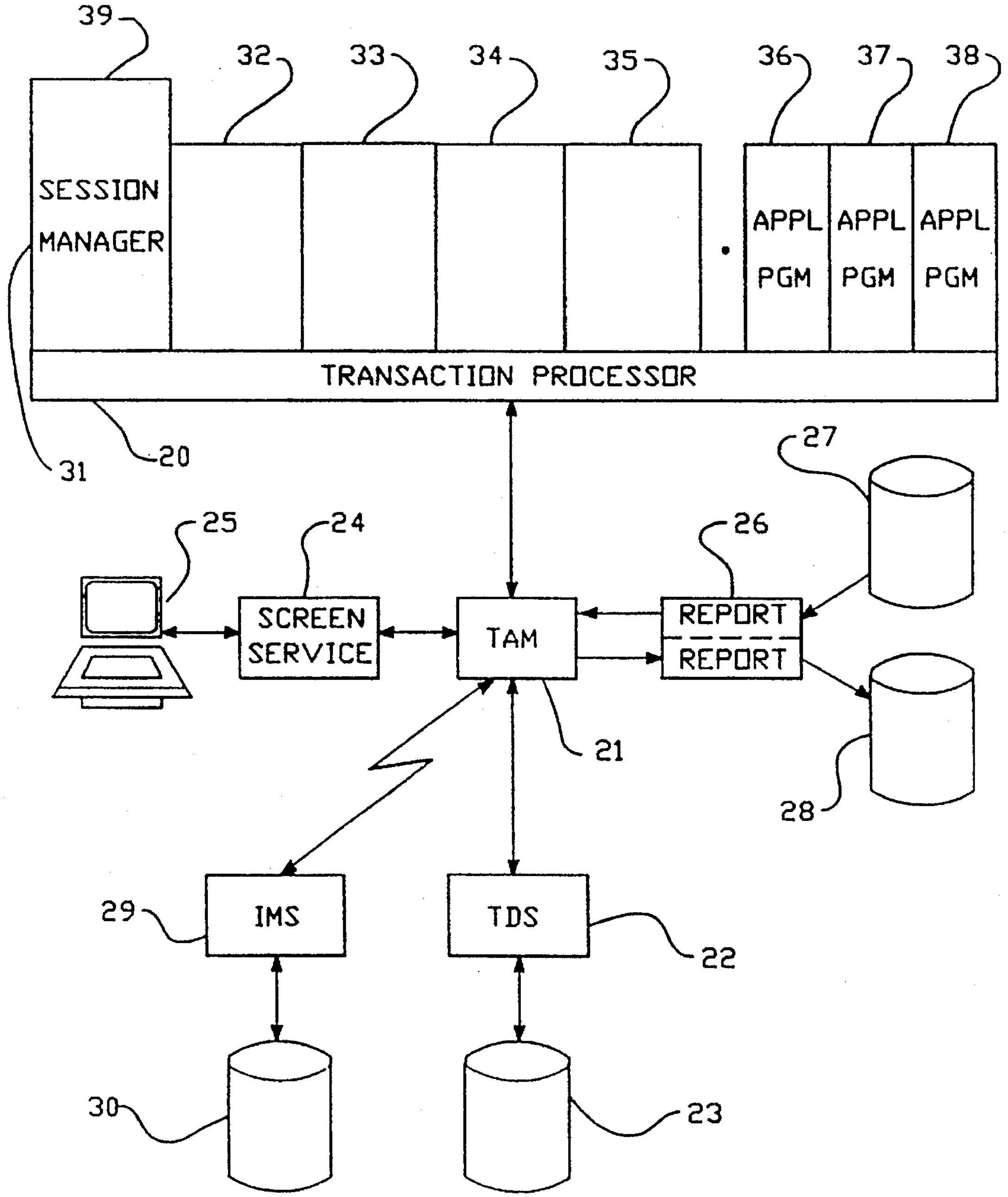
FIG. 2 is a schematic block diagram of the virtual data processing machine according to the present invention.

FIG. 2 shows a conceptual block diagram of the HURON data processing system. The system includes a transaction processor 20, a table access machine 21, and a table data store server 22 which is coupled to direct access storage device 23. The table access machine 21 also drives a screen server 24 which is coupled to a user terminal 25, and an import/export server 26 coupled to other sources of data files 27 and 28.

In addition, the table access machine 21 provides an interface to a heterogenous data base system server, such as IMS server 29, which is coupled to direct storage access devices 30.

The transaction processor 20 is implemented as a virtual stack machine which executes the object code level representation of rules. Those rules are stored in a rule library 31 associated with each transaction. The rule library typically includes a session manager 39 which provides a screen menu and basic utilities to the programmer. Utilities include rule editor 32, a table editor browser 33, RPW and print utilities 34, query processors, if necessary, 35, and application programs 36, 37, 38 such as are called up for a given transaction.

Through the table access machine 21, physical data stored in direct access storage devices 23, 30, 27, 28 are presented to the transaction processor 20 as if it were stored in the table data store system.

The servers 22, 24, 26, 29, the table access machine 21, and the transaction processor 20 are all implemented as virtual machines on the host operating system. Thus, in the preferred system, these virtual machines are implemented with system 370 assembler language and perform the functions which are described in detail below.

A high level view of the system is best provided by understanding the rule language used by application programmers.

II. Rules Language

The rule language is the programming interface for the system. The language comprises an integrated set of database access commands, 4th-generation constructs, and conventional language statements which makes structured programming a natural consequence of developing an application.

The rules have four parts. These parts contain:

1. the rule definition
2. conditions
3. actions
4. exception handlers

The rules are introduced by giving several short examples. Next, each of the four parts of a rule are described, in turn. Then, details concerning expressions, data types, and indirect references to tables and fields are set out. Finally, a formal specification of the rule language in Backus-Naur form is provided, and the standard routines are described.

GENERAL FORM OF RULES

Conceptually, a rule has four parts. When presented physically, the four parts are separated by horizontal lines. The examples that follow show the general form of Huron rules.

Table 1 shows a sample rule named LEAPYEAR, which has one argument names YEAR. LEAPYEAR is a function because it RETURNs a value—either 'Y' or 'N'—as a result of execution.

TABLE 1

| The Rule LEAPYEAR | | |
|---|---|---|
| LEAPYEAR (YEAR); | | |
| REMAINDER (YEAR, 4) = 0' | Y | N |
| RETURN ('Y'); | 1 | |
| RETURN ('N'); | | 1 |

The rule definition contains the rule header "LEAPYEAR(YEAR);" and would contain local variable definitions, if there were any. The conditions determine the execution sequence. In this rule, there is only one condition, the comparison "REMAINDER(YEAR, 4)=0;". The actions are executable statements in the rule, only some of which will be executed on any particular invocation. The first action, "RETURN('Y');", is executed if the condition is satisfied, and the second action, "RETURN('N');", is executed if the condition is not satisfied. The rule in this example has no exception handlers, so there are no statements in the fourth part of the rule.

Table 2 shows a more complex rule. The two GET statements verify that the month referred to by the parameter MM occurs in the table MONTHS and that the day referred to by the parameter DD is less than or equal to the maximum for that month. Failure of a GET statement causes the exception GETFAIL, and the exception handler produces a message and returns the value 'N'.

TABLE 2

| The rule VALID_DATE | | | |
|---|---|---|---|
| VALID_DATE (YY, MM, DD); | | | |
| DD <= 0; | Y | N | N |
| LEAPYEAR (YY); | | Y | N |
| CALL MSGLOG ('INVALID DAY ENTERED'); | 1 | | |
| GET MONTHS WHERE MONTH=MM & LDAYS >=DD; | | 1 | |
| GET MONTHS WHERE MONTH=MM & DAYS >=DD; | | | 1 |
| RETURN ('N'); | 2 | | |
| RETURN ('Y'); | | 2 | 2 |
| ON GETFAIL: | | | |
| CALL MSGLOG ('INVALID MONTH/DAY COMBINATION'); | | | |
| RETURN ('N"); | | | |

Table 3 shows the table MONTHS, which the rule VALID_DATE refers to. note the two columns for the numbers of days in a month for leap years and non-leap years.

Table 4 shows a rule containing a FORALL statement. The rule COUNT_CARS calculates the number of owners with cars of a given model and year and then prints the result (MODEL and YEAR are fields in the table CARS). The rule has no conditions. The standard routine MSLOG presents the result of the summation in the message log (the symbol || is the concatenation operator).

Table 5 shows the table CARS, which the rule COUNT_CARS refers to.

TABLE 3

The Table MONTHS

| MONTH | ABBR | NAME | DAYS | LDAYS |
|---|---|---|---|---|
| 1 | JAN | JANUARY | 31 | 31 |
| 2 | FEB | FEBRUARY | 28 | 29 |
| 3 | MAR | MARCH | 31 | 31 |
| 4 | APR | APRIL | 30 | 30 |
| 5 | MAY | MAY | 31 | 31 |
| 6 | JUN | JUNE | 30 | 30 |
| 7 | JUL | JULY | 31 | 31 |
| 8 | AUG | AUGUST | 31 | 31 |
| 9 | SEP | SEPTEMBER | 30 | 30 |
| 10 | OCT | OCTOBER | 31 | 31 |
| 11 | NOV | NOVEMBER | 30 | 30 |
| 12 | DEC | DECEMBER | 31 | 31 |

TABLE 4

The Rule COUNT_CARS

```
COUNT_CARS (MDL, YY);
LOCAL COUNT;
```

```
FORALL CARS WHERE MODEL=MDL AND                 1
YEAR=YY
   COUNT = COUNT + 1;
   END;
CALL MSGLOG ('RESULT:' || COUNT);               2
```

TABLE 5

The Table CARS

| LICENSE | MODEL | YEAR | PRICE |
|---|---|---|---|
| ASD102 | FIESTA | 86 | 7599 |
| BNM029 | ESCORT | 84 | 5559 |
| BXT524 | TAURUS | 88 | 12099 |
| FDS882 | TEMPO | 87 | 10099 |
| GET347 | THUNDERBIRD | 57 | 10999 |
| LLA498 | FIESTA | 87 | 85059 |
| PFF356 | MUSTANG | 84 | 10599 |
| RTY211 | TORINO | 85 | 9599 |
| SOT963 | LTD | 86 | 15159 |
| TDS412 | THUNDERBIRD | 88 | 35299 |

RULE DEFINITION

The rule definition, the first part of a Huron Rule, contains a rule header (obligatory) and a declaration of local variables (optional).

Rule Header

The rule header gives a name to the rule and defines its parameters (if any). Parameter passing between rules is by value: a called rule cannot alter the value of a parameter. The data representation of a parameter is dynamic: it conforms to the semantic data type and syntax of the value assigned to it. The scope of a parameter is the rule in which the parameter is defined. Table 6 gives an example of a rule header.

TABLE 6

Rule Header for the Rule LEAPYEAR

```
LEAPYEAR (YEAR);
```

Declaration of Local Variables

Local variables are declared below the rule header. The scope of a local variable is the rule in which it is defined and any descendant rules. A local variable can be assigned an arithmetic value or a string and can be used anywhere in an action. The data representation of a local variable is dynamic: it conforms to the semantic data type and syntax of the value assigned to it. Local variables are initialized to null (i.e., zero, the logical 'N', or the null string, depending on the usage). Table 7 gives an example of a local variable declaration.

TABLE 7

Declaration of the Local Varibales SUM and RESULT

```
LOCAL SUM, RESULT;
```

CONDITIONS

Conditions, which are logical expressions evaluated for their truth value, determine the flow of control in a rule. Conditions are evaluated sequentially, and, if one of them is satisfied, the actions corresponding to it are executable, and no further conditions are evaluated. If there are no conditions (as in the rule in Table 4), then the rule's actions are executable.

Table 8 gives some examples of conditions. REMAINDER and SUPPLIER_LOC are functions which return values. Although one of them is a system supplied standard routine and one is a user routine, there is no distinction in the invocation.

TABLE 8

Conditions

```
CARS.PRICE > INPUT.MIN;
REMAINDER (YEAR, 4) = 0;
INVOICE.LOCATION = SUPPLIER_LOC(INPUT.SUPP#);
```

Note: the example rules in earlier tables show that the part of a rule that contains conditions also contains a Y/N Quadrant, which displays Y/N ("yes/no") values. The Y/N values coordinate conditions and actions. Huron supplies the Y/N values, however, not the user. The function of the Y/N Quadrant will become clear in the section on actions.

ACTIONS

An action is an executable statement. Action sequence numbers determine which actions will be executed for each particular condition. The same action can be executed for different condition.

A rule, in effect, is an extended case statement. The conditions and actions can be read as follows:

```
CASE:
   condition 1:          actions
   condition 2:          actions
   . . .
   condition n:          actions
   else:                 actions
END CASE;
```

Consider the rule in Table 9, for example.

The conditions and actions in the rule VALID-DATE can be read as the case statement below:

```
CASE:
  DD <= 0;            CALL MSGLOG ('INVALID DAY ENTERED');
                      RETURN ('N');
  LEAPYEAR (YY):      GET MONTHS
                        WHERE MONTH = MM & LDAYS >= DD;
                      RETURN ('Y');
  ELSE:               GET MONTHS
                        WHERE MONTH = MM & DAYS >= DD;
                      RETURN ('Y')
END CASE;
```

The actions available in the rule language are described below.

TABLE 9

| Action Sequence Numbers | | | |
|---|---|---|---|
| VALID_DATE (YY, DD); | | | |
| DD <= 0; | Y | N | N |
| LEAPYEAR (YY); | | Y | N |
| CALL MSGLOG ('INVALID DAY ENTERED'); | 1 | | |
| GET MONTHS WHERE MONTH=MM & LDAYS >= DD; | | 1 | |
| GET MONTHS WHERE MONTH=MM & DAYS >= DD; | | | 1 |
| RETURN ('N'); | 2 | | |
| RETURN ('Y'); | | 2 | 2 |
| ON GETFAIL; | | | |
| CALL MSGLOG ('INVALID MONTH/DAY COMBINATION'); | | | |
| RETURN ('N'); | | | |

Assignment Statements

There are two kinds of assignment statement. In simple assignment, a single value is assigned to a field of a table or to a local variable. Table 10 shows simple assignment.

TABLE 10

```
Simple Assignment
CARS.PRICE = (PRICES.BASE + PRICES.SHIPPING)
        *TAXES.RETAIL;
AMOUNT = PRINCIPAL * (1 + INTEREST) ** YEARS;
```

In assignment-by-name, all the values of the fields of the table on the right are assigned to identically named fields of the table on the left. Table 11 shows an example. Assignment-by-name is a convenient way of assigning all the values of fields of a screen table to fields of a data table, or vice versa.

TABLE 11

```
Assignment-by-Name
ORDERS.* = ORDER_SCREEN.*;
```

Rule Invocation

A rule can invoke another rule implicitly through a logical or arithmetic expression that uses functional notation or explicitly with a CALL statement. Table 12 shows the implicit invocation of the function REMAINDER(YEAR, 4), which is a standard routine that returns an integer.

TABLE 12

```
Implicit Invocation of a Rule
R = REMAINDER (YEAR, 4);
```

RETURN Statement

A rule is a function if it contains a RETURN statement, which specifies the result. Table 13 shows examples of RETURN statements.

TABLE 13

```
RETURN Statement
RETURN ('Y');
RETURN (CARS.PRICE - REBATE);
```

CALL Statement

The CALL statement can invoke a rule directly by referring to the rule by its name or indirectly by referring to a field of a table or to a parameter which contains the name of the rule.

The first two examples in Table 14 invoke the rule SELECT_RENTAL directly. Note that arguments in CALL statements can be passed by an argument list or by a WHERE clause. A parameter keyword in a WHERE clause must be the name of a parameter in the rule header of the called rule. The calls in the first two examples have identical effects, but the calls use different parameter passing mechanisms. All parameters must be specified when a rule is called.

TABLE 14

```
CALL Statement
CALL SELECT_RENTAL (NEAREST_CAR(LOCATION));
CALL SELECT_RENTAL
 WHERE RENTAL_LOC = NEAREST_CAR(LOCATION);
CALL PFKEYS.ROUTINE;
```

The last example in Table 14 invokes a rule indirectly. The value of the field ROUTINE in the table PFKEYS is the name of the rule to be executed.

Table I/O

A Huron database is a collection of tables. Rules access tables on an occurrence basis. When a rule refers to a table, it creates a table template, which serves as a window to the table. Rules enter new information into the table by first placing the new data in the appropriate fields of a table template and then executing either a REPLACE or an INSERT statement. Rules retrieve information from the table into a table template with a GET statement or a FORALL statement. Rules delete information from the table by placing the information in a table template and then executing a DELETE statement (the table template is undefined after a DELETE statement).

Selection Criteria

For a GET, FORALL, or DELETE statement, selection criteria can be specified in a WHERE clause. The WHERE clause contains a predicate composed of one or more comparisons. The predicate is evaluated before data is placed in the table template.

Table parameters can be specified in list form or in a WHERE clause (the two forms correspond to the two methods of parameter passing in the CALL statement).

GET Statement

The GET statement retrieves the first occurrence in a table satisfying the specified selection criteria. Table 15 gives examples.

TABLE 15

| |
|---|
| GET Statement |
| GET STUDENTS; |
| GET STUDENTS WHERE STUDENT# = '810883'; |
| GET MONTHS WHERE MONTH = MM and DAYS >= DD; |
| GET EMPLOYEES WHERE EMP# = INPUT.EMP; |

In the first example of Table 15, the GET statement retrieves the first occurrence in the table STUDENTS. In the second example, the GET statement retrieves the first occurrence in the table STUDENTS whose field STUDENT# has a value equal to 810883. In the third example, the GET statement retrieves the first occurrence in the table MONTHS whose field MONTH has a value equal to the value of MM and whose field DAYS has a value greater than or equal to the value of DD. In the fourth example, the GET statement retrieves the first occurrence in the table EMPLOYEES whose field EMP# is equal to the value of the field EMP of the table INPUT.

If there are no occurrences that meet the selection criteria, the GETFAIL exception is signaled.

FORALL Statement

The FORALL statement, which is a looping construct, processes a set of occurrences. The body of the loop consists of the statements to be executed for each occurrence satisfying the selection criteria. Nesting of FORALL statements is allowed.

A FORALL statement contains a table name, an optional WHERE clause, optional ORDERED clauses, an optional UNTIL clause, and actions. A colon (:) comes after the optional clauses (or the table name, if there are no optional clauses). The actions, which comprise the body of the loop, come on separate lines after the colon. An "END;" clause, on a separate line, marks the end of the FORALL statement. Table 16 gives an example of a FORALL statement.

TABLE 16

```
FORALL Statement
FORALL CARS:
    CALL PRINT_CARS;
    END;
```

As with all table access statements, parameters can be specified in an argument list or in a WHERE clause. Selection on fields is also specified in the WHERE clause, as in Table 17.

TABLE 17

| |
|---|
| Selection Criteria in FORALL Statements |
| FORALL CARS WHERE MODEL = MDL AND YEAR = YY: |
| FORALL EMPLOYEES WHERE HIREDATE >*.BIRTHDATE+40: |
| FORALL EMPLOYEES WHERE LASTNAME LIKE '*SON': |

A WHERE clause in a FORALL statement has the same effect as in a GET statement. In the first example of Table 17, the FORALL statement retrieves all occurrences in the table CARS whose field MODEL has a value equal to the value of MDL and whose field YEAR has a value equal to the value of YY.

A WHERE clause can refer to the current table with an asterisk (*). In the second example of Table 17, the FORALL statement retrieves all occurrences in the table EMPLOYEES for which the field HIREDATE has a value greater than the value of the field BIRTHDATE plus 40.

A WHERE clause can contain the "partial match" operator LIKE, which allows comparison of incompletely specified data strings. Incompletely specified data strings can refer to zero or more unspecified characters with an asterisk (*), and they can refer to one unknown character with a question mark (?). In the last example of Table 17, the FORALL statement retrieves all occurrences in the table EMPLOYEES in which the field LASTNAME ends in "SON".

When a FORALL statement is executed, table occurrences are retrieved in primary key order, unless a different order is specified by one or more ORDERED clauses. In the example of Table 18, the occurrences will be presented sorted by descending values of the field PRICE, then by ascending values of the field MODEL, and then by ascending values of the primary key LICENSE (the default for ordering is ASCENDING).

Execution of a FORALL statement will terminate under either of two circumstances: (1) all occurrences satisfying the FORALL selection criteria have been processed, or (2) an exception is detected during the execution of the statements comprising the loop.

The table template is undefined at the end of a FORALL statement. Accessing CARS.MODEL after the FORALL statement in the example of Table 18 would not provide the model of the last car, but would cause the UNASSIGNED exception.

TABLE 18

```
FORALL Statement with Ordering
FORALL CARS (INVOICE.CITY)
        ORDERED DESCENDING PRICE AND
        ORDERED ASCENDING MODEL:
    CALL $PRINTLINE ('CAR ID'||CARS.LICENSE#||
      'MODEL'||CARS.MODEL||'RETAIL PRICE:$||
      CARS.PRICE);
    END;
```

INSERT Statement

The INSERT statement adds a new occurrence to a table in the database. No field selection is possible: the WHERE clause can only specify parameter values.

Occurrences within a table must have unique primary keys. An attempt to insert an occurrence with a primary key that already exists will cause the INSERTFAIL exception.

Table 19 gives examples of the INSERT statement. Note that, in the second example, CITY is a parameter. The third example shows another way to specify the same parameter.

TABLE 19

| |
|---|
| INSERT Statement |
| INSERT STUDENT; |
| INSERT CARS WHERE CITY = INPUT.CITY; |
| INSERT CARS (INPUT.CITY); |

REPLACE Statement

The REPLACE statement updates an occurrence in the database. No field selection is possible: the WHERE clause can only specify parameter values.

If the occurrence does not exist, the REPLACEFAIL exception is signaled. In order to alto the primary key value of the occurrence, it is necessary to DELETE the old occurrence and INSERT the new one.

Table 20 gives examples of the REPLACE statement. Note that, in the second example, CITY is a parameter. The third example shows another way of specifying the same parameter.

TABLE 20

```
REPLACE Statement
REPLACE STUDENTS;
REPLACE CARS WHERE CITY = INPUT.CITY;
REPLACE CARS (INPUT.CITY);
```

DELETE Statement

The DELETE statement removes an occurrence from a table in the database. A WHERE clause can specify field selection on the primary key field if the relation specified is equality. No other field selection is allowed. A WHERE clause can specify parameter values, as usual.

If the primary key is specified in a WHERE clause, then that occurrence is deleted. If no primary key is specified, then the occurrence referred to by the primary key in the table template is deleted. If the occurrence does not exist in the table, the DELETEFAIL exception is signaled.

Table 21 gives examples of the DELETE statement.

TABLE 21

```
DELETE Statement
DELETE STUDENT;
DELETE STUDENT WHERE ID = '810883';
DELETE CARS ('TORONTO');
```

User Interface

Screens are the standard user interface. They support input from a keyboard and produce output to a terminal.

DISPLAY Statement

The DISPLAY statement causes the specified screen to be displayed, and any input that is entered on the screen is available for processing. Table 22 gives an example of the DISPLAY statement.

TABLE 22

```
DISPLAY Statement
DISPLAY CAR_INPUT;
```

UNTIL . . . DISPLAY Statement

The UNTIL . . . DISPLAY statement, which is a looping construct, displays a screen repetitively. The body of the loop consists of statements which are executed each time the screen is displayed. Inside the body of the loop, any input is available for processing. Table 23 gives an example of an UNTIL . . . DISPLAY statement.

TABLE 23

```
UNTIL . . . DISPLAY Statement

UNTIL DONE DISPLAY QUERY_SCREEN:
    CALL PROCESS_QUERY;
    END;
```

Looping: UNTIL Clause

Two constructs allow looping, the FORALL statement, which can contain an UNTIL clause, and the UNTIL . . . DISPLAY statement. The statements between the FORALL part or the UNTIL . . . DISPLAY part, which is terminated with a colon (:), and the "END;" clause comprise the body of the loop.

The UNTIL clause specifies one exception or two or more exceptions separated by the keyword OR. Looping terminates if an exception is detected. Table 24 gives an example of a FORALL statement with an UNTIL clause.

TABLE 24

```
FORALL . . . UNTIL Statement

FORALL SRC_TBL1 UNTIL GETFAIL:
    GET SRC_TBL2 WHERE LINE_NUM =
    SRC_TBL1.LINE_NUM;
    CALL CMP_LINES (SRC_TBL1.TEXT,
    SRC_TBL2.TEXT);
    END;
```

If a loop terminates because of an exception, control passes to new actions as follows:

If the exception is specified in an UNTIL clause for the loop, then the actions executed next will be those following the END clause of the loop (control passes to those actions even if there is an ON statement for that exception in the exception handler part of the rule). Upon completion of those actions, the rule is finished executing and control passes to the caller. Execution does NOT resume at the point where the exception was detected.

If the exception is not specified in an UNTIL clause for the loop but is specified in an ON statement in the exception handler part of the rule, then the exception will be handled in the usual way: the actions executed next will be those listed in the ON statement.

If the exception is not specified in an UNTIL clause for the loop or in an ON statement in the exception handler part of the rule, then the exception will be handled in the usual way: either the exception will be trapped by an exception handler in a rule higher in the calling hierarchy or the transaction will terminate.

Synchronization

Five statements control the synchronization of transaction, the COMMIT statement, the ROLLBACK statement, the SCHEDULE statement, the TRANSFERCALL statement, and the EXECUTE statement.

COMMIT and ROLLBACK Statements

The statements COMMIT and ROLLBACK establish transaction synchronization points. All or none of the changes between synchronization points will be applied to the database.

Normal termination of a transaction implies COMMIT, and abnormal termination implies ROLLBACK. Table 25 shows COMMIT and ROLLBACK statements.

TABLE 25

```
COMMIT and ROLLBACK Statements

COMMIT;
ROLLBACK;
```

SCHEDULE Statement

The SCHEDULE statement allows asynchronous processing by allowing a rule to be queued for execution independently of the current transaction. The rule to be executed must exist when the SCHEDULE statement is executed. The name of a queue can be specified by an optional TO clause. Definition of queues is handled by system parameters and is not done within the rule language.

Queuing depends on the normal completion of the current transaction, that is, completion in accordance with the transaction protocol. Table 26 shows examples of SCHEDULE statements.

TABLE 26

| SCHEDULE Statement |
|---|
| SCHEDULE PRINT_INVOICE ( INPUT.INVOICE# );<br>SCHEDULE TO WEEKEND<br>CLEANUP WHERE LOCATION = INPUT.CITY; |

TRANSFERCALL Statement

The TRANSFERCALL statement terminates the current transaction and invokes a new one. Control does not pass back to the calling rule. When the called rule is finished executing, the transaction is complete.

Like the CALL statement, the TRANSFERCALL statement can invoke a rule directly by referring to the rule by its name or indirectly by referring to a field of a table or to a parameter which contains the name of the rule. The first two examples in Table 27 invoke the rule SELECT_RENTAL directly, and the last example invokes the rule whose name is the value of the field ROUTINE of the table PFKEYS.

TABLE 27

| TRANSFERCALL Statement |
|---|
| TRANSFERCALL SELECT_RENTAL<br>(NEAREST_CAR(LOCATION));<br>TRANSFERCALL SELECT_RENTAL<br>WHERE RENTAL_LOC =<br>NEAREST_CAR(LOCATION);<br>TRANSFERCALL PFKEYS.ROUTINE; |

EXECUTE Statement

The EXECUTE statement invokes a descendant transaction. Control passes back to the original transaction on completion of the executed transaction. (Note that the CALL statement invokes a rule within the scope of the current transaction, but the EXECUTE statement invokes a rule that starts an independent transaction.)

Like the CALL statement, the EXECUTE statement can invoke a rule directly by referring to the rule by its name or indirectly by referring to a field of a table or to a parameter which contains the name of the rule. The first two examples in Table 27 invoke the rule SELECT_RENTAL directly, and the last example invokes the rule whose name is the value of the field ROUTINE of the table PFKEYS.

TABLE 28

| EXECUTE Statement |
|---|
| EXECUTE SELECT_RENTAL<br>(NEAREST_CAR(LOCATION));<br>EXECUTE SELECT_RENTAL<br>WHERE RENTAL_LOC =<br>NEAREST_CAR(LOCATION);<br>EXECUTE PFKEYS.ROUTINE; |

Exceptions: SIGNAL Statement

The SIGNAL statement causes the exception specified within the statement. An ON statement or an UNTIL clause can subsequently detect and process an exception caused by the SIGNAL statement.

In Table 29, the SIGNAL statement causes a user-defined exception MISSING_INVOICE.

Note: the SIGNAL statement gives the user a way to signal exceptions. The system automatically signals system exceptions such as GETFAIL or ERROR when it detects an error.

TABLE 29

| SIGNAL Statement |
|---|
| SIGNAL MISSING_INVOICE; |

EXCEPTION HANDLING

The fourth part of a rule contains exception handlers (if there are any).

ON Statement

An exception handler is an ON statement that contains the name of an exception followed by a sequence of actions to be executed in the event that the exception is detected.

The ON statement is in effect only during the execution of the actions of the rule in which it occurs. It will trap exceptions generated both in the rule and in any of the rule's descendants (rules which are below the rule in the calling hierarchy).

If ON statements in two or more rules at different levels in the calling hierarchy can handle the same exception, the ON statement in the lowest rule handles the exception.

System exceptions are hierarchically defined (the hierarchy is presented in the next section). If more than one handler within a rule can handle an exception, the most specific handler will handle it. For example, GETFAIL is lower than ACCESSFAIL in the exception hierarchy. If a rule has both a GETFAIL handler and an ACCESSFAIL handler, and a GETFAIL exception occurs, the GETFAIL handler will be invoked. If the rule has no GETFAIL handler but does have an ACCESSFAIL handler, the ACCESSFAIL handler will be invoked.

In Table 30, the exception DATE_INVALID caused by the SIGNAL statement, if it is trapped, is trapped higher in the calling hierarchy, because DATE_INVALID is not handled in the rule CUSTINFO. The rule that called CUSTINFO, for example, might trap this exception. If the exception DATE_INVALID is not trapped, the transaction terminates with an error condition, and the message log shows that the exception was signaled.

The GETFAIL handler (ON GETFAIL CUSTOMER) will handle a GETFAIL exception if it occurs on a GET access to the table CUSTOMER when the rule VALID_DATE is invoked (assuming VALID_DATE does not provide its own handler), or if it occurs in the GET CUSTOMER statement.

TABLE 30

| Exception Handling | | |
|---|---|---|
| CUSTINFO(DATE, ID) ; | | |
| VALID_DATE(DATE); | Y | N |
| GET CUSTOMER WHERE NAME = ID; | 1 | |
| SIGNAL DATE_INVALID; | | 1 |
| ON GETFAIL CUSTOMER :<br>CALL ENTER_CUSTOM; | | |

Data access exception handlers (handlers for GETFAIL, INSERTFAIL, DELETEFAIL, REPLACEFAIL, ACCESSFAIL, and DEFINITIONFAIL) can limit their scope by specifying a table name, as in Table 30. If a table name is specified, the handler will only trap the corresponding exception if it is detected while accessing that table. If no table is specified, the handler will trap the exception regardless of what table is being accessed.

The statements comprising an exception handler might cause the same exception. If this happens (and the second exception is not handled somewhere lower in the calling hierarchy), the currently executing handler will not handle the second exception. The rule executor will detect a possible "infinite loop" condition and abort the transaction.

Exception Hierarchy

The run time environment signals system exceptions to permit an application to recover from an error. System exceptions form a hierarchy of names. The ERROR exception will trap all detectable errors, but the GETFAIL exception will only trap a table occurrence not found on execution of a GET statement. The following diagram shows all of the system exception names with their relative position in the hierarchy.

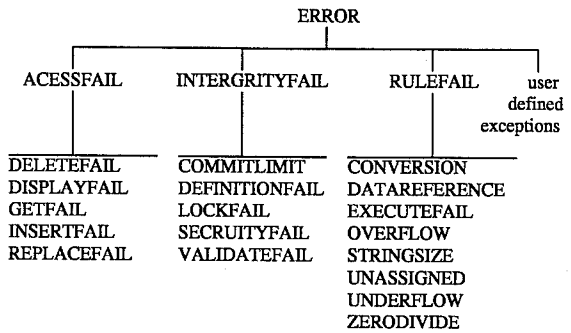

Three levels of exceptions are defined, and an exception will trap any of the exception names that are below it in the hierarchy. The conditions under which each of these exceptions is signaled are described below. ACCESSFAIL table access error has been detected COMMITLIMIT—limit on number of updates for one transaction has been reached CONVERSION—value contains invalid data for syntax or cannot be converted to target syntax DATAREFERENCE—error in specification of selection criteria has been detected DEFINITIONFAIL—error in definition of a table has been detected DELETEFAIL—key for DELETE statement does not exist DISPLAYFAIL—error in displaying a screen has been detected ERROR—an error has been detected EXECUTEFAIL—an error in the child transaction has been detected GETFAIL—no occurrence satisfies the selection criteria INSERTFAIL—key for INSERT statement already exists LOCKFAIL—there is a lock on an occurrence or a table is unavailable or a deadlock has occurred OVERFLOW—value is too big to be assigned to target syntax REPLACEFAIL—key for REPLACE statement does not exist RULEFAIL—error results from arithmetic computation SECURITYFAIL—permission for requested action is denied STRINGSIZE—size error in assigning one string to another has been detected UNASSIGNED—a field of a table that has not been assigned a value has been referenced UNDERFLOW—value is too small to be represented in target syntax (mostly exponential errors)

VALIDATEFAIL—validation exit requested through validation exit key

ZERODIVIDE—attempt to divide by zero has been detected

EXPRESSIONS, OPERATORS, AND DATA TYPES

Conditions, actions, and exception handlers contain expressions. Expressions may contain arithmetic operators and/or a string-concatenation operator. These operators conform with conventional notation, and they obey the precedence given below (exponentiation has highest precedence):

| | |
|---|---|
| ** | exponentiation |
| *,/ | multiplication, division |
| +,− | unary +, unary − |
| +,−,\|\| | addition, subtraction, string-concatenation |

A sequence of arithmetic operators or string-concatenation operators of the same precedence is evaluated from left to right. Table 31 shows operators within expressions.

TABLE 31

| Expressions |
|---|
| (PRICES.BASE + PRICES.SHIPPING) * TAXES.RETAIL |
| PRINCIPAL * ( 1 + INTEREST) ** YEARS |

Each element of an expression has a syntax and a semantic data type. The syntax describes how the data is stored, and the semantic data type describes how the element can be used.

Syntax

The syntax for values of a field of a table is specified in the table definition. The maximum length of the field is also specified in the table definition.

Valid specifications for syntax are:

| | |
|---|---|
| B | (binary)<br>- valid lengths are 2 and 4 bytes |
| P | (packed decimal)<br>- valid lengths range from 1 to 8 bytes, which can hold from 1 to 15 decimal digits<br>- the number of decimal digits is specified in the table definition |
| F | (floating point)<br>- valid lengths are 4, 8, and 16 bytes, for a primary key field, or from 1 to 256 bytes for other fields |
| C | (fixed length character string)<br>- valid lengths range from 1 to 128 bytes, for a primary key field, or from 1 to 256 bytes for other fields |
| V | variable length character string<br>- valid lengths range from 3 to 128 bytes, for a primary key field, or from 3 to 256 bytes for other fields<br>- storage is reserved for the length specified, but string operations use the current length |

Semantic Data Types

The semantic data type for values of a field of a table is specified in the table definition. The semantic data type determines what operations can be performed on values of the field. Operators in the language are defined only for meaningful semantic data types. For example, negating a string or adding a number to an identifier are invalid operations (consider adding 3 to a license plate number)

Valid semantic data types and their permitted syntax are:

| | | |
|---|---|---|
| | I | (identifier) |
| | | C (fixed length character string) |
| | | V (variable length character string) |
| | | B (binary) |
| | | P (packed decimal) |
| | S | (string) |
| | | C (fixed length character string) |
| | | V (variable length character string) |
| | L | (logical) |
| | | C (fixed length character string of length 1) |
| | | Possible values: |
| | | Y (yes) |
| | | N (no) |
| C | | (count) |
| | | C (fixed length character string) |
| | | V (variable length character string) |
| | | B (binary) |
| | | P (packed decimal with no decimal digits) |
| Q | | (quantity) |
| | | C (fixed length character string) |
| | | V (variable length character string) |
| | | B (binary) |
| | | P (packed decimal) |
| | | F (floating point) |

Comparison Operators

The rule language contains the following operators for making comparisons:

=

¬=

<

<=

>

>=

Note the following points about semantic data types in expressions containing these operators:

The relational operators for equality and inequality (=, ¬=) allow any two operands of the same semantic data type. These operators allow two operands of different semantic data types if the types are identifier and string or identifier and count.

The relational operators for ordering (<, <=, >, >=) allow any two operands of the same semantic data type except logical. Values of type logical are not permitted in comparisons which involve ordering.

Trailing blanks are significant for variable length strings, but not for fixed length strings. For example, comparison of two fixed length strings X and Y with lengths 12 and 16 will have the same result as if the shorter string X had been padded with four blanks on the right.

If syntax differs, operands are converted to a common syntax.

The result of a comparison is always a logical value ('Y' or 'N').

The Assignment Operator

The rule language uses the equal sign (=) as the assignment operator. Note the following points about semantic data types in expressions containing this operator:

A value of any semantic data type can be assigned to a field of the same semantic data type.

A value of type identifier can be assigned to a field of type count (and vice versa).

A value of type identifier can be assigned to a field of type string (and vice versa).

A value of type string can be assigned to a field of type quantity (and vice versa).

A value of type string can be assigned to a field of type count (and vice versa).

Arithmetic Operators

The rule language contains the following operators for doing arithmetic:

**

*

/

+

−

The arithmetic operators allow two operands in these combinations:

count and count quantity and quantity count and quantity

The Concatenation Operator the rule language uses a double vertical bar (||) as the concatenation operator. The concatenation operator is valid between any two semantic data types, and the result is always a variable length string.

Indirect Table and Field References

To assist the coding of generic routines and utility functions, the rule language permits indirect references to table and field names.

The rule COUNT in Table 32 is a generic routine that determines the sum of a field over all occurrences. This rule generalizes the rule COUNT_CARS in Table 4 so that it sums any field of any table (more precisely, any table without parameters): it receives the name of the table in the parameter TABLEREF, an it receives the name of the field in the parameter FIELDREF. The parentheses around the names TABLEREF and FIELDREF signify indirection.

The FORALL statement in the rule COUNT shows the two kinds of indirect reference. First, the FORALL statement loops over the table specified by the indirect table reference "(TABLEREF)". Second, the action in the body of the loop involves the field specified by the indirect field reference "(FIELDREF)". Suppose that the rule is call in this way:

```
CALL COUNT('PARTS','PRICE')
```

The value of TABLEREF will be 'PARTS', the value of FIELDREF will be 'PRICE', and the call will find the sum of the prices of all parts.

TABLE 32

Indirect References. The example invocations and their results show how indirect references can generalize a rule.

```
COUNT(TABLEREF, FIELDREF);
LOCAL SUM;
```

```
FORALL TABLEREF                                          1
  SUM = SUM + (TABLEREF).(FIELDREF) ;
  END;
CALL $PRINTLINE('THE SUM OF' || TABLEREF                 2
      ||' '|| FIELDREF||' IS: '|| SUM);
```

Example Invocation:
  CALL COUNT('CARS', PRICE');

TABLE 32-continued

| |
|---|
| Resulting printline: |
| THE SUM OF CARS PRICE IS: 5690230.19 |
| Example Invocation: |
| CALL COUNT('PARTS', 'QUANTITY'); |
| Resulting printline: |
| THE SUM OF PARTS QUANTITY IS: 6750 |

SYNTAX

A complete, formal syntax of the rule language in Backus-Naur Form (BNF) follows.

BNF Notation (a) Lower case words enclosed in angle brackets, < >, denote syntactic categories. For example:

<start character>

(b) In a list of alternatives each alternative starts on a new line.

(c) A repeated item is enclosed in braces, { }. The item may appear zero or more times. For example:

{<digit>}

(d) Optional categories are enclosed in square brackets, [ ]. For example:

[<exponent>]

Character Set

All rule language constructs are represented with a character set that is subdivided as follows:

(a) letters

A B C D E F G H I J K L M N O P Q R S T U V W X Y Z (b) digits 0 1 2 3 4 5 6 7 8 9

(c) special characters

@ # $ | ¬ & * ( ) − _ = + ; : ' , . / < >

Lexical Elements

A rule is a sequence of lexical elements. Lexical elements are identifiers (including reserved words), numeric literals, string literals and delimiters. A delimiter is one of the following special characters

| ¬ & * ( ) − + = : ; ' , / < > or one of the following compound symbols

** <= >= ¬= ||

Adjacent lexical elements may be separated by spaces or a new line. An identifier or numeric literal must be separated in this way from an adjacent identifier or numeric literal. The only lexical element which may contain a space is the string literal. String literals may span more than one line; all other lexical elements must fit on a single line.

Identifiers

Rule language identifiers may not exceed 16 characters in length.

<identifier> ::=<start character> {<follow character>}

<start character> ::=A B C D E F G H I J K L M N 0 P Q R S T U V W X YZ@#$

<follow character> ::=<start character> <digit>

<digit> ::= 0 1 2 3 4 5 6 7 8 9

Numeric Literals

The rule language supports the following forms of numeric literals:

<numeric literal> ::=<digits> [.<digits>] [<exponent>]

<digits> ::=digit {<digit>}

<digit> ::=0 1 2 3 4 5 6 7 8 9

<exponent> ::=E [<sign>] <digits>

<sign> ::=+ −

String Literals

A string literal is zero or more characters enclosed in single quotes:

<string literal> ::='{<character>}'

Single quotes within a string literal are written twice. Thus the following string literal is a single quote "".

Reserved Words

The following list of names are reserved by the system as key words in the rule language.

| | | |
|---|---|---|
| AND | ASCENDING | CALL |
| COMMIT | DELETE | DESCENDING |
| DISPLAY | END | EXECUTE |
| FORALL | GET | INSERT |
| LOCAL | NOT | ON |
| OR | ORDERED | REPLACE |
| RETURN | ROLLBACK | SCHEDULE |
| SIGNAL | TO | TRANSFERCALL |
| UNTIL | WHERE | LIKE |

Syntax of Rules

<rule> ::=<rule declare><cond list><action list><exception list>

<rule declare> ::=<rule header> [<local name declaration>]

<rule header> ::=<rule name> [<rule header parm list>];

<rule header parm list> ::=(<rule parameter name> { , <rule parameter name>})

<local name declaration> ::=LOCAL <local name> { , <local name>};

<cond list> ::={<condition>; }

<condition> ::=<logical value> NOT <logical value> <expression> <relop> <expression>

<logical value> ::=<field of a table> <rule parameter name> <function call>

<action list> ::=<action> {<action>}

<exception list> ::={<on exception>}

<on exception> ::=ON <exception designation> : {<action>}

<action> ::=<statement>;

<statement> ::=<assignment> <rule call> <function return> <table access stmt> <sync processing> <display processing> <signal exception> <asynchronous call> <iterative display processing>

<assignment> ::=<assignment target>=<expression> <assign by name>

<assignment target> ::=<field of a table> <local name>

<assign by name> ::=<table ref> .* =<table ref>.*

<rule call> ::=CALL <call spec> [<call arguments>]

<call spec> ::=<rule name> <rule parameter name> <table name> . <field name>

<call arguments> ::=<arg list> WHERE <where arg list>

<where arg list> ::=<where arg item> {<and> <where arg item>}

<where arg item> ::=<identifier>=<expression>

<function return> ::=RETURN (<expression>)

<table access stmt> ::=<get stmt> <insert stmt> <replace stmt> <delete stmt> <forall stmt>

<get stmt> ::=GET <occ spec>

<occ spec> ::=<table spec> [WHERE <where predicate>]

<table spec> ::=<table name> [<arg list>] <rule parameter name> [<arg list>] <table name> . <field name> [<arg list>]

<where predicate> ::=<where nexpr> {<logical op> <where nexpr>}

<where nexpr> ::=[<not>] <where expr>

<where expr> ::=<where relation> (<where predicate>)

<where relation> ::=<fieldname> <relational op> <where expression><where expression> ::=[<unary op>] <where expr term> {<add op> <where expr term>

<where expr term> ::=<where expr factor> {<mult op> <where expr factor>}

<where expr factor> ::=<where expr primary> [<exp op> <where expr primary>]

<where expr primary> ::=(<where expression>) <where field of a table> <rule parameter name> <local name> <function call> <constant>

<where field of a table> ::=<where table ref> . <field ref>

<where table ref> ::=* <table name> (<rule parameter name>) (<table name> . <field name>)

Notice that the <where table ref> production allows a "*" to be specified as the table name.

<insert stmt> ::=INSERT <table spec> [WHERE <where arg list>]

<replace stmt> ::=REPLACE <table spec> [WHERE <where arg list>]

<delete stmt> ::=DELETE <table spec> [WHERE <where arg list>]

<forall stmt> ::=FORALL <occ spec> [<table order>] [<until clause>] : <for alist> END <until clause> ::=UNTIL <exceptions>

<exceptions> ::=<exception designation> {<or> <exception designation>}

<exception designation> ::=<exception name> [<table name>]

<exception name> ::=<identifier>

<for alist> ::={<for action>;}

<for action> ::=<assignment> <rule call> <table access stmt> <display processing> <asynchronous call> <iterative display processing> COMMIT <table order> ::=<table order item> {AND <table order item>}

<table order item> ::=ORDERED [<ordering>] <field name>

<ordering> ::=ASCENDING DESCENDING

<order clause> ::=ORDER <order item> {<and> <order item>}

<order item> ::=ORDERED <fieldname> ORDERED ASCENDING <fieldname> ORDERED DESCENDING <fieldname>

<sync processing> ::=COMMIT ROLLBACK

<display processing> ::=DISPLAY <screen ref>

<screen ref> ::=<screen name> <table name> . <field name> <rule parameter name>

<screen name> ::=<identifier>

<signal exception> ::=SIGNAL <exception name>

<asynchronous call> ::=SCHEDULE [<queue spec>] <rule name> [<call arguments>]

<queue spec> ::=TO <expression>

<iterative display processing> ::=UNTIL <exceptions><display processing> : {<action>} END <field ref> ::=<field name> (<rule parameter name>) (<table name> <field name>)

<function call> ::=<function name> [<arg list>]

<arg list> ::=(<expression> { , <expression>])

<expression> ::=[<unary op>] <expr term> {<add op><expr term>}

<expr term> ::=<expr factor> {<mult op> <expr factor>}

<expr factor> ::=<expr primary> [<exp op> <expr primary>]

<expr primary> ::=(<expression>) <field of a table> <rule parameter name> <local name> <function call> <constant>

<field of a table> ::=<table ref> . <field ref>

<table ref> ::=<table name> (<rule parameter name>) (<table name> . <field name>) <rule name> ::=<identifier>

<function name> :==<identifier>

<rule parameter name> ::=<identifier>

<table name> ::=<identifier>

<field name> ::=<identifier>

<local name> ::=<identifier>

<unary op> ::=– +

<add op> :: =+ – ||

<mult op> ::=* /

<exp op> ::=**

<logical op> ::=<and> <or>

<and> ::=AND &

<or> ::=OR |

<not> ::=NOT¬

<relational op> ::=<rel op> LIKE

<rel op> ::== ¬= > >= < <=

<constant> ::=<string literal> <numeric literal>

III. Table Data Store

The table data store stores data in relational tables according to the unique table data structure. This structure can best be understood by understanding how tables are built through the table access machine.

HURON's logical access method to retrieve and access tables is the Table Access Method (TAM)

HURON provides access to other heterogeneous databases. This facility is transparent to the user once the data definition has been done. TAM acts as a traffic cop in conjunction with the transaction processor to access the correct server—resident in other regions The physical access method and data organization is the TDS (Table Data Store)

Data Stores are in a B+ Tree relational data structure

Since HURON is a transaction system, a user's access to a large amount of data will only affect their dependent region.

Defining a TDS table

Table Definer is invoked using a command DT <table name> from a work bench menu or a primary command line produced by a session manager routine. The screen layout of the Table Definer is set out in Table 33.

Standard naming conventions can be followed for the table name.

The default table type is TDS.

Other table types are available such as IMS, IMPORT-EXPORT (sequential) etc.

Each table type has its own table definition screen in the session manager.

Tables are universal to a system.

The Security system on individual tables prevents unauthorized access to the definition and/or data.

The syntax specifications of parameters and fields describe how the data is stored.

The semantic specifications describe how the data should be used in applications.

Event processing can be invoked at data definition time, however the actual rules are coded using the generalized programming language. The event processing is invoked when the data is accessed.

TABLE 33

Define Table - Screen Layout

| | | | | | | | | |
|---|---|---|---|---|---|---|---|---|
| DT EMPLOYEE | | | | | | | | |
| COMMAND==> | | | TABLE DEFINITION | | | | | |
| TABLE:EMPLOYEE | | TYPE:TDS | UNIT:educ | | | IDGEN:N | | |
| PARAMETER NAME | TYPE | SYNTAX | LENGTH | DECIMAL | EVENT RULE | | TYPE | ACCESS |
| USERID | I | C | 16 | | | | | |
| FIELD NAME | TYPE | SYNTAX | LENGTH | DECIMAL | KEY | REQ | DEFAULT | |
| EMPNO | I | P | 3 | 0 | P | | | |
| LNAME | S | C | 22 | 0 | | | | |
| POSITION | S | C | 14 | 0 | | | | |
| MGR# | I | P | 3 | 0 | | | | |
| DEPTNO | i | B | 2 | 0 | | | | |
| SALARY | Q | P | 3 | 2 | | | | |
| HIREDATE | S | C | 9 | 0 | | | | |
| ADDRESS | S | V | 40 | 0 | | | | |
| CITY | S | C | 20 | 0 | | | | |
| PROV | S | C | 3 | 0 | | | | |
| P_CODE | S | C | 7 | 0 | | | | |
| PFKEYS:3=SAVE 12=CANCEL 22=DELETE 13=PRINT 21=EDIT 2=DOC 6=RETRIEVE | | | | | | | | |

General discussion—TDS Options

The fields of the Define Table—Screen Layout are discussed below, except for obvious ones.

| | |
|---|---|
| TYPE: | The table type specifies the access method. Table Data Store ('TDS') is the default value and is used as the reference template. Each table type has an associated template for display. When the table type is changed, the corresponding template is displayed by pressing any of the function keys or the ENTER key. Valid table types include 'TEM' (temporary) 'IMP' (import), 'EXP' (export), 'PRM' (parameter), 'SUB' (subview) and 'IMS' (IMS) and others defined by a user. |
| UNIT: | The user unit the table is associated with is entered in this field. Valid units are provided by the database administration. |
| IDGEN: | This informs the system that it is responsible for providing unique primary keys for each occurrence. |
| PARAMETER: | The parameter information component is a scrollable area for multiple entries. A maximum of four entries are allowed. This feature allows the system to partition its databases based on a unique field. This mimics a hierarchial structure of data which is more common in the real world than truly relational. |
| NAME | The field name which should be unique within the table. |
| TYPE | The semantic type - application design control. |
| SYNTAX | The internal representation for storage. |
| LENGTH | The length in bytes. The system stores its' data as variable length data to optimize storage. |
| DECIMAL | If specified, it indicates the number of digits to the right of the decimal point. |
| KEY | The valid entry is 'P' for primary, and blank (non-key field). A table must have one field defined as its primary key. The primary key specification effectively makes the field a required one. Each occurrence in the table is uniquely identified by its primary key value. |
| RQD | The default value for this filed is blank (not required). Other valid entries are 'Y' for required or 'N' for not required. |

-continued

| | |
|---|---|
| | Inserting or editing an occurrence without proper values in the required fields is not allowed. |
| DEFAULT | The default value of the field, this will be input if the filed is left blank when a new occurrence is being added. |

Semantic Data Type and Syntax

All fields of a table are bound to a semantic data type and syntax. The syntax describes how the data is stored while the semantic type describes how a field may be used. Valid semantic data types and their permitted syntaxes are:

I - identifier

C fixed length character string
V variable length character string
P packed decimal
B binary S - string C fixed length character string
V variable length character string L - logical C fixed length character string of length 1
- value of "Y" for yes
- value of "N" for no C - count C fixed length character string
V variable length character string
B binary
P packed decimal with no decimal digits Q - quantity C fixed length character string
V variable length character string
B binary
P packed decimal
F floating point Valid field syntaxes specifications B - binary

- valid lengths are 2 and 4 bytes

-continued

| |
|---|
| P - packed decimal |
| - length may range from 1 to 8 bytes which can hold 1 to 15 decimal digits<br>- number of decimal digits may be specified |
| F - floating point |
| - valid lengths are 4, 8, and 16 bytes corresponding to 24, 56, and 112 binary digits of precision |
| C - fixed length character string |
| - valid lengths range from 1 to 128 bytes for a primary key field and 1 to 256 bytes for other fields.<br>- results in uppercase characters |
| V - variable length character string |
| - valid lengths range from 3 to 128 bytes for a primary key field and 2 to 256 bytes for other fields.<br>- storage is reserved for the maximum length possible for the string, however string operations use the current length<br>- results in upper/lower case |

TABLE 34-continued

| |
|---|
| contents and has designed USERID as a parameter in order to provide each course participant with a copy of the table. |
| PFKEYS: 3=EDIT OBJECT 5=EDIT/VIEW DOCUMENT |

Subview Tables

Subviews provide windows on corporate data. Users can be given a subset of the fields of a table or a subset based on selection criteria.

The Table definer is invoked using a DT <subview table name> command from the workbench menu or the command line on the screen.

Standard naming conventions are followed for the subview table name.

The subview table definer screen is invoked by changing the default table type "TDS" to "SUB", resulting in a definer screen as shown in TABLE 35.

The Security system on individual subviews prevents unauthorized access to the definition and/or use.

There is no separate space allocated for a subview. All data maintenance is actually carried out on the associated source TDS table.

TABLE 35

Screen layout of a subview table

DT SUB_TABLE
COMMAND==> TABLE DEFINITION
TABLE:SUB_TABLE TYPE:SUB UNIT:educ
SOURCE:EMPLOYEE
SELECT:USERID = 'EDUC' & DEPTNO = 10

PARAMETER NAME TYPE SYN LEN DEC SOURCE PARM ORDER FIELD SEQ

| FIELD NAME | TYP | SYN | LEN | DEC | KEY | REQ | DEFAULT | SRC | SOURCE NAME |
|---|---|---|---|---|---|---|---|---|---|
| EMPLOYEENO | I | P | 3 | 0 | P | | | S | EMPNO |
| LNAME | S | C | 22 | 0 | | | | | |
| POSITION | S | C | 14 | 0 | | | | S | MGR# |
| MANAGERNO | I | P | 3 | 0 | | | | | |
| DEPTNO | I | B | 2 | 0 | | | | | |

PFKEYS: 3=SAVE 12=CANCEL 13=PRINT 15=SAVEON 21=EDIT 22=DELETE
6=RETRIEVE 2=DOC
TABLE TYPE CHANGED (PF6 GETS BACK ORIGINAL DEFN).

Table Documentation

Documentation is associated with all objects including tables. Users can specify a short summary, keywords and a long description to document any tables defined, using a documentation screen as shown in TABLE 34 invoked from the table definer. The summary is limited to one line of information. The keywords specified can be made available for use by the keyword search facility. There is space available to provide a detailed table description. Script formatting commands can be included in the long description.

TABLE 34

DOCUMENTATION SCREEN FOR THE EMPLOYEE TABLE
DESCRIPTION OF TABLE:employee UNIT: educ
MODIFIED ON: BY: CREATED ON:88.181 BY:educ
KEYWORDS: EDUCATION,EMPLOYEE
SUMMARY: Table of employees parameterized by USERID
DESCRIPTION:

- This table contains employee information
- The education department is responsible for its General discussion—SUBVIEWS All fields are the same as described for the 'TDS' table. Fields unique to the subview are described below.

| | |
|---|---|
| SOURCE: | Name of the source table whose subview is defined by this table. The source table must exist before its subview can be defined. |
| SELECT: | The scope of the selection criteria is to subgroup the number of occurrences selected. If not present, all occurrences will be selected. |
| PARAMETERS: | New parameters can be specified in the subview if there is a corresponding field in the TDS table.<br>Source table parameters can be renamed and the source name specified in the SOURCE PARM. |
| ORDERING: | This is a scrollable area.<br>Ordering can be specified on a field that is not defined in the subview.<br>Ordering is only used for display purposes.<br>SEQ - A(scending) or D(escending) |

Field definition—Subviews:

SRC: This is the source indicator field. Fieldnames can be the same, renamed or unique to the subview table. The source,indicator field identifies the status of the field in relation to the source table.

Valid entries are:

Blank

Field definition in both source and subview are the same.

S=Source:

A renamed field is indicated with this entry followed by the field name in the source table D=Derived:

A field unique to the subview table is indicated by this entry as a derived field.

The source of a derived field ought to be a functional rule which returns a value for this field. Applicational Applicational advantages of this feature allows for table manipulations and ad hoc reporting on a subview table level.

In ADHOC processing the derived fields receive values when the table is accessed. for example, when editing the table:

ED (table name)

Event Rules

Event Rules within data definition are commonly made up of a mixture of either validations or triggers.

Validations are rules such as, when information is entered into a table, that data must be validated against another table. For example, when maintaining the employee table, the department number has to be in the departments table. This could extend to a series of other tables or external files.

Triggers cause actions to happen rather than just verification, such as audit trails, updating of other tables or scheduling of other jobs.

With event rules, a user is provided a completely "open" environment, where rigorous checks and controls can be implemented on data.

Definition of Event Rules:

Event rules can be defined for specific data access codes, such as insert or more generally—get and write Different event rules can be invoked on the same action Example Write—event rule—Validation Write—Trigger If a data maintenance action is invoked—such as insert or update then write will also be invoked.

The event rule that should be executed can be tested from a local library, but would reside in the site library at production time.

In the event that a test is required using for example the Table Editor then the workbench function cannot be used if the rule is in a local library.

To force the search path to access the local library execute the Table Editor as if it was a rule:

EX=====>STE('table name(parameters)')

or

Command line===>EX STE('tablename(parameters)')

When coding the event rule remember that the occurrence of the table has already been obtained—no data access is required for that table.

When coding the event rule the following has to be true:

TRIGGERS—subroutines

VALIDATIONS—functions returning 'Y', 'N' or a message if not 'Y'

Example of an Event Rule—Validation:

In defining the Employee table there was the following constraint:

All employees had to have the department number validated.

The validation had to be done against the DEPARTMENTS table.

The department data consisted of a department number and a department name.

The definition of the EMPLOYEE table had to change to reflect that a validation rule DEPT_CHK was to be executed anytime any type of maintenance was performed.

The changed EMPLOYEE table with event rule DEPT_CHK is shown in TABLE 36.

TABLE 36

| COMMAND==> | | | TABLE DEFINITION | | | | |
|---|---|---|---|---|---|---|---|
| TABLE:EMPLOYEE | | TYPE:TDS | UNIT:PER | | | IDGEN:N | |
| PARAMETER NAME | TYPE | SYNTAX | LENGTH | DECIMAL | EVENT RULE | TYPE | ACCESS |
| USERID | I | C | 100 | | DEPT_CHK | V | W |
| FIELD NAME | TYPE | SYNTAX | LENGTH | DECIMAL | KEY REQ DEFAULT | | |
| EMPNO | I | P | 3 | 0 | P | | |
| LNAME | S | C | 22 | 0 | | | |
| POSITION | S | C | 20 | 0 | | | |
| MGR# | I | P | 3 | 0 | | | |
| DEPTNO | C | B | 2 | 0 | | | |
| SALARY | Q | P | 4 | 2 | | | |
| HIREDATE | S | C | 9 | 0 | | | |
| ADDRESS | S | V | 80 | 0 | | | |
| CITY | S | C | 20 | 0 | | | |
| PROV | S | C | 3 | 0 | | | |
| P_CODE | S | C | 7 | 0 | | | |
| PFKEYS:3=SAVE 12=CANCEL 22=DELETE 13=PRINT 21=EDIT 2=DOC 6=RETRIEVE | | | | | | | |

The event rules section is a scrollable portion

Event rules are coded in execution order

An example of the rule DEPT_CHK would appear as in TABLE 37.

TABLE 37

```
RULE EDITOR ==>

DEPT_CHK;

—
— GET DEPARTMENTS WHERE DEPTNO =
—   EMPLOYEE.DEPTNO;
—
  RETURN('Y');
—
— ON INSERTFAIL DEPARTMENTS:
—
  RETURN('INVALID DEPARTMENT NUMBER:' ||
—   EMPLOYEE.DEPTNO);
—
```

Example of an Event Rule—Trigger

The Employee table modified to include the trigger EMP_AUDIT is shown in TABLE 38.

To provide an audit trail of the people that update the employee table, an output table will be created.

This table EMP_AUDIT will contain information about the user and also the values of the important fields such as salary.

Change the definition to force an audit entry to be written every time the employee table is maintained.

TABLE 38

Additional Event Rule for the employee table

COMMAND==> TABLE DEFINITION
TABLE:EMPLOYEE TYPE:TDS UNIT:PER IDGEN:N

| PARAMETER NAME | TYPE | SYNTAX | LENGTH | DECIMAL | EVENT RULE | TYPE | ACCESS |
|---|---|---|---|---|---|---|---|
| USERID | I | C | 100 | | DEPT_CHK | V | W |
| | | | | | EMP_AUDIT | T | W |

| FIELD NAME | TYPE | SYNTAX | LENGTH | DECIMAL | KEY | REQ | DEFAULT |
|---|---|---|---|---|---|---|---|
| EMPNO | I | P | 3 | 0 | P | | |
| LNAME | S | C | 22 | 0 | | | |
| POSITION | S | C | 20 | 0 | | | |
| MGR# | I | P | 3 | 0 | | | |
| DEPTNO | C | B | 2 | 0 | | | |
| SALARY | Q | P | 4 | 2 | | | |
| HIREDATE | S | C | 9 | 0 | | | |
| ADDRESS | S | V | 80 | 0 | | | |
| CITY | S | C | 20 | 0 | | | |
| PROV | S | C | 3 | 0 | | | |
| P_CODE | S | C | 7 | 0 | | | |

PFKEYS:3=SAVE 12=CANCEL 22=DELETE 13=PRINT 21=EDIT 2=DOC 6=RETRIEVE

The table to hold the audit trail information would have the definition shown in TABLE 39.

TABLE 39

COMMAND==> TABLE DEFINITION
TABLE:EMPLOYEE TYPE:TDS UNIT:PER IDGEN:Y

| PARAMETER NAME | TYPE | SYNTAX | LENGTH | DECIMAL | EVENT RULE | TYPE | ACCESS |
|---|---|---|---|---|---|---|---|

| FIELD NAME | TYPE | SYNTAX | LENGTH | DECIMAL | KEY | REQ | DEFAULT |
|---|---|---|---|---|---|---|---|
| AUDIT_NO | I | B | 4 | 0 | P | | |
| USERID | S | C | 8 | 0 | | | |
| TRAN_DATE | S | C | 8 | 0 | | | |
| TRAN_TIME | S | C | 8 | 0 | | | |
| EMPNO | I | P | 3 | 0 | | | |
| LNAME | S | C | 22 | 2 | | | |

TABLE 39-continued

| | | | | | | |
|---|---|---|---|---|---|---|
| DEPTNO | C | B | 2 | 0 | | |
| SALARY | Q | P | 4 | 2 | | |
| PFKEYS:3=SAVE | 12=CANCEL | 22=DELETE | 13=PRINT | 21=EDIT | 2=DOC | 6=RETRIEVE |

Note that this table will use an automatically generated key.

An example of the rule EMP_AUDIT would appear as shown in TABLE 40.

The Event rules for the base table are still in effect for the subview.

TABLE 40

```
        RULE EDITOR ==>

EMP_AUDIT;
    ________________________________________________+________
  _
    ________________________________________________+________
  _
    EMP_AUDIT.* = EMPLOYEE                          |
  _
    EMP_AUDIT.USERID = USERID                       |
  _
    EMP_AUDIT.TRAN_DATE = CURRENT_DATE('Y/M#/D');   |
  _
    EMP_AUDIT.TRAN_TIME = REALTIME;                 |
  _
    INSERT EMP_AUDIT;                               |
  _
    ________________________________________________+________
  _
```

SUBVIEWS—Derived Fields

SUBVIEWS can consist of a view of existing data. It can also consist of derived fields.

The definition of the subview template provides a space as mentioned before for defining the source and the source name.

The source can be 'S'

To provide an alternate name for a field from the base table.

The source name must be the name from the base table.

However, if the source is defined as 'D'

To provide a derived field using information from the base table.

The source name must be the rule to be executed whenever the subview is accessed.

When the subview provides source rules to be executed, these rules are functions returning one value.

These rules are unlimited in their function similar to event rules.

Similarly, these rules already know the current occurrence of the associated table—no data access against that table is required.

The information on derived fields is never stored and therefore cannot be updated.

Similar to the event rules—a search of the local library has to be forced in a testing environment. These rules would exist in the site library normally. (Please refer to event rules section).

Additional security can be placed on a subview over the base table.

The following example of an event rule validation illustrates used of Derived fields.

Request by manager of department 10

Only his employees

Only certain fields

Interested in how his staff could benefit from the new Employee Savings program that the company had introduced.

With this in mind, a subview was created to satisfy the manager's request.

Two derived fields were added to calculate the employee's length of employment and the amount that the employee could save.

These fields are good choices for derived fields because the length of employment increases daily and the savings amount is a calculation based on that data and the salary. Therefore if the salary changes and the length of employment is always changing, this field is too dynamic to store on a database.

The layout of the subview file is shown in TABLE 41.

TABLE 41

```
                                              DT EMPLOYEE_SUB
COMMAND==>        TABLE DEFINITION
TABLE:EMPLOYEE_SUB      TYPE:SUB        UNIT:EDUC
SOURCE:EMPLOYEE
SELECT:DEPTNO = 10
```

TABLE 41-continued

| PARAMETER NAME | TYPE | SYN | LEN | DEC | SOURCE PARM | ORDER FIELD | SEQ |
|---|---|---|---|---|---|---|---|
| USERID | I | C | 100 | 0 | | | |

| FIELD NAME | TYPE | SYN | LEN | DEC | KEY | REQ | DEFAULT | SRC | SOURCE NAME |
|---|---|---|---|---|---|---|---|---|---|
| EMPLOYEENO | I | P | 3 | 0 | P | | | S | EMPNO |
| LNAME | S | C | 22 | 0 | | | | | |
| HIREDATE | S | C | 9 | 0 | | | | | |
| MANAGERNO | I | P | 3 | 0 | | | | S | MGR# |
| DEPTNO | I | B | 2 | 0 | | | | | |
| LGTH_EMPLOY | I | B | 4 | 0 | | | | D | LGHT_EMPLOY |
| EMP_SAVINGS | I | B | 4 | 0 | | | | D | EMP_SAVINGS |

PFKEYS:3=SAVE 12=CANCEL 13:PRINT 15:SAVEON 21=EDIT 22=DELETE
6=RETRIEVE 2=DOC

An example of the rule LGTH_EMPLOY to calculate the length of employment would appear as shown in TABLE 42.

TABLE 42

```
          RULE EDITOR ==>

LGTH_EMPLOY;
    ------------------------------------------+-------
  _
    ------------------------------------------+-------
  _
    RETURN(DATE_DIFFERENCE(HIREDATE, 'D-M-Y', |
  _   CURRENT_DATE('D-M-Y'), 'D-M-Y'));       |
  _
    ------------------------------------------+-------
  _
```

The difference between the two dates—HIREDATE and today's date would be obtained using the function DATE_DIFFERENCE. This value is then returned anytime the data is access through this subview.

An example of the rule EMP_SAVINGS would appear as shown in TABLE 43.

TABLE 43

```
          RULE EDITOR ==>

EMP_SAVINGS;
    ------------------------------------------+-------
  _
    LGTH_EMPLOY > 365;                        | Y N
  _
    ------------------------------------------+-------
  _
    RETURN(EMPLOYEE.SALARY * 52 * 0.06);      | x
  _
    RETURN (0);                               |   x
  _
    ------------------------------------------+-------
  _
```

A decision has to be made based on the length of employment:

Employment a year or more then the employee is eligible to use the plan.

Calculation—6 Percent of the annual salary (52 weeks)

Less than that—no eligibility amount is zero.

Changing a Table Definition

Changing a table definition is allowed if the table is not populated. If the table is populated, then some restrictions apply, which will be caught by the Table Definer.

Any new fields must be added to the end of the previous ones

Field lengths can be made longer, but should not be shortened

Some syntaxes do not allow modification

Semantic constraints can be changed

Table Definition Command Summary

1. LINE COMMANDS

The leftmost column of the screen is reserved for entering line commands. A line command is entered by placing the first letter of the command in the command space on the line. All line commands are processed when a function key or the ENTER key is pressed.

I—INSERT AFTER THIS LINE
D—DELETE THIS LINE
R—REPLICATE THIS LINE
C—COPY THIS LINE
M—MOVE THIS LINE

A—DESTINATION OF MOVE/COPY AFTER THIS LINE
B—DESTINATION OF MOVE/COPY BEFORE THIS LINE

The destination of a MOVE or COPY command is determined from either an explicit destination "A" for after or "B" for before, or an implicit destination (the line after the current cursor position).

PRIMARY COMMANDS AND FUNCTION KEYS

The primary commands are entered in the area provided on the first line of the screen. Most primary commands have corresponding function keys for user convenience. Following is a list of PF keys and their functions and associated primary commands:

| PF Key | Command | Summary |
|---|---|---|
| PF1 | | -HELP. |
| PF2 | DOC | -DOCUMENTATION FOR THIS TABLE |
| PF3 | SAVE | -SAVE THE DEFINITION AND LEAVE THE DEFINE TABLE. |
| PF6 | RETRIEVE | -COMMENCES A NEW SESSION BY RETRIEVING THE DEFINITION OF THE NAMED TABLE |
| PF7 | | -SCROLL UP IN THE RULE |
| PF8 | | -SCROLL DOWN IN THE RULE |
| PF9 | | -REDISPLAY PREVIOUS PRIMARY COMMAND |
| PF12 | CANCEL | -LEAVE THE TABLE DEFINE WITHOUT SAVING CHANGES |
| PF13 | PRINT | -PRINT THE DEFINITION |
| PF15 | SAVEON | -SAVE AND CONTINUE |

-continued

| | | |
|---|---|---|
| PF22 | DELETE | -DELETE THE DEFINITION AND EXIT |
| | COPY | -APPEND THE DEFINITION OF A NAMED TABLE |
| PF21 | EDIT | -SAVE THE DEFINITION & BEGIN AN STE SESSION |

SCREEN DEFINITION

Facilities of the Screen

The HURON Screen Definer is invoked from the workbench.

A screen is made up of various screen tables.

Screen tables are unique to the system and are shareable between screens.

The Screen Definer consists of two separate functions.

(1) The screen definition—which screen tables should be used.

(2) Painting the screen tables and defining the fields within the screen table.

Screen tables have no stored representation in the data store and are temporary tables within the user's environment.

Screen tables are manipulated using the same data access commands in the rules language specifications as all other tables.

Screen Definition

Screen definition is invoked by a PS <screen name> command. This results in a layout screen as shown in TABLE 44.

The screen name is unique to the system.

The screen definition provides for default keys and will automatically perform scrolling for the user.

A screen can be viewed by pressing PF21, any validation rules or require fields can be entered at this time to test validation—without the user having written a DISPLAY command in the rules language.

PF12—the default validation exit will provide an exit if the validation rules cannot be met.

If the user provides a fieldname from a screen table within the SCROLL AMOUNT ENTRY area then HURON will allow scrolling values such as M-maximum, P—page, etc., to be invoked without any further coding.

The user can control the initial cursor position.

Default PFkeys can be modified to meet the user's standards.

TABLE 44

HURON BUILD SCREEN: employee_expense UNIT: acc

| PF KEYS | SCROLL AMOUNT ENTRY | DEFAULT CURSOR POSITION |
|---|---|---|
| UP:7 DOWN:8<br>LEFT:10 RIGHT:11<br>VALIDATION EXIT:12<br>HELP:1 REFRESH:24 | TABLE: _______<br>FIELD: _______ | TABLE: expense_data<br>FIELD: employee# |

SCREEN TABLES FOR EMPLOYEE_EXPENSE

| NAME | ORIGIN ROW: | ORIGIN COL: | MAX OCCUR: | SCROLL: | VALIDATION RULE: | TITLE: | FOOTING | FIX COL |
|---|---|---|---|---|---|---|---|---|
| acct_title | 1 | 1 | 1 | n | | | | |
| expense_data | 5 | 5 | 5 | y | AUTHORIZE | 2 | | |

PFKEYS: 2=DOCT 6=PAINT 9=DEFHLP 13=PRINT 16=EXCLD 19=DUP 21=DISPLAY

Screen Definitions Command Summary

Following is a list of PF keys and their functions:

| PF Key | Function | Summary |
|---|---|---|
| PF1 | Help | - HELP ON SCREEN DEFINITION. |
| PF2 | Document | - DOCUMENTATION FOR THIS SCREEN. |
| PF3 | Save | - SAVE THE DEFINITION AND EXIT. |
| PF6 | Paint | - SAVE AND CALL THE SCREEN PAINTER FOR THE TABLE AT CURSOR POSITION. |
| PF7 | | - SCROLL UP. |
| PF8 | | - SCROLL DOWN. |
| PF9 | Define HELP | - DEFINE HELP SCREEN TO BE ASSOCIATED WITH THIS SCREEN. |
| PF12 | Cancel | - EXIT THE FACILITY WITHOUT SAVING CHANGES. |
| PF13 | Print | - PRINT THE SCREEN. |

-continued

| | | |
|---|---|---|
| PF16 | Exclude | - EXCLUDE THE TABLE THE CURSOR IS ON. |
| PF19 | Duplicate | - DUPLICATE THE LINE THE CURSOR IS ON. |
| PF21 | Display | - DISPLAY THE SCREEN. |
| PF22 | Delete | - DELETE THE DEFINITION AND EXIT. |

Painting Screen Tables

The screen table painter has two portions: the actual painting of the screen; and the definition of the fields and attributes. The layout screen is shown in TABLE 45.

Screen table names are unique to the system.

Screen tables are not directly associated with any data tables.

Painting the screen tables is very flexible, and free format.

The user is provided the ability to copy the fieldnames from an existing data table, if required.

Validation rules can be associated with each screen table, as opposed to just the screen. This provides sharing for validation rules as well.

The features of the screen table painter provide a great deal of flexibility, such as moving the positions of fields, deleting lines, easy online help screens etc.

-continued

| | | |
|---|---|---|
| PF19 | Copy | - COPY THE NAMED TABLE DEFINITION. |
| PF22 | Delete | - DELETE THE DEFINITION AND EXIT. |

IV. Dictionary Data

All data within the HURON data processing machine is stored according to the table access machine, either directly in the table data store or virtually in other data storage systems. The actual location and the type of table in which a given occurrence is stored is defined by a plurality of dictionary tables within the table data store. These dictionary tables can be considered metadata in that they are prespecified tables having a structure known to the table data store and to the table access machine so that they can be automatically surveyed in order to build control tables used for accessing occurrences in generic tables.

The dictionary tables include the table named TABLE which has the structure shown in FIG. 3. This table includes the name and type of all tables available to a given session in the machine.

Also, the dictionary includes a table named FIELDS (table name) which is a table which includes the attributes of all data elements in the system and has the structure set out in FIG. 4. This table is parameterized on the table name. Therefore, the table access machine generates a view of the table called FIELDS which is limited to the fields of a given table.

TABLE 45

Screen Table Painter

CUSTOMER INFORMATION

CUSTOMER NAME : -AAAAAAAAAAAAA ACCOUNT#: -99999
STREET ADDRESS : -AAAAAAAAAAAAAAAAAAAAA
CITY & PROVINCE : -AAAAAAAAAAAAAAAAAAAAA

| TABLE: | ORDER_CUST | FIELD | | SCREEN ATTRIBUTES | | | | | | | | |
|---|---|---|---|---|---|---|---|---|---|---|---|---|
| ROW, COL | NAME | TYP | SYN | JUST | FILL | LEN | DEC | PT | SHW | RQ | HI | SKP |
| 3 18 | name | s | c | l | | 14 | 0 | n | y | y | y | y |
| 3 35 | account# | i | c | r | 0 | 5 | 0 | n | y | y | n | n |
| 4 18 | address | s | c | l | | 22 | 0 | n | y | n | n | y |
| 5 18 | city | s | c | l | | 22 | 0 | n | y | y | n | y |

PFKEYS: 2=DOC 4=±LINE 5=CUT 6=+FLD 13=Print 16=–LINE 17=PASTE
18=–FLD 19=LOAD

Screen Painter Command Summary

Following is a list of PF keys and their functions:

| PF Key | Function | Summary |
|---|---|---|
| PF1 | Help | - HELP ON SCREEN DEFINITION. |
| PF2 | Document | - DOCUMENT FOR THE SCREEN TABLE. |
| PF3 | Save | - SAVE THE DEFINITION AND EXIT. |
| PF4 | Add line | - INSERT A LINE AFTER THE CURSOR. |
| PF5 | Cut field | - CUT & HOLD THE FIELD AT CURSOR. |
| PF6 | Add field | - ADD A FIELD AT THE CURSOR |
| PF7 | | - SCROLL UP. |
| PF8 | | - SCROLL DOWN. |
| PF12 | Cancel | - EXIT THE FACILITY WITHOUT SAVING CHANGES. |
| PF13 | Print | - PRINT THE SCREEN. |
| PF16 | Delete line | - DELETE THE LINE THE CURSOR IS ON. |
| PF17 | Paste field | - RELEASE A CUT FIELD & POSITION AT THE CURSOR POSITION. |
| PF18 | Del field | - DELETE THE FIELD THE CURSOR IS ON. |

The dictionary also includes a table called PARMS (table name) which is shown in FIG. 5.

This table identifies the parameter associated with each table, if there are any.

The dictionary also includes the table called SELECTION (table name) shown in FIG. 6, in which is stored a selection string or filter to be applied to accesses to the table.

Other dictionary tables include ORDERING (table name) as shown in FIG. 7 which defines a set of ordering operations to be implemented upon accesses to the table, EVENTRULES (table name) as shown in FIG. 8 which specifies rules to be executed upon access events to occurrences in the table, @RULESLIBRARY (library name) as shown in FIG. 9 which stores actual object code for executable rules for the session. The parameter library name is a basic method for dividing up the rules library by a variety of names.

The dictionary also includes dictionary tables required for accesses through the servers other than the table data store. For instance, FIGS. 10, 11, and 12 shown the tables IMSTABFIELDS (table name), IMSSEGFIELDS (db name, seg name), and the IMSACCESS (table name) tables which are used by the IMS server. The IMSTABFIELDS table maps the table access method filed name to an IMS field name. The IMSSEGFIELDS table provides the syntax and mapping parameters for an access based on parameters retrieved from the IMSTABFIELDS table, The IMSACCESS table is used by the server to generate actual access sequences for transmission to the IMS data base.

Also, the dictionary table includes the tables used by the screen servers as shown in FIGS. 13–15. FIG. 13 showns the table SCREENS which identifies all the screens that are accessible through the table access machine in a given session. FIG. 14 shows the table SCREENTABLES (screen) which provides a screen definition for a window in a position within a screen for the window.

The table SCREENFIELDS (screen table) shown in FIG. 15 further provides mapping directly onto the screen itself.

This dictionary data can be expanded to serve any number of servers, but its structure is hard coded ("meta meta data") in the preferred system.

Now that the basic application programmer's view of the system has been described and the representation of data and dictionary data in the system has been provided, an internal specification of the operation of the virtual machines can be understood.

V. Internal Representation of Rules

Rules are stored in an internal representation that is directly executable by the virtual stack machine. The process of saving a rule in the rule editor involves a translation from its textual source code to virtual machine object code. When the textual representation of a rule is required, a detranslation process converts from the virtual machine object code to text. The obvious advantage of storing only one representation of a rule is that a discrepancy between representation can never arise.

This section details the internal representation of a rule. It begins by describing the overall layout of the object code. A detailed description of the various data items, and virtual machine opcodes follows. Examples of the object code corresponding to various kinds of rule statements are included.

THE FORMAT OF A RULE

Rule object code is stored in the @RULESLIBRARY table. This table is parameterized by library name and has the rule name as its primary key.

Conceptually, the object code for a rule may be subdivided into four components: 52 bytes of header information; "n" bytes of code; "m" bytes of static (non-modifiable) data; and "p" bytes of modifiable data. Only the first three of these components are actually stored in the object code. The modifiable area is allocated when the rule is loaded for execution.

TABLE 46 shows the detailed layout of the rule object code. The header and code sections contain references to objects in the static data area. These references are two byte binary offsets which are relative to the start of the header. The Parameters, Local Variables, Exception Handler Names, Table.Field Names, Rule names and Constants Sections all belong to the static data area.

TABLE 46

| Layout of rule object code |
|---|
| Header (52 bytes) |

TABLE 46-continued

| |
|---|
| Parameters (optional) |
| Local Variables (optional) |
| Code for Conditions |
| Code for Actions |
| Code for Exceptions (optional) |
| Exception Handler Names (optional) |
| Rule Names (optional) |
| Table.Field Names (optional) |
| Constants (optional) |

RULE HEADER

The header portion of the object code, which is shown in TABLE 47, contains the name of the rule along with various other values which describe the code, static data and modifiable data areas.

The length stored in the header is the number of bytes to the right of the length value. Thus the total length of the rule is the value in Length plus 28 (the number of bytes to the left of and including the Length value).

TABLE 47

Layout of rule object code header

| Value | Offset | Syntax | Purpose |
|---|---|---|---|
| Rulename | 00 | Char(16) | Name of the rule |
| Date | 16 | Char(6) | Date of translation |
| Time | 22 | Char(4) | Time of translation |
| Length | 26 | Bin(2) | Length of rest of rule |
| Num parms | 28 | Bin(2) | Number of formal parameters |
| Parm off | 30 | Bin(2) | Offset to local list |
| Num locs | 32 | Bin(2) | Number of local variables |
| Loc off | 34 | Bin(2) | Offset to local list |
| Cond off | 36 | Bin(2) | Offset to conditions |
| Act off | 38 | Bin(2) | Offset to actions |
| Excp off | 40 | Bin(2) | Offset to exception names |
| Function | 42 | Char(1) | Rule is a function (Y/N) |
| TabFld off | 43 | Bin(2) | Offset to t.f names |
| Const off | 45 | Bin(2) | Offset to constants |
| Rule off | 47 | Bin(2) | Offset to rule names |
| Version | 49 | Bin(1) | Object code version# |
| Mod data | 50 | Bin(2) | Size of modifiable data area |

RULE STATIC DATA

This section outlines the contents of the static data area. Certain object names in the static data section contain references to items in the modifiable data area. Each reference is a two byte offset which is relative to the start of the modifiable data area.

The values in the header which describe the static data area's layout are identified, when appropriate.

Parameters

The parameter section of the object code contains the list of names of the formal parameters declared for this rule.

TABLE 48

The internal representation of a parameter

| |
|---|
| Parameter name |
| (16) |

As shown in Table 48, item in the list is a 16 byte name. "Num parms" contains the number of formal parameters declared for this rule, while the "Parm off" value is an offset to the start of this list.

Local Variables

The local variables section of the object code contains the list of names of local variables declared in this rule.

TABLE 49

The internal representation of a local variable

| Local variable name | offset |
|---|---|
| (16) | (2) |

As shown in Table 49, each item in the list contains a 16 byte name followed by a two byte offset to the modifiable data area. "Num locs" contains the number of local variables declared in this rule, while "Locs off" contains an offset to the start of this list.

Exception handler names

The exception name section contains the list of names of exceptions handled by this rule.

TABLE 50

The internal representation of an exception name

| Exception name | offset | offset |
|---|---|---|
| (16) | (2) | (2) |

As shown in Table 50, each item in the list consists of a 16 byte name followed by a pair of two byte offsets. The first two byte offset references the name of the table associated with this exception. The table name is stored in the static data area as a 16 byte name. If there is no associated table name, this offset is zero. The second offset references the code which handles the exception. "Excp off" contains an offset to the start of this list; the list is terminated with a two byte zero.

Fields of tables

The table.field section of the rule object code is a list of all direct table.field names in the rule.

TABLE 51

The internal representation of a direct table.field name

| Table name | Field name | offset |
|---|---|---|
| (16) | (16) | (2) |

As shown in Table 51, each item in the list consists of two 16 byte names (one for the table and one for the field) followed by a two byte offset to the modifiable data area. "TabFld off" references the start of the list; the list ends at the "Const off" offset.

Rule names

The rule name section is a list of all the direct rule (or local variables not declared in this rule) names called by this rule.

TABLE 52

The internal representation of a direct rule name

| Rule name | offset |
|---|---|
| (16) | (2) |

As shown in Table 52, each item in the list consists of a 16 byte name, followed by a two byte offset to the modifiable data area. "Rule off" references the start of the list; the list ends at the "TabFld off" offset.

Constants

The constants section is a list of all the constants in the rule (either literal constants or constants generated internally by the translator). A shown in Table 53, each item in the list has a six byte descriptor followed by data. The data itself is prefixed by a one or two byte length (one byte if the data is 0 . . . 127 bytes in length, two bytes for 128+). The high order bit of CLen is on if CLen is two bytes, otherwise CLen is one byte.

TABLE 53

The internal representation of a constant

| Type | Syntax | DLen | Dec | CLen | Data |
|---|---|---|---|---|---|
| (1) | (1) | (2) | (2) | (1/2) | (CLen) |

The type is a single byte which contains the semantic type of the constant. All constants have an unknown (blank) semantic type. The Syntax is a byte which indicates the representation of the data. Valid syntaxes are B(binary) P(packed decimal) F(floating point) C(fixed char) and V(variable char). The DLen is two bytes and contains the definition (or maximum) length of the Data. CLen contains the current length of the Data. Dec is also two bytes and contains the number of digits to the right of the decimal point. Dec is only meaningful for packed decimal constants. "Const off" references the start of the list of constants; the list terminates at the end of the object code which is given by "Length"+28.

RULE OPCODES

The virtual stack machine is based on a stack architecture. Most virtual machine instructions manipulate the items on the top of the stack. All stack items are four bytes in length. Many items are pointers to values which are either fields of a table, rule constants or temporary values built during execution. As shown in Table 54, all values are comprised of a six byte descriptor, followed by a four byte pointer to the actual data. The data itself is prefixed by a one or two byte length. The stack may contain other information, such as that necessary to implement rule call and return.

TABLE 54

The virtual machine representation of a value

| Type | Syntax | DLen | Dec | Pointer → | CLen | Data |
|---|---|---|---|---|---|---|
| (1) | (1) | (2) | (2) | (4) | (1/2) | (CLen) |

For values that are built during execution, the virtual machine maintains a temporary area. When temporary values are popped from the stack, their storage in the temporary area is freed.

All virtual machine instructions contain a single byte opcode. Depending upon the opcode, it may require zero, one or two, two byte operands.

For the purpose of describing the semantics of each opcode, let item1 represent the top item on the stack and item2 represent the second item on the stack. Let operand1 and operand2 denote the first and second immediate operands, respectively.

| Name | Opcode | #Ops | Semantics |
|---|---|---|---|
| @ADD | 4 | 0 | Add two values together. Pop item1 and item2. Create and push a temporary value of item2 + item1. |
| @SUB | 8 | 0 | Subtract one value from another. Pop item1 and item2. Create and push a temporary value of item2 – item1. |
| @MULT | 12 | 0 | Multiply two values together. Pop item1 and item2. Create and push a temporary value of item2 * item1. |
| @DIV | 16 | 0 | Divide one value by another. Pop item1 and item2. Create and push a temporary value of item2 / item1. |
| @EXP | 20 | 0 | Raise one value to the power of another. Pop item1 and item2. Create and push a temporary value of item2 ** item1. |
| @UNM | 24 | 0 | Arithmetically negate a value. Pop item1. Create and push a temporary value of –(item1). |
| @CAT | 28 | 0 | Concatenate two values together. Pop item1 and item2. Create and push a temporary value of item2 concatenated to item1. |
| @EQ | 32 | 0 | Compare two values for equality. Pop item1 and item2. Create and push a temporary value of item 2 = item 1 ('Y" or 'N'). |
| @NE | 36 | 0 | Compare two values for inequality. Pop item1 and item2. Create and push a temporary value of item2 ¬= item1 ('Y' or 'N'). |
| @LT | 40 | 0 | Compare to determine if one value is less than another. Pop item1 and item2. Create and push a temporary value of item2 < item1 ('Y' or 'N'). |
| @LE | 44 | 0 | Compare to determine if one value is less or equal to another. Pop item1 and item2. Create and push a temporary value of item <= 1 ('Y' or 'N'). |

-continued

| Name | Opcode | #Ops | Semantics |
|---|---|---|---|
| @GT | 48 | 0 | Compare to determine if one value is greater than another. Pop item1 and item2. Create and push a temporary value of item2 > item1 ('Y' or 'N'). |
| @GE | 52 | 0 | Compare to determine if one value is greater or equal to another. Pop item1 and item2. Create and push a temporary value of item2 >= item1 ('Y' or 'N'). |
| @CALL | 56 | 2 | Call a procedural rule or bulitin. Operand1 is the number of arguments to pass; they have already been pushed onto the stack. Operand2 is an offset to the name of the rule to call; a positive offset is a reference to a name in the static data area. A non-positive offset signifies an indirect rule name, in which case item1 contains the name of the rule to call. On an indirect call, item1 is popped. The caller's environment is saved and execution begins at the start of the called rule. |
| @FN | 60 | 2 | Call a functional rule or bulitin. Operand1 is the number of arguments to pass; they have already been pushed onto the stack. Operand2 is an offset to the name of the rule to call. The caller's environment is saved and execution begins at the start of the called rule. |
| | 64 | | UNUSED. |
| @RETURN | 68 | 0 | Return from a functional or procedural rule. Pop all arguments passed to the called rule and restore the caller's environment. If the called rule was a function, push the return value onto the stack. |
| @UNTIL | 72 | 2 | Initialize for the execution of an UNTIL loop. Operand1 is an offset to the opcode to be executed once the loop terminates. Operand2 indicates whether this is an UNTIL . . . DISPLAY loop (1) or just UNTIL loop (0). |
| @PARM | 76 | 1 | Push a formal rule parameter onto the stack. Operand1 is the number |

-continued

| Name | Opcode | #Ops | Semantics |
|---|---|---|---|
| | | | of the formal parameter. (For a rule with N parameters, the Ith one is numbered (N - I)). Push the parameter value onto the stack. |
| @CONST | 80 | 1 | Push a constant onto the stack. Operand1 is an offset to the value in the static data area. Copy the values' descriptor into the temporary area and append a four byte pointer to it. Set the pointer to reference the value's data in the static data area. Push the constant value onto the stack. |
| @TEMP | 84 | 0 | Create a temporary copy of a value. If item1 is not a temporary value, create a temporary copy, pop item1 and then push the temporary value. |
| @RFIELD | 88 | 1 | Push a field of a table onto the stack. Operand1 is an offset to the table field name; a positive offset references a name in the static data area. A non-positive offset signifies an indirect table.field, in which case item1 is the name of the table and item2 is the name of the field. On an indirect reference, item1 and item2 are popped. Push the field value onto the stack. As the field is being pushed, a check ensures that the field has a value; if not the exception UNASSIGNED is raised. |
| @WFIELD | 92 | 1 | Push a field of a table onto a stack. Operand1 is an offset to the table.field name; a positive offset references a name in the static data area. A non-positive offset signifies an indirect table.field, in which case item1 is the name of the table and item2 is the name of the field On an indirect reference, item1 and item2 are popped. Push the field value onto the stack. |
| @AEND | 96 | 0 | Mark the end of the current code section. Used to separate the conditions from the and the actions from the exceptions. |

-continued

| Name | Opcode | #Ops | Semantics |
|---|---|---|---|
| | | | @AEND is NEVER executed by the virtual machine. |
| @SET | 100 | 0 | Assign a field of a table a value. Item1 is a field of a table. Item2 is a value. Set data of item1 to data of item2 and pop both items. |
| @ABN | 104 | 0 | Assign commonly named fields in tables. Item1 is the name of the source table. Item2 is the name of the target table. Set the data of all commonly named fields in the target table to data of fields in the source table. Pop item1 and item2. |
| @SCHED | 108 | 2 | Schedule the asynchronous execution of a rule. Operand1 is the number of arguments to pass; they have already been pushed onto the stack. Operand2 is an offset to the name of the rule to schedule. |
| | ???? what is done with these args and queue name ??? | | |
| | | | Pop all arguments from the stack. Pop item1, which is the name of the queue for the asynchronous event and continue. |
| @DROP | 112 | 1 | Branch conditionally to an offset within a rule. Pop item1. If item1 is not 'Y', branch to the offset given by operand1. |
| @NEXT | 116 | 1 | Branch unconditionally to an offset within a rule. Branch to the offset given by operand1. |
| @BRC | 120 | 1 | Branch conditionally to an offset within a rule. Check the return code set as a result of the last @TAM opcode. If it is non-zero, branch to the offset given by operand1. |
| @FORI | 124 | 0 | Initialize for the execution of a FORALL loop. |
| @TAM | 128 | 1 | Call TAM to perform a table access request. Operand1 contains the number of arguments on the stack. Build a parameter list from these arguments, and call TAM. If the access was other than a FORALL or UNTIL . . DISPLAY, pop the arguments from the stack. If the access was a FORALL or UNTIL . . DISPLAY and the return code is zero (end of occs.), pop the arguments, otherwise |

-continued

| Name | Opcode | #Ops | Semantics |
|---|---|---|---|
| | | | leave the arguments on the stack. Save the return code from the TAM call. |
| @TAMP | 132 | 1 | Insert a reference into a TAM selection string or parameter list. Item1 is a value which is to be inserted into the selection string or parameter list. Item2 is the selection string or parameter list. Operand1 is an offset in item2 where the reference to item1 is to be inserted. If necessary, create temporary copies of both item1 and item2. Insert the reference to item1 in item2 and pop item1. (item2 will be popped during the course of executing the @TAM opcode). |
| @TAMN | 136 | 1 | Copy a table name into a TAM table name argument. Item1 is a table name which is to be passed to TAM. Item2 is a 16 byte blank character string. Operand1 is an offset in item2 where the table name is to be copied. If necessary, create temporary copies of item1 and item2. Copy item1 into item2 and pop item1. (item2 will be popped during the course of execution the @TAM opcode). |
| @SIGNAL | 140 | 0 | Raise an exception. Item1 is the name of the exception which is to be raised. Pop item1 and raise the exception. |
| | 144 | | UNUSED. |
| @ACALL | 148 | 1 | Call an action from the conditions. Push the offset to the next instruction (the "return address") and branch to the offset given by operand1. |
| @ARETURN | 152 | 0 | Return from an action (to the conditions). Item1 is the offset of the next opcode to be executed. Pop item1 and branch to that offset. |
| @EXEC | 156 | 2 | Execute a procedural rule. Operand1 is the number of arguments to pass; they have already been pushed onto the stack. Operand2 is an offset to the name of the rule to execute; a positive |

-continued

| Name | Opcode | #Ops | Semantics |
|---|---|---|---|
| | | | offset is a reference to a name in the static data area. A non-positive offset signifies an indirect rule name, in which case item1 contains the name of the rule to execute. On an indirect execution, item1 is popped. The enviornment of the current transaction is saved and a new transaction begins at the start of rule being executed. |
| | 160 | | UNUSED. |
| @SETL | 164 | 1 | Assign a local variable a value. Item1 is the value to be assigned. Operand1 is the local variable. Set data of operand1 to data of item1 and pop item1. |
| @WARG | 168 | 2 | Convert a list of arguments which are passed by name to a list of arguments passed by position. The stack consists of parameter name/parameter value pairs. Operand1 is the number of name/value pairs. Operand2 is an offset to the name of the rule being passed there args; a positive offset is a reference to a name in the static data area. A non-positive offset signifies an indirect rule name, in which case item1 contains the name of the rule. On an indirect reference, item1 is popped. Pop all name/value pairs and push and values in positional order. |
| @NOT | 172 | 0 | Logically negate a value. Pop item1. Create and push a temporary value of -(item1). |
| | 176 | | UNUSED. |
| | 180 | | UNUSED. |
| @XCALL | 184 | 2 | Transfercall a procedural rule. Operand1 is the number of arguments to pass; they have already been pushed onto the stack. Operand2 is an offset to the name of the rule to transfercall; a positive offset is a reference to a name in the static data area. A non-positive offset signifies an indirect rule name, in which case item1 contains the name of the rule to transfercall. On an indirect |

-continued

| Name | Opcode | #Ops | Semantics |
|---|---|---|---|
| | | | transfercall, item1 is popped. The environment of the current transaction is discarded, and a new transaction begins at the start of the transfercalled rule. |

RULE MODIFIABLE DATA

The virtual machine performs run time binding of references to objects named in the static data area, specifically rules, local variables and fields of tables. Binding involves a search for the object and occurs when an object is first referenced. The binding is remembered by storing the object's address (or "thread") in the modifiable data area. (See, Tables 55–56). Subsequent references to a bound object may simply use the thread since the address of an object is constant for an entire transaction.

The size of the modifiable area is calculated when a rule is translated from source to object code. This size is stored as the "Mod data" value in the rule header. The first time a rule is called during the course of a transaction, its modifiable data area is allocated and set to contain zeros. As the rule is executed, references to fields of tables, local variables and rules are bound by saving their addresses at the designated offset in this rule's modifiable area. The modifiable data area of a rule is deallocated when the transaction terminates.

TABLE 55

A table field reference before binding

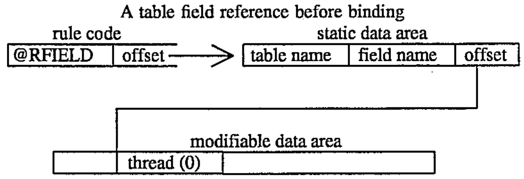

The modifiable data area is also used to save the names of indirect rule and indirect table.field references. As described in the Rule opcodes section, an indirect reference is denoted by a non-positive offset as an operand to the @RFIELD, @WFIELD, @CALL, @EXEC, @XCALL or @WARG opcodes. The non-positive offset indicates that the name of the rule or table.field being referenced is on the virtual machine stack. This name is saved in the modifiable data area at the absolute value of the offset along with its thread. (See, Tables 57–58).

TABLE 56

A table field reference after binding

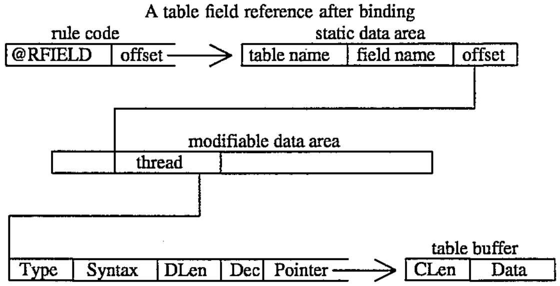

TABLE 57

An indirect rule call before binding

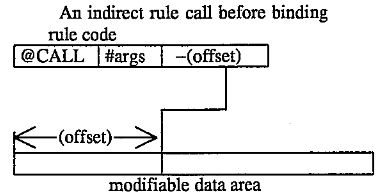

TABLE 58

An indirect rule call after binding

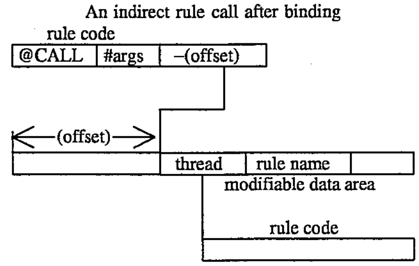

RULE CODE SEQUENCES

Now that we have seen the various virtual machine instructions available, it is time to explore how they are put together to implement the various language features.

Conditions and Actions

The code generated for the condition section of a rule, amounts to sequences of "calls" (@ACALL) to the actions to be executed (the action list) when each condition is satisfied. These @ACALL opcodes may be "guarded" by code to evaluate a condition and an @DROP opcode which branches to the next condition if this one is not satisfied. An unguarded sequence of @ACALL opcodes may arise when there are no further conditions to evaluate.

The @ACALL opcode pushes the offset to the next instruction onto the stack and then branches to the action. The last opcode in an action is an @ARETURN which uses the saved offset to return to process the next action for the condition. An @RETURN opcode follows the last @ACALL in each sequence to return from the rule.

The main benefit of "calling" actions from the conditions is that the code for an action need only be generated once, even when the action is a member of more than one condition's action list.

An example is set out in Table 59.

TABLE 59

Source and object code for conditions and actions

| Rule source code: | | |
|---|---|---|
| MAX (X, Y); | | |
| X < Y; | Y | N |
| RETURN(Y); | 1 | |
| RETURN(X); | | 1 |

Rule object code:

| Offset | Opcode | Operands | Comment |
|---|---|---|---|
| CONDITIONS | | | |
| 54 : | @PARM | 1 | Push value of X |
| 57 : | @PARM | 0 | Push value of Y |
| 5A : | @LT | | Pop X,Y and push X < Y |
| 5B : | @DROP | 62 | IF X < Y THEN |
| 5E : | @ACALL | 67 | "Call" action at offset 67 |

TABLE 59-continued

| | | | |
|---|---|---|---|
| 61 : | @RETURN | | ELSE |
| 62 : | @ACALL | 6C | "Call" action at offset 6C |
| 65 : | @RETURN | | ENDIF |
| 66 : | @AEND | | End of conditions |
| ACTIONS | | | |
| 67 : | @PARM | 0 | Push value of Y |
| 6A : | @RETURN | | Return from the rule |
| 6B : | @ARETURN | | End of an action |
| 6C : | @PARM | 1 | Push value of X |
| 6F : | @RETURN | | Return from the rule |
| 70 : | @ARETURN | | End of an action |
| 71 : | @AEND | | End of actions |

Assignments

The code generated for an assignment statement consists of the postfix representation of an expression followed by either an @SETL (assigning to a local variable) or an @SET (assigning to a field of a table). TABLE 60, shows a reference to an identifier G. At the time the rule ASSIGN is translated, it is not known whether G is a local variable defined in one of ASSIGN's ancestors, or a function which takes no arguments. The translator generates code assuming that G is a function and when the @FN opcode is executed, a check is made to determine if G is actually a local variable.

Rule Calls

Arguments to a rule may be passed by position or by name (using a WHERE clause). The code generated for rule calls when parameters are passed by position is very straightforward. First each argument is evaluated and made a temporary on the stack. This is followed by the @CALL (or @FN for a functional rule) opcode which takes the number of arguments and the name of the rule as its operands. When the @RETURN opcode in the rule being called is executed, all the arguments passed to the called rule are popped. If the called rule is a function, the return value is left on the top of the stack.

When arguments are passed by name, the code generated is slightly more complicated. Each argument is evaluated and made a temporary, just as it is when parameters are passed by position. However, the name of the formal parameter which each argument corresponds to, is also pushed, immediately after the argument. This results in parameter name followed by parameter value on the stack for each argument. Immediately preceding the @CALL opcode is the @WARG opcode. @WARG massages the name/value pairs on the stack into the same form as when arguments are passed by position. This allows the @CALL opcode to be executed unaware that the arguments were actually passed by name.

An example of code generated by a rule call is shown in Table 61.

Table Accesses

The Table Access Method, or TAM, is used to implement various language statements which access the database. The interface to TAM is quite simple: an @TAM opcode and N (between one and five) arguments on the run time stack. The code generated for table access statements first pushes the necessary arguments on the stack, and then calls TAM. After returning from TAM, the @TAM opcode pops its arguments (unless we are in the midst of performing an UNTIL .. DISPLAY or a FORALL) and saves the code returned from TAM.

The first argument pushed onto the stack is always the TAM operation code. It tells TAM what kind of table access is being performed. The TAM operation code is the only required argument. Each of the others are optional and are only passed as needed.

TABLE 60

Source and object code for assignments

Rule source code:
ASSIGN;
LOCAL L;

| | |
|---|---|
| L =(G + 1) * 4; | 1 |
| T.F = L; | 2 |

Rule object code:

| Offset | Opcode | Operands | | Comment |
|---|---|---|---|---|
| CONDITIONS | | | | |
| 46 : | @ACALL | 4E | | Call action 1 |
| 49 : | @ACALL | 5F | | Call action 2 |
| 4C : | @RETURN | | | Return from the rule |
| 4D : | @AEND | | | |
| ACTIONS | | | | |
| 4E : | @FN | 0 | | Push value of G |
| 53 : | @CONST | 1 | | Push |
| 56 : | @ADD | | | Compute G + 1 |
| 57 : | @CONST | 4 | | Push 4 |
| 5A : | @MULT | | | Compute (G + 1) * 4 |
| 5B : | @SETL | L | | Assign value to L |
| 5E : | @ARETURN | | | Return from action 1 |
| 5F : | @FN | 0 | L | Push value of L |
| 64 : | @WFIELD | T.F | | Push value of T.F |
| 67 : | @SET | | | Assign L to T.F |
| 68 : | @ARETURN | | | Return from action 2 |
| 69 : | @AEND | | | |

The second argument is the name of the table or screen being accessed. This name is always padded out to be 16 characters in length. The third argument contains the list of parameter values for the table. Each element in this list is a four byte pointer to a value. Elements in the parameter list are inserted by the @TAMP opcode.

TABLE 61 code generated for rule calls.

Rule source code:
CALLS;

| | |
|---|---|
| CALL PARSE('SELECTION', 'SELECT F = 5'); | 1 |
| CALL PARSE WHERE GRAMMAR ='SELECTION' & INPUT = SELECT F = 5'; | 2 |

Rule object code:

| Offset | | Opcode | Operands | Comment |
|---|---|---|---|---|
| CONDITIONS | | | | |
| 34 | : | @ACALL | 3C | Call action 1 |
| 37 | : | @ACALL | 4A | Call action 2 |
| 3A | : | @RETURN | | Return from the rule |
| 3B | : | @AEND | | |

TABLE 61-continued

| | | | | | |
|---|---|---|---|---|---|
| ACTIONS | | | | | |
| 3C | : | @CONST | "SELECTION" | | Push "SELECTION" |
| 3F | : | @TEMP | | | Make it a temp |
| 40 | : | @CONST | "SELECT F=5" | | Push "SELECT F = 5" |
| 43 | : | @TEMP | | | Make it a temp |
| 44 | : | @CALL | 2 | PARSE | Call PARSE with 2 args |
| 49 | : | @ARETURN | | | Return from action 1 |
| 4A | : | @CONST | "SELECTION" | | Push "SELECTION" |
| 4D | : | @TEMP | | | Make it a temp |
| 4E | : | @CONST | "GRAMMAR" | | Push name of formal |
| 51 | : | @CONST | "SELECT F=5" | | Push "SELECT F = 5" |
| 54 | : | @TEMP | | | Make it a temp |
| 55 | : | @CONST | "INPUT" | | Push name of formal |
| 58 | : | @WARG | 2 | PARSE | Convert to positional list |
| 5D | : | @CALL | 2 | PARSE | Call PARSE with 2 args |
| 62 | : | @ARETURN | | | Return from action 2 |
| 63 | : | @AEND | | | |

The fourth argument, which contains the selection that is to be applied to the table, is the most complicated to describe. Essentially it contains a postfix representation of the WHERE clause. It is comprised of one or more terms which are joined by logical operators. Each term begins with a field reference, is followed by an expression (made up of field references, values and arithmetic operators) and ends with a relational operator. Each field reference is 17 bytes long: a one byte binary code indicating that this is a field reference followed by the name of the field. Each value is a one byte binary code for value, followed by a four byte pointer to the value. Every operator is a single byte binary code, representing the particular operator. As with elements in the parameter list, the @TAMP opcode is used to insert references to values in the selection string.

The fifth argument contains any ordering that is to be applied to occurrences retrieved. Each term in the ordering string contains a 16 byte field name followed by either "A" or "D" to indicate whether that field should be ordered in Ascending or Descending fashion.

An example of the table access code is shown in Table 62.

Indirect references

Indirect references may be used to specify:

↓ a rule name (in the CALL, TRANSFERCALL or EXECUTE statements)

↓ a table or screen name in the various table access statements

↓ table and field names on the left hand side of an assignment, or in an expression.

The code generated for indirect references, first evaluates the reference by pushing it onto the stack. The opcode which uses the indirect references has a non-positive offset as one of its operands. The non-positive offset indicates that the name is on the run time stack (rather than in the static data area as is the case for direct references), An example of indirect reference code is set out in Table 63.

Indirect table and screen names for table access statements behave somewhat differently than described above. After the value of the table or screen name is pushed onto the stack, a special opcode (@TAMN) is generated. It pops this value and copies it into a temporary value on the top of the stack.

TABLE 62

Code generated for table accesses.

Rule source code:
TABLEIO(T);

| | |
|---|---|
| GET TABLES; | 1 |
| GET TABLES WHERE NAME = T; | 2 |
| FORALL @RULESDOCUMENT(LIBID) ORDERED ASCENDING CREATED: END; | 3 |

Rule object code:

| Offset | | Opcode | Operands | Comment |
|---|---|---|---|---|
| CONDITIONS | | | | |
| 44 | : | @ACALL | 4F | Call action 1 |
| 47 | : | @ACALL | 59 | Call action 2 |
| 4A | : | @ACALL | 6F | Call action 3 |
| 4D | : | @RETURN | | Return from rule |
| 4E | : | @AEND | | |
| ACTIONS | | | | |
| 4F | : | @CONST | "G " | Push TAM opcode |
| 52 | : | @CONST | "TABLES " | Push table name |
| 55 | : | @TAM | 2 | Call TAM (2 args) |
| 58 | : | @ARETURN | | Return from act1 |
| 59 | : | @CONST | "G" | Push TAM opcode |

TABLE 62-continued

| | | | | |
|---|---|---|---|---|
| 5C | : | @CONST | "TABLES " | Push table name |
| 5F | : | @CONST | " " | Push dummy parms |
| 62 | : | @CONST | ".NAME . ." | Push select str. |
| 65 | : | @PARM | 0 | Push value of T |
| 68 | : | @TAMP | 14 | Insert reference |
| 6B | : | @TAM | 4 | Call TAM (4 args) |
| 6E | : | @ARETURN | | Return from act2 |
| 6F | : | @FORI | | Init for FORALL |
| 70 | : | @CONST | "A" | Push TAM opcode |
| 73 | : | @CONST | "@RULESDOCUMENT " | Push table name |
| 76 | : | @CONST | " " | Push table parm |
| 79 | : | @FN | 0 LIBID | Call LIBID |
| 7E | : | @TAMP | 2 | Insert reference |
| 81 | : | @CONST | " " | Push dummy selstr |
| 84 | : | @CONST | "CREATED A" | Push order str. |
| 87 | : | @TAM 5 | | Call TAM (5 args) |
| 8A | : | @BRC | 90 | Cond. branch |
| 8D | : | @NEXT | 87 | Uncond. branch |
| 90 | : | @ARETURN | | Return from act3 |
| 91 | : | @AEND | | |

TABLE 63

Code generated for indirect references

Rule source code:
UNDREFS(R,T);

| | |
|---|---|
| CALL R; | 1 |
| (T).F = 7; | 2 |
| DELETE T; | 3 |

Rule object code:

| Offset | | Opcode | Operands | Comment |
|---|---|---|---|---|
| CONDITIONS | | | | |
| 44 | : | @ACALL | 4F | Call action 1 |
| 47 | : | @ACALL | 58 | Call action 2 |
| 4A | : | @ACALL | 66 | Call action 3 |
| 4D | : | @RETURN | | Return from the rule |
| 4E | : | @AEND | | |
| ACTIONS | | | | |
| 4F | : | @PARM | 1 | Push value of R |
| 52 | : | @CALL | 0 −4 | Indirect call |
| 57 | : | @ARETURN | | Return from action 1 |
| 58 | : | @CONST | 7 | Push 7 |
| 5B | : | @CONST | "F" | Push "F" (field name) |
| 5E | : | @PARM | 0 | Push value of T (table) |
| 61 | : | @WFIELD | −18 | Push val of indirect t.f |
| 64 | : | @SET | | Assign 7 to field |
| 65 | : | @ARETURN | | Return from action 2 |
| 66 | : | @CONST | "D" | Push TAM opcode |
| 69 | : | @CONST | " " | Push dummy table name |
| 6C | : | @PARM | 0 | Push value of T |
| 6F | : | @TAMN | 0 | Put tab name into dummy |
| 72 | : | @TAM | 2 | Call TAM (2 args) |
| 75 | : | @ARETURN | | Return from action 3 |
| 76 | : | @AEND | | |

VI. Transaction Processor

Figure 16:
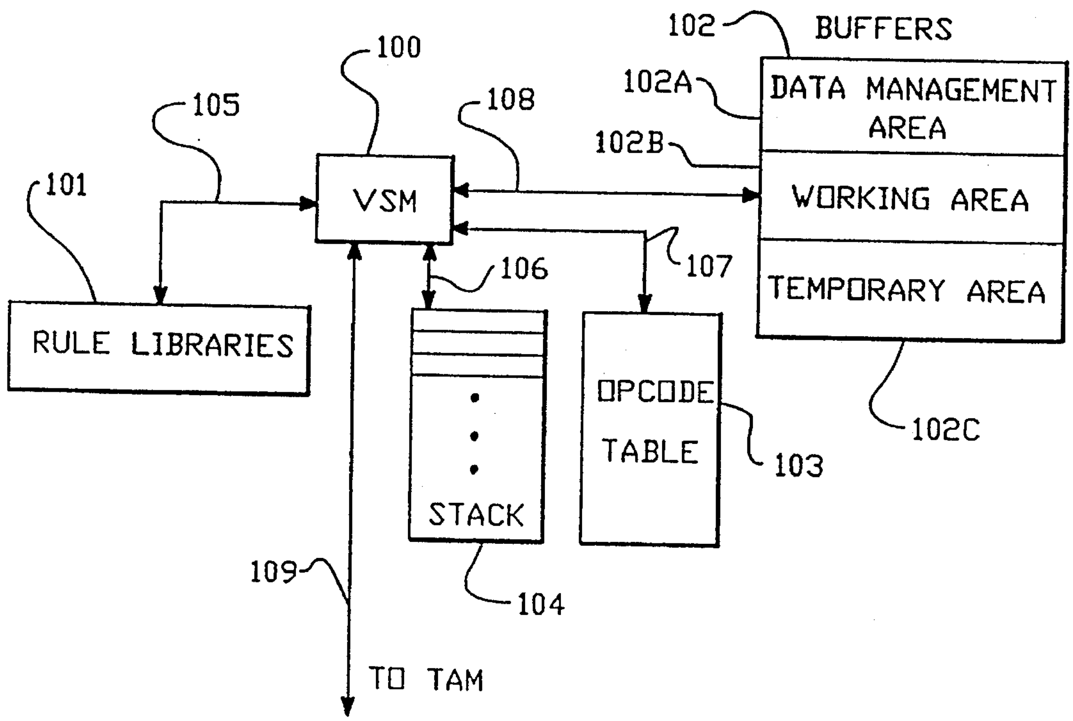
FIG. 16 is a conceptual diagram of the transaction processor according to the present invention.

FIG. 16 is a block diagram of the transaction processor which implements the virtual stack machine for execution of the object code level rules, as described in the preceding section.

The virtual stack machine is a software module 100 which manages execution of the rules. When a session begins, the virtual stack machine 100 retrieves a plurality of rule libraries 101 and establishes a set of buffers 102. In addition, an opcode table 103 is established and a stack 104 is set up. The buffers include a data management area 102A, a working area 102B, and a temporary area 102C.

In execution, the virtual stack machine generates an instruction pointer across line 105 to the rule libraries 101. A stack pointer is generated and supplied across line 106 to the stack. The virtual stack machine 100 communicates with the opcode table 103 across line 107, and the buffers 102 across line 108. Data access instructions are passed to the table access machine across line 109. The virtual stack machine executes the algorithm as follows:

1. Fetch opcode pointed to by the instruction pointer in the rule;
2. Lookup opcode in opcode table 103 to retrieve the host system routine identified by the opcode;
3. Dispatch the host system routine;
4. Advance the instruction pointer;
5. Return to the fetch opcode step.

Figure 17:
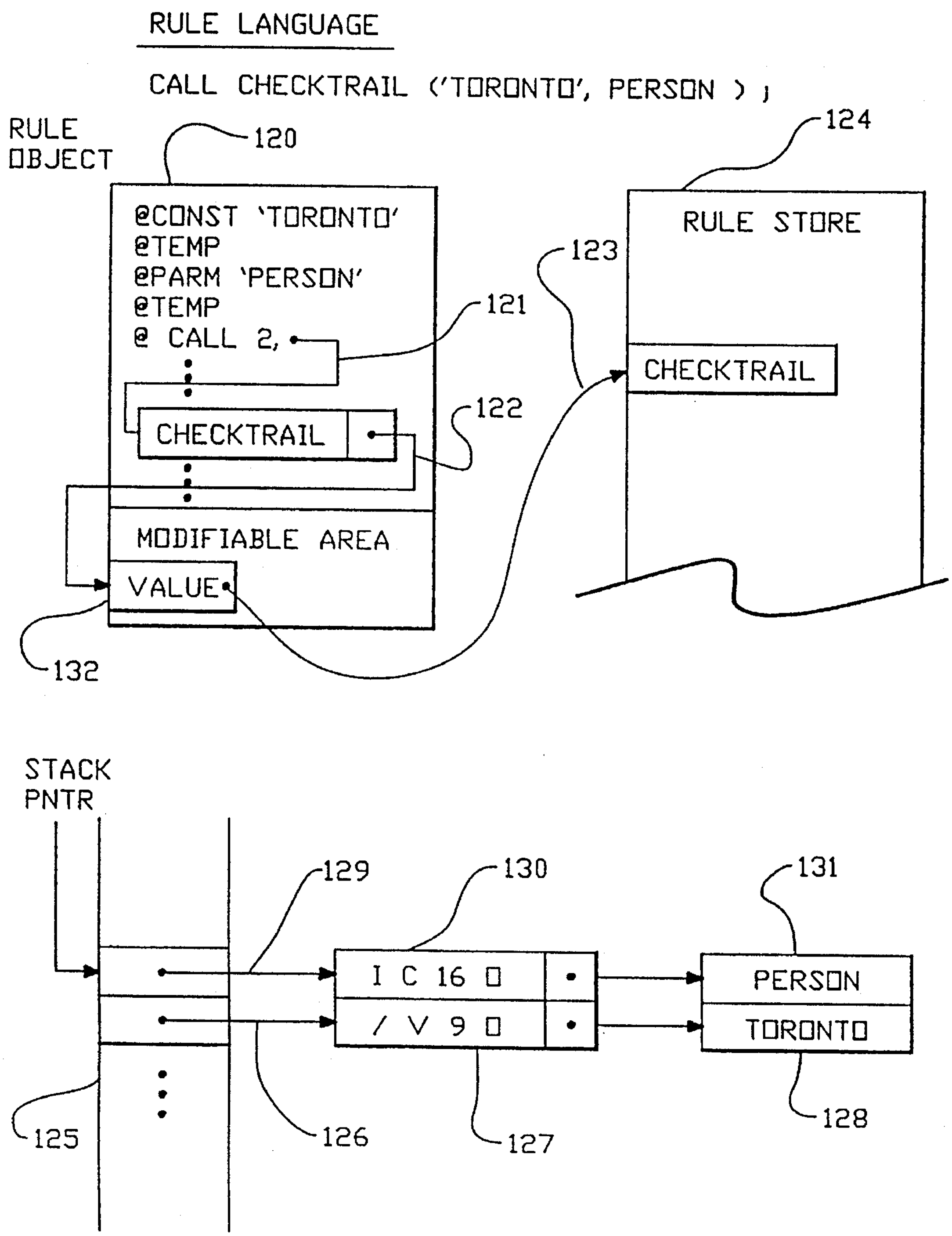
FIG. 17 is a schematic diagram illustrating operation of the transaction processor for a rule call.

FIG. 17 provides an example of execution by the virtual stack machine for calling a rule named "CHECKTRAIL" In this example, the CHECKTRAIL rule includes two parameters, including 'TORONTO' and PERSON. The rule object code is stored in the rule library at the location 120. The instruction pointer will be advanced from the top code @CONST 'TORONTO' to the last object @CALL 2, offset, where the offset is indicated by the line 121. The offset identifies the position within the static data area of the rule where the rule name CHECKTRAIL with offset 122 is stored. The offset 122 stores a location in the modifiable area of the rule at which the value for the CHECKTRAIL object code is stored. The value points across line 123 to the location in the rule library 124 at which CHECKTRAIL can be found. The stack 125 is impacted as follows:

First, in response to the @CONST opcode, the value of the variable TORONTO is placed in the working area of the vertical stack machine. In response to the @TEMP opcode, a temporary copy of the TORONTO parameter is stored. The stack is loaded with an offset 126 to the value 127 for the temporary copy 128. Next, the parameter 'PERSON' is moved into the working area of the virtual stack machine and a temporary copy is made. The stack is loaded with a pointer 129 to the value 130 of the temporary copy of the constant PERSON 131. Next, the @CALL 2, offset rule is executed. If the offset in the @CALL opcode points to the name and offset in the static data area of the rule to be called, the value which identifies the location in the rule store of the rule to be called is stored in the modifiable data area at the location 132 identified by the offset 122. The instruction pointer in the virtual stack machine is then moved to the location in the rule store 124 at which CHECKTRAIL is found, and CHECKTRAIL is executed.

The rule libraries 101 shown in FIG. T consist of a plurality of rule libraries. When a @CALL opcode is executed, a search for the appropriate rule is carried out by rule name. The rule can be found as rule object code in one of the libraries, as a built in function or sub-routine (e.g., the ENTER key sub-routine which responds to user input), a customer defined external routine which is written perhaps in a different source language like Cobal or PL1, or it could be a local variable reference, rather than a call to an actual rule. Thus, the rule name search proceeds first through the list of local variables in the rule from which the statement was executed, second, through the local rules library which is set up by the user for a given session, next, through an installation rules library which is a standard set of routines established by a customer for a given execution and programming environment, fourth, through a built in routines library which includes all the standard functions of the operating system, fifth, through a system rules library which stores the Huron system rules which are utilized in the data management and other built in operations, and sixth and finally, through a library of external routines.

When a rule is called, from a prior rule, such as a session manager, the stack of the prior rule is saved in a context save area in the stack before execution of the subsequent rule is begun. The stack pointer returns to the prior rule upon execution of a return statement.

Figure 18:
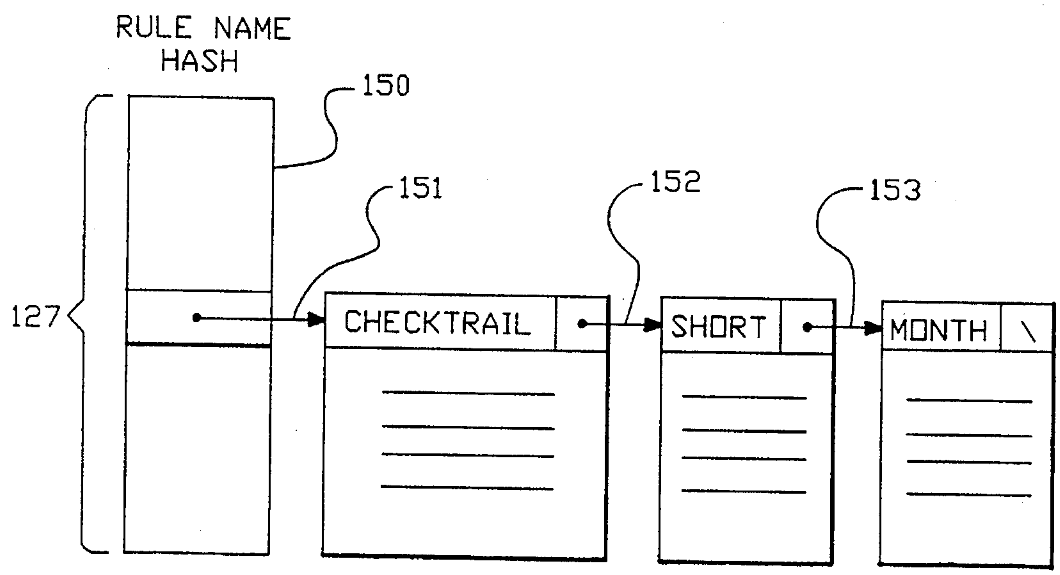
FIG. 18 is a diagram of the rule name hashing method.

The data management area 102A in the virtual stack machine contains the tables through which rule name searches are carried out. These tables are shown in FIG. 18. For the rule names, a rule name hash table 150 is generated, which is 127 entries long. Each entry in the rule name hash includes a pointer to a first rule which hashes into that entry. For instance, a pointer 151 to the CHECKTRAIL rule may be the first entry. The CHECKTRAIL rule will store a pointer 152 to a second rule which corresponds to that entry in the hash table (e.g., the SHORT rule shown in the Figure). The SHORT rule then includes a pointer 153 to a subsequent entry down to the end of the list which hashes into a given location in the rule name hash table.

If a called rule is not located in the hash table, then it must be retrieved through the table access machine and inserted into the rule library for the session.

Figure 19:
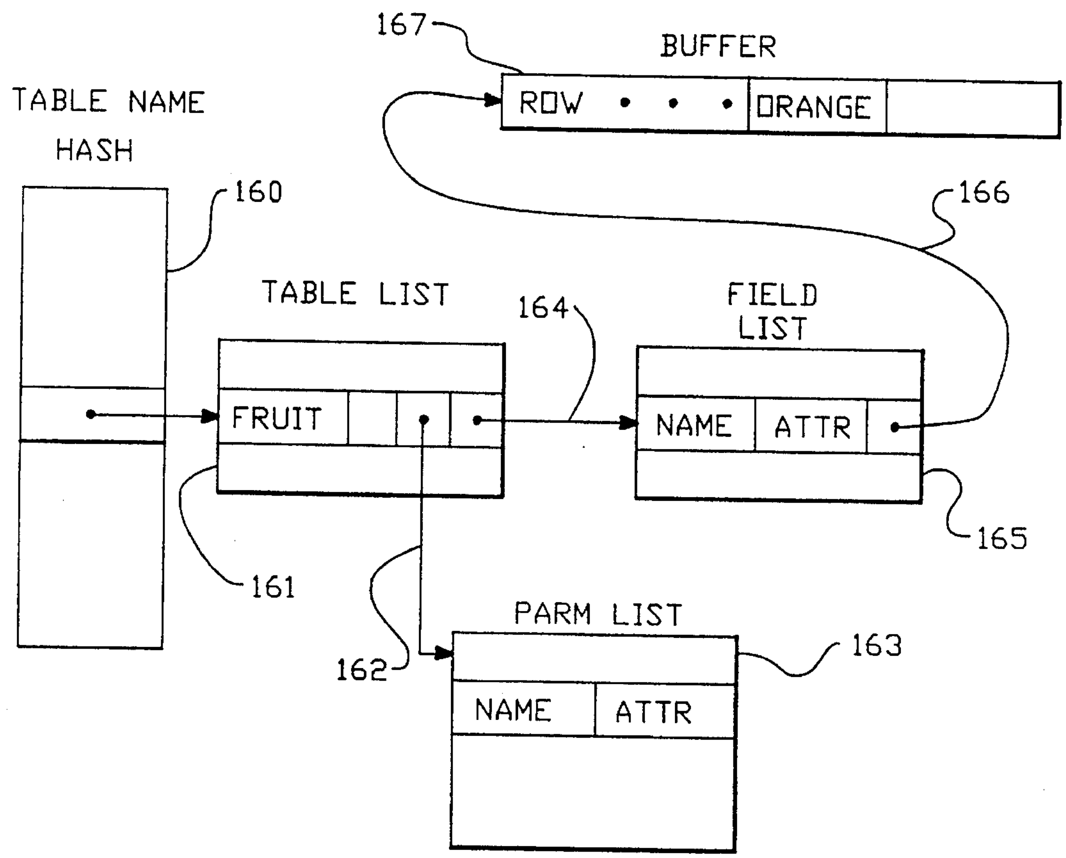
FIG. 19 is a schematic diagram of the table name hashing method.

FIG. 19 shows the table definition built in the data management area in the virtual stack machine. The table name is first hashed into a table name hash table 160. Then entry in the hash table 160 points to a table list 161 which is searched to find the name of the table "FRUIT" of interest. This entry includes a first pointer 162 to a parameter list 163 and a second pointer 164 to a field list 165 for the table. This field list includes a pointer 166 to the row buffer 167 for the occurrence of the table which has the field of interest.

The virtual stack machine maintains buffer for all data accesses and local variables. So, whenever a rule program says

```
GET CARS WHERE LIC_PLATE='878BBC';
```

the VSM has to acquire the dictionary information for the table CAKS and establish a buffer for it.

Likewise, when a rule program says

```
CUSTOMER.NAME=INPUT.NAME;
```

without having issued a data access command, the virtual stack machine must acquire the dictionary information for the table CUSTOMER and establish a buffer for it.

As soon as a buffer for a particular table has been established, it is henceforth available for all rules in the current transaction. The virtual stack machine keeps track of which fields and which tables have been assigned a value, either through a GET or FORALL command or through an assignment statement.

The virtual stack machine acquires the dictionary to populate its data management area exactly as any application program would, by issuing a set of access commands:

GET TABLES WHERE NAME=TABLE NAME;

FORALL FIELDS (TABLE NAME);

FORALL PARMS (TABLE NAME).

The uniform view of dictionary data and other data are strictly preserved above the table access machine. No component of the system above the table access machine sees unnormalized dictionary data.

VII. The Table Access Machine

Figure 20:
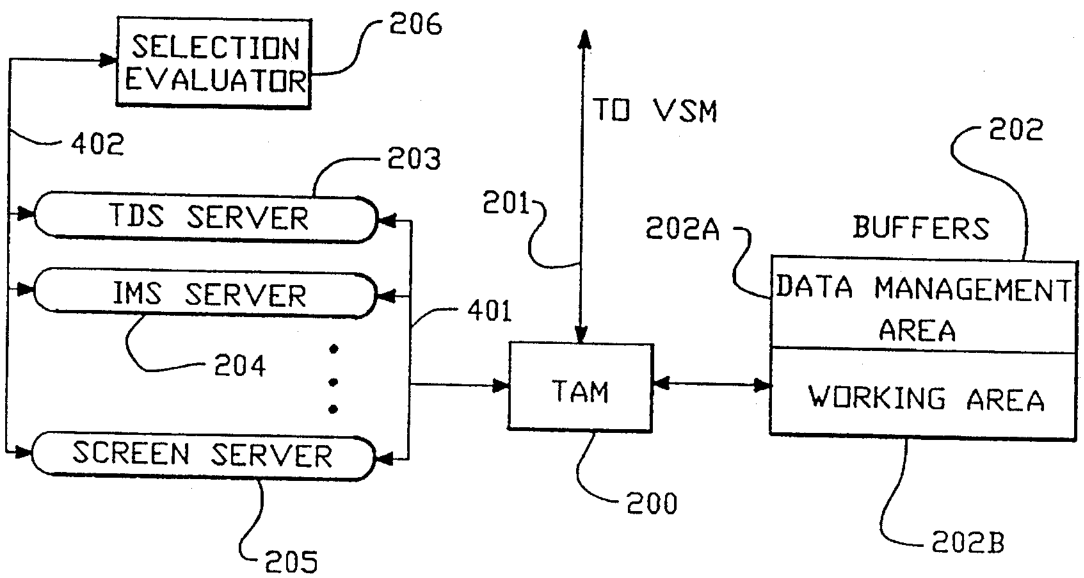
FIG. 20 is a conceptual diagram of the table access machine with a plurality of servers and buffers according to the present invention.

The table access machine is illustrated in block diagram form in FIG. 20.

This machine or method consists of a host assembler software module 200 which communicates with the virtual stack machine across line 201. This module 200 establishes buffers 202 including a data management area buffer 202A and a working area 202B. In addition, the table access method module 200 provides an interface 401 for a plurality of servers including a TDS server 203 for the native table data store, an IMS server 204 for data stored within an IMS data base associated with the host machine, a screen server 205 which provides an interface to display systems coupled to the host machine, import/export server (not shown), and other servers which are required for retrieval of data through the table access method 200 to the virtual stack machine. Coupled with the servers across interface 402 is a selection evaluator module 206 which interprets selection strings at the server level.

The Table Access Method (TAM) is the component of the system, which manages all data access in the system, and effectively is the owner of the dictionary tables and repository of all other tables used by a session.

A call to TAM has the following information:

1. Operation
2. address of data and return areas
3. Table name
4. Parameters
5. Selection string
6. Ordering string The operations are:

A: First request of a FORALL

B: Subsequent request of a FORALL

I: Insert

G: Get with key

N: Get without key

R: Replace

D: Delete

S: Display screen

C: Commit

O: Rollback

T: Transaction end

On the first request for a particular table, TAM will acquire a CTABLE from the Table Data store. The CTABLE is a control block consisting of the dictionary data in unnormalized form. The CTABLE is used for processing by both TAM and all the data servers, of which TDS is one. The CTABLE contains the equivalent data as in TABLES, FIELDS, PARMS, SELECTION, ORDERING and EVENTRULES.

Note that TAM acquires the CTABLE for a table as soon as it is given a call like:

GET TABLES WHERE NAME=tablename;

Normally, this means that a component above TAM wants to build a buffer for <tablename> and therefore immediately after the GET request will issue a FORALL FIELDS(tablename); and a FORALL PARMS(tablename);

These requests are serviced by TAM out of the CTABLE.

Besides the CTABLE, TAM sets up data structures for data rows, where the last row accessed are maintained, as well as an Intentlist of pending updates to the data servers.

POSITIONING

TAM manages positioning within the data bases. The data servers like TDS process requests from TAM one by one, without keeping any information from request to request. Only the LOCK MANAGER (within TDS) keeps information for the duration of a transaction.

In the case of a parameterized table, TAM maintains a buffer and a position for each table accessed within the table set.

INTENT LIST

When a REPLACE, INSERT or DELETE request is received by TAM, it will ascertain that the request is possible by asking the server, if the occurrence is there (DELETE and REPLACE) or is not there (INSERT), and will acquire the necessary exclusive lock on the occurrence. Thereafter TAM will place the REPLACE, INSERT or DELETE occurrence in the Intentlist (work to do list), until it receives a COMMIT, ROLLBACK or TRANSACTION_END request.

SUBVIEWS

TAM performs the conversions between subviews and logical views, consisting of:

Data conversions between different representations

Projections (subview contains fewer fields than logical view)

Selection (subview contains fewer rows than logical view)

Ordering (different from logical view)

Derived or calculated fields

A subview is effectively a window into a logical view, which never materializes in storage, only appears in buffers during the execution. To the user and VSM, however, there is no apparent difference between a subview and a logical view table.

DERIVED FIELDS, VALIDATION AND TRIGGERS

Derived fields are fields of a subview, which are calculated during the GET or FORALL processing. Validation and trigger rules are executed on the basis of EVENTRULES information.

In all 3 cases, TAM issues a (recursive) call to the virtual stack machine to execute a rule. The table buffer, on which the validation or trigger is scheduled is shared by the recursion levels, as is the intent list.

TEMPORARY TABLES

TAM implements the concept of temporary tables, which exist only during a transaction (in the TAM data areas), but does not materialize in any data server like TDS.

ORDERING

TAM performs all the necessary sorting for both subviews and for FORALL requests with ordering which is different from the ordering maintained by the data server.

DIRECTING

Data access requests are directed to the appropriate server on basis of the information in the TABLES table for the particular table.

Figure 21:
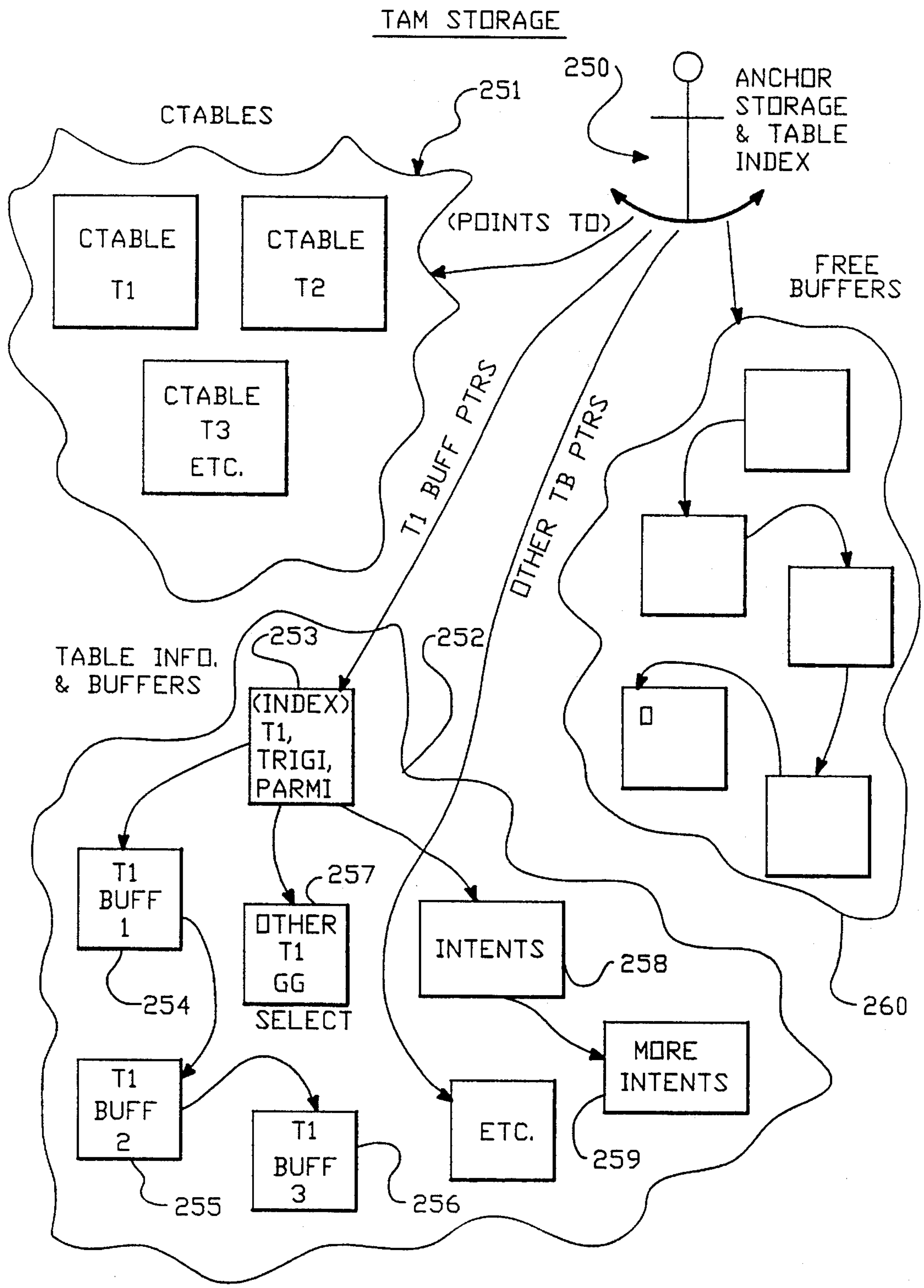
FIG. 21 is a conceptual diagram of the stroage in the table access machine.

FIG. 21 is a conceptual diagram of the TAM buffer storage area. The TAM buffer storage area includes an anchor storage area 250 which includes the table index. This table index points to a set of CTABLES 251 which buffers the CTABLE for each of the tables T1–T3 and so on.

In addition, the buffer pointer for a given table T1 points to a set 252 of buffers for the table T1. This set 252 includes an index 253 for triggers and parameters for table 1. This index points to the actual data occurrence buffers 254, 255, 256, and so on, as required. In addition, the index page 253 points to other T1 information, such as selection strings and the like, in page 257. In addition, the intent list for table T1 is maintained in pages 258 and 259, as required.

The anchor storage 250, in addition, points to free buffers in a set 260, which includes a plurality of single linked empty buffers.

The buffering is sequential and forward. The table anchors are cleared at a transaction end in response to the "T" opcode.

FIG. 22 is a chart showing the table types versus the table opcodes which are executable over those table types. The Fig. is basically self-explanatory, except that the table type SUB, which is a sub-view of either a TDS table type 1 or an IMS table type 2. In addition, the IMP type tables and the EXP type tables have a parameter PARM1 which is equal to the PDS member.

Figure 23:
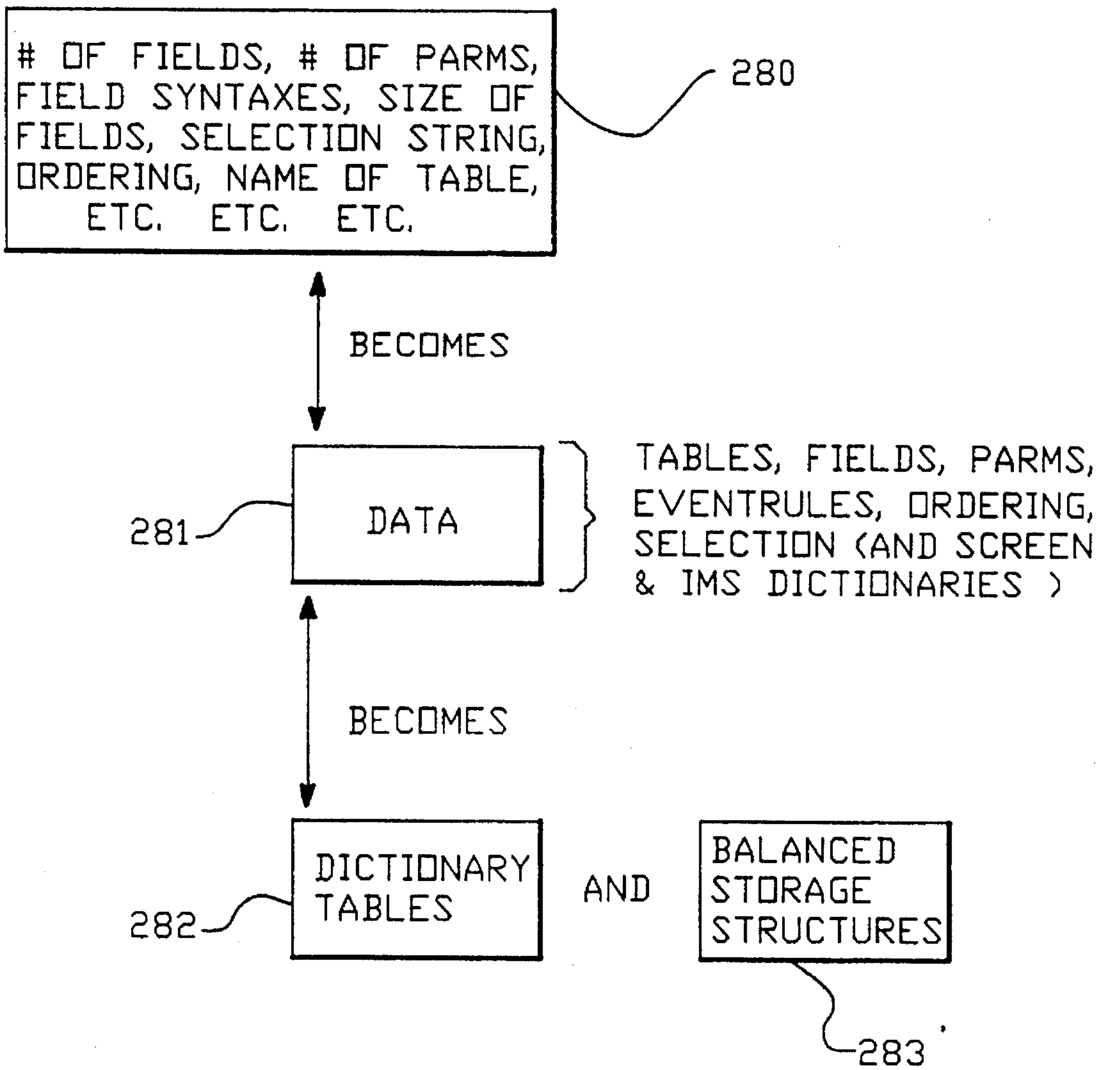
FIG. 23 is a conceptual diagram of the CTABLE.

FIG. 23 schematically illustrates the CTABLE formation in the table access machine. The CTABLE is a table of characteristics of a corresponding table stored in a buffer 280. This buffer is generated from raw data 281 which is retrieved from the dictionary tables 282 in the table data store. These dictionary tables are in turn maintained in the balanced storage structures 283 of the table data store just as all other data in the system. Thus, the metadata in a CTABLE is stored in the relational, object-oriented data base upon which the transaction is executing.

However, "meta-meta-data" is hard coded. That is, the dictionary structure is established for the user and cannot be changed. Thus, there must be the minimum set of dictionary tables for a given transaction to successfully complete.

A given CTABLE is bound for the duration of a transaction. Thus, after it has been retrieved, upon the first call to a portion of a table, all subsequent calls to that table are served by the CTABLE in the transaction storage area of the table access machine.

Figure 24:
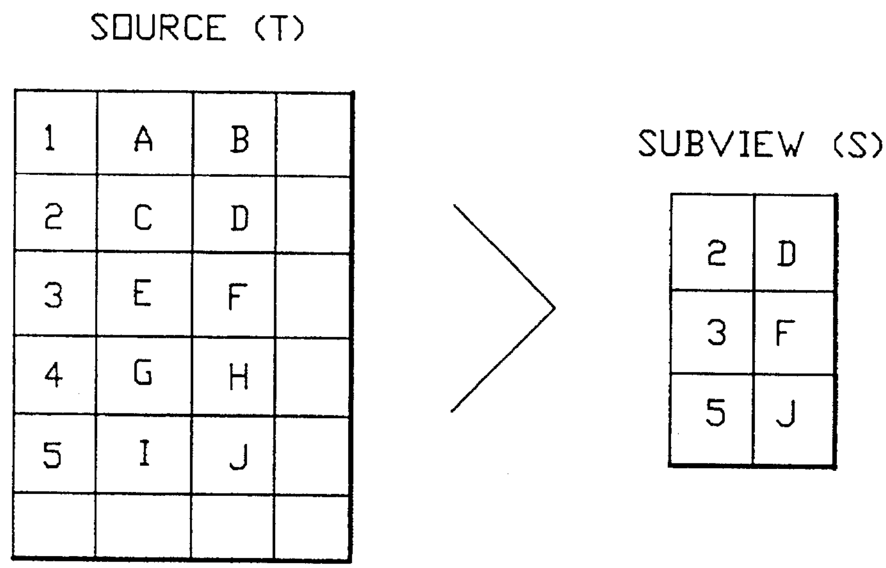
FIG. 24 is a conceptual diagram of a source table and a subview table.

FIG. 24 is a representation of a source table (T) and a sub-view table (S). A sub-view is a map of some rectangle within the source table. Thus, as can be seen in FIG. 24, the sub-view includes the first and third columns of rows 2, 3 and 5 of the source table T. This sub-view is implemented by the table access machine with one set of data buffers, but two CTABLES. A sub-view is built for each occurrence at interface time. Derived fields, however, are generated only from the source table. Thus, in response to a request in the rule that needs access to the sub-view table S, the table access machine will build a control table for both the source table T and the sub-view table S.

The access will occur in the table data store to the source table T. Thus, a source table page will be returned to the table access machine. The table access machine then buffers the page, converts it to the logical subview, and returns the first occurrence in the sub-view to the executor.

Triggers can be executed from sub-views as event rules and otherwise in response to entries in the CTABLE for a given table. When a rule is called, the calling rule execution environment is saved, TAM sends the triggered rule to the executor for interpretation. The triggered rule can also issue table operations which will cause the executor to recurse to the table access machine. Upon completion of the triggered rule, control is returned back to the calling rule.

Parameterized tables are implemented in the access model, but not at the occurrence level. Thus, they are executed in a manner similar to sub-views. These parameterized tables allow concatenated keys, improved concurrency, save storage space in the virtual machines, and simplify archiving. They are executed by building a parameter table in the table access machine out of the dictionary in the table data store. This control table is built in response to the "P" call to the table data store from TAM. The table access machine then transfers the parameter occurrences to the executor for entry in the table lookup indexes.

TAM will retrieve data from the table data store from the source table. It builds a buffer for the source table and then will perform the parameter selections prior to sending occurrences to the executor.

Also, sub-view selection can specify a source parameter name on RHS of the operator.

Temporary tables and intent lists are created by the table access machine with the same code. The difference is that temporary tables also allow selection. These tables are searched in a linear manner. However, access can be random, unlike other table buffers.

Figure 25:
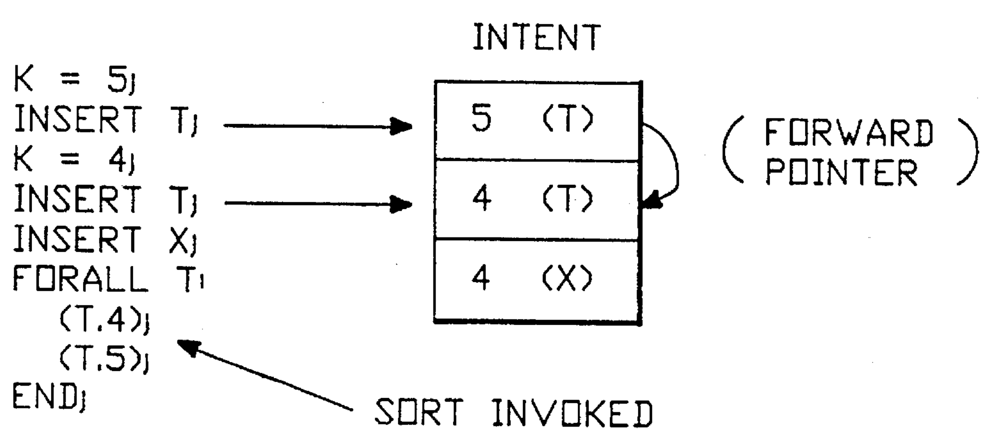
FIG. 25 illustrates the operation of the intent list.

FIG. 25 shows the code and insertions in an intent list for a given operation. See the intent list stores the intent to store the value k=5 and the value k=4. The FORALL statement executed at the end invokes the sort to establish the insertion. Other operators like replace, delete, and get use the intent list in a similar manner.

Figure 26:
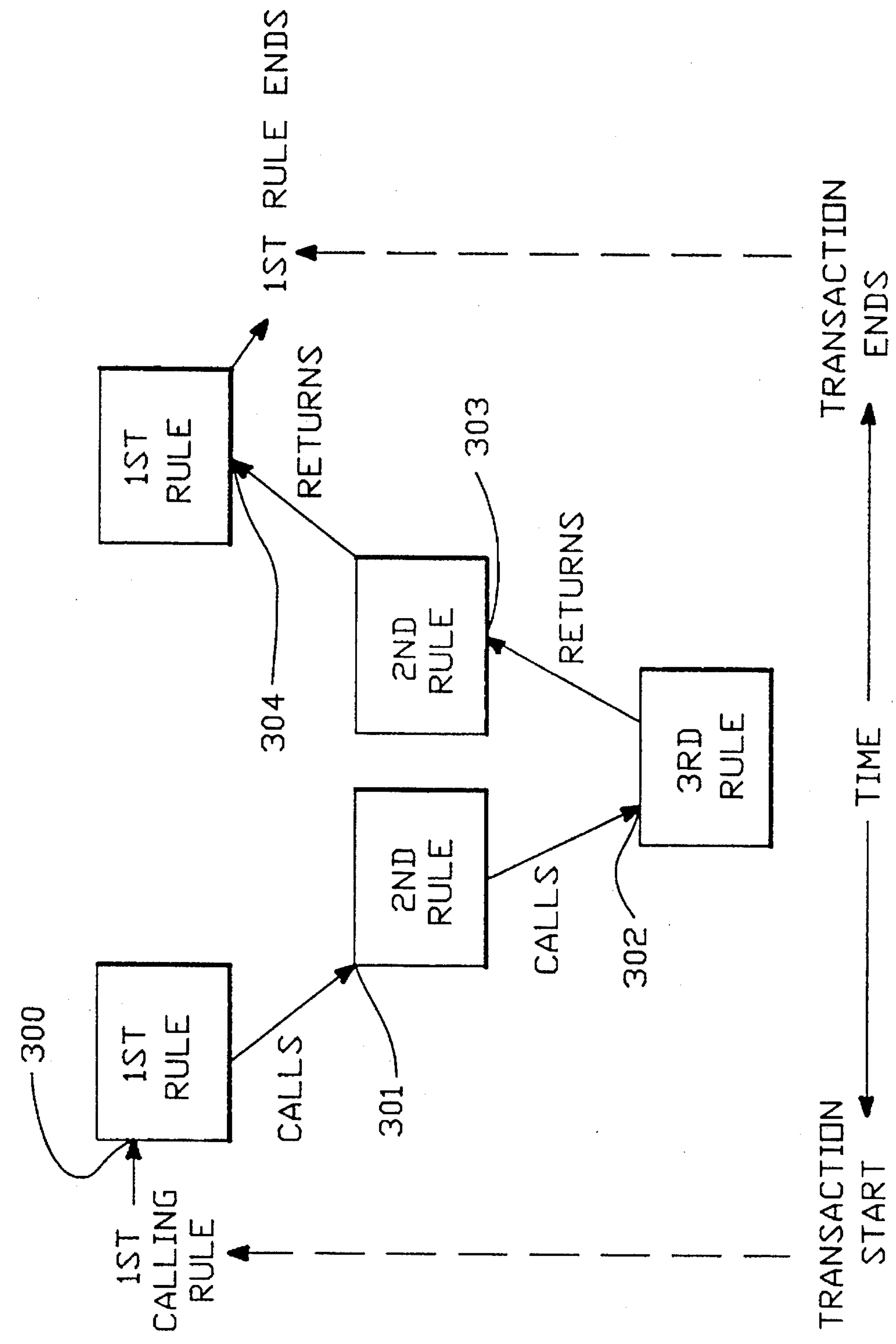
FIG. 26 is a conceptual diagram of a transaction in the virtual machine of the present invention.

FIG. 26 is a conceptual diagram of transactions. This object-oriented operating system, according to the present invention, is transaction oriented. Thus, the executor determines a transaction, and the table access machine operates with recognition of the transaction. This allows operations to be broken down into small pieces for concurrency and integrity. Also, it can be user transparent or implicit, except for transfer call and execute functions. At transaction start, as shown in FIG. 26, a first rule is CALL at point 300. This rule is executed until a second rule is called at point 301. This second rule is implemented by the executor with recursive calls to the table access machine. The second rule may call a third rule at point 302. This third rule executes until it completes operation and issues a return to the second rule at point 303. The second rule then completes execution and issues a return to the first rule at point 304. The first rule then completes execution and ends. Conceptually, the first rule could be considered a session manager in which it presents menu screens to an operator. The operator then invokes a second rule to perform a given application. This second rule may include any number of transaction levels as required by the given application.

The table access machine also executes a two-phase lock protocol for objects in the data base. All locks are cleared at transaction end and cannot be made "weaker" during a transaction. The locks are requested by the table access machine and granted, or not, by the native access method server, such as the table data store or the server of other types of data sources.

The table access machine also builds selection strings for transfer to a selection evaluator which is associated with the table data store server or other native data store server. Selection evaluator is called by a server. The server supplies a row from a table, along with a selection string. There are no data definitons passed to the selection evaluator. The selection evaluator carries out the selection operation. Results of the selection are returned to the table access machine by the appropriate server.

To access the various tables, screens, and other subsystems in the subject data processing system, object code routines in the VSM build @TAM arguments, which are forwarded to TAM on the VSM <---> TAM interface. TAM communicates various requests to the Servers which perform the actual accessing of the tables, screens, etc. The Servers may in turn forward requests to the Selection Evaluator, which performs evaluations and returns responses to the Servers. The Servers then return data or answers to TAM, which forwards them to the VSM object code routines.

TAM <---> Server Interface

TAM communicates with the various entities of the computing environment via Servers. There are Servers for screens, IMS, import/export, native table data store, and other entities. TAM sends a request to a Server, followed by one or more data strings. A data string begins with a 1-byte length indicator if the string is less than 128 bytes in length (bit 0 clear), or a 2-byte length indicator (bit 0 set) if the string is greater than 127 bytes in length. Table 64 lists the valid Server requests which TAM may make:

TABLE 64

(Valid TAM —> Server Requests)

| Code | Name |
|---|---|
| C | Ctable request |
| R | Release locks |
| G | Get |
| N | Next |
| P | Next Parameter |

Tables 65–69 give detailed information about the data contents of the request and return communications for each of the request codes:

TABLE 65 (C)

| Byte Offset | Length | Contents |
|---|---|---|
| TAM —> Server C request: | | |
| 0 | 2 | Message length |
| 2 | 4 | Transaction ID |
| 6 | 1 | Request code |
| 7 | 3 | Type of data |
| 10 | variable | Tablename, UserID, and GroupID data strings |
| Server —> TAM C return: | | |
| Byte Offset | Length | Contents |
| 0 | 2 | Message length |
| 2 | 2 | Return code |
| 4 | 4 | Transaction ID |
| 8 | variable | CTable data string |

TABLE 66 (R)

| Byte Offset | Length | Contents |
|---|---|---|
| TAM —> Server R request: | | |
| 0 | 2 | Message length |
| 2 | 4 | Transaction ID |
| 6 | 1 | Request code |
| Server —> TAM R return: | | |
| Byte Offset | Length | Contents |
| 0 | 2 | Message length |
| 2 | 2 | Return code |
| 4 | 4 | Transaction ID |

TABLE 67 (G)

TAM —> Server G request:

| Byte Offset | Length | Contents |
|---|---|---|
| 0 | 2 | Message length |
| 2 | 4 | Transaction ID |
| 6 | 1 | Request code |
| 7 | 1 | Lock |
| 8 | variable | Tablename, Parameters, and Key Value data strings |

Server —> TAM G return:

| Byte Offset | Length | Contents |
|---|---|---|
| 0 | 2 | Message length |
| 2 | 2 | Return code |
| 4 | 4 | Transaction ID |
| 8 | variable | Table Row data string |

TABLE 68 (N)

TAM —> Server N request:

| Byte Offset | Length | Contents |
|---|---|---|
| 0 | 2 | Message length |
| 2 | 4 | Transaction ID |
| 6 | 1 | Request code |
| 7 | 1 | Lock |
| 8 | variable | Tablename, Parameters, Last Row, Selection, Keyname Ordering, and Keyname !op! Value data strings |

Server —> TAM N return:

| Byte Offset | Length | Contents |
|---|---|---|
| 0 | 2 | Message length |
| 2 | 2 | Return code |
| 4 | 4 | Transaction ID |
| 8 | variable | Table Rows data string |

TABLE 69 (P)

TAM —> Server P request:

| Byte Offset | Length | Contents |
|---|---|---|
| 0 | 2 | Message length |
| 2 | 4 | Transaction ID |
| 6 | 1 | Request code |
| 7 | 1 | Lock |
| 8 | variable | Tablename, Last Parameter Set, and Selection data strings |

Server —> TAM P return:

| Byte Offset | Length | Contents |
|---|---|---|
| 0 | 2 | Message length |
| 2 | 2 | Return code |
| 4 | 4 | Transaction ID |
| 8 | variable | Parameter Sets data string |

Additionally, an Update (synchronization) message may be sent by TAM. Table 70 gives detailed information about the data content of that message and its return answer:

TABLE 70

(Update)

TAM ——> Server update message:

| Byte Offset | Length | Contents |
|---|---|---|
| 0 | 2 | Message length |
| 2 | 2 | Number of transactions |
| 4 | 1 | Lock request |
| 5 | variable | One of more transactions udpate records, each including: |
| | 4 | Transaction ID |
| | 2 | Number of updates, each update consisting of: |
| | 2 | Length |
| | 1 | Update request (I, R, D) |
| | variable | Tablename, Parameters, and Table Row data strings |

Server ——> TAM update return:

| Byte Offset | Length | Contents |
|---|---|---|
| 0 | 2 | Message length |
| 2 | 2 | Return code |
| 4 | 4 | Transaction ID |

Server --> Selection Evaluator Interface

TAM may send to the Servers various messages which include information which must be forwarded to the Selection Evaluator for processing. The Selection Evaluator expects the following registers to contain the indicated data:

| Register | Contents |
|---|---|
| 15 | address of entry point into Selection Evaluator |
| 13 | address of standard save area |
| 01 | address of parameter list |

The parameter list contains, at the given byte offsets, the following information:

| Byte Offset | Contents |
|---|---|
| 0 | address of selection string |
| 4 | address of table row to be compared |
| 8 | address of 4080-byte work area |

A selection string consists of a 2-byte length field followed by one or more selection terms in postfix notation. Each selection term begins with a 1-byte opcode, and can be grouped into the categories listed in Table 71:

TABLE 71

(Selection Terms)

| Term Type | Function |
|---|---|
| Operator | 1 - byte arithmetic, relational, or logical opcode |
| Field reference | 1-byte opcode ('44') followed by a 6-byte field descriptor and a 2-byte field number |

TABLE 71-continued

| | |
|---|---|
| Offset reference | 1-byte opcode ('4C') followed by a 6-byte field descriptor and a 2-byte offset of the field in the row. Used for Temporary, Import, Screen, and IMS tables. |
| Value | 1-byte opcode ('48') followed by a 6-byte value descriptor and a value. Values begin with a 1-byte (length < 128, bit 0 clear) or 2-byte (length > 127, bit 0 set) length prefix. |

Detailed information about the contents of the field and value descriptors, and selection string term opcodes are given in Tables 72 and 73, respectively:

TABLE 72

(6-byte Field and Value Descriptors)

| Byte Offset | Length | Contents |
|---|---|---|
| 0 | 1 | semantic type |
| 1 | 1 | data syntax |
| 2 | 2 | maximum data length |
| 4 | 2 | number of decimal places |

TABLE 73

(Hexadecimal Opcodes)

| Opcode | Function | |
|---|---|---|
| (Arithmetic) | | |
| '04' | + | (addition) |
| '08' | − | (subtraction) |
| '0C' | * | (multiplication) |
| '10' | / | (division) |
| '14' | ** | (exponential) |
| '18' | − | (unary minus) |
| '1C' | ¦¦ | (concatenation) |
| (Relational) | | |
| '20' | = | (equal) |
| '24' | = | (not equal) |
| '28' | < | (less than) |
| '2C' | <= | (less than or equal) |
| '30' | > | (greater than) |
| '34' | >= | (greater than or equal) |
| (Logical) | | |
| '38' | & | (and) |
| '3C' | ¦ | (or) |
| '40' | | (not) |
| (Other) | | |
| '44' | R | (reference to i'th field in row) |
| '48' | V | (value) |
| '4C' | O | (reference to field at offset in row) |
| '54' | @ | (parameter replaced in selection and always evaluates to true) |
| 'BC' | LIKE | (relation) |

The LIKE relational operator has two operands: a field name and a pattern. The result of the relation is true if the value of the field in the row matches the pattern. The pattern may include the wildcards: '*' (any string of zero or more characters) and '?' (any one character).

The table row passed by address to the Selection Evaluator may be in either of two formats: Expanded Variable Length Row format (used with Temporary, Import, Screen, and IMS tables), or Variable Length Row format (used elsewhere).

Variable Length Row format begins with a 2-byte row length designator, which gives the length of the entire row including the designator itself. Appended to the row length designator are one or more fields, the first field being a "key" field. Each such field begins with a 1-byte field length indicator if the field length is less than 128 bytes excluding the length indicator (bit 0 clear), or 2-byte field length indicator if the length is greater than 127 bytes (bit 0 set). The value of the field is represented in the given number of bytes. Blanks are removed from the right end of all fields containing syntax characters. If a requested field is not present in the row, the field is assumed to have a null value.

Expanded Variable Length Row format differs slightly, in that no row length designator is used. Also, fixed numbers of bytes are reserved for each field's value, with the length indicator for each field merely indicating how many of those bytes are actually used. The final difference is that if a requested field is not present in the row, the row is not selected unless the field is being compared with a null string.

Selection Evaluator --> Server Interface

Upon return, the Selection Evaluator will pass, to the Servers, the following return codes in register 15:

| Return Code | Reason |
|---|---|
| 0 | row matches selection criteria |
| 4 | row does not match selection criteria |
| 8 | error detected |

If an error is detected, the Selection Evaluator will return, in the work area, the data shown in Table 74.

TABLE 74

(Selection Evaluator Return)

| Byte Offset | Length | Meaning |
|---|---|---|
| 0 | 2 | error code where: Code Meaning |
| | | 1 overflow |
| | | 2 underflow |
| | | 3 conversion |
| | | 4 division by zero |
| | | 5 result of exponential operation is imaginary |
| 2 | 2 | error message length indicator |
| 4 | variable | error message text |

The error message text may contain strings of the form "%Fnnnn", where "nnnn" is a four-digit field number for Variable Length Row format or a four-digit field offset for a fixed length format row. For example, an error message may read 'TYPE ERROR, FIELD "%F0010" COMPARED WITH TYPE IDENTIFIER' and the calling entity may then substitute the appropriate field name into the string in lieu of "%F0010".

Thus, a table access can be summarized as beginning with a table access statement in the object code of the executor. The object code thus includes the code which builds the @TAM arguments, and constants to be used by such arguments. This code can be rebuilt individual form at the source level by the rule editor. The table access statement in object code is then translated into a @TAM opcode format. This includes the opcode, table names, parameters, selection strings, ordering information onto the stack. The values are stored in descriptor format, and based on data management data structures. The accesses are made using field names. Next, the TABLE ACCESS MACHINE INTERFACE is executed, which the opcode, table name, parameters, selection strings, and ordering are set out in machine code format.

The server then performs a necessary communication with the native data store to return the identified occurrences. The selection evaluator is invoked by the server when appropriate.

VIII. Dynamic Binding

The dynamic binding carried out in the virtual stack machine can be summarized as implementation with three major steps. First, the rule object code is implemented with a modifiable data area. Second, the executor builds hash tables for rules and tables by which objects to be bound can be quickly found. Third, at a log on of a session, the virtual stack machine buffers fixed data, including rules from system and installation libraries, and the fixed table definitions for the dictionaries and the like.

Objects in a rule which are not bound include rules or data stored in tables. When a rule calls another rule by a name, the rule will include an offset to a position in the modifiable data area of the rule at which the value of the rule to be called can be stored. The executor then searches for the rule by name through the hash tables and its buffers. If it is not found in the hash tables, then a call to the table access machine is executed to insert the buffer and the proper values in the hash tables. When the buffer for the rule to be called is found by the executor, then the value of the buffer is inserted into the modifiable portion of the rule. Similarly, when an object is called by a table and field name by a rule, that table is found by the virtual stack machine through hash tables or libraries. The value for the occurrence of the table in which the called field is found is then stored in the modifiable portion of the rule at the specified offset.

All objects in the data base can be bound at execution time using these formats. In fact, the rule binding is the same as the table.field binding, except that the table in which a rule is found is determined by searching a predetermined set of libraries as described above.

At log on of a session, a good number of the data tables from the table data store and other storage systems associated with the host can be retrieved into the virtual stack machines buffers to minimize the calls through the table access machine and the native data stores during execution of a rule.

IX. Table Data Store

Figure 27:
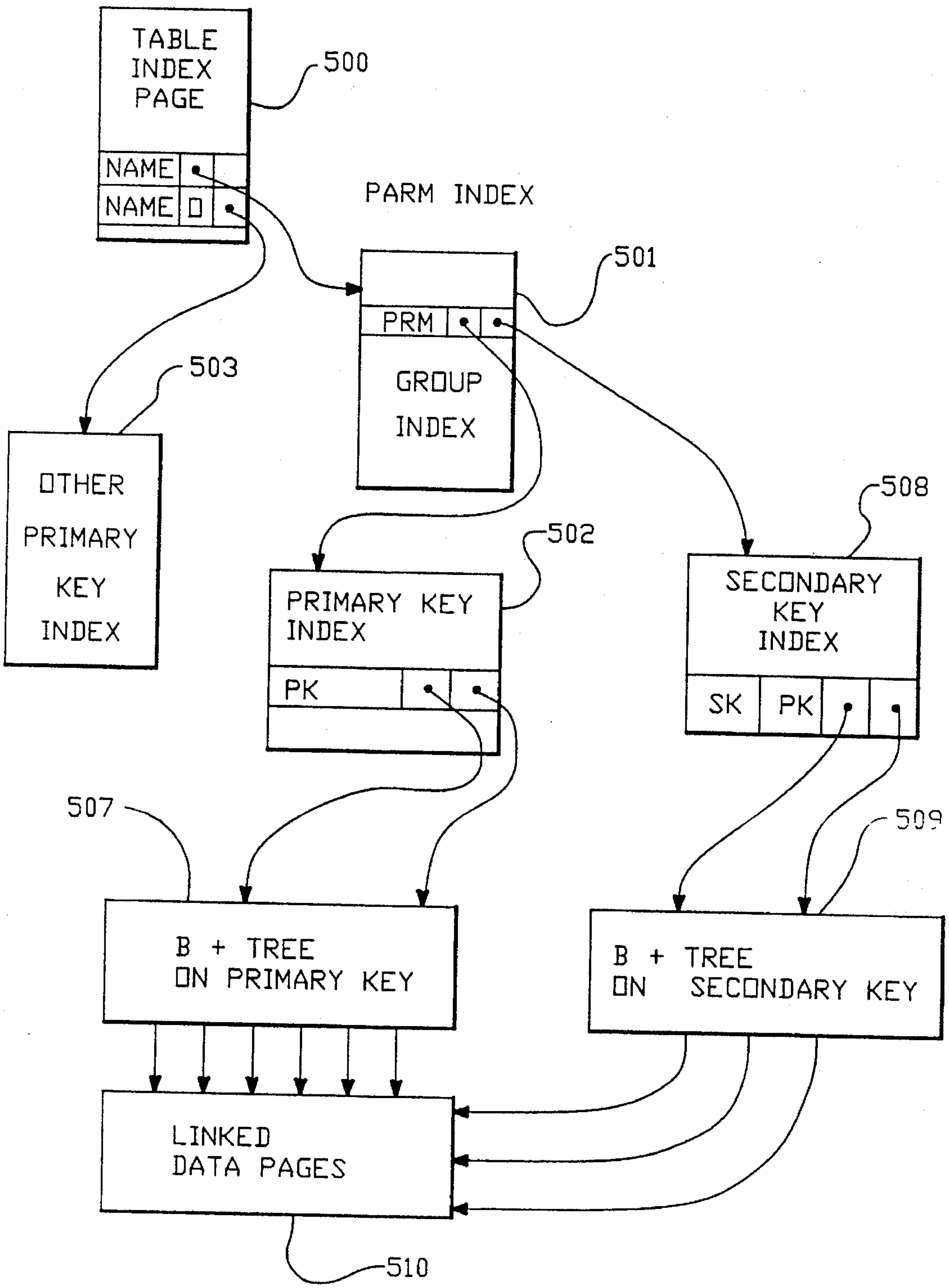
FIG. 27 is a schematic diagram of the table data store access method.

The table data store is the native access method for the object-oriented operating system according to the present invention. Data in this system is stored in a balanced structure where each table is ordered on the primary key within the table. The basic structure of the access method implemented by the table data store is shown in FIG. 27. The table data store consists of a table index page 500. The table index page includes a list of table names with pointers to a parameter index page 501 where appropriate. Other entries in the table index page point directly to a primary key index 503. Entries in the parameter index page 501 point to a primary key index 502. The primary key index is a balanced binary tree 507 based on the B+ tree organization ordered on the primary key (where index 502 is the top of the tree). The bottom of the B+ tree points to the actual link to data pages which store occurrences for the table.

The parameter index 501 or the table index page 500 can point also to a secondary key index 508. Secondary key index 508 points to lower sets 509 of indexes on a secondary key based on the B+ key structure. These indexes point to the same linked data pages 510 as the B+ tree on the primary key 507.

Figure 28:
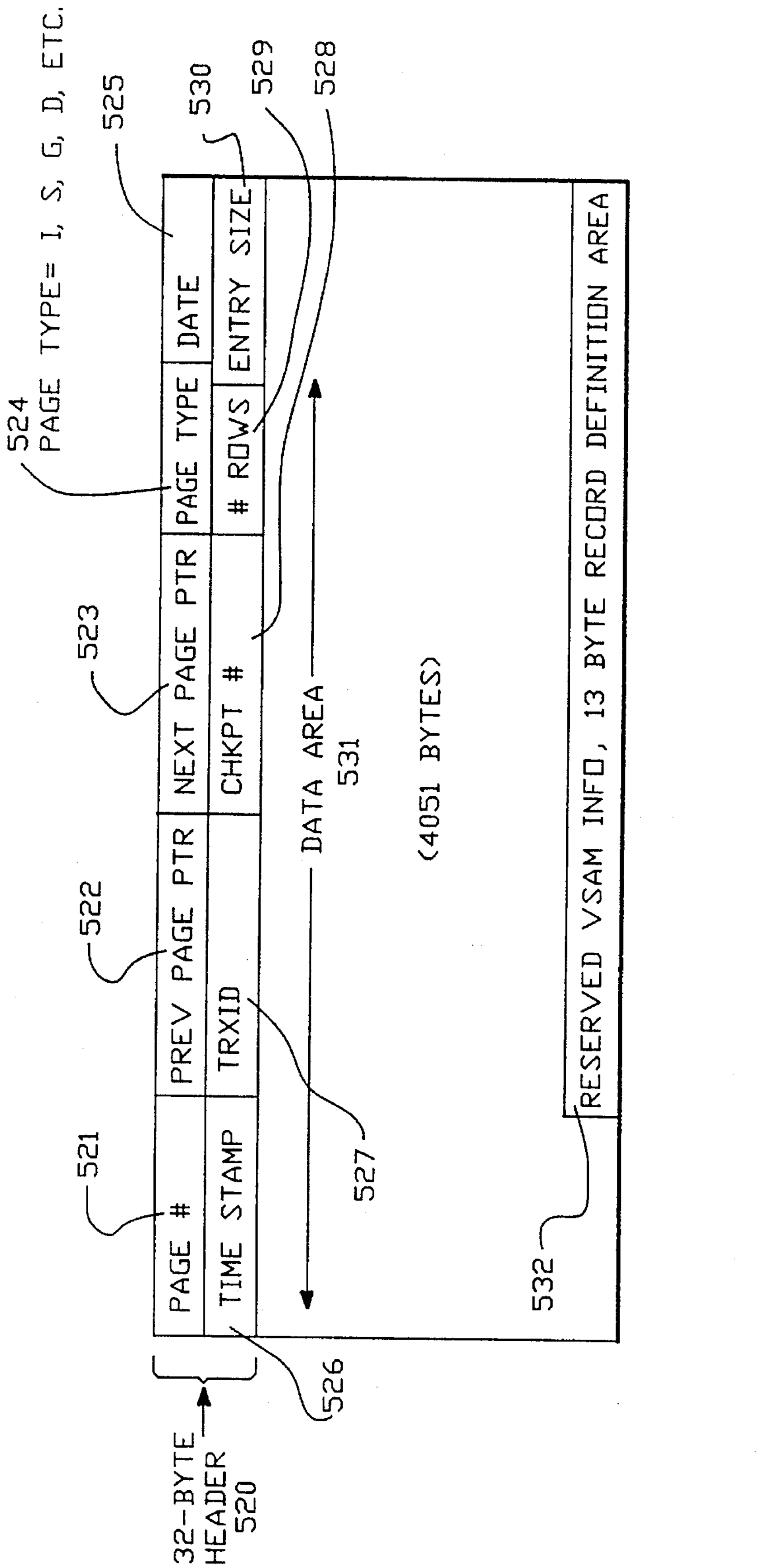
FIG. 28 illustrates the layout of a page of data in the table data store.

The page layout for all page types is shown in FIG. 28. The page includes a 32 byte header 520. The header consists of the page number 521, a previous page pointer 522, a next page pointer 523, a page type indicator 524, and a date value 525. A time stamp 526 is included, as well as a transaction I.D. 527, a check point number 528, the number of rows in the page 529, and the size of each row in the page 530. A data area 531 consists of 4,051 bytes of raw data. At the end of the page, a 13 byte record definition area is reserved for VSAM INFORMATION 532 used by the host system.

A record within the page stores a row of the table in the format as follows:

LL/l/value/l/value/l/value . . . l/value/l/value, where LL is equal to a 2 byte length of the row, l is equal to a 1 or 2 byte length for the value, and the value is the actual data entry or a null value.

A primary index record is of the following format: value/pointer.

A secondary index record is of the format: secondary key value/primary key value/pointer.

A group index entry is of the format: parm/parm/. . . /pointer.

The B+ tree automatically balances the data structure. Whenever more than two entries in a given level of the tree are created, the B+ tree automatically implements an independent level of the tree according to well know techniques.

Accordingly, searches for occurrences in a table by the primary key are carried out very quickly. For searches on non-ordered fields, an entire table must be retrieved to the server for selection or the table access machine for creating a sub-view or the like.

X. Translator/Detranslator

The creation and modification of rules is accomplished through the interaction of three components: an editor, a translator and a detranslator. The rule editor is an interactive tool which allows a user to make testual changes to a rule's contents. The translator converts a rule's textual image into "virtual machine code", which may be executed by Huron's virtual machine. The detranslator performs the inverse transformation: it produces a textual representation of a rule from its virtual machine image.

When a rule is edited, the detranslator transforms its virtual machine code into a tokenized representation of the source. The composer then takes the tokenized form and builds the line by line textual representation of the rule. This is what is displayed to the user by the editor. As changes are made by the user, the scanner performs lexical analysis of the lines that are updated. Lexical analysis converts the lines into their tokenized form, ready for input to the translator. When the user saves a rule, the translator parses it and, if valid, generates the virtual machine code for the rule. Once the rule is saved in its executable form, the rule's text is discarded.

Figure 29:
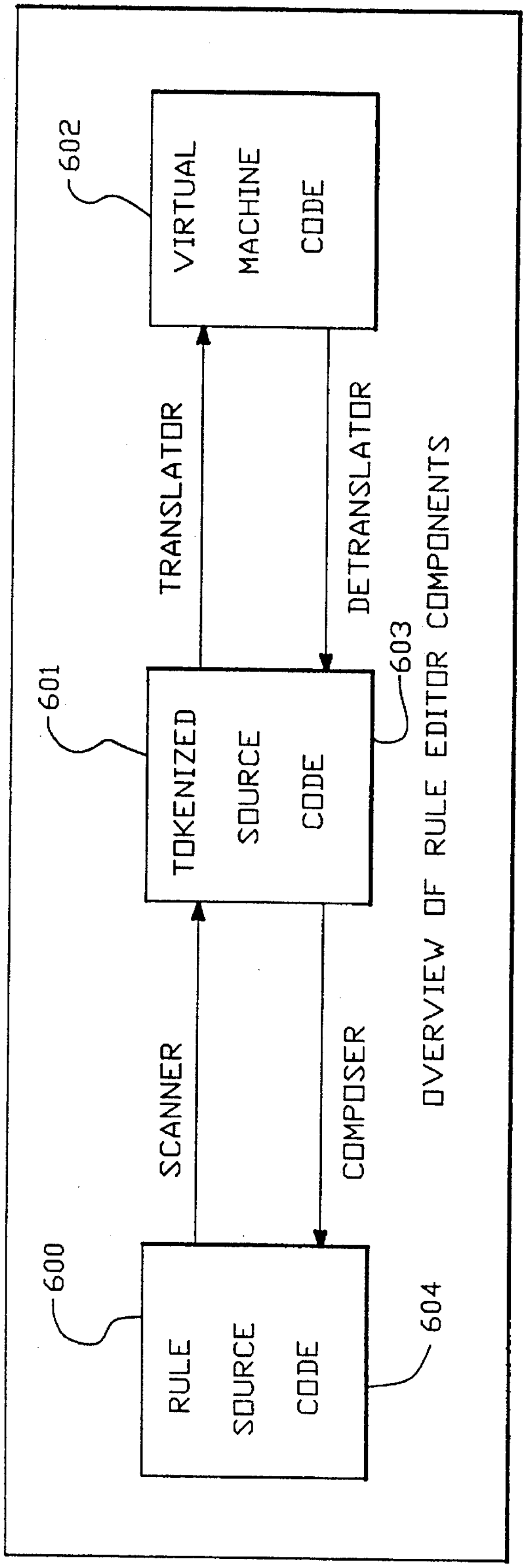
FIG. 29 is an overview of the rule editor components according to the present invention.

FIG. 29 provides an overview of the translator/detranslator system. It operates by scanning the rule source code 600 which translates it into a tokenized source code 601. The translator then generates the virtual machine code 602. Virtual machine code is detranslated to a tokenized source code 603 when required by a user for editing. It is supplied back to the user by a composer as rule source code.

The tokenized source code consists of data stored in a TOKENS table built by the detranslator and parameterized by logical line. A lexical analyzer is used to modify,the TOKENS table. This table consists of the following fields:

INDEX—the primary key;

STRING—the text of the token;

TYPE—the type of token;

LEN—the character length of the token;

DEC—the number of digits to the right of the decimal points of the token;

TABREF.MARK—indicates whether this token is part of a table.field reference.

Tokens which are too long for the TOKENS table are stored in the LONG_STRINGS table. This includes tokens greater than 16 characters in length, quoted strings, and large numbers. This table is comprised of the following fields:

INDEX—primary key;

STRING—test of token;

TYPE—type of token;

LEN—character length of the token;

DEC—the number of digits to the right of the decimal point.

This LONG_STRING table is identified in the TOKENS table by inserting in the TYPE field "long string", and by inserting an index to the LONG_STRINGS table in the LEN field.

A typical TOKENS table and LONG_STRINGS table are shown in FIG. 30. The logical line is shown at 1000, and the tokenized representation of the line is shown in the tables 1001, 1002.

The translator converts tokenized representation of the rule into virtual machine code. It performs context free syntax checking and some context sensitive syntax checking. Further, it generates the threaded object code suitable for run time binding.

The algorithm structure is written in rules of the object-oriented operating system. It performs a top down recursive descent translation algorithm in which the language syntax is hard coded in conditions. The translator converts the infix form of the rules language to the postfix form of the object language suitable for execution on the stack machine. Finally, it saves information about rule data. The translator generates the rule object code in the format described above. The modifiable data area is actually allocated only at run time.

A rule may contain a variety of data types including constants that are literally in the program or generated by the translator, exception handler names, global (unbound) names, such as a rule or local variable, and table.field names. The translator maintains a table for each kind of data item called CONSTANTS, EXCEPTIONS, SYMTAB, and TABLE_REFS, respectively. It also maintains a table known as RELOCATION which allows dummy references to data items to be resolved by the translator.

The CONSTANT table contains the following fields:

INDEX_PRIMARY KEY;

STRING_TEXT OF CONSTANT;

TYPE—semantic type (always "S");

SYNTAX—internal representation;

LEN—number of bytes;

DEC—number of digits to the right of the decimal point;

REAL_ADDRESS—offset to the constant.

Thus, the object code format of a constant can be generated from the CONSTANTS table.

The SYMTAB table contains information about rules, such as local variable, parameters, and global unbound names directly or indirectly called in the rule. The field of the SYMTAB table include:

IDENT—primary key (identifier name);

KIND—parameter, local or global;

REF—the offset to the data item (negative if an indirect name);

INDEX—unique within the kind (key).

Again, the parameters and locals and globals in the object code format can be generated from the SYMTAB table. The TABLE_REFS table contains information about the table.field references. The fields include the following:

INDEX—primary key;

TABLE_NAME—name of the table (quote if indirect);

FIELD_NAME—name of the field (quote if indirect);

REAL_ADDRESS—the offset to the data item (negative if either name is indirect).

Again, it can be seen that the table.field references within the object code can be generated from this table.

The RELOCATION table contains information about "dummy" references to data objects. It is used to resolve these references once data objects have been allocated. The RELOCATION table includes the following fields:

OCCUR_ADDR—the offset to the dummy reference;

TYPE—the kind of dummy reference (constant, global, . . . );

TABLE_INDEX—the index to the corresponding table;

OFFSET—this contains the offset to the object.

Once all data objects have been allocated the translator traverses the RELOCATION table and resolves all references to these objects.

The EXCEPTION table contains the following fields:

EX_NUM—the primary key;

IDENT—the exception name;

FORALL#—the loop number if within an until clause, otherwise zero;

OFFSET—the offset decode for the handler;

TABLE NAME—the associated table name if any;

TABLE OFFSET—the offset to the name of the table in object code.

The exception handler names are generated from the EXCEPTIONS table. If the handler has an associated table name, it can also be generated from this table.

The detranslator converts the virtual machine code to tokenized representation of the rule language. The algorithm structure is written in the rules within the object-oriented operating system. It converts the post-fix form of the object level representation to the in-fix form of the rule language. The detranslator is table driven. Most of the object code structure is encoded in tables which are referred to by the detranslator.

The detranslator uses several stacks for the conversion from post-fix to in-fix.

The detranslator is essentially a stack machine. Rather than executing post-fix code, it transforms it into its tokenized representation. Each opcode causes the manipulation of the detranslator internal stacks. Once the opcode for the left hand side of a statement is reached, contents of the stack or stacks are moved to the tokens table. The detranslator maintains three stacks which operate in harmony and are identified in corresponding tables. The first is the DET.STACK table. Objects are pushed onto this stack as each opcode is visited. It is a marked stack, as stack elements between the markers are moved as one element. The DET.STACK table includes the following fields:

INDEX—primary key;

TYPE—the detranslation type (parameter, constant, table.field reference, . . . );

OFFSET—the offset to the data item in the static data area;

ITEM—symbol text;

SUBTYPE—this is the translator type (operator, reserved word, . . . ).

The next table is known as the DET_PRED_ST table. This table contains the precedence of an item of the DET-.STACK. The fields include the following:

INDEX—primary key;

PRECEDENCE—the item's precedence.

The final stack is identified in the DET_WORKAREA table. Items are placed in this table from the DET_STACK table. It helps during conversion of post-fix to in-fix. Items are transferred from the DET_WORKAREA back to the DET_STACK. It contains the same fields as the DET_STACK table.

An example of detranslation is shown in FIGS. T/D1–T/D4C. The source for the detranslation is L=1+2; the object is as follows:

1:@CONST 1

2:@CONST 2

3:@ADD

4:@SETL L.

Figure 31:
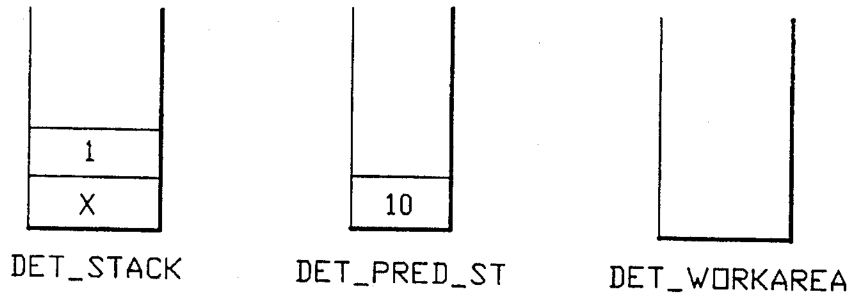

The first step is shown in FIG. 31. The value "1" is inserted into the DET STACK with the marker X indicating a boundary element. The DET_PRED_ST is filled with the precedence 10 of the first data element. The DET_WORKAREA is empty.

Figure 32:
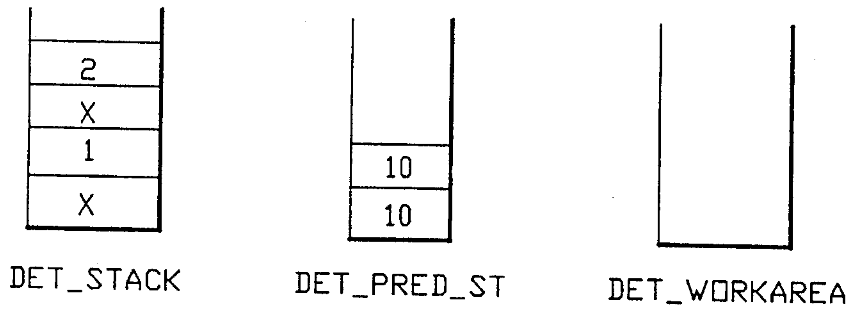
Figure 33A:
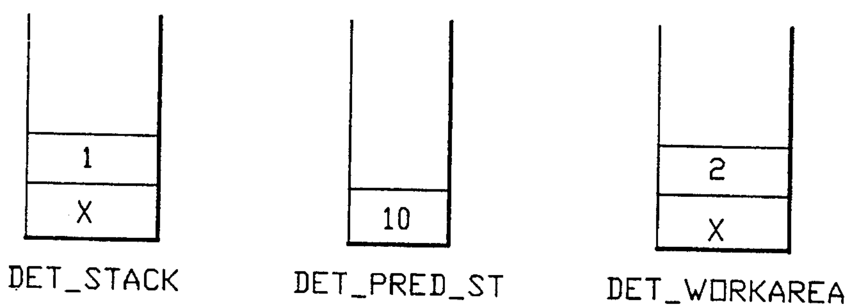
Figure 33B:
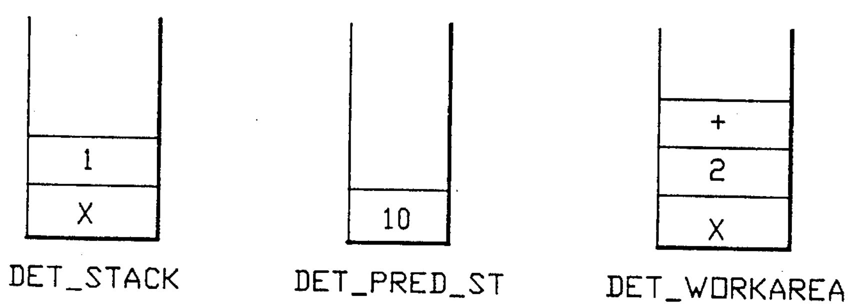

The next step is shown in FIG. 32. In this step, the value constant 2 is entered as an element of the DET_STACK and its precedence is set on the DET_PRED_ST as a value 10. The work area remains empty. In the next step, the @ADD operator is encountered. In this step, the constant 2 is moved to the work area and its precedence removed from the stack. Next, the "+" operator is added to the work area stack as part of the element including the constant 2. Finally, the constant 1 is moved from the stack to the work area as part of the same element as the constant 2 and the "+". These steps are sequentially shown in FIGS. 33A, 33B, and 33C.

In FIG. 34A, the contents of the work area are transferred back to the main stack. In FIGS. 34B, 34C, 34D and 34E, the TOKENS table is filled. This happens in response to the @SETL opcode which inserts the first and second tokens as shown in FIG. 34B. Thus, the fields of the tokens table for the first token is filled with the value L, an identifier I. It is a one character string with zero positions to the right of the decimal point. It is not a part of the table.field reference. The next entry 2 is the equal sign. It is an operator with one character length with no points to the right of the decimal point and not part of a table.field reference. The contents of the stack are then reordered into the work area to the in-fix form as it appears in the rule language as shown in FIG. 34C. Finally, the balance of the TOKENS table is build from the work area entries as shown in FIG. 34D. The 1 is taken from the top of the work area and inserted as the third entry in the TOKENS table. The "+" operator is inserted as the fourth entry. The constant 2 is inserted as the fifth entry, and the ";", which is the end of the line, is inserted as the last entry. After this occurs, the stack, the precedence table and work area are cleared as illustrated in FIGS. 34E.

This translator/detranslator pair provides the means of maintaining only one single version or representation of any given program on the computer. Only the object code . version of a program is stored on the secondary storage medium. The source code version is only generated on demand by the detranslation from the object code. The object code version includes all information necessary to assist the detranslation process. This provides significant maintenance cost reductions because no effort is spent to secure synchronization of source and object code versions of programs. The need for secondary storage is reduced as only the object code version need be stored. Further, several translator/detranslator pairs could be implemented so that the same program can be represented differently for different programs. Use of this technique would allow implementation of the rule language in a variety of different spoken languages like French, German or English, different graphical or diagrammatic representation of program structures, or in different communication media, for instance, visual or sound.

Appendix A is a copy of source code for the translator and detranslator.

CONCLUSION

The object-oriented operating system of the present invention offers a new generation of application system environment which could substantially enhance programmer efficiency. Some of the key technologies implemented in this invention include the central active on line repository of tables which maintains definitions of data and programs, and links all resources necessary at execution time without regard to where in the storage system the resources reside. It enables dynamic data driven structure in the environment of the system to operate without performance limitation of tradition interpretive systems. Further, the operating system of the present invention is not limited to any particular hardware or control program environment,. Programming developed on one node may be moved easily to any other platform of the system, such as from a main frame to a work station. This makes it possible to support a broad user base with a single programming structure.

In this operating system, there is only one copy of any program module. All program modules are stored in the repository in object form. Traditional maintenance problems associated with coordinating source and object modules are completely eliminated.

The rule language of the operating systems enforces and supports structured programming techniques. It eliminates the inefficiencies of huge load modules and pregenerated transaction logic.

The rule language is a general purpose language which is comparable to specification languages for ease of use. The rule language integrates program and data access functions under a single view, and can be used for general purpose applications.

The operating system implements data driven programming. This makes it easy to store all program parameters in the data base. Further, clear separation between data and programs can be easily accomplished.

The data representation provided by the operating system provides extensions to the traditional relational model to offer the functionality of the relational conceptual model together with the performance associated with hierarchical internal models.

Semantic data types are supported. Thus, improper use of data can be restricted. Further, this facilitates data compatibility in instances where simple syntactical descriptors may be incompatible.

The operating system provides a superior implementation of event driven processing. Common data related functions can be managed with the data instead of contained within application programs. This reduces the amount of coding necessary by a programmed and provides an ability to control common procedures through a data base administrator.

The operating system presents an access to heterogeneous data stores. A customer can utilize the object-oriented operating system to access old data in a data base other than the native data store of the operating system. For instance, data in an IMS data base is presented to the user as if it were stored in the TDS.

This permits the extended relational conceptual view of data to be distributed across different physical data base systems, including the table data store, IMS, DB2, and other main frame data base management systems. Also, new programs may be developed using the relational views no matter where the data is located. User does not need to include the calls to specific data base management systems within his programs.

The virtual stack machine with dynamic binding, the on-line dictionary maintained by the table access machine within the native data store, and the extended relational view of data which treats all objects in the system with a common view combine to form an object-oriented operating system that provides a very high level interface for programming and data access, and a complete data processing system for development and production of programs.

The on-line transaction oriented system of the present invention provides full consistency and recovery using a two-phase commit protocol. The data base is an object-oriented system with semantic data types and strong support for events. The programming rules are practical in general purpose in the form of an extended case statement. The message based architecture of the virtual machines support access to distributed heterogeneous data bases. The system provides control of data and programs as a shared strategic resources. Application development is as fast as prototyping. The application systems are easy to change and expand. And the interface for data access and ad hoc processing is simple yet powerful.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

-202-

APPENDIX

SOURCE LISTING OF TRANSLATOR/DETRANSLATOR

Copyright Amdahl Corporation 1989

SAME APPENDIX AS IN FILE
AMDH 7294

APPENDIX

MAIL ROOM MAR 11 1993 PAT. & TRADEMARK OFC.

SOURCE LISTING OF TRANSLATOR/DETRANSLATOR

Copyright Amdahl Corporation 1989

PRINTING TABLE(S): @TRANS_CONSTS PAGE 1 1

| IDENTIFIER | RESERVED_WORD | NUMBER | QUOTED_STRING | LONG_STRING | SPECIAL_CHAR | OPERATOR | BINARY | PACKED_DECIMAL | FLOATING_POINT | VARIABLE_CHAR |
|---|---|---|---|---|---|---|---|---|---|---|
| I | R | N | Q | L | S | O | B | P | F | V |

PRINTING TABLE(S) @TRANS_CONSTS PAGE 1 2

| IDENTIFIER | FIXED_CHAR | TYPE_OFFSET | TYPE_LENGTH | SYNTAX_OFFSET | SYNTAX_LENGTH | LENGTH_OFFSET | LENGTH_LENGTH | DECIMAL_OFFSET | DECIMAL_LENGTH |
|---|---|---|---|---|---|---|---|---|---|
| . | C | 0 | [illegible] | [illegible] | 1 | 2 | 2 | 4 | 2 |

PAGE 13

PRINTING TABLE(S) @TRANS_CONSTS

| IDENTIFIER | DATA_OFFSET | MAX_2BYTE_BINARY | MAX_RULE_LENGTH | MAX_PACKED_LEN | NAME_LENGTH | FLOAT_LENGTH | CONSTANT_REF | TAMSTRING_REF | NAME_REF |
|---|---|---|---|---|---|---|---|---|---|
| 1 | 6 | 32767 | 1980 | 15 | 16 | 16 | C | T | N |

PAGE 14

PRINTING TABLE(S) @TRANS_CONSTS

| IDENTIFIER | TABLEFIELD_REF | BINARY_NUMBER | PACKED_NUMBER | FLOAT_NUMBER |
|---|---|---|---|---|
| 1 | N | 0 | 0.0 | 0.0E+00 |

```
PRINTING TABLE(S)  BNF(AND)                                        PAGE 1

ORDER     RULE_NAME
------ ----------------
     1 ACTION_FAIL
```

```
PRINTING TABLE(S:  BNF(ASCENDING)                                   PAGE 1

ORDER     RULE_NAME
------ ----------------
     1 ACTION_FAIL
```

PRINTING TABLE(S) BNF(CALL) PAGE 1

| ORDER | RULE_NAME |
|---|---|
| 1 | CALL_NAME |
| 2 | PARSE_CALL |

PRINTING TABLE(S) BNF(COMMIT) PAGE 1

| ORDER | RULE_NAME |
|---|---|
| 1 | PARSE_COMMIT |

```
PRINTING TABLE(S)  BNF(DELETE)                                                  PAGE 1

ORDER      RULE_NAME
------ ---------------
     1 PARSE_DELETE
     2 TABLE_SPEC
     3 PARM_LIST
     4 WP_SELECTION
     5 GEN_TAM
```

```
PRINTING TABLE(S)  BNF(DESCENDING)                                              PAGE 1

ORDER      RULE_NAME
------ ---------------
     1 ACTION_FAIL
```

```
PRINTING TABLE(S)   BNF(DISPLAY)                                        PAGE 1

ORDER       RULE_NAME
------- ----------------
      1 DISPLAY_NAME
```

```
PRINTING TABLE(S)   BNF(END)                                            PAGE 1

ORDER       RULE_NAME
------- ----------------
      · PARSE_END
```

PRINTING TABLE(S) - BNF(EXECUTE)

PAGE 1

| ORDER | RULE_NAME |
|---|---|
| 1 | CALL_NAME |
| 2 | PARSE_EXECUTE |

PRINTING TABLE(S) BNF(FORALL)

PAGE 1

| ORDER | RULE_NAME |
|---|---|
| 1 | PARSE_FORALL |
| 2 | TABLE_SPEC |
| 3 | PARM_LIST |
| 4 | CHECK_WEXPR |
| 5 | TABLE_ORDER |
| 6 | OPTIONAL_UNTIL |
| 7 | GEN_FTAB |

```
PRINTING TABLE(S)  BNF(GET)                                    PAGE 1

ORDER      RULE_NAME
------ ----------------
     1 PARSE_GET
     2 TABLE_SPEC
     3 PARM_LIST
     4 CHECK_WEXPR
     6 GEN_TAM
```

```
PRINTING TABLE(S)  BNF(INSERT)                                 PAGE 1

ORDER      RULE_NAME
------ ----------------
     1 PARSE_INSERT
     2 TABLE_SPEC
     3 PARM_LIST
     4 WP_SELECTION
     6 GEN_TAM
```

```
PRINTING TABLE(S) SNF(LIKE)                                    PAGE 1

ORDER     RULE_NAME
------ ----------------
     1 ACTION_FAIL
```

```
PRINTING TABLE(S) SNF(LOCAL)                                   PAGE

ORDER     RULE_NAME
------ ----------------
     1 ACTION_FAIL
```

```
                                                                 PAGE 1
PRINTING TABLE(S)  BNF(NOT)

ORDER      RULE_NAME
------ ----------------
     1 ACTION_FAIL
```

```
                                                                 PAGE
PRINTING TABLE(S)  BNF(NULL)

ORDER      RULE_NAME
------ ----------------
     1 ACTION_FAIL
```

```
PRINTING TABLE(S)  BNF(ON)                                        PAGE 1

ORDER      RULE_NAME
------ ------------------
     1 ACTION_FAIL
```

```
PRINTING TABLE(S)  BNF(OR)                                        PAGE

ORDER      RULE_NAME
------ ------------------
     1 ACTION_FAIL
```

```
PRINTING TABLE(S)  BNF(ORDERED)                                    PAGE 1

ORDER      RULE_NAME
------ ----------------
     1 ACTION_FAIL
```

```
PRINTING TABLE(S)  BNF(REPLACE)                                    PAGE 1

ORDER      RULE_NAME
------ ----------------
     1 PARSE_REPLACE
     2 TABLE_SPEC
     3 PARM_LIST
     4 WP_SELECTION
     5 GEN_TAM
```

PRINTING TABLE(S) BNF(RETURN)

PAGE 1

```
ORDER      RULE_NAME
------ ----------------
     1 L_BRAC
     2 PROCESS_EXPR
     3 R_BRAC
     4 PARSE_RETURN
```

PRINTING TABLE(S) BNF(ROLLBACK)

PAGE

```
ORDER      RULE_NAME
------ ----------------
     1 PARSE_ROLL
```

PAGE 1

```
PRINTING TABLE(S): BNF(SCHEDULE)

ORDER      RULE_NAME
------ ----------------
     1 QUEUE_SPEC
     2 PARSE_SCHEDULE
```

PAGE 1

```
PRINTING TABLE(S)  BNF(SIGNAL)

ORDER      RULE_NAME
------ ----------------
     1 SIGNAL_STMNT
```

```
PRINTING TABLE(S)  BNF(TO)                                        PAGE 1

ORDER      RULE_NAME
------  -----------------
     1 ACTION_FAIL
```

```
PRINTING TABLE(S)  BNF(TRANSFERCALL)                              PAGE 1

ORDER      RULE_NAME
------  -----------------
     1 CALL_NAME
     2 PARSE_XCALL
```

PAGE 1

```
PRINTING TABLE(S): BNF(UNTIL)

ORDER     RULE_NAME
------ ----------------
     1 PARSE_UNTIL
     2 UNTIL_DISPLAY
     3 CHECK_COLON
```

PAGE 1

```
PRINTING TABLE(S): BNF(WHERE)

ORDER     RULE_NAME
------ ----------------
     1 ACTION_FAIL
```

PAGE 1

PRINTING TABLE(S) CHAR_MAP2

| CHAR | NUMERIC | ST_VARS | OPERS | CONT_VARS | SPECIAL | LEAD_BLANK | FOLLOW_BLANK | SCREEN_CONVERT | SEQ_CHAR | DESCRIPTION |
|---|---|---|---|---|---|---|---|---|---|---|
| ¢ | N | N | N | N | Y | Y | Y | 0 | N | |
| | N | N | N | N | Y | N | N | 0 | N | |
| < | N | N | [illegible] | N | N | Y | Y | 0 | N | |
| ( | N | N | N | N | Y | N | N | 0 | N | |
| + | N | N | Y | N | N | Y | Y | 0 | N | |
| \| | N | N | Y | N | N | [illegible] | [illegible] | 0 | N | |
| & | N | N | Y | N | N | Y | [illegible] | 0 | N | |
| [illegible] | N | N | N | N | [illegible] | [illegible] | Y | 0 | N | |
| $ | N | [illegible] | N | [illegible] | N | [illegible] | [illegible] | 0 | N | |
| * | N | N | [illegible] | N | N | Y | [illegible] | 0 | [illegible] | |
| [illegible] | N | N | N | N | [illegible] | N | [illegible] | 0 | N | |
| [illegible] | N | N | N | N | [illegible] | N | N | 0 | N | |
| [illegible] | N | N | [illegible] | N | N | N | [illegible] | 0 | N | |
| [illegible] | N | N | [illegible] | N | N | [illegible] | Y | 0 | N | |
| [illegible] | N | N | [illegible] | N | N | [illegible] | [illegible] | 0 | N | |
| - | N | N | N | N | [illegible] | [illegible] | [illegible] | 0 | N | |
| [illegible] | N | N | N | N | [illegible] | N | [illegible] | 0 | N | |
| [illegible] | N | N | N | N | [illegible] | [illegible] | [illegible] | 0 | N | |
| [illegible] | N | N | [illegible] | [illegible] | N | [illegible] | Y | 0 | [illegible] | |
| [illegible] | N | N | [illegible] | N | N | [illegible] | Y | 0 | [illegible] | |
| - | N | N | N | N | Y | [illegible] | [illegible] | 0 | N | |
| [illegible] | N | N | N | N | [illegible] | [illegible] | [illegible] | 0 | [illegible] | |
| [illegible] | N | N | N | N | [illegible] | Y | N | 0 | N | |
| [illegible] | N | Y | N | [illegible] | [illegible] | [illegible] | [illegible] | 0 | [illegible] | |
| [illegible] | N | Y | N | [illegible] | N | [illegible] | [illegible] | 0 | [illegible] | |
| [illegible] | N | N | N | N | [illegible] | [illegible] | [illegible] | 0 | N | |
| [illegible] | N | N | [illegible] | N | N | [illegible] | [illegible] | 0 | [illegible] | |
| [illegible] | N | N | N | N | [illegible] | [illegible] | [illegible] | 0 | N | |
| [illegible] | N | N | N | N | [illegible] | [illegible] | [illegible] | 0 | N | |
| . | N | N | N | N | Y | [illegible] | [illegible] | 0 | N | |
| A | N | Y | N | Y | N | Y | Y | 10 | Y | |
| B | N | Y | N | Y | N | Y | Y | 11 | Y | |
| C | N | Y | N | Y | N | Y | Y | 12 | Y | |
| D | N | Y | N | Y | N | Y | Y | 13 | Y | |
| E | N | Y | N | Y | N | Y | Y | 14 | Y | |
| F | N | Y | N | Y | N | Y | Y | 15 | Y | |
| G | N | Y | N | Y | N | Y | Y | 16 | Y | |
| H | N | Y | N | Y | N | Y | Y | 17 | Y | |
| I | N | Y | N | Y | N | Y | Y | 18 | Y | |
| [illegible] | N | N | N | N | Y | Y | Y | 0 | N | |
| [illegible] | N | Y | N | Y | N | Y | Y | 19 | Y | |
| [illegible] | N | Y | N | Y | N | Y | Y | 20 | Y | |
| [illegible] | N | Y | N | Y | N | Y | Y | 21 | Y | |
| M | N | Y | N | Y | N | Y | Y | 22 | Y | |
| N | N | Y | N | Y | N | Y | Y | 23 | Y | |
| O | N | Y | N | Y | N | Y | Y | 24 | Y | |
| P | N | Y | N | Y | N | Y | Y | 25 | Y | |
| Q | N | Y | N | Y | N | Y | Y | 26 | Y | |
| R | N | Y | N | Y | N | Y | Y | 27 | Y | |
| [illegible] | N | N | N | N | Y | Y | Y | 0 | N | |
| S | N | Y | N | Y | N | Y | Y | 28 | Y | |
| T | N | Y | N | Y | N | Y | Y | 29 | Y | |
| U | N | Y | N | Y | N | Y | Y | 30 | Y | |
| V | N | Y | N | Y | N | Y | Y | 31 | Y | |
| W | N | Y | N | Y | N | Y | Y | 32 | Y | |

PAGE 2

PRINTING TABLE(S) CHAR_MAP2

| CHAR | NUMERIC | ST_VARS | OPERS | CONT_VARS | SPECIAL | LEAD_BLANK | FOLLOW_BLANK | SCREEN_CONVERT | SEQ_CHAR | DESCRIPTION |
|---|---|---|---|---|---|---|---|---|---|---|
| X | N | Y | N | Y | N | Y | Y | 33 | Y | |
| Y | N | Y | N | Y | N | Y | Y | 34 | Y | |
| Z | N | Y | N | Y | N | Y | Y | 35 | Y | |
| 0 | Y | N | N | Y | N | Y | Y | 0 | N | |
| [illegible] | Y | N | N | Y | N | Y | Y | [illegible] | Y | |
| 2 | Y | N | N | Y | N | Y | Y | 2 | Y | |
| 3 | Y | N | N | Y | N | Y | Y | 3 | Y | |
| 4 | Y | N | N | Y | N | Y | Y | 4 | Y | |
| 5 | Y | N | N | Y | N | Y | Y | 5 | Y | |
| 6 | Y | N | N | Y | N | Y | Y | 6 | Y | |
| 7 | Y | N | N | Y | N | Y | Y | 7 | Y | |
| 8 | Y | N | N | Y | N | Y | Y | 8 | Y | |
| 9 | Y | N | N | Y | N | Y | Y | 9 | Y | |

PRINTING TABLE(S) DET_TAM_OPCODE

PAGE 1

| OPCODE | SYMBOL |
|---|---|
| A | FORALL |
| C | COMMIT |
| D | DELETE |
| G | GET |
| I | INSERT |
| O | ROLLBACK |
| P | REPLACE |
| S | DISPLAY |
| U | DISPLAY |

PRINTING TABLE(S) ESCONSTANTS

PAGE 1

| NOT_LEXED | NO_STMNT |
|---|---|
| -1 | -1 |

PAGE 1

PRINTING TABLE(S) ESDEFAULTS

| PROMPT_ROW | PROMPT_COL | PROMPT | FIRST_RULE_ROW | HOR_SEP_CHAR | HOR_JOIN_CHAR | VERT_SEP_CHAR |
|---|---|---|---|---|---|---|
| 1 | 5 | RULE EDITOR <<<> | 2 | - | + | : |
| 7 | 7 | RULE EDITOR <<<> | 8 | - | + | : |

PAGE 1

PRINTING TABLE(S) FLOREF_FSA

| INDEX | STATE | INPUT | NEW_STATE |
|---|---|---|---|
| 1 | LEFT | ID | DOT |
| 2 | LEFT | ( | LEFT( |
| 3 | LEFT | * | STAR |
| 4 | LEFT( | ID | LEFT(ID |
| 5 | LEFT(ID | ! | DOT |
| 6 | LEFT(ID | | LEFT(ID |
| 7 | LEFT:ID | ID | LEFT(ID |
| 8 | DOT | | RIGHT |
| 9 | RIGHT | ID | EXIT |
| 10 | RIGHT | : | RIGHT( |
| 11 | RIGHT | * | EXIT |
| 12 | RIGHT( | ID | RIGHT(ID |
| 13 | RIGHT(ID | ; | EXIT |
| 14 | RIGHT(ID | | RIGHT(ID |
| 15 | RIGHT(ID | ID | RIGHT(ID |
| 16 | STAR | | STAR |
| 17 | STAR | ID | EXIT |
| 18 | STAR | ( | RIGHT( |

PRINTING TABLE(S) MESSAGES(EDITRULE) PAGE 1

| MESSAGE_NUM | MESSAGE | HIGHLIGHT |
|---|---|---|
| 1 | "%" NOT FOUND. | |
| 2 | NO TARGET SPECIFIED FOR % COMMAND. | |
| 3 | NO CHANGES NECESSARY. | |
| 4 | % CHANGE(S) MADE | |
| 5 | *** INTERNAL EDITOR ERROR DETECTED *** <PF2> FOR MORE | |
| 6 | PROMOTION RIGHTS NOT OBTAINED%. | |
| 7 | RULE % %. | |
| 8 | FUNCTION KEY NOT SUPPORTED | |
| 9 | SEPARATOR LINES MAY NOT BE EDITED | |
| 10 | CANNOT ADD ANY MORE CONDITIONS | |
| 11 | "%" IS AN INVALID %. | |
| 12 | SCROLL STOPPED AT % | |
| 13 | RULE % STATEMENT(S) | |
| 14 | "%" EXCEEDS MAXIMUM RULE NAME LENGTH OF % CHARS | Y |
| 15 | NO RULE TO %. | |
| 16 | WARNING ABOUT TO % RULE % (%) TO CONFIRM | |
| 17 | CHANGES TO RULE % CANCELLED | |
| 18 | THE "%" STATEMENT IS NO LONGER SUPPORTED | |
| 19 | UNABLE TO % RULES IN %. | |
| 20 | CANNOT DELETE RULE % (ORIGINAL NAME HAS BEEN CHANGED) | |
| 21 | PROMOTION RIGHTS RELEASED%. | |
| 22 | WARNING % IS THE NAME OF A SYSTEM BUILT-IN ROUTINE | |
| 23 | UNABLE TO EDIT RULE "%" . | |
| 24 | UNABLE TO EXPAND "%" | |
| 25 | PLACE CURSOR ON OBJECT TO BE EXPANDED | |
| 100 | "%" ENCOUNTERED WHEN EXPECTING "%" | Y |
| 101 | "%" IS AN UNRECOGNIZED STATEMENT | Y |
| 102 | TABLE * EXPECTED ON BOTH SIDES OF AN ASSIGN BY NAME STATEMENT | Y |
| 103 | "%" IS AN INVALID % NAME | Y |
| 104 | TOO % "END" STATEMENTS | Y |
| 105 | ONLY ONE STATEMENT PER LINE IS ALLOWED | Y |
| 106 | "%" ENCOUNTERED WHEN EXPECTING A RELATIONAL OPERATOR | Y |
| 107 | "%" ENCOUNTERED WHEN EXPECTING A CONSTANT, IDENTIFIER OR "(" | Y |
| 108 | A "%" STATEMENT IS NOT PERMITTED WITHIN A "FORALL" LOOP | Y |
| 109 | UNEXPECTED END OF STATEMENT ENCOUNTERED AT "%" | Y |
| 110 | INDIRECT % NAME NOT ALLOWED IN %. | Y |
| 111 | TABLE NAME MAY ONLY BE GIVEN FOR TABLE ACCESS EXCEPTIONS | Y |
| 112 | "%" IS ALREADY DEFINED IN THIS RULE | Y |
| 113 | "%" ENCOUNTERED WHEN EXPECTING A FIELD NAME OR "(" | Y |
| 114 | "%" ENCOUNTERED WHEN EXPECTING A FIELD REFERENCE | Y |
| 115 | SEQUENCE NUMBER "%" IS WITHIN A "FORALL" OR "UNTIL" LOOP | Y |
| 116 | SEQUENCE NUMBER "%" IS NOT ON THE FIRST LINE OF THE STATEMENT | Y |
| 117 | NO ACTIONS "%" CANNOT BE SAVED | Y |
| 118 | "%" TOO LARGE TO SAVE | Y |
| 119 | NESTING OF "FORALL" AND/OR "UNTIL" STATEMENTS IS TOO DEEP | Y |
| 120 | % CLAUSE IS TOO LONG TO SAVE | Y |
| 121 | % "%" MAY NOT BE %. | Y |
| 122 | "%" IS AN INVALID NUMBER | Y |
| 123 | "%" ENCOUNTERED WHEN EXPECTING AN IDENTIFIER | Y |
| 124 | UNABLE TO % RULE "%" % | Y |
| 200 | "%" EXCEEDS MAXIMUM IDENTIFIER LENGTH OF % CHARS | Y |
| 202 | "%" IS AN IMPROPERLY QUOTED STRING | Y |
| 203 | AN IDENTIFIER MAY NOT BEGIN WITH "%". | Y |
| 204 | TOKEN TOO LONG TO BE STORED INTERNALLY | Y |
| 300 | % IS ALREADY IN THE "%" TABLE. | |

PRINTING TABLE(S) MESSAGES(EDITRULE) PAGE 2

| MESSAGE_NUM | MESSAGE | HIGHLIGHT |
|---|---|---|
| 301 | TAM SELECTION STRING NOT FOUND IN THE CONSTANTS TABLE | |
| 302 | ATTEMPTING TO GENERATE CODE FOR THE "%" INSTRUCTION | |
| 303 | % IS AN INVALID ROW IN FIND_REGION | |
| 304 | NO TOKENS IN TOKEN(%) | |
| 305 | INVALID TYPE "%" ENCOUNTERED IN % TABLE | |
| 306 | TRYING TO % NON-EXISTANT ROW % IN ESMAP | |
| 307 | "%" IS AN UNRECOGNIZED CHARACTER | |
| 304 | NO @RULESDOCUMENT ENTRY EXISTS FOR THE RULE | |
| 308 | INVALID OBJECT CODE IN DETRANSLATOR RULE "%" AT OFFSET % | |
| 310 | PRINT FAILED % | |
| 311 | TOO MANY POPS OF % STACK | |

PRINTING TABLE(S) SYSOPCODES PAGE 1

| OPCODE | NAME | SYMBOL | DET_TYPE | LEN | TOKEN_TYPE | FUNCTION | OPERAND | PRECEDENCE | XRF_SUB | FINAL_OP |
|---|---|---|---|---|---|---|---|---|---|---|
| 4 | ADD | + | I | 1 | O | OP2 | 0 | 3 | | N |
| 8 | SUB | - | I | 1 | O | OP2 | 0 | 3 | | N |
| 12 | MULT | * | I | 1 | O | OP2 | 0 | 5 | | N |
| 16 | DIV | / | I | 1 | O | OP2 | 0 | 5 | | N |
| 20 | EXP | ** | I | 1 | O | OP2 | 0 | 6 | | N |
| 24 | UNM | - | I | 1 | O | OP1PREF | 0 | 4 | | N |
| 28 | CAT | \|\| | I | 1 | O | OP2 | 0 | 3 | | N |
| 32 | EQ | = | I | 1 | O | OP2 | 0 | 2 | | N |
| 36 | NE | ¬= | I | 1 | O | OP2 | 0 | 2 | | N |
| 40 | LT | < | I | 1 | O | OP2 | 0 | 2 | | N |
| 44 | LE | <= | I | 1 | O | OP2 | 0 | 2 | | N |
| 48 | GT | > | I | 1 | O | OP2 | 0 | 2 | | N |
| 52 | GE | >= | I | 1 | O | OP2 | 0 | 2 | | N |
| 56 | CALL | CALL | | 5 | P | PCALL | 1 | 0 | XRF_CALL | |
| 60 | FN | FUNCTION | | 5 | | PFUNC | 1 | 0 | XRF_FUNCTION | N |
| 64 | RETURN | RETURN | | 1 | R | DETRET | 0 | 0 | | |
| 72 | UNTIL | | | 5 | S | DETUNTIL | 0 | 0 | | |
| 76 | PARM | PARM | P | 2 | | PUSHONE | | 0 | | N |
| 80 | CONST | CONST | C | 2 | | PUSHONE | | 0 | | N |
| 84 | TEMP | TEMP | | 1 | | NOOP | 0 | 0 | | N |
| 88 | RFIELD | FIELD | F | 2 | | PUSHONE | 1 | 0 | XRF_TABLE | N |
| 92 | WFIELD | FIELD | F | 2 | | PUSHONE | 1 | 0 | XRF_TABLE | N |
| 96 | AEND | AEND | | 1 | | ENDCODE | 0 | 0 | XRF_AEND | N |
| 100 | SET | := | I | 1 | O | ASSIGIN | 2 | 0 | | Y |
| 104 | ABN | := | I | 1 | O | ASSIGBN | 2 | 0 | | Y |
| 108 | SCHED | SCHEDULE | | 5 | R | OP1SCHED | 2 | 0 | | Y |
| 112 | DROP | DROP | | 2 | | NOOP | 1 | 0 | | N |
| 116 | NEXT | END | | 2 | R | OPC | 1 | 0 | | Y |
| 120 | BRC | | I | 3 | S | APPENDCL | 1 | 0 | | Y |
| 124 | FOR | FOR | | 1 | R | NOOP | 0 | 0 | | Y |
| 128 | TAM | TAM | | 3 | | TAMCALL | 1 | 0 | XREF_TAM | Y |
| 132 | TAMP | TAMP | | 3 | | TAMP | 1 | 0 | | N |
| 136 | TAMN | TAMN | | 2 | | TAMP | 1 | 0 | | N |
| 140 | SIGNAL | SIGNAL | | 1 | R | OP1SIG | 0 | 0 | XRF_PROC_SIGNAL | Y |
| 144 | ACALL | ACALL | | 2 | | ACTCALL | 1 | 0 | | N |
| 152 | ARETURN | ARETURN | | 1 | | ENDACT | 0 | 0 | | N |
| 156 | EXEC | EXECUTE | | 5 | R | PCALL | 1 | 0 | XRF_CALL | Y |
| 164 | SETL | := | I | 3 | O | ASSIGLOC | 1 | 0 | XRF_SETLOCAL | Y |
| 168 | WARE | WHERE | I | 5 | R | WCALL | 2 | 0 | | N |
| 172 | NOT | ¬ | | 1 | O | OP1PREF | 0 | 1 | | N |
| 184 | XCALL | TRANSFERCALL | | 5 | R | PCALL | 2 | 0 | XRF_CALL | |
| 188 | LIKE | LIKE | I | 1 | R | OP2 | 0 | 2 | | N |
| 192 | AND | & | | 0 | O | | 0 | 1 | | |
| 196 | OR | \| | | 0 | O | | 0 | 1 | | |

PRINT TREE LISTING

PRINTING ALL DESCENDENT RULES OF A BASE RULE

THE BASE RULE FOR THIS PRINT TREE IS

TRANSLATE

PRINTED BY BATCH ON September 01 1989

Y/N ***** SECTION OPTIONS ******

- Y PRINT BASE & DESCENDENT RULES
- Y RULE CROSS REFERENCE
- Y LOCAL DECLARATION
- Y LOCAL CROSS REFERENCE
- Y SIGNAL CROSS REFERENCE
- Y EXCEPTION HANDLER
- Y SCREEN DEFINITIONS
- Y SCREEN CROSS REFERENCE
- Y TABLE DEFINITION
- Y TABLE CROSS REFERENCE
- Y PRINT ENTRY & VALIDATION RULES
- Y VALIDATION RULE CROSS REFERENCE
- Y LIST OF UNRESOLVED NAMES
- Y LIST ENTRY & VALIDATION RULES
- Y RULE CALLING STRUCTURE

PAGE 1

SAVED ON Feb 22, 1989 BY NLL10

```
TRANSLATE.
LOCAL CURR_SEC, CURR_LEN, CURR_TYPE, CURR_TOKEN, CONST_INDEX,
  TABREF_INDEX, CURR_ISTBLREF, GLOBAL_INDEX, CURR_COMPONENT,
  CURR_STMNT_NUM, INSTRUCTION_PTR, LOOP_NUM, EXCEPT_NUM, DATA_AREA,
  TARGETRULE;

------------------------------------------------------------------
| SUMMARY : Translate a rule from source to object code.          |
| KEYWORDS: TRANSLATE, PARSE, GENERATE, CODE                      |
| UNIT    : TRAN                                 LIBRARY: COMMON  |
------------------------------------------------------------------

                                                      |
------------------------------------------------------+-----------

CALL INIT_TRANSLATOR;                                 | 1

CALL HEADER;                                          | 2
```

```
CALL CONDITIONS;
CALL ACTIONS.
CALL EXCEPTIONS.
CALL FINI_TRANSLATOR:
------------------------------------------------------------------
PAGE 7
                                       SAVED ON  NOV 4  1988 BY MCROO

ACTION.
LOCAL NUM_TAM_ARGS.

------------------------------------------------------------------
: SUMMARY:  Parse and gen code for a stmnt which begins with a keyword  :
  KEYWORDS: PARSE, GENERATE, CODE, ACTION
                                                  LIBRARY: COMMON :
! UNIT      TRAN
------------------------------------------------------------------

------------------------------------------------------------------

GET BNF(CURR_TOKEN.
CALL POP_RESTRICT(CURR_TOKEN).
FORALL BNF(CURR_TOKEN)
   CALL BNF.RULE_NAME.
   END.
------------------------------------------------------------------
ON GETFAIL BNF
   CALL EDIT_MESSAGE(101, CURR_TOKEN).
ON STMNT_END
   CALL EDIT_MESSAGE(109, CURR_TOKEN).
PAGE 3
                                       SAVED ON  APR 15, 1988 BY MCROO

ACTIONS.

------------------------------------------------------------------
| SUMMARY:   INITIATE THE TRANSLATION OF ALL ACTIONS IN A RULE     |
| KEYWORDS.  TRANSLATE, PARSE, GENERATE, CODE, INITIALIZE
                                                  LIBRARY  COMMON |
| UNIT       TRAN
------------------------------------------------------------------

------------------------------------------------------------------

CURR_COMPONENT = 'ACTION'
HEADER.ACTION_OFF = INSTRUCTION_PTR.
CURR_STMNT_NUM = 0.
CALL NEXT_STATEMENT.
CALL DO_ACTIONS.
CALL CHECK_ENDS.
CALL GEN_CODE('AEND', 0, 0).
------------------------------------------------------------------
ON ACTIONS_END
   SIGNAL NO_ACTIONS.
PAGE 4
                                       SAVED ON  APR 15. 1988 BY MCROO

ADD_ATTR(POS, P, I, N).

------------------------------------------------------------------
| SUMMARY   PUT A NEW ENTRY INTO THE ESATTRIBUTES TABLE           :
| KEYWORDS
                                                  LIBRARY  COMMON :
: UNIT      TRAN
------------------------------------------------------------------

------------------------------------------------------------------

ESATTRIBUTES.POSITION = POS.
ESATTRIBUTES.PROTECTION = P.
ESATTRIBUTES.INTENSITY = I.
ESATTRIBUTES.NUMERIC = N;
INSERT ESATTRIBUTES;
------------------------------------------------------------------
ON INSERTFAIL :
   REPLACE ESATTRIBUTES;
PAGE 5
                                       SAVED ON: Jan 27, 1989 BY MCROO

ADD_FIELDREF(TNAME, FNAME);

------------------------------------------------------------------
| SUMMARY : Add a new table.field reference, if necessary.        |
| KEYWORDS:
```

```
| UNIT     TRAN                                        LIBRARY  COMMON |
--------------------------------------------------------------------------

TNAME = '';                                            | Y N N
FNAME = '';                                            |   Y N
--------------------------------------------------------------------------
RETURN(NEW_FENTRY(TNAME, FNAME));                      :   1
GET TABLE_REFS WHERE TABLE_NAME = TNAME & FIELD_NAME = :
  FNAME.                                               :
RETURN(TABLE_REFS INDEX);                              :       2
--------------------------------------------------------------------------
ON GETFAIL
   RETURN(NEW_FENTRY(TNAME, FNAME)
PAGE 6
                                        SAVED ON  Jan 27  1985 BY MGROO
ADD_FIELDREF(TNAME  FNAME).

--------------------------------------------------------------------------
| SUMMARY   Add a new table field reference if necessary                  |
| KEYWORDS
| UNIT      TRAN                                        LIBRARY  COMMON
--------------------------------------------------------------------------
```

DESCRIPTION

It is necessary to add a new table field reference to the TABLE_REFS table under two circumstances: the reference is indirect (either tname or fname is ''), or when this is the first direct reference (the GET fails). Otherwise it is sufficient to return the INDEX (key) field for the existing occurrence

```
PAGE 7
                                        SAVED ON  Nov 2, 1988 BY MGROO
ADD_RELOC(ADDR, TYPE, INDEX, OFFSET)

--------------------------------------------------------------------------
| SUMMARY   Insert an entry into the relocation table
| KEYWORDS  GENERATE, CODE, RELOCATION, CONSTANT
| UNIT      TRAN                                        LIBRARY  COMMON |
--------------------------------------------------------------------------

--------------------------------------------------------------------------
RELOCATION OCCUR_ADDR = ADDR,                          | 1
RELOCATION TYPE = TYPE.                                | 2
RELOCATION.TABLE_INDEX = INDEX.                        | 3
RELOCATION.OFFSET = OFFSET.                            | 4
INSERT RELOCATION.                                     | 5
--------------------------------------------------------------------------
ON INSERTFAIL
   CALL EDIT_MESSAGE(300, QUOTE('ADDRESS "' || ADDR || '"') ||
     'RELOCATION').
PAGE 8
                                        SAVED ON  Nov 2, 1988 BY MGROO
ADD_RELOC(ADDR, TYPE, INDEX, OFFSET).

--------------------------------------------------------------------------
| SUMMARY  : Insert an entry into the relocation table                   |
| KEYWORDS : GENERATE, CODE, RELOCATION, CONSTANT
| UNIT     : TRAN                                      LIBRARY: COMMON |
--------------------------------------------------------------------------
```

DESCRIPTION

The relocation table holds information about references to various data objects. These objects are: constants, global names (rules or local variables not defined in this rule), table.fields, and tam strings References to these data objects are made during the generation of the object code. Since the data is not allocated until all the code has been generated, dummy references are put into the code and entries are made in the relocation table. Once the data has been allocated, it is necessary to revisit all dummy references (in WRITE_RELOCATION) and resolve (or relocate) the references.

```
PAGE 9                                        SAVED ON  JUL 4  1988 BY MCROC

ADVANCE_TOKEN.

------------------------------------------------------------------------
| SUMMARY
| KEYWORDS                                          LIBRARY  COMMON
| UNIT       TRAN
------------------------------------------------------------------------

------------------------------------------------------------------------
GET TOKENS(PARM_VALUE) WHERE INDEX > TOKENS INDEX          |
CALL LOAD_BUFFER.                                          | Y
------------------------------------------------------------------------
ON GETFAIL
   SIGNAL STMNT_END
PAGE 10                                       SAVED ON  Mar 17  1988 BY MCROC

ASSIGN_BY_NAME(TOK  TYP).

------------------------------------------------------------------------
| SUMMARY    Parse and gen code for and assign by name statement
| KEYWORDS   PARSE, GENERATE, CODE, ASSIGN, NAME        LIBRARY  COMMON |
| UNIT       TRAN
------------------------------------------------------------------------

- EQ_TOKENS(TOK, TYP, '=', @TRANS_CONSTS OPERATOR).        | Y N

------------------------------------------------------------------------
CALL EDIT_MESSAGE(100, QUOTE(TOK) || ' '')                 |  1
CALL PARSE_NULLFLDREF(NEXT_TOKEN, CURR_TYPE).              |      1
------------------------------------------------------------------------
ON GENERIC_FIELD
   CALL IR_PUSH(0, IND_INSTR1  IND_REF1  IND_INSTR2, IND_REF2)
   CALL GEN_INDIRECTREF.
   CALL GEN_CODE('ASN      ', 0, 0).
   CALL IR_POP.
   CALL CHECK_EOS(CURR_TOKEN)
PAGE 11                                       SAVED ON  Mar 17  1988 BY MCROO

ASSIGN_BY_NAME(TOK, TYP).

------------------------------------------------------------------------
| SUMMARY    Parse and gen code for and assign by name statement
| KEYWORDS   PARSE, GENERATE, CODE, ASSIGN  NAME        LIBRARY  COMMON |
| UNIT       TRAN
------------------------------------------------------------------------
```

DESCRIPTION

An assign by name statement has the following syntax

```
<assign by name> ::=
     <table ref>.* = <table ref>.*
     <table ref>.* = NULL
```

ASSIGN_BY_NAME parses the equal sign and the right hand side of the assignment.

```
PAGE 12
                                              SAVED ON  NOV 4, 1988 BY MGROO

ASSIGNMENT,
LOCAL LOCALS_ADDR, LOCAL_NAME, IND_INSTR1, IND_REF1, IND_INSTR2, IND_REF2,

-----------------------------------------------------------------------------
| SUMMARY    Parse and generate code for an assignment statement            |
| KEYWORDS   PARSE, GENERATE, CODE  ASSIGNMENT                              |
| UNIT       TRAN                                   LIBRARY  COMMON         |
-----------------------------------------------------------------------------


CURR_ISTBLREF                                                    |

--------------------------------------------------------------------------------
CALL IR_PUSH(PARSE_FIELD_REF(CURR_TOKEN, CURR_TYPE
  IND_INSTR1, IND_REF1  IND_INSTR2  IND_REF2)
CALL RHS_ASSIGN(CURR_TOKEN  CURR_TYPE),
CALL GEN_INDIRECTREF
CALL GEN_CODE('WFIELD      C  O)
CALL ADD_RELOC(INSTRUCTION_PTR + 2
  @TRANS_CONSTS TABLEFIELD_REF  @INDIRECT_REFS.REFERENCE
  O)
CALL GEN_CODE('SET          2  O)
CALL IR_POP,
CALL CHECK_ASSIGNTARG(SYMTAB_LOOKUP(CURR_TOKEN),
GET SYMTAB WHERE IDENT : CURR_TOKEN & KIND = 'LOCAL
LOCALS_ADDR : SYMTAB REF
CALL RHS_ASSIGN(NEXT_TOKEN, CURR_TYPE)
CALL GEN_CODE('SETL        LOCALS_ADDR  O)
--------------------------------------------------------------------------------
ON GETFAIL
   LOCAL_NAME : CURR_TOKEN
   CALL RHS_ASSIGN(NEXT_TOKEN, CURR_TYPE),
   CALL GEN_CODE('SETL     ', C, O)
   CALL ADD_RELOC(INSTRUCTION_PTR + 2, @TRANS_CONSTS NAME_REF,



     SYMTAB_REFERENCE(LOCAL_NAME   O)
ON GENERIC_FIELD
PAGE 13
                                              SAVED ON  NOV 4, 1988 BY MGROO

ASSIGNMENT
LOCAL LOCALS_ADDR, LOCAL_NAME  IND_INSTR1, IND_REF1  IND_INSTR2  IND_REF2

-----------------------------------------------------------------------------
| SUMMARY    Parse and generate code for an assignment statement            |
| KEYWORDS   PARSE  GENERATE  CODE  ASSIGNMENT                              |
| UNIT       TRAN                                   LIBRARY  COMMON         |
-----------------------------------------------------------------------------

   CALL IR_PUSH(O, IND_INSTR1  IND_REF1, IND_INSTR2  IND_REF2)
   CALL GEN_INDIRECTREF
   CALL IR_POP
   CALL ASSIGN_BY_NAME(CURR_TOKEN  CURR_TYPE).
ON STMNT_END
   CALL EDIT_MESSAGE(109  CURR_TOKEN)
PAGE 14
                                              SAVED ON  NOV 4  1982 BY MGROO

ASSIGNMENT.
LOCAL LOCALS_ADDR, LOCAL_NAME  IND_INSTR1  IND_REF1  IND_INSTR2, IND_REF2.

-----------------------------------------------------------------------------
| SUMMARY    Parse and generate code for an assignment statement            |
| KEYWORDS   PARSE, GENERATE  CODE  ASSIGNMENT                              |
| UNIT       TRAN                                   LIBRARY  COMMON         |
-----------------------------------------------------------------------------
```

DESCRIPTION

The call to CHECK_ASSIGNTARG ensures that we don't perform an assignment to a parameter. If the check is ommitted, incorrect object code (non-retranslatable) can be produced

```
PAGE 15                                      SAVED ON  Jan 20, 1989 BY MGROO

BINARY(INTEGER

------------------------------------------------------------------------
| SUMMARY   Generate a binary constant for a literal number            |
| KEYWORDS  BINARY INTEGER                                             |
| UNIT      TRAN                                  LIBRARY  COMMON      |
------------------------------------------------------------------------

------------------------------------------------------------------------
@TRANS_CONSTS BINARY_NUMBER : INTEGER.                        | 1
SYNTAX : @TRANS_CONSTS.BINARY.                                | 2
TOKEN_TEXT : @TRANS_CONSTS BINARY_NUMBER                      | 3
LENGTH : RET_LEN(TOKEN_TEXT)                                  | 4
DECIMAL : 0                                                   | 5
------------------------------------------------------------------------

ON OVERFLOW
   CALL PACKED_DECIMAL(INTEGER (1 ' 0', 0).
ON CONVERSION
   CALL EDIT_MESSAGE(122. INTEGER).
PAGE 16                                      SAVED ON  Jan 20, 1989 BY MGROO

BINARY(INTEGER)

------------------------------------------------------------------------
| SUMMARY   Generate a binary constant for a literal number            |
| KEYWORDS  BINARY, INTEGER                                            |
| UNIT      TRAN                                  LIBRARY  COMMON      |
------------------------------------------------------------------------

                              DESCRIPTION

     The assignment to @TRANS_CONSTS BINARY_NUMBER is done to
     determine if the value can be represented as a binary
     number  If its too large (OVERFLOW) we attempt to
     represent it as a packed decimal  If it contains bad data
     (CONVERSION), it is an invalid number

PAGE 17                                      SAVED ON  Nov 4, 1988 BY MGROO

BYNAME_FIELD

------------------------------------------------------------------------
| SUMMARY   Handle the field portion of an assignment by name statement |
| KEYWORDS  FIELD ASSIGN, NAME                                         |
| UNIT      TRAN                                  LIBRARY  COMMON      |
------------------------------------------------------------------------

                                                              | Y N
TABLE_NAME : ''.                                              |
------------------------------------------------------------------------
IND_INSTR1 : 'CONST';                                         |   1
IND_REF1 : RET_CONST(TABLE_NAME, @TRANS_CONSTS.FIXED_CHAR,    |   2
  LENGTH(TABLE_NAME), 0).                                     |
SIGNAL GENERIC_FIELD;                                         | 1 3
------------------------------------------------------------------------
PAGE 18                                      SAVED ON: Jul 8, 1988 BY MGROO

CALC_OFFSET(INDICE);

------------------------------------------------------------------------
| SUMMARY :                                                            |
```

```
| KEYWORDS
| UNIT       TRAN                                              LIBRARY  COMMON |
................................................................................

                                                                 |
INDICE > HEADER.PARMS#.                                          | Y N
.................................................................................
                                                                 |
GET SYMTAB WHERE KIND = 'PARM' & INDEX = INDICE.                 |  1
SYMTAB REF > HEADER PARMS# - INDICE                              |  2
REPLACE SYMTAB                                                   |  3
CALL CALC_OFFSET(INDICE + 1).                                    |  4
.................................................................................
PAGE 19
                                              SAVED ON  Apr 15  1988 BY MGROO

CHECK_ASSIGNTARG(KIND).

.................................................................................
  SUMMARY   CHECK THAT WE ARE ASSIGNING TO A LOCAL OR "FREE" VARIABLE
  KEYWORDS  ASSIGNMENT  LOCAL  VARIABLE, GLOBAL
  UNIT      TRAN                                           LIBRARY  COMMON
.................................................................................

                                                                 |
KIND = 'LOCAL'.                                                  | Y N N
KIND = 'GLOBAL'                                                  |   Y N
.................................................................................
                                                                 |
CALL EDIT_MESSAGE(121  'PARAMETER '  || SYMTAB.IDENT ||          |     1
   ''' || 'ASSIGNED TO ' || '''':                                |
.................................................................................
PAGE 20
                                              SAVED ON  Nov 4, 1988 BY MGROO

CHECK_COLON.

.................................................................................
| SUMMARY   Match a colon -- otherwise a syntax error                          |
| KEYWORDS  PARSE, COLON
| UNIT      TRAN                                           LIBRARY  COMMON     |
.................................................................................

                                                                 |
EQ_TOKENS(CURR_TOKEN, CURR_TYPE, ':').                           | Y N



  @TRANS_CONSTS SPECIAL_CHAR!                                    | Y N
.................................................................................
                                                                 |
CALL EDIT_MESSAGE(100  CURR_TOKEN || ':').                       |   1
.................................................................................
PAGE 21
                                              SAVED ON  Apr 15, 1988 BY MGROO

CHECK_ENDS.

.................................................................................
| SUMMARY   CHECK FOR A MISSING END (TO A FORALL OR UNTIL STATEMENT)           |
| KEYWORDS  SYNTAX, END
| UNIT      TRAN                                           LIBRARY  COMMON     |
.................................................................................

                                                                 |
LS_EMPTY.                                                        | Y N
.................................................................................
                                                                 |
CALL EDIT_MESSAGE(104  'FEW')                                    |   1
.................................................................................
PAGE 22
                                              SAVED ON  Apr 15, 1988 BY MGROO

CHECK_ENDS

.................................................................................
| SUMMARY   CHECK FOR A MISSING END (TO A FORALL OR UNTIL STATEMENT)           |
| KEYWORDS  SYNTAX, END
| UNIT      TRAN                                           LIBRARY  COMMON
.................................................................................

                            DESCRIPTION
                            -----------

    AFTER PROCESSING ALL ACTIONS OR ALL EXCEPTIONS, THE LOOP STACK
    MUST BE EMPTY.  OTHERWISE THERE IS ONE OR MORE MISSING END(S).
PAGE 23
                                              SAVED ON: Nov 4, 1988 BY MGROO

CHECK_EOS(TOKEN);

.................................................................................
| SUMMARY : Match a semicolon -- otherwise a syntax error.                     |
| KEYWORDS: PARSE, SEMICOLON
| UNIT    : TRAN                                           LIBRARY: COMMON     |
.................................................................................
```

```
EQ_TOKENS(TOKEN, CURR_TYPE,';', @TRANS_CONSTS.SPECIAL_CHAR  | Y N
  ).                                                        | Y N
------------------------------------------------------------+--------------
CALL EDIT_MESSAGE(100, QUOTE(TOKEN) ||';').                 |   1
------------------------------------------------------------+--------------
PAGE 24
                                        SAVED ON  JUL 8, 1988 BY MGROO

CHECK_EXTRA_TOKS.

---------------------------------------------------------------------------
| SUMMARY   CHECK THAT A LOGICAL LINE DOES NOT CONTAIN >1 STATEMENT       |
| KEYWORDS  SYNTAX, LOGICAL, LINE, TOKEN                                  |
| UNIT      TRAN                                     LIBRARY  COMMON      |
---------------------------------------------------------------------------

                                                            |
------------------------------------------------------------+--------------
GET TOKENS(PARM_VALUE) WHERE INDEX > TOKENS.INDEX.          |
CALL EDIT_MESSAGE(105, '').                                 | 2
------------------------------------------------------------+--------------
ON GETFAIL

ON UNASSIGNED
PAGE 25
                                        SAVED ON  NOV 4, 1988 BY MGROO

CHECK_MORE_EXPR(TOKEN, TYP).

---------------------------------------------------------------------------
| SUMMARY   Parse and gen code for another term is this expression        |
| KEYWORDS  PARSE, GENERATE CODE, EXPRESSION                              |
| UNIT      TRAN                                     LIBRARY  COMMON      |
---------------------------------------------------------------------------

EQ_TOKENS(TOKEN, TYP, '+', @TRANS_CONSTS.OPERATOR);         | Y N N N
EQ_TOKENS(TOKEN, TYP, '-', @TRANS_CONSTS.OPERATOR).         |   Y N N
EQ_TOKENS(TOKEN, TYP, '||', @TRANS_CONSTS.OPERATOR).        |     Y N
------------------------------------------------------------+--------------
CALL EXPR_TERM(NEXT_TOKEN, CURR_TYPE);                      | 1 1 1


CALL GEN_CODE('ADD      ', 0, 0).                           | 2
CALL GEN_CODE('SUB      ', 0  0).                           |   2
CALL GEN_CODE('CAT      ', 0, 0).                           |     2
CALL CHECK_MORE_EXPR(CURR_TOKEN, CURR_TYPE).                | 3 3 3
------------------------------------------------------------+--------------
PAGE 26
                                        SAVED ON  NOV 4, 1988 BY MGROO

CHECK_MORE_TERM(TOKEN, TYP).

---------------------------------------------------------------------------
| SUMMARY   Parse and gen code for another factor in this expression.     |
| KEYWORDS  PARSE, GENERATE CODE, EXPRESSION                              |
| UNIT      TRAN                                     LIBRARY  COMMON      |
---------------------------------------------------------------------------

EQ_TOKENS(TOKEN, TYP, '*'  @TRANS_CONSTS.OPERATOR).         | Y N N
EQ_TOKENS(TOKEN, TYP, '/', @TRANS_CONSTS.OPERATOR).         |   Y N
------------------------------------------------------------+--------------
CALL EXPR_FACTOR(NEXT_TOKEN, CURR_TYPE).                    | 1 1
CALL GEN_CODE('MULT     ', 0, 0).                           | 2
CALL GEN_CODE('DIV      ', 0, 0).                           |   2
CALL CHECK_MORE_TERM(CURR_TOKEN, CURR_TYPE).                | 3 3
------------------------------------------------------------+--------------
PAGE 27
                                        SAVED ON, NOV 4, 1988 BY MGROO

CHECK_PARMS(TOKEN);

---------------------------------------------------------------------------
| SUMMARY : Parse the optional formal parameters in the rule header.      |
| KEYWORDS: RULE, FORMAL, PARAMETER                                       |
| UNIT    : TRAN                                     LIBRARY: COMMON      |
---------------------------------------------------------------------------

EQ_TOKENS(TOKEN, CURR_TYPE,'(', @TRANS_CONSTS.SPECIAL_CHAR  | Y N
  );                                                        | Y N
------------------------------------------------------------+--------------
CALL PARM_NAME(NEXT_TOKEN, CURR_TYPE);                      | 1
```

```
CALL CHECK_R_PAREN(CURR_TOKEN),                                   | 2
--------------------------------------------------------------------------
PAGE 28
                                         SAVED ON  NOV 4  1988 BY MGROO

CHECK_R_PAREN(TOKEN).

--------------------------------------------------------------------------
| SUMMARY   Match and consume a right bracket  otherwise a syntax error  |
  KEYWORDS  PARSE, RIGHT  PARENTHESIS
| UNIT      TRAN                                       LIBRARY  COMMON  |
--------------------------------------------------------------------------


EQ_TOKENS(TOKEN  CURR_TYPE  '''  @TRANS_CONSTS SPECIAL_CHAR           Y N
   :                                                                  N
--------------------------------------------------------------------------

CALL EDIT_MESSAGE(100, TOKEN ||'!')

CALL ADVANCE_TOKEN,

--------------------------------------------------------------------------
PAGE 29
                                         SAVED ON  NOV 4  1988 BY MGROO

CHK_MORE_FACTOR(TOKEN, TYP),

--------------------------------------------------------------------------
  SUMMARY   Parse and generate code for an expression                    |
| KEYWORDS  PARSE, GENERATE CODE, EXPRESSION
| UNIT      TRAN                                       LIBRARY  COMMON  |
--------------------------------------------------------------------------


EQ_TOKENS(TOKEN  TYP  '**'  @TRANS_CONSTS OPERATOR),                 Y N
--------------------------------------------------------------------------

CALL EXPR_ITEM(NEXT_TOKEN, CURR_TYPE),

CALL GEN_CODE('EXP', 0, 0),                                          : 2
--------------------------------------------------------------------------
PAGE 30
                                         SAVED ON  NOV 4  1988 BY MGROO

CHOOSE_REP(NUMBER, DEC),

--------------------------------------------------------------------------
| SUMMARY   Determine the representation of a numeric literal           |
| KEYWORDS



| UNIT      TRAN                                       LIBRARY  COMMON  |
--------------------------------------------------------------------------


DEC -= 0,                                                           Y N N N

MATCH(NUMBER, 'E') > 0,                                               Y N N

MATCH(NUMBER, '.') > 0,                                                 Y N
--------------------------------------------------------------------------

CALL FLOATING_POINT(NUMBER),                                           1

CALL PACKED_DECIMAL(NUMBER  DEC)                                    1   1

CALL BINARY(NUMBER),                                                      :
--------------------------------------------------------------------------
PAGE 31
                                         SAVED ON  APR 15  1988 BY MGROO

CLEAR_TTABLES.

--------------------------------------------------------------------------
| SUMMARY   CLEAR THE TRANSLATOR TEMPORARY TABLES FOR REUSE             |
| KEYWORDS  CLEANUP, TRANSLATOR, TABLE
| UNIT      TRAN                                       LIBRARY  COMMON  |
--------------------------------------------------------------------------


--------------------------------------------------------------------------
CALL DEL_TABLE('RELOCATION'),                                     : 1
CALL DEL_TABLE('CONSTANTS'),                                      : 2
CALL DEL_TABLE('EXCEPTIONS'),                                     : 3
CALL DEL_TABLE('TABLE_REFS');                                     | 4
CALL DEL_TABLE('SYMTAB'),                                         | 5
CALL DEL_TABLE('LOOP_STACK'),                                     | 6
--------------------------------------------------------------------------
PAGE 32
                                       SAVED ON: FEB 28, 1989 BY HLL10

CONDITION;
LOCAL SAVED_INSTP;

--------------------------------------------------------------------------
| SUMMARY : Initiate the translation of a single condition.             |
| KEYWORDS: PARSE, GENERATE, CODE, CONDITION
| UNIT    : TRAN                                      LIBRARY: COMMON   |
--------------------------------------------------------------------------
```

```
EQ_TOKENS(CURR_TOKEN, CURR_TYPE,'~',                        | Y N
  @TRANS_CONSTS.OPERATOR).                                  | Y N
------------------------------------------------------------+---------
CALL LOGICAL_VALUE(NEXT_TOKEN, CURR_TYPE).                  | 1
CALL LOOKAHEAD_EXPR(CURR_TOKEN  CURR_TYPE)                  |     1
CALL GEN_CODE('NOT        , 0, 0).                          | 2
CALL GEN_CODE('DROP      ', 1111, 0);                       | 3 2
SAVED_INSTP   INSTRUCTION_PTR + 2.                          | 4 3
NUM_CONDITIONS : NUM_CONDITIONS + 1                         | 5 4
CALL ISSUE_ACALLS(NUM_CONDITIONS)                           | 6 5
CALL GEN_CODE('RETURN   ', 0, 0).                           | 7 6
CALL GENERATERULE(SAVED_INSTP, GENBIN(INSTRUCTION_PTR, 2).  | 8 7
  2)                                                        |
----------------------------------------------------------------------
ON STMT_END
   CALL EDIT_MESSAGE(102, CURR_TOKEN).
PAGE 33
                                          SAVED ON  Feb 26, 1989 BY NLLIC

CONDITION.
LOCAL SAVED_INSTP.
----------------------------------------------------------------------
: SUMMARY    Initiate the translation of a single condition          :
| KEYWORDS   PARSE, GENERATE, CODE, CONDITION                        
: UNIT       TRAN                                   LIBRARY   COMMON  :
----------------------------------------------------------------------
```

DESCRIPTION

A condition has the following syntax:

```
<condition> ::=
     <logical value>
     <not> <logical value>
     <expression> <relational operator> <expression>
```

A logical value is simply a table field reference, a rule parameter or a local variable/functional rule reference

```
PAGE 34
                                          SAVED ON  Apr 15, 1988 BY MGROO

CONDITIONS.
LOCAL NUM_CONDITIONS.
----------------------------------------------------------------------
| SUMMARY    INITIATE THE TRANSLATION OF ALL CONDITIONS              :
| KEYWORDS   PARSE, GENERATE, CODE, CONDITION, TRANSLATE
| UNIT       TRAN                                   LIBRARY   COMMON  :
----------------------------------------------------------------------
                                                            |
------------------------------------------------------------+---------
CURR_COMPONENT : 'CONDITION'.                               | 1
CURR_STMNT_NUM : 0;                                         | 2
HEADER.RULES : INSTRUCTION_PTR.                             | 3
CALL PARSE_CONDITIONS.                                      | 4
CALL ISSUE_ACALLS(NUM_CONDITIONS + 1);                      | 5
CALL GEN_CODE('RETURN   ', 0, 0).                           | 6
CALL GEN_CODE('AEND     ', 0, 0);                           | 7
----------------------------------------------------------------------
PAGE 35
                                          SAVED ON: Nov 9, 1988 BY MGROO

CONSTANT(TYPE);

----------------------------------------------------------------------
| SUMMARY  : Is this token a literal constant?                       |
| KEYWORDS: LITERAL, CONSTANT                                         
| UNIT     : TRAN                                  LIBRARY: COMMON    |
----------------------------------------------------------------------
```

```
TYPE = @TRANS_CONSTS.NUMBER,                          | Y N N
TYPE = @TRANS_CONSTS.QUOTED_STRING.                   |   Y N
------------------------------------------------------+---------
RETURN('Y');                                          | 1
RETURN('N').                                          |     1
----------------------------------------------------------------
PAGE 36                              SAVED ON  JUL 8, 1988 BY MGROO

DEL_TABLE(TABLE_NAME)

----------------------------------------------------------------
| SUMMARY
| KEYWORDS
| UNIT     UTIL                              LIBRARY  COMMON
----------------------------------------------------------------

------------------------------------------------------+---------
FORALL TABLE_NAME                                     |
   DELETE TABLE_NAME.                                 |
   END                                                |
----------------------------------------------------------------
PAGE 37                              SAVED ON  JUL 20, 1988 BY MGROO

DO_ACTIONS.

----------------------------------------------------------------
| SUMMARY   INITIATE THE TRANSLATION OF ALL ACTIONS
| KEYWORDS  TRANSLATE  PARSE, GENERATE, CODE, STATEMENT
| UNIT      TRAN                             LIBRARY  COMMON
----------------------------------------------------------------

CURR_ISTBLREF                                         | Y N N
NAME(CURR_TYPE).                                      |   Y N
------------------------------------------------------+---------
CALL RESOLVE_ACALLS(CURR_STMNT_NUM).                  | 1 1 1
CALL ASSIGNMENT;                                      | 2 2
CALL ACTION;                                          |     2


CALL GEN_ARETURN                                      | 3 3 3
CALL NEXT_STATEMENT.                                  | 4 4 4
CALL DO_ACTIONS.                                      | 5 5 5
----------------------------------------------------------------
ON ACTIONS_END
PAGE 38                              SAVED ON  JUL 8, 1988 BY MGROO

EDIT_MESSAGE(NUM, TEXT).
LOCAL ERR_ROW, SAVE_INDEX.

----------------------------------------------------------------
| SUMMARY   GENERATE AN ERROR OR INFORMATIVE MESSAGE FOR THE RULE EDITOR
| KEYWORDS  ERROR  MESSAGE  INFORMATIVE, WARNING
| UNIT      EDR                              LIBRARY  COMMON
----------------------------------------------------------------

NUM >= 300,                                           | Y N N N
NUM >= 200,                                           |   Y N N
NUM >= 100,                                           |     Y N
------------------------------------------------------+---------
MSG = MESSAGE('EDITRULE'  NUM, TEXT)                  | 1 1 1 1
CALL MSGLOG(MSG).                                     | 2
CALL MSGLOG('**** INTERNAL ERROR CONTACT SYSTEM REP'). | 3
SIGNAL CATASTROPHE.                                   | 4
SAVE_INDEX = ESMAP.INDEX,                             |   2
GET ESMAP WHERE PARM_VALUE = PARM_VALUE;              |   3 2
ERR_ROW = ESMAP.ROW,                                  |   4 3
CALL HILITE_LINES(MESSAGES.HIGHLIGHT).                |     4
CALL HILITE_LINE;                                     |   5
GET ESMAP WHERE INDEX = SAVE_INDEX;                   |   6
CALL FOCUS_ON_TARGET(ERR_ROW, 0);                     |     5
SIGNAL TRANSLATOR_ERR;                                |     6
----------------------------------------------------------------
ON GETFAIL ESMAP :
   SIGNAL TRANSLATOR_ERR;
```

```
ON STRINGSIZE
PAGE 39                                          SAVED ON  Apr 15, 1986 BY MGROO

EQ_TOKENS(TOK1, TYPE1, TOK2, TYPE2).

-------------------------------------------------------------------------------
| SUMMARY
| KEYWORDS                                                    LIBRARY  COMMON |
| UNIT        TRAN
-------------------------------------------------------------------------------

                                                              | Y N N
TYPE1 ¬= TYPE2,                                               |
                                                              |   Y N
TOK1 ¬= TOK2;                                                 |
-------------------------------------------------------------------------------
                                                              | 1 1
RETURN('N'),                                                  |
                                                              |     1
RETURN('Y');                                                  |
-------------------------------------------------------------------------------
PAGE 40                                          SAVED ON  Nov 9, 1988 BY MGROC

EXCEPT_ACTIONS.

-------------------------------------------------------------------------------
| SUMMARY   Process the action portion of an exception handler               |
| KEYWORDS  PARSE, GENERATE, CODE, EXCEPTION  HANDLER         LIBRARY  COMMON |
| UNIT      TRAN
-------------------------------------------------------------------------------

                                                              | Y N N N
EQ_TOKENS(CURR_TOKEN, CURR_TYPE, 'ON'                         |
                                                              | Y N N N
  @TRANS_CONSTS RESERVED_WORD),                               |
                                                              |   Y N N
CURR_ISTBLREF                                                 |
                                                              |     Y N
NAME(CURR_TYPE),                                              |
-------------------------------------------------------------------------------
                                                              |   1 1
CALL ASSIGNMENT,                                              |
                                                              |       1
CALL ACTION,                                                  |
                                                              |   2 2 2
CALL NEXT_STATEMENT                                           |
                                                              |   3 3 3
CALL EXCEPT_ACTIONS,                                          |
-------------------------------------------------------------------------------
```

```
PAGE 41                                          SAVED ON  Apr 15, 1986 BY MGROC

EXCEPT_NAME.

-------------------------------------------------------------------------------
| SUMMARY   DEFINE AN EXCEPTION HANDLED BY THIS RULE
| KEYWORDS  EXCEPTION, HANDLER  DEFINITION, ON  STATEMENT     LIBRARY  COMMON |
| UNIT      TRAN
-------------------------------------------------------------------------------

                                                              | Y N N
¬ NAME(CURR_TYPE),                                            |
                                                              |   Y N
EXCEPT_NUM = 0,                                               |
-------------------------------------------------------------------------------
                                                              | 1
CALL EDIT_MESSAGE(103, CURR_TOKEN || ' EXCEPTION'),           |
                                                              |   1
CALL GEN_CODE('RETURN', 0, 0),                                |
                                                              |   2 1
EXCEPT_NUM = EXCEPT_NUM + 1,                                  |
                                                              |   3 2
EXCEPTIONS IDENT = CURR_TOKEN,                                |
                                                              |   4 3
EXCEPTIONS EX_NUM = EXCEPT_NUM,                               |
                                                              |   5 4
EXCEPTIONS OFFSET = INSTRUCTION_PTR                           |
                                                              |   6 5
EXCEPTIONS FORALLP = 0,                                       |
                                                              |   7 6
CALL ADVANCE_TOKEN,                                           |
                                                              |   8 7
CALL OPT_TABLE_NAME,                                          |
                                                              |   9 8
INSERT EXCEPTIONS,                                            |
                                                              |   A 9
CALL CHECK_COLON;                                             |
-------------------------------------------------------------------------------
PAGE 42                                          SAVED ON: Nov 9, 1988 BY MGROO

EXCEPT_ON;

-------------------------------------------------------------------------------
| SUMMARY : Parse and gen code for the ON part of an exception handler.       |
| KEYWORDS: PARSE, GENERATE, CODE, EXCEPTION, HANDLER        LIBRARY: COMMON |
| UNIT    : TRAN
-------------------------------------------------------------------------------

                                                              | Y N
EQ_TOKENS(CURR_TOKEN, CURR_TYPE, 'ON',                        |
                                                              | Y N
  @TRANS_CONSTS.RESERVED_WORD);                               |
```

```
--------------------------------------------------------------+------------
CALL ADVANCE_TOKEN;                                           | 1
CALL EXCEPT_NAME,                                             | 2
CALL NEXT_STATEMENT,                                          | 3
CALL EDIT_MESSAGE(100, CURR_TOKEN || ' ON'),                  :   1
---------------------------------------------------------------------------
PAGE 43
                                          SAVED ON  Apr 15  1986 BY MCROO

EXCEPTION

---------------------------------------------------------------------------
  SUMMARY    PARSE AND GEN CODE FOR ALL EXCEPTION HANDLERS
  KEYWORDS   PARSE, GENERATE  CODE, EXCEPTION, HANDLERS
  UNIT       TRAN                                       LIBRARY  COMMON
---------------------------------------------------------------------------

---------------------------------------------------------------------------
CALL EXCEPT_ON.
CALL EXCEPT_ACTIONS                                            :
CALL EXCEPTION                                                 :
---------------------------------------------------------------------------
ON STMNT_END
   CALL EDIT_MESSAGE(105, CURR_TOKEN)
PAGE 44
                                          SAVED ON  Apr 15  1986 BY MCROO

EXCEPTIONS.

---------------------------------------------------------------------------
  SUMMARY    PARSE AND GEN CODE FOR ALL EXCEPTION HANDLERS
: KEYWORDS   PARSE, GENERATE, CODE, EXCEPTION
: UNIT       TRAN                                       LIBRARY  COMMON
---------------------------------------------------------------------------

--------------------------------------------------------------+------------
CURR_COMPONENT = 'EXCEPTION';                                 | 1
CURR_STMNT_NUM = 0,                                           | 2
CALL NEXT_STATEMENT,                                          | 3



CALL EXCEPTION.                                               : 4
CALL CHECK_ENDS                                               : 5
CALL GEN_CODE('RETURN'  0, 0).                                : 6
---------------------------------------------------------------------------
ON ACTIONS_END
   CALL CHECK_ENDS,
   CALL GEN_CODE('RETURN'  0  0).
PAGE 45
                                          SAVED ON  Apr 15  1986 BY MCROO

EXPR_FACTOR(TOKEN, TYP),

---------------------------------------------------------------------------
| SUMMARY
| KEYWORDS
| UNIT       TRAN                                       LIBRARY  COMMON |
---------------------------------------------------------------------------

--------------------------------------------------------------+------------
CALL EXPR_ITEM(TOKEN, TYP),                                   : 1
CALL CHK_MORE_FACTOR(CURR_TOKEN, CURR_TYPE)                   : 2
---------------------------------------------------------------------------
PAGE 46
                                          SAVED ON  May 26, 1988 BY MCROO

EXPR_ITEM(TOKEN, TYP).
LOCAL IND_INSTR1, IND_REF1, IND_INSTR2, IND_REF2,
---------------------------------------------------------------------------
| SUMMARY    Parse and generate code for an item in an expression        |
| KEYWORDS:  PARSE, GENERATE, CODE, EXPRESSION          LIBRARY. COMMON  |
| UNIT     : TRAN                                                        |
---------------------------------------------------------------------------

                                                              | Y N N N N
CURR_ISTBLREF;                                                |   Y N N N
CONSTANT(TYP);                                                |     Y N N
EQ_TOKENS(TOKEN, TYP, '(', @TRANS_CONSTS.SPECIAL_CHAR);       |       Y N
NAME(TYP);                                                    |
--------------------------------------------------------------+------------
CALL IR_PUSH(PARSE_FIELD_REF(TOKEN, CURR_TYPE),              .| 1
```

```
  IND_INSTR1, IND_REF1, IND_INSTR2, IND_REF2).
CALL GEN_INDIRECTREF;                                          | 2
CALL GEN_CODE('RFIELD   ', 0, 0).                              | 3
CALL ADD_RELOC(INSTRUCTION_PTR - 2,                            | 4
  @TRANS_CONSTS.TABLEFIELD_REF, @INDIRECT_REFS.REFERENCE,      |
  0).
CALL IP_POP                                                        5
CALL GEN_CODE('CONST    ', 0, 0).                                    :
CALL ADD_RELOC(INSTRUCTION_PTR - 2                                   :
  @TRANS_CONSTS.CONSTANT_REF  RET_CONST(TOKEN  TYP,
  CURR_LEN, CURR_DEC), 0);
CALL ADVANCE_TOKEN                                                   3
CALL PARSE_EXPR(NEXT_TOKEN, CURR_TYPE                                  1
CALL CHECK_R_PAREN(CURR_TOKEN).                                        2
CALL RESOLVE_NAME(TOKEN)                                                 1
CALL EDIT_MESSAGE(107, TOKEN).
------------------------------------------------------------------------------
ON GENERIC_FIELD
   CALL EDIT_MESSAGE(102, '').
PAGE 47
                                             SAVED ON  May 24, 1985 BY MGROO

EXPR_ITEM(TOKEN, TYP);
LOCAL IND_INSTR1, IND_REF1, IND_INSTR2  IND_REF2.
------------------------------------------------------------------------------
| SUMMARY    Parse and generate code for an item in an expression          |
| KEYWORDS   PARSE, GENERATE, CODE, EXPRESSION                             |
| UNIT       TRAN                                         LIBRARY  COMMON  |
------------------------------------------------------------------------------

                              DESCRIPTION

   <Expr> ::=  <UnaryOp> <ExprTerm> [ <AddOp> <ExprTerm> ]
                         <ExprTerm> [ <AddOp> <ExprTerm> ]

   <ExprTerm>  ::= <ExprFactor> { <MultOp> <ExprFactor> }


   <ExprFactor>    : <ExprItem> <ExpOp> <ExprPrimary>
                     <ExprItem>

   <ExprItem>     : ( <Expr> )
                    <FieldOfATable>
                    <RuleParameterName>
                    <LocalName>
                    <FunctionCall>
                     <Constant>
PAGE 48
                                             SAVED ON  Apr 15, 1988 BY MGROO

EXPR_TERM(TOKEN, TYP).
------------------------------------------------------------------------------
| SUMMARY                                                                    |
| KEYWORDS                                                                   |
| UNIT       TRAN                                         LIBRARY  COMMON   |
------------------------------------------------------------------------------

------------------------------------------------------------------------------
CALL EXPR_FACTOR(TOKEN, TYP).                                        | 1
CALL CHECK_MORE_TERM(CURR_TOKEN, CURR_TYPE).                         | 2
------------------------------------------------------------------------------
PAGE 49
                                             SAVED ON  Nov 9, 1988 BY MGROO

FIELD_PART(TOKEN  TTYPE).
------------------------------------------------------------------------------
| SUMMARY    Parse and gen code for the field part of a table field ref     |
| KEYWORDS   PARSE, GENERATE CODE, FIELD REFERENCE                          |
| UNIT       TRAN                                         LIBRARY  COMMON   |
------------------------------------------------------------------------------

EQ_TOKENS(TOKEN, TTYPE, '<', @TRANS_CONSTS.OPERATOR);           | Y N N N
EQ_TOKENS(TOKEN, TTYPE,'(', @TRANS_CONSTS.SPECIAL_CHAR);        |   Y N N
TABLE_NAME = '';                                                |     Y N
------------------------------------------------------------------------------
CALL ADVANCE_TOKEN;                                             | 1   1 1
CALL BYNAME_FIELD;                                              | 2
CALL INDIRECT_PREF(NEXT_TOKEN, CURR_TYPE);                      |   1
FIELD_NAME = TOKEN;                                             |     2 2
```

```
IND_INSTR2 : 'CONST',                                                   3

IND_REF2 : GET_CONST(FIELD_NAME, @TRANS_CONSTS FIXED_CHAR,               4

  LENGTH(FIELD_NAME), 0),
-----------------------------------------------------------------------------
PAGE 50
                                          SAVED ON  Nov 9, 1988 BY MCROO

FIELD_PART(TOKEN  TTYPE;

-----------------------------------------------------------------------------
| SUMMARY   Parse and gen code for the field part of a table.field ref
| KEYWORDS  PARSE, GENERATE CODE  FIELD REFERENCE
| UNIT      TRAN                                         LIBRARY  COMMON
-----------------------------------------------------------------------------

                              DESCRIPTION
                              ___________

        The field part may be

        1   a * (for assign by name

        2   an indirect reference

        3   a direct reference

        In the case of a direct field name, if the table name is
        direct then an entry is generated in the T F name list
        Otherwise (the table name is indirect) in which case we
        must cause a constant, which is the name of the field, to
        be pushed on the stack


PAGE 51
                                          SAVED ON  Jul 8  1986 BY MCROO

FIND_ROW(STATEMENT),
LOCAL SAVE_ROW,

-----------------------------------------------------------------------------
| SUMMARY                                                                   |
| KEYWORDS                                                                  |
| UNIT      TRAN                                         LIBRARY  COMMON    |
-----------------------------------------------------------------------------


-----------------------------------------------------------------------------

FORALL ESMAP WHERE STMNT# : STATEMENT & TABLE : 'ACTION'                1

     ORDERED DESCENDING ROW

   SAVE_ROW : ESMAP ROW

   END,

RETURN(SAVE_ROW),                                                       2
-----------------------------------------------------------------------------
PAGE 52
                                          SAVED ON  May 11  1988 BY MCROO

FINI_TRANSLATOR,

-----------------------------------------------------------------------------
| SUMMARY   WRITE THE VARIOUS LISTS OUT ONCE THE TRANSLATION IS COMPLETE   |
| KEYWORDS  GENERATE CODE                                                   |
| UNIT      TRAN                                         LIBRARY  COMMON    |
-----------------------------------------------------------------------------

-----------------------------------------------------------------------------

CALL WRITE_EXCEPTIONS,                                                  1

CALL WRITE_GLOBALS                                                      2

CALL WRITE_FIELDREFS,                                                   3

CALL WRITE_CONSTANTS,                                                   4

CALL WRITE_RELOCATION,                                                  5

CALL WRITE_HEADER;                                                      6
-----------------------------------------------------------------------------
PAGE 53
                                          SAVED ON: Nov 9, 1988 BY MCROO

FLOATING_POINT(REAL);

-----------------------------------------------------------------------------
| SUMMARY : Generate a floating point representation of a number.           |
| KEYWORDS: FLOATING, POINT, REAL, LEXICAL, ANALYSIS                         |
| UNIT    : EDR                                          LIBRARY: COMMON    |
-----------------------------------------------------------------------------

-----------------------------------------------------------------------------
```

```
@TRANS_CONSTS.FLOAT_NUMBER : REAL;                        | 1
SYNTAX : @TRANS_CONSTS.FLOATING_POINT;                    | 2
TOKEN_TEXT : @TRANS_CONSTS.FLOAT_NUMBER,                  | 3
DECIMAL : 0,                                              | 4
LENGTH : @TRANS_CONSTS.FLOAT_LENGTH;                      | 5
------------------------------------------------------------------------
ON CONVERSION
   CALL EDIT_MESSAGE(122  REAL);
ON OVERFLOW
   CALL EDIT_MESSAGE(122  REAL);
PAGE 54
                                          SAVED ON: Nov 9, 1988 BY MGROO

FLOATING_POINT(REAL)

------------------------------------------------------------------------
 SUMMARY    Generate a floating point representation of a number.
 KEYWORDS   FLOATING, POINT, REAL, LEXICAL  ANALYSIS
 UNIT       EDF                                       LIBRARY  COMMON
------------------------------------------------------------------------
```

DESCRIPTION

The assignment to @TRANS_CONSTS.FLOAT_NUMBER, ensures that the number is representable as a floating point value. Otherwise it is illegal.

```
PAGE 55
                                          SAVED ON  Mar 23, 1989 BY MGROO

FOCUS_ON_TARGET(ROW, COL),
LOCAL SCROLL_ADJUST, SCROLL_AMT.

------------------------------------------------------------------------
| SUMMARY    Place the cursor on the token being searched for
| KEYWORDS   CURSOR, FIND, CHANGE, COMMAND, ERROR
| UNIT       EDR                                      LIBRARY  COMMON
------------------------------------------------------------------------

ROW <: ESOVE_VARS.POS_HSEP,                               | Y N N N
ROW <: VERT_SCROLL + ESOVE_VARS.POS_HSEP.                 |   Y N N
ROW <: VERT_SCROLL + SCREENROW - 2,                       |     Y N
------------------------------------------------------------------------
CALL TEXT_TO_SCREEN(ROW, COL),                            | 1
SCROLL_AMT : ROW -(VERT_SCROLL + ESOVE_VARS.POS_HSEP),    |   1
SCROLL_ADJUST : MIN(VERT_SCROLL + SCROLL_AMT, 5),         |   2
ESOVE_VARS.SCROLL_AMT : SCROLL_AMT - SCROLL_ADJUST,       |   3
CALL TEXT_TO_SCREEN(ESOVE_VARS.POS_HSEP + SCROLL_ADJUST,  |   4
  COL),                                                   |
CALL TEXT_TO_SCREEN(ROW - VERT_SCROLL, COL),              |     1
ESOVE_VARS.SCROLL_AMT : ROW -(VERT_SCROLL +               |       1
  ESOVE_VARS.POS_HSEP + 6);                               |
CALL TEXT_TO_SCREEN(ESOVE_VARS.POS_HSEP + 6, COL);        |       2
------------------------------------------------------------------------
PAGE 56
                                          SAVED ON: Mar 23, 1989 BY MGROO

FOCUS_ON_TARGET(ROW, COL);
LOCAL SCROLL_ADJUST, SCROLL_AMT;

------------------------------------------------------------------------
| SUMMARY : Place the cursor on the token being searched for.
| KEYWORDS: CURSOR, FIND, CHANGE, COMMAND, ERROR
| UNIT    : EDR                                      LIBRARY: COMMON
------------------------------------------------------------------------
```

DESCRIPTION

Cause scrolling to be initiated, if the token is not on the screen.

```
PAGE 57
                                          SAVED ON  Nov 5, 1988 BY MGROC

FOR_RESTRICT(TOKEN)

----------------------------------------------------------------------
| SUMMARY   Check that the current statement is legal within a FORALL
| KEYWORDS  SYNTAX, RESTRICT, FORALL, STATEMENT
| UNIT      TRAN                                      LIBRARY  COMMON |
----------------------------------------------------------------------

LS_ITEM('KIND') = 'UNTIL',                              | Y N N N N
EQ_TOKENS(TOKEN, CURR_TYPE, 'RETURN',                   |   Y N N N
  @TRANS_CONSTS.RESERVED_WORD),                         |   Y N N N
EQ_TOKENS(TOKEN, CURR_TYPE, 'SIGNAL',                   |     Y N N
  @TRANS_CONSTS.RESERVED_WORD),                         |     Y N N
EQ_TOKENS(TOKEN, CURR_TYPE, 'ROLLBACK',                 |       Y N
  @TRANS_CONSTS.RESERVED_WORD),                         |       Y N
----------------------------------------------------------------------
CALL EDIT_MESSAGE(108, TOKEN),                          |   1 1 1
----------------------------------------------------------------------
ON STACK_EMPTY
```

```
PAGE 58
                                          SAVED ON  Nov 5, 1988 BY MGROC

FOR_RESTRICT(TOKEN)

----------------------------------------------------------------------
| SUMMARY   Check that the current statement is legal within a FORALL |
| KEYWORDS  SYNTAX, RESTRICT  FORALL, STATEMENT
| UNIT      TRAN                                      LIBRARY  COMMON |
----------------------------------------------------------------------
```

DESCRIPTION

Currently SIGNAL, RETURN and ROLLBACK are disallowed within a FORALL

```
PAGE 59
                                          SAVED ON: Apr 15, 1988 BY MGROC

GEN_ARETURN;

----------------------------------------------------------------------
| SUMMARY : GENERATE A RETURN FROM THE CURRENT ACTION.               |
| KEYWORDS: GENERATE, CODE, ACTION                                   |
| UNIT    : TRAN                                     LIBRARY: COMMON |
----------------------------------------------------------------------

LS_EMPTY;                                               | Y N
----------------------------------------------------------------------
CALL GEN_CODE('ARETURN', 0, 0);                         | 1
```

```
PAGE 60                                         SAVED ON  Jul 8, 1988 BY MCROO

GEN_CODE(INSTR_NAME, ARG1, ARG2);

| SUMMARY   GENERATE AN INSTRUCTION AN PLACE IT IN THE OBJECT CODE
| KEYWORDS  GENERATE, CODE
| UNIT      TRAN                                      LIBRARY  COMMON

GET SYSSOPCODES WHERE NAME = INSTR_NAME.                       | 1
CALL GEN_CODE2(ARG1, ARG2).                                    | 2

ON GETFAIL SYSSOPCODES
   CALL EDIT_MESSAGE(302, INSTR_NAME).
PAGE 61                                         SAVED ON  Mar  , 1983 BY NLL10

GEN_CODE2(ARG1, ARG2).

| SUMMARY   generate code & operands for OPCODE with 1 or 2 operands
| KEYWORDS
| UNIT      TRAN                                      LIBRARY  COMMON

SYSSOPCODES.LEN = 5.                                           | Y N N
SYSSOPCODES.LEN = 3.                                           |   Y N

CALL GENERATERULE(INSTRUCTION_PTR, GENBIN(                     | 1 1 1
  SYSSOPCODES.OPCODE, 1), 1).
CALL GENERATERULE(INSTRUCTION_PTR + 1, GENBIN(ARG1, 2), 2      | 2 2
  ),
CALL GENERATERULE(INSTRUCTION_PTR + 3, GENBIN(ARG2, 2), 2      | 3
  ),
CALL WRITELN(INSTRUCTION_PTR || '  ' || SYSSOPCODES.NAME       | 4 3 2

  || '  ' || SYSSOPCODES.LEN).
INSTRUCTION_PTR = INSTRUCTION_PTR + SYSSOPCODES.LEN.           | 5 4 3

PAGE 62                                         SAVED ON  Nov 9, 1988 BY MCROO

GEN_INDIRECTREF.

| SUMMARY   Generate an indirect reference
| KEYWORDS
| UNIT      TRAN                                      LIBRARY  COMMON

CALL GEN_IREF(@INDIRECT_REFS.IR2_INSTRUCTION,                  | 1
  @INDIRECT_REFS.IR2);
CALL GEN_IREF(@INDIRECT_REFS.IR1_INSTRUCTION,                  | 2
  @INDIRECT_REFS.IR1);

PAGE 63                                         SAVED ON  Nov 9, 1988 BY MCROO

GEN_INDIRECTREF.

| SUMMARY   Generate an indirect reference.
| KEYWORDS
| UNIT      TRAN                                      LIBRARY  COMMON
```

DESCRIPTION

In the most general case, an indirect reference is comprised of an indirect table name, followed by and indirect field name. To satisfy the executer, these must actually be generated as indirect field name followed by indirect table name.

In the less general case when the indirect item is just the name of a rule or table, the second indirect item is empty.

```
PAGE 64                                        SAVED ON  Nov 5, 1986 BY MGROC

GEN_IREF(INSTRUCTION  REFERENCE).

------------------------------------------------------------------------
  SUMMARY    Generate an indirect reference
  KEYWORDS
  UNIT       TRAN                                        LIBRARY  COMMON
------------------------------------------------------------------------

INSTRUCTION : ''                                     | Y N N N
INSTRUCTION : 'PARM'                                 |   Y N N
INSTRUCTION : 'CONST'.                               |     Y N
-----------------------------------------------------+------------------
CALL GEN_CODE(INSTRUCTION, REFERENCE, 0).            |   1
CALL GEN_CODE(INSTRUCTION, 0, 0).                    |     1
CALL ADD_RELOC(INSTRUCTION_PTR - 2                   |       1
  @TRANS_CONSTS CONSTANT_REF  REFERENCE, 0).         |
CALL ADD_RELOC(INSTRUCTION_PTR - 2                   |         2
  @TRANS_CONSTS TABLEFIELD_REF, REFERENCE, 0).       |
------------------------------------------------------------------------
PAGE 65                                        SAVED ON  Nov 5, 1986 BY MGROC

GEN_IREF(INSTRUCTION, REFERENCE).

------------------------------------------------------------------------
| SUMMARY    Generate an indirect reference                            |
| KEYWORDS                                                             |
| UNIT       TRAN                                        LIBRARY  COMMON |
------------------------------------------------------------------------
```

DESCRIPTION

A single indirect reference is either empty, or it is a reference to a parameter a constant or a field of a table

```
PAGE 66                                        SAVED ON  Feb 26, 1987 BY [illegible]

GEN_LOCAL

------------------------------------------------------------------------
| SUMMARY    Generate the list of local variables defined in this rule |
| KEYWORDS                                                             |
| UNIT       TRAN                                        LIBRARY  COMMON |
------------------------------------------------------------------------

HEADER.LOCALS# > 0;                                       | Y N
----------------------------------------------------------+-------------
HEADER.LOCALS_OFF = INSTRUCTION_PTR;                      | 1
FORALL SYNTAB WHERE KIND = 'LOCAL' ORDERED ASCENDING INDEX | 2
    :
   CALL GENERATERULE(INSTRUCTION_PTR, SYNTAB.IDENT,       |
     @TRANS_CONSTS.NAME_LENGTH);                          |
   CALL GENERATERULE(INSTRUCTION_PTR +                    |
     @TRANS_CONSTS.NAME_LENGTH, GENBIN(DATA_AREA, 2), 2); |
```

```
  SYMTAB.REF : INSTRUCTION_PTR;
  REPLACE SYMTAB;
  INSTRUCTION_PTR : INSTRUCTION_PTR +
    @TRANS_CONSTS.NAME_LENGTH + 2.
  DATA_AREA : DATA_AREA + 4.
  END.
HEADER.LOCALS_OFF : 0
-----------------------------------------------------------------------
PAGE 67                                  SAVED ON  Apr 12, 1989 BY MGROO

GEN_PARM

-----------------------------------------------------------------------
| SUMMARY   Generate the list of parameters for this rule              |
| KEYWORDS.                                            LIBRARY  COMMON |
| UNIT      TRAN                                                       |
-----------------------------------------------------------------------

HEADER.PARMS# : 0.                                          + N
-----------------------------------------------------------------------
HEADER.PARMS_OFF : INSTRUCTION_PTR.                      |
CALL CALC_OFFSET(1).                                     |  2
FORALL SYMTAB WHERE KIND : 'PARM' ORDERED DESCENDING REF |  3
   CALL GENERATERULE(INSTRUCTION_PTR, SYMTAB.IDENT,      |
     @TRANS_CONSTS NAME_LENGTH).                         |
   INSTRUCTION_PTR : INSTRUCTION_PTR +                   |
     @TRANS_CONSTS.NAME_LENGTH.                          |
   END.                                                  |
HEADER.PARMS_OFF : 0.                                    |   1
-----------------------------------------------------------------------
PAGE 68                                  SAVED ON  Mar 1, 1989 BY HLL10

GENERATERULE(OFFSET, VALUE, LENGTH).

-----------------------------------------------------------------------
| SUMMARY : generate hexadecimal code  interface to SINFIELD           |


| KEYWORDS                                             LIBRARY  COMMON |
| UNIT      TRAN                                                       |
-----------------------------------------------------------------------

-----------------------------------------------------------------------
CALL SINFIELD(TARGETRULE  VALUE  OFFSET + 1, LENGTH,     |  1
  'L').                                                  |
-----------------------------------------------------------------------
PAGE 69                                  SAVED ON  Mar 1, 1989 BY HLL10

GENERATERULE(OFFSET, VALUE  LENGTH).

-----------------------------------------------------------------------
| SUMMARY   generate hexadecimal code  interface to SINFIELD           |
| KEYWORDS                                             LIBRARY  COMMON |
| UNIT      TRAN                                                       |
-----------------------------------------------------------------------

                         DESCRIPTION

      We  adjust here the starting position (OFFSET + 1) and
  specify the padding character




PAGE 70                                  SAVED ON: Apr 18, 1989 BY MGROO

GENNULLBIN(VAL, LEN);
```

```
| SUMMARY   Generate a (possibly null) binary value
| KEYWORDS:
| UNIT     : TRAN                                   LIBRARY: COMMON |

LEN = 0;

RETURN('');

RETURN(GENBIN(VAL, LEN))
```

```
PAGE 71                                  SAVED ON  Apr 16, 1985 BY MGROO

GENNULLBIN(VAL, LEN);

: SUMMARY   Generate a (possibly null) binary value
  KEYWORDS
· UNIT      TRAN                                    LIBRARY  COMMON
```

DESCRIPTION

The keyword NULL is represented internally as a binary number of length zero. Since GENBIN cannot handle such a beast, GENNULLBIN must check for it

```
PAGE 72                                  SAVED ON  Jul 8, 1988 BY MGROO

HEADER.

| SUMMARY   TRANSLATE THE HEADER PORTION OF A RULE
| KEYWORDS  PARSE, GENERATE, CODE, RULE, HEADER
| UNIT      TRAN                                    LIBRARY  COMMON |

CURR_COMPONENT = 'HEADER'.
GET ESMAP WHERE TABLE = 'HEADER' & TERMINATOR = '*
PARM_VALUE = ESMAP PARM_VALUE.
GET TOKENS(PARM_VALUE) WHERE INDEX = 1.
CALL LOAD_BUFFER;
CALL NAME_AND_PARMS
CALL LOCALS.
CALL GEN_PARM.
CALL GEN_LOCAL.

ON STMNT_END
   CALL EDIT_MESSAGE(109, CURR_TOKEN).
ON GETFAIL TOKENS
   CALL EDIT_MESSAGE(304, PARM_VALUE);
ON GETFAIL ESMAP .
   CALL EDIT_MESSAGE(100, '''' || '''' ||';');
```

```
PAGE 73                                  SAVED ON. Apr 15, 1988 BY MGROO

HILITE_LINE;

| SUMMARY : GIVE A SINGLE LINE THE "HIGHLIGHT" ATTRIBUTE.
| KEYWORDS: ERROR, HIGHLIGHT, ATTRIBUTE
| UNIT    : TRAN                                    LIBRARY: COMMON |
```

```
CALL ADD_ATTR(ESMAP.ROW * 100 + ESMAP.COLUMN, 'U', 'H',      | 1
  'A');
ESMAP.LINE_STATUS = 'E'.                                      | 2
REPLACE ESMAP.                                                | 3
ERROR_FLAG = 'Y'.                                             | 4
--------------------------------------------------------------------------------
PAGE 74                                     SAVED ON JUL 8, 1988 BY MCROO

HILITE_LINES(HIGHLIGHT).

--------------------------------------------------------------------------------
| SUMMARY   GIVE ONE OR MORE LINES THE "HIGHLIGHT" ATTRIBUTE
| KEYWORDS  ERROR  HIGHLIGHT, ATTRIBUTE                    LIBRARY  COMMON |
| UNIT      TRAN
--------------------------------------------------------------------------------

                                                              . N
HIGHLIGHT.
--------------------------------------------------------------------------------
FORALL ESMAP WHERE STMNT# = ESMAP.STMNT# & TABLE :
     ESMAP TABLE                                              |
   CALL HILITE_LINE.                                          |
   END.                                                       |
--------------------------------------------------------------------------------
PAGE 75                                     SAVED ON JUL 8 1988 BY MCROO

HILITE_LINES(HIGHLIGHT).

--------------------------------------------------------------------------------
| SUMMARY   GIVE ONE OR MORE LINES THE "HIGHLIGHT" ATTRIBUTE                  |
| KEYWORDS  ERROR, HIGHLIGHT, ATTRIBUTE                    LIBRARY  COMMON |
| UNIT      TRAN
--------------------------------------------------------------------------------

                              DESCRIPTION

   FOR EACH LINE, ADD AN 'H' (HIGHLIGHTED) ATTRIBUTE ENTRY
PAGE 76                                     SAVED ON NOV 9, 1988 BY MCROO



IND_TABLENAME(TABLE).

--------------------------------------------------------------------------------
| SUMMARY   Generate the instruction to reference a direct tablename         |
| KEYWORDS                                                 LIBRARY  COMMON |
| UNIT      TRAN
--------------------------------------------------------------------------------

                                                              | Y N
TABLE = ''.                                                   |
--------------------------------------------------------------------------------
IND_INSTR1 = 'CONST'.                                         |  1
IND_REF1 = RET_CONST(TABLE, @TRANS_CONSTS FIXED_CHAR,         |  2
  LENGTH(TABLE), 0).                                          |
--------------------------------------------------------------------------------
PAGE 77                                     SAVED ON NOV 9, 1988 BY MCROO

IND_TABLENAME(TABLE).

--------------------------------------------------------------------------------
| SUMMARY   Generate the instruction to reference a direct tablename         |
| KEYWORDS                                                 LIBRARY  COMMON |
| UNIT      TRAN
--------------------------------------------------------------------------------
```

DESCRIPTION

IND_TABLENAME is called when processing an indirect field reference. If the table name was direct (TABLE ¬= '') then we must put code in IND_INSTR1 to cause the value of the table name to be pushed onto the stack.

```
PAGE 78                                        SAVED ON  Nov 9, 1988 BY MGROO

INDIRECT_FREF(TOKEN, TTYPE);

-----------------------------------------------------------------------
| SUMMARY   Parse and generate code for an indirect field reference   |
| KEYWORDS  PARSE, GENERATE, CODE, INDIRECT, FIELD                    |
| UNIT      TRAN                                     LIBRARY  COMMON  |
-----------------------------------------------------------------------

PARM(TOKEN);                                            | Y N N
EQ_TOKENS(NEXT_TOKEN, CURR_TYPE, ' ',                   |   Y N
  @TRANS_CONSTS.SPECIAL_CHAR);                          |   Y N
-----------------------------------------------------------------------
CALL IND_TABLENAME(TABLE_NAME);                         |
IND_INSTR1 = 'PARM';                                    | 2
IND_REF1 = SYMTAB.REF;                                  | 3
IND_INSTR2 = 'RFIELD';                                  |   2
IND_REF2 = ADD_FIELDREF(TOKEN, NEXT_TOKEN);             |   3
CALL ADVANCE_TOKEN;                                     | 4 4
CALL ADVANCE_TOKEN;                                     | 5 5
CALL EDIT_MESSAGE(102, TOKEN || QUOTE('INDIRECT FIELD')); |     1
-----------------------------------------------------------------------
PAGE 79                                        SAVED ON  Nov 9, 1988 BY MGROO

INDIRECT_FREF(TOKEN, TTYPE);

-----------------------------------------------------------------------
| SUMMARY   Parse and generate code for an indirect field reference   |
| KEYWORDS  PARSE, GENERATE, CODE, INDIRECT, FIELD                    |
| UNIT      TRAN                                     LIBRARY  COMMON  |
-----------------------------------------------------------------------

                          DESCRIPTION
                          -----------

     Call IND_TABLENAME to cause the instruction to reference
     the table name to be generated



PAGE 80                                        SAVED ON  Nov 9, 1988 BY MGROO

INDIRECT_TREF(TOKEN, TTYPE);

-----------------------------------------------------------------------
| SUMMARY   Parse and generate code for an indirect table reference   |
| KEYWORDS  PARSE, GENERATE, CODE, INDIRECT, TABLE                    |
| UNIT      TRAN                                     LIBRARY  COMMON  |
-----------------------------------------------------------------------

PARM(TOKEN);                                            | Y N N
EQ_TOKENS(NEXT_TOKEN, CURR_TYPE, ' ',                   |   Y N
  @TRANS_CONSTS.SPECIAL_CHAR);                          |   Y N
-----------------------------------------------------------------------
IND_INSTR1 = 'PARM';                                    | 1
IND_REF1 = SYMTAB.REF;                                  | 2
IND_INSTR1 = 'RFIELD';                                  |   1
IND_REF1 = ADD_FIELDREF(TOKEN, NEXT_TOKEN);             |   2
CALL ADVANCE_TOKEN;                                     | 3 3
CALL ADVANCE_TOKEN;                                     | 4 4
CALL FIELD_PART(NEXT_TOKEN, CURR_TYPE);                 | 5 5
```

```
CALL EDIT_MESSAGE(103, TOKEN || QUOTE('INDIRECT TABLE')).
--------------------------------------------------------------------------
PAGE 81
                                        SAVED ON  Feb 22, 1989 BY WLL10

INIT_TRANSLATOR.

--------------------------------------------------------------------------
| SUMMARY   Initialize the translator prior to translating a rule
| KEYWORDS  INITIALIZE, TRANSLATOR
| UNIT      TRAN                                      LIBRARY  COMMON
--------------------------------------------------------------------------

--------------------------------------------------------------------------
CONST_INDEX : 1.
TABREF_INDEX : 1.
GLOBAL_INDEX : 1.
INSTRUCTION_PTR : 52
LOOP_NUM : 0
EXCEPT_NUM : 0
DATA_AREA : 4
TARGETRULE : PAD(' ', @TRANS_CONSTS MAX_RULE_LENGTH GENBIN
  (0 1), '1').
CALL CLEAR_TTABLES.
--------------------------------------------------------------------------
PAGE 82
                                        SAVED ON  May 30, 1989 BY MGROO

IR_POP.

--------------------------------------------------------------------------
| SUMMARY   Pop the indirect references stack
| KEYWORDS  POP, INDIRECT REFERENCE
| UNIT      TRAN                                      LIBRARY  COMMON
--------------------------------------------------------------------------

--------------------------------------------------------------------------
DELETE @INDIRECT_REFS.
GET @INDIRECT_REFS WHERE INDEX = @INDIRECT_REFS.INDEX - 1;



--------------------------------------------------------------------------
ON DELETEFAIL @INDIRECT_REFS
   CALL EDIT_MESSAGE(311, '@INDIRECT_REFS').
ON GETFAIL @INDIRECT_REFS
PAGE 83
                                        SAVED ON  Oct 28, 1988 BY MGROO

IR_PUSH(REF, INSTR1, IREF1, INSTR2, IREF2).

--------------------------------------------------------------------------
| SUMMARY   Push an entry on the indirect reference stack
| KEYWORDS  PUSH, INDIRECT REFERENCE
| UNIT      TRAN                                      LIBRARY  COMMON
--------------------------------------------------------------------------

--------------------------------------------------------------------------
GET @INDIRECT_REFS.
@INDIRECT_REFS INDEX = @INDIRECT_REFS INDEX + 1.
@INDIRECT_REFS.REFERENCE = REF.
@INDIRECT_REFS IR1_INSTRUCTION : INSTR1
@INDIRECT_REFS.IR1 = IREF1
@INDIRECT_REFS.IR2_INSTRUCTION : INSTR2.
@INDIRECT_REFS.IR2 = IREF2
INSERT @INDIRECT_REFS.
--------------------------------------------------------------------------
ON GETFAIL @INDIRECT_REFS
   @INDIRECT_REFS.INDEX = 100;
   @INDIRECT_REFS.REFERENCE = REF,
   @INDIRECT_REFS.IR1_INSTRUCTION = INSTR1;
   @INDIRECT_REFS.IR1 = IREF1;
   @INDIRECT_REFS.IR2_INSTRUCTION = INSTR2;
   @INDIRECT_REFS.IR2 = IREF2;
   INSERT @INDIRECT_REFS;
PAGE 84
                                        SAVED ON: Oct 28, 1988 BY MGROO

IR_PUSH(REF, INSTR1, IREF1, INSTR2, IREF2);
```

```
SUMMARY  - Push an entry on the indirect reference stack
KEYWORDS: PUSH, INDIRECT REFERENCE
UNIT     : TRAN                                   LIBRARY  COMMON
```

DESCRIPTION

An entry is pushed for an indirect rule name or an indirect table field name. The entry consists of a reference to the entire indirect reference and an instruction and reference to be generated for each component of the indirect reference. For an indirect rule name, only the first component is used. For an indirect table field, both components are used.

```
PAGE 85                               SAVED ON  Apr 15, 1986 BY MGROC

IS_NULL(S);

SUMMARY   RETURN WHETHER OR NOT THE ARGUMENT IS NULL
KEYWORDS  NULL, COMPARE EQUAL
UNIT      STE                                    LIBRARY  COMMON

S = '';                                          | Y N
-------------------------------------------------+----------
RETURN('Y');                                     | 1
RETURN('N');                                     |   1
```

```
PAGE 86                               SAVED ON  Jul 8, 1988 BY MGROC

ISSUE_ACALLS(CNUM);

SUMMARY   ISSUE CALLS TO ALL ACTIONS ASSOCIATED WITH THIS CONDITION
KEYWORDS
UNIT      TRAN                                   LIBRARY  COMMON

-------------------------------------------------+----------
GET ESSEQ_MAP WHERE COND# = CNUM;                | 1
FORALL SEQUENCE#(ESSEQ_MAP.PARMVAL)              | 2
   CALL GEN_CODE('ACALL    ', 0, 0);             |
   SEQUENCE#.ADDR = INSTRUCTION_PTR - 2;         |
   REPLACE SEQUENCE#(ESSEQ_MAP.PARMVAL);         |
   END;                                          |
```

```
PAGE 87                               SAVED ON  Jul 8, 1988 BY MGROO

ISSUE_ACALLS(CNUM);

SUMMARY   ISSUE CALLS TO ALL ACTIONS ASSOCIATED WITH THIS CONDITION
KEYWORDS
UNIT     : TRAN                                  LIBRARY  COMMON
```

DESCRIPTION

ISSUE_ACALLS IS CALLED AFTER EACH CONDITION HAS BEEN TRANSLATED.

IT GENERATES CALLS TO ALL THE ACTIONS THAT MUST BE EXECUTED WHEN THE CONDITION IS TRUE.

SINCE THE START ADDRESS OF THE ACTIONS IS NOT KNOWN WHEN THE CALL IS GENERATED, WE SAVE THE ADDRESS OF THE CALL IN THE ADDR FIELD OF THE SEQUENCE# TABLE. RESOLVE_ACALLS RESOLVES THESE UNKNOWN ADDRESSES WHEN THE ACTION CODE IS GENERATED.

```
PAGE 88                               SAVED ON: Nov 10, 1988 BY MGROO

LOAD_BUFFER;
```

```
--------------------------------------------------------------------------
| SUMMARY : Get the attributes of the current token                      |
| KEYWORDS:                                                              |
| UNIT    : TRAN                                       LIBRARY: COMMON   |
--------------------------------------------------------------------------

TOKENS TYPE : @TRANS_CONSTS.LONG_STRING                          | Y N
-------------------------------------------------------------------------
GET LONG_STRINGS WHERE INDEX : TOKENS LEN.                       | 1
CURR_TYPE : LONG_STRINGS TYPE.                                   | 2
CURR_LEN : LONG_STRINGS.LEN.                                     | 3
CURR_DEC : 0.                                                    | 4
CURR_TOKEN : LONG_STRINGS.STRING.                                | 5
CURR_ISTBLREF : 'N'.                                             | 6
CURR_TYPE : TOKENS TYPE.                                         |   1
CURR_LEN : TOKENS LEN                                            |   2
CURR_DEC : TOKENS.DEC.                                           |   3
CURR_TOKEN : TOKENS.STRING.                                      |   4
CURR_ISTBLREF : TOKENS.TABREF_MARK.                              |   5
-------------------------------------------------------------------------
PAGE 85
                                          SAVED ON  Apr 15, 1988 BY MGROC

LOCAL_NAME(ID, TYPE).

--------------------------------------------------------------------------
| SUMMARY   PARSE & NAME IN THE LIST OF LOCALS                           |
| KEYWORDS  PARSE, LOCAL, NAME                                           |
| UNIT      TRAN                                       LIBRARY: COMMON   |
--------------------------------------------------------------------------

NAME(TYPE).                                                      | Y N
-------------------------------------------------------------------------
CALL EDIT_MESSAGE(103, ID || ' LOCAL').                          |   1
HEADER.LOCALS# : HEADER.LOCALS# + 1.                             | 1
CALL SYMTAB_DEFINE(ID, 'LOCAL', HEADER.LOCALS#, 0).              | 2

CALL MORE_LOCALS(NEXT_TOKEN, CURR_TYPE).                         | 3
-------------------------------------------------------------------------
ON STMNT_END
   CALL EDIT_MESSAGE(109, CURR_TOKEN).
PAGE 90
                                          SAVED ON  Sep 21, 1988 BY MGROO

LOCALS.
LOCAL STMNT.

--------------------------------------------------------------------------
| SUMMARY   Initiate the parsing and code generation for locals          |
| KEYWORDS: PARSE, GENERATE, CODE, LOCAL, VARIABLE                       |
| UNIT      TRAN                                       LIBRARY  COMMON   |
--------------------------------------------------------------------------

                                                                 |
-------------------------------------------------------------------------
HEADER.LOCALS# : 0.                                              | 1
CALL CHECK_EXTRA_TOKS.                                           | 2
GET ESMAP WHERE TABLE : 'HEADER' & STMNT# > ESMAP STMNT# &       | 3
  PARM_VALUE ¬= ESCONSTANTS.NOT_LEXED;                           |
STMNT : ESMAP.STMNT#.                                            | 4
FORALL ESMAP WHERE TABLE : 'HEADER' & STMNT# : STMNT             | 5
     ORDERED ASCENDING ROW                                       |
   PARM_VALUE : ESMAP PARM_VALUE;                                |
   END.                                                          |
GET TOKENS(PARM_VALUE) WHERE INDEX : 1;                          | 6
CALL LOAD_BUFFER;                                                | 7
CALL PARSE_LOCALS(CURR_TOKEN, CURR_TYPE);                        | 8
CALL CHECK_EXTRA_TOKS;                                           | 9
GET ESMAP WHERE TABLE = 'HEADER' & STMNT# > STMNT;               | A
CALL EDIT_MESSAGE(100, TOKEN(ESMAP.TEXT) || ' ' || QUOTE(        | B
  ''));                                                          |
-------------------------------------------------------------------------
ON GETFAIL ESMAP :
```

```
ON GETFAIL TOKENS

   CALL EDIT_MESSAGE(304, '' || PARM_VALUE),
PAGE 91
                                          SAVED ON  Mar 14, 1989 BY MGROO

LOGICAL_VALUE(TOKEN, TYPE);
LOCAL IND_INSTR1, IND_REF1, IND_INSTR2, IND_REF2,

-----------------------------------------------------------------------
| SUMMARY   Parse and generate code for a logical value in a condition  |
| KEYWORDS  CONDITION, LOGICAL, VALUE  GENERATE  CODE                   |
| UNIT      TRAN                                   LIBRARY  COMMON      |
-----------------------------------------------------------------------

                                                   |
CURR_ISTBLREF                                      |  - N N
                                                   |
NAME(TYPE).                                        |    Y N
---------------------------------------------------+-------------------
                                                   |
CALL IP_PUSH(PARSE_FIELD_REF(TOKEN, TYPE)  IND_INSTR1, |
                                                   |
  IND_REF1, IND_INSTR2, IND_REF2                   |
CALL GEN_INDIRECTREF                               | 1
CALL GEN_CODE('RFIELD    , C, 0'                   | 2
CALL ADD_RELOC(INSTRUCTION_PTR   2                 | 4
  @TRANS_CONSTS.TABLEFIELD_REF, @INDIRECT_REFS REFERENCE, |
  0).                                              |
CALL IR_POP.                                       | 5
CALL RESOLVE_NAME(TOKEN).                          |   1
CALL CHECK_EOS(CURR_TOKEN).                        | 6 2
CALL EDIT_MESSAGE(123, CURR_TOKEN)                 |
---------------------------------------------------+-------------------
PAGE 92
                                          SAVED ON  Mar 14, 1989 BY MGROO

LOGICAL_VALUE(TOKEN, TYPE).
LOCAL IND_INSTR1, IND_REF1, IND_INSTR2  IND_REF2.

-----------------------------------------------------------------------
| SUMMARY : Parse and generate code for a logical value in a condition |
| KEYWORDS: CONDITION, LOGICAL, VALUE, GENERATE, CODE                  |
| UNIT    : TRAN                                   LIBRARY  COMMON     |
-----------------------------------------------------------------------
```

DESCRIPTION

A logical value is either a table field reference, or an identifier  It must be followed by a semi-colon

```
PAGE 93
                                          SAVED ON  Aug 12, 1988 BY MGROO

LOOKAHEAD_EOS.

-----------------------------------------------------------------------
| SUMMARY : Lookahead one token and attempt to match a semi-colon      |
| KEYWORDS: LOOKAHEAD, PARSE, SEMI-COLON                               |
| UNIT      TRAN                                   LIBRARY  COMMON     |
-----------------------------------------------------------------------

                                                   |
---------------------------------------------------+-------------------

GET TOKENS(PARM_VALUE) WHERE INDEX = TOKENS.INDEX + 1 &  | 1
                                                   |
  STRING =';';                                     |
---------------------------------------------------+-------------------

ON GETFAIL :

   SIGNAL LOOKAHEAD_FAILED;
PAGE 94
                                          SAVED ON: Aug 30, 1988 BY MGROO

LOOKAHEAD_EXPR(TOKEN, TYPE);
LOCAL SAVE_INDEX;

-----------------------------------------------------------------------
| SUMMARY : Lookahead for a relational expression or a logical value.  |
```

```
| KEYWORDS: LOOKAHEAD, LOGICAL, VALUE, RELATION
| UNIT     : TRAN                                          LIBRARY: COMMON |
--------------------------------------------------------------------------

CURR_ISTBLREF;                                      | Y N N N
PARM(TYPE),                                         |   Y N N
NAME(TYPE),                                         |     Y N
----------------------------------------------------+---------------------
SAVE_INDEX = TOKENS INDEX,                          | 1 1 1
CALL LOOKAHEAD_TABREF,                              | 2
CALL LOOKAHEAD_FUNC;                                |     2
CALL LOOKAHEAD_EOS;                                 | 3 2 3
TOKENS.INDEX = SAVE_INDEX,                          | 4 3 4
CALL LOGICAL_VALUE(TOKEN, TYPE),                    | 5 4 5
CALL RELATIONAL_EXPR(TOKEN, TYPE),                  |       :
--------------------------------------------------------------------------
ON LOOKAHEAD_FAILED

   TOKENS.INDEX = SAVE_INDEX

   CALL RELATIONAL_EXPR(TOKEN, TYPE),
PAGE 95
                                       SAVED ON. Aug 30, 1984 BY MGROO

LOOKAHEAD_FUNC;
LOCAL I, PAREN_NESTING.

--------------------------------------------------------------------------
| SUMMARY   Lookahead past a functional rule call                         |
| KEYWORDS: LOOKAHEAD, FUNCTION, CALL                                     |
| UNIT      TRAN                                         LIBRARY: COMMON |
--------------------------------------------------------------------------

----------------------------------------------------+---------------------
I = TOKENS.INDEX,                                   | 1
GET TOKENS(PARM_VALUE) WHERE INDEX = TOKENS.INDEX + 1 &  | 2
  STRING ='(';                                      |
PAREN_NESTING = 1;                                  | 3
CALL LOOKAHEAD_PAREN;                               | 4

----------------------------------------------------+---------------------
ON GETFAIL

   TOKENS.INDEX = I,
PAGE 96
                                       SAVED ON  Aug 30, 1988 BY MGROO

LOOKAHEAD_FUNC,
LOCAL I, PAREN_NESTING,

--------------------------------------------------------------------------
| SUMMARY   Lookahead past a functional rule call                         |
| KEYWORDS  LOOKAHEAD, FUNCTION, CALL                                     |
| UNIT      TRAN                                         LIBRARY  COMMON |
--------------------------------------------------------------------------

                         DESCRIPTION

      A function call has the following syntax

      <function call>    :
           <id>
           <id> ( <expr> [, <expr>] )

PAGE 97
                                       SAVED ON: Oct 28, 1988 BY MGROO

LOOKAHEAD_PAREN;

--------------------------------------------------------------------------
| SUMMARY : Lookahead until a matching right paren is found.              |
| KEYWORDS: LOOKAHEAD, PARENTHESIS                                        |
| UNIT     : TRAN                                        LIBRARY: COMMON |
--------------------------------------------------------------------------
```

```
PAREN_NESTING = 0.                                               | Y N
-----------------------------------------------------------------+---------------
GET TOKENS(PARM_VALUE) WHERE INDEX > TOKENS INDEX &(STRING        |   1
  ='(' | STRING ='')') & TYPE = @TRANS_CONSTS SPECIAL_CHAR        |
PAREN_NESTING = PAREN_NESTING + NEXT_LEVEL(TOKENS.STRING).        |   2
CALL LOOKAHEAD_PAREN                                              |   2
----------------------------------------------------------------------------------
PAGE 98
                                      SAVED ON  Aug 12  1988 BY MCROO

LOOKAHEAD_TABREF

-----------------------------------------------------------------------------
: SUMMARY    Lookahead to the end of the current table field reference
: KEYWORDS   LOOKAHEAD, PARSE  TABLE, REFERENCE
: UNIT       TRAN                                       LIBRARY  COMMON .
-----------------------------------------------------------------------------


-----------------------------------------------------------------+-----------
GET TOKENS(PARM_VALUE) WHERE INDEX > TOKENS INDEX &               | 1
  TABREF_MARK = 'Y'                                               :
-----------------------------------------------------------------------------
PAGE 99
                                      SAVED ON  Apr 15  1988 BY MCROO

LS_EMPTY.

-----------------------------------------------------------------------------
: SUMMARY    RETURN WHETHER THE LOOP STACK IS EMPTY                         :
| KEYWORDS   FORALL, UNTIL, STACK, EMPTY                                    |
| UNIT       TRAN                                       LIBRARY  COMMON     |
-----------------------------------------------------------------------------

                                                                  |
------------------------------------------------------------------+----------
GET LOOP_STACK                                                    | 1
RETURN('N').                                                      | 2
-----------------------------------------------------------------------------

ON GETFAIL
   RETURN('Y').



PAGE 100
                                      SAVED ON  Apr 15  1988 BY MCROO

LS_EMPTY.

-----------------------------------------------------------------------------
| SUMMARY    RETURN WHETHER THE LOOP STACK IS EMPTY                         :
| KEYWORDS   FORALL, UNTIL  STACK  EMPTY                                    :
| UNIT       TRAN                                       LIBRARY  COMMON     :
-----------------------------------------------------------------------------

                           DESCRIPTION
                           -----------

  THE LOOP STACK CONTAINS INFORMATION ABOUT BOTH FORALL    ENDFOR
  AND UNTIL    ENDUNTIL LOOPS
PAGE 101
                                      SAVED ON  Apr 15  1988 BY MCROO

LS_ITEM(ITEM).

-----------------------------------------------------------------------------
| SUMMARY    RETURN THE REQUESTED ITEM FROM THE TOP OF THE LOOP STACK       |
| KEYWORDS   FORALL, UNTIL, STACK                                           |
| UNIT       TRAN                                       LIBRARY  COMMON     |
-----------------------------------------------------------------------------

LS_EMPTY;                                                         | Y N
------------------------------------------------------------------+----------
RETURN(LOOP_STACK.(ITEM)).                                        |   1
SIGNAL STACK_EMPTY.                                               | 1
-----------------------------------------------------------------------------
PAGE 102
                                      SAVED ON: Mar 17, 1989 BY MCROO

MORE_ARGS(TOKEN, TYP, COUNT);

-----------------------------------------------------------------------------
| SUMMARY : Parse and gen code for each actual parameter in an arg list.    |
| KEYWORDS: PARSE, GENERATE, CODE, RULE, ARGUMENT                           |
| UNIT    : TRAN                                       LIBRARY: COMMON      |
-----------------------------------------------------------------------------

EQ_TOKENS(TOKEN, TYP,',', @TRANS_CONSTS.SPECIAL_CHAR);           | Y N N
EQ_TOKENS(TOKEN, TYP,')', @TRANS_CONSTS.SPECIAL_CHAR);           |   Y N
```

```
CALL PARSE_NULL_EXPR(NEXT_TOKEN, CURR_TYPE);                 1
CALL GEN_CODE('TEMP     ', 0, 0).                            2
RETURN(MORE_ARGS(CURR_TOKEN, CURR_TYPE, COUNT + 1)).         3
CALL ADVANCE_TOKEN.
RETURN(COUNT);
CALL EDIT_MESSAGE(100  TOKEN |; QUOTE(  ' OR ')')))

ON STMNT_END
   CALL EDIT_MESSAGE(105, CURR_TOKEN).
PAGE 103
                                        SAVED ON  Mar 17, 1989 BY MCROC

MORE_ARGS(TOKEN, TYP, COUNT).

| SUMMARY   Parse and gen code for each actual parameter in an arg list
| KEYWORDS  PARSE  GENERATE, CODE, RULE  ARGUMENT
| UNIT      TRAN                                    LIBRARY  COMMON
```

DESCRIPTION

```
<arglist> ::= ( <Null_or_Expr> { , <Null_or_Expr> } )

MORE_ARGS  handles  the {  <Null_or_Expr> } ) portion of an
<arglist>
```

```
PAGE 104
                                        SAVED ON  Nov 10  1988 BY MCROO

MORE_LOCALS(TOKEN, TYPE).

| SUMMARY   Parse the list of local variables defined in this rule
| KEYWORDS  PARSE, LOCAL, NAME
| UNIT      TRAN                                    LIBRARY  COMMON

EQ_TOKENS(TOKEN, TYPE,';'  @TRANS_CONSTS SPECIAL_CHAR).     Y N N
EQ_TOKENS(TOKEN, TYPE,','. @TRANS_CONSTS SPECIAL_CHAR)        Y N

CALL LOCAL_NAME(NEXT_TOKEN, CURR_TYPE)
CALL EDIT_MESSAGE(100, TOKEN || QUOTE(' ; OR ',')).
PAGE 105
                                        SAVED ON  Nov 10  1988 BY MCROO

MORE_LOCALS(TOKEN  TYPE)

| SUMMARY   Parse the list of local variables defined in this rule
| KEYWORDS  PARSE  LOCAL, NAME
| UNIT      TRAN                                    LIBRARY  COMMON
```

DESCRIPTION

```
<LocalList> ::= LOCAL <LocalName> { , <LocalName> } ;

MORE_LOCALS  handles the { , <LocalName> } ; portion of the
<LocalList>
```

```
PAGE 105
                                        SAVED ON  Nov 10, 1988 BY MGROO

MORE_PARMS(TOK  TYPE).

-----------------------------------------------------------------
| SUMMARY   Parse the next parm in a rule's list of formal parameters |
| KEYWORDS                                                      |
| UNIT      TRAN                                LIBRARY  COMMON |
-----------------------------------------------------------------

EC_TOKENS(TOK  TYPE.    @TRANS_CONSTS.SPECIAL_CHAR)   | Y N
------------------------------------------------------+----------
CALL PARM_NAME(NEXT_TOKEN  CURR_TYPE).                 |
------------------------------------------------------------------
PAGE 107
                                        SAVED ON  Nov 10, 1988 BY MGROO

NAME(TYPE).

-----------------------------------------------------------------
| SUMMARY   Does this type represent a name, or not?            |
| KEYWORDS                                                      |
| UNIT      TRAN                                LIBRARY  COMMON |
-----------------------------------------------------------------

TYPE : @TRANS_CONSTS IDENTIFIER                        | Y N
-------------------------------------------------------+---------
RETURN('Y').                                           | 1
RETURN('N').                                           |   1
------------------------------------------------------------------
PAGE 108
                                        SAVED ON  Apr 12, 1989 BY MGROO

NAME_AND_PARMS.

-----------------------------------------------------------------
| SUMMARY : Parse a rule name and its optional list of formals  |
| KEYWORDS  PARSE, GENERATE, CODE, RULE, NAME, PARAMETER

| UNIT      TRAN                                LIBRARY  COMMON |
-----------------------------------------------------------------

¬ NAME(CURR_TYPE).                                     | Y N
-------------------------------------------------------+---------
CALL EDIT_MESSAGE(103  CURR_TOKEN ||  RULE').          | 1
HEADER.DVNAME : CURR_TOKEN                             |   1
HEADER.PARMS# : 0                                      |   2
CALL CHECK_PARMS(NEXT_TOKEN).                          |   3
CALL CHECK_EOS(CURR_TOKEN).                            |   4
------------------------------------------------------------------
PAGE 109
                                        SAVED ON  Apr 12, 1989 BY MGROO

NAME_AND_PARMS.

-----------------------------------------------------------------
| SUMMARY   Parse a rule name and its optional list of formals  |
| KEYWORDS  PARSE, GENERATE, CODE, RULE, NAME, PARAMETER        |
| UNIT      TRAN                                LIBRARY  COMMON |
-----------------------------------------------------------------

                         DESCRIPTION

     <NameAndParms> ::=
          <Rulename> .
          <Rulename> <FormalList> ;

     <FormalList> ::=
          [(<Parmname> { , <Parmname> })]

     NAME_AND_PARMS handles the <Rulename> and calls CHECK_PARMS
     to handle the optional <FormalList>.
```

```
PAGE 110                                   SAVED ON  Apr 15, 1988 BY MGROO

NEGATE(BOOLEAN);

 ----------------------------------------------------------------------
| SUMMARY   RETURN THE NEGATION OF THE BOOLEAN ARGUMENT                 |
| KEYWORDS  LOGICAL, NEGATE                                             |
| UNIT      STE                                      LIBRARY  COMMON    |
 ----------------------------------------------------------------------

                                                              Y N
BOOLEAN.
-----------------------------------------------------------------------
RETURN('N').
RETURN('Y')
-----------------------------------------------------------------------
PAGE 111                                   SAVED ON  Apr 15  1988 BY MGROO

NEITHER_NULL(S, P).

 ----------------------------------------------------------------------
| SUMMARY   RETURN 'Y' IF BOTH ARGUMENTS ARE NON-EMPTY                  |
| KEYWORDS  PATTERN, MATCH, NUL                                         |
| UNIT      STE                                      LIBRARY  COMMON    |
 ----------------------------------------------------------------------

                                                              Y N
IS_NULL(S).
-----------------------------------------------------------------------
RETURN('N').
RETURN(NEGATE(IS_NULL(P)));
-----------------------------------------------------------------------
PAGE 112                                   SAVED ON  Apr 15, 1988 BY MGROO

NEW_CONST(TOKEN, TYP, LENGTH, DECIMAL).

 ----------------------------------------------------------------------
| SUMMARY                                                               |
| KEYWORDS:                                                             |
| UNIT      : TRAN                                   LIBRARY  COMMON    |
 ----------------------------------------------------------------------

-----------------------------------------------------------------------
CONSTANTS.INDEX = CONST_INDEX.
CONSTANTS.TYPE = ' '.
CONSTANTS.SYNT = TYP.
CONSTANTS.STRING = TOKEN.
CONSTANTS.LEN = LENGTH.
CONSTANTS.DEC = DECIMAL
CONSTANTS.PTR = 0.
CONSTANTS.REAL_ADDRESS = 0.
INSERT CONSTANTS.
CONST_INDEX = CONST_INDEX + 1
RETURN(CONSTANTS.INDEX).
-----------------------------------------------------------------------
PAGE 113                                   SAVED ON  Jan 27  1989 BY MGROO

NEW_FENTRY(TNAME, FNAME)

 ----------------------------------------------------------------------
| SUMMARY . Insert a new table field entry into the TABLE_REFS table    |
| KEYWORDS.                                                             |
| UNIT      TRAN                                     LIBRARY  COMMON    |
 ----------------------------------------------------------------------

-----------------------------------------------------------------------
TABLE_REFS.INDEX = TABREF_INDEX;
TABLE_REFS.TABLE_NAME = TNAME;
TABLE_REFS.FIELD_NAME = FNAME;
TABLE_REFS.REAL_ADDRESS = 0;
INSERT TABLE_REFS;
TABREF_INDEX = TABREF_INDEX + 1;
RETURN(TABLE_REFS.INDEX);
-----------------------------------------------------------------------
PAGE 114                                   SAVED ON: Aug 30, 1988 BY MGROO
```

```
NEXT_LEVEL(PAREN).

-------------------------------------------------------------------------
| SUMMARY   Return the amount to adjust the current nesting level      |
| KEYWORDS                                                              |
| UNIT      TRAN                                       LIBRARY  COMMON |
-------------------------------------------------------------------------

PAREN '('                                                   N

-------------------------------------------------------------------------

RETURN(1).

RETURN(- 1).

-------------------------------------------------------------------------
PAGE 115
                                           SAVED ON  Aug 30  1988 BY MGROO

NEXT_LEVEL(PAREN)

-------------------------------------------------------------------------
| SUMMARY   Return the amount to adjust the current nesting leve
| KEYWORDS
| UNIT      TRAN                                       LIBRARY  COMMON
-------------------------------------------------------------------------

                        DESCRIPTION

  A right paren decreases the nesting level by one, a left paren increases
  it by one
PAGE 116
                                           SAVED ON  Jul 8, 1988 BY MGROO

NEXT_STATEMENT

-------------------------------------------------------------------------
| SUMMARY   ADVANCE TO THE NEXT STATEMENT'S TOKENS                      |
| KEYWORDS  PARSER, STATEMENT                                           |
| UNIT      TRAN                                       LIBRARY  COMMON |
-------------------------------------------------------------------------

-------------------------------------------------------------------------

CALL CHECK_EXTRA_TOKS.                                          | 1

CURR_STMNT_NUM = CURR_STMNT_NUM + 1.                            | 2

GET ESMAP WHERE STMNT# = CURR_STMNT_NUM & TABLE =               | 3
  CURR_COMPONENT
FORALL ESMAP WHERE STMNT# = CURR_STMNT_NUM & TABLE =            | 4
    CURR_COMPONENT ORDERED ASCENDING ROW
  PARM_VALUE = ESMAP PARM_VALUE.
  END.
GET TOKENS(PARM_VALUE) WHERE INDEX = 1.                         | 5
CALL LOAD_BUFFER                                                | 6
-------------------------------------------------------------------------

ON GETFAIL
  SIGNAL ACTIONS_END.
PAGE 117
                                           SAVED ON  Jul 8, 1988 BY MGROO

NEXT_TOKEN.

-------------------------------------------------------------------------
| SUMMARY
| KEYWORDS
| UNIT      TRAN                                       LIBRARY  COMMON
-------------------------------------------------------------------------

-------------------------------------------------------------------------

GET TOKENS(PARM_VALUE) WHERE INDEX > TOKENS INDEX.              | 1

CALL LOAD_BUFFER.                                               | 2

RETURN(CURR_TOKEN).                                             | 3
-------------------------------------------------------------------------

ON GETFAIL :
  SIGNAL STMNT_END;
PAGE 118
                                          SAVED ON: Apr 15, 1988 BY MGROO

OPT_TABLE_NAME:

-------------------------------------------------------------------------
| SUMMARY : PARSE THE OPTIONAL TABLE NAME FOR AN EXCEPTION HANDLER      |
| KEYWORDS: PARSE, EXCEPTION, HANDLER, TABLE, NAME                      |
| UNIT    : TRAN                                       LIBRARY: COMMON |
-------------------------------------------------------------------------
```

```
PARM(CURR_TOKEN).                                  | Y N N N N
CURR_ISTBLREF:                                     |   Y N N N
- NAME(CURR_TYPE).                                 |     Y N N
TABLE_ILLEGAL.                                     |       Y N
---------------------------------------------------------------
CALL EDIT_MESSAGE(110, 'TABLE' ||
  '''"ON" OR "FORALL" EXCEPTION''').
CALL EDIT_MESSAGE(111, EXCEPTIONS.IDENT)                  1
EXCEPTIONS.TABLENAME : CURR_TOKEN.                          1
EXCEPTIONS.TABLENAME : ''                               1
EXCEPTIONS.TABLEOFFSET : 0.                             2   2
CALL ADVANCE_TOKEN                                          3
---------------------------------------------------------------
PAGE 115
                                     SAVED ON  Jun 16  1989 BY MCROC

PACKED_DECIMAL(REAL, DEC)
LOCAL INTEGER, FRACTION.

---------------------------------------------------------------
| SUMMARY    Convert a real number into a string of digits and a decimal |
| KEYWORDS   PACKED, DECIMAL, REAL                                       |
| UNIT       TRAN                                     LIBRARY  COMMON    |
---------------------------------------------------------------

DEC -: 0                                           | Y N
---------------------------------------------------------------
@TRANS_CONSTS PACKED_NUMBER : REAL.                | 1 1
TOKEN_TEXT : PAD(REAL, DEC  '0', 'R').             | 2
DECIMAL : DEC.                                     | 3
SYNTAX : @TRANS_CONSTS.PACKED_DECIMAL.             | 4 2
DECIMAL : MATCH(REAL,' ').                         |   3
INTEGER : PEEL('0', HEADSTRING(REAL, DECIMAL)).    |   4
FRACTION : TAILSTRING(REAL, DECIMAL);              |   5
TOKEN_TEXT : PEEL(' ', INTEGER) || FRACTION;       |   6


CALL SIGNAL_GREATER(LENGTH(TOKEN_TEXT).            |   7
  @TRANS_CONSTS MAX_PACKED_LEN).                   |
DECIMAL : LENGTH(FRACTION).                        |   8
LENGTH : LENGTH(TOKEN_TEXT) / 2 + 1.               | 5 9
---------------------------------------------------------------
ON OVERFLOW
   CALL FLOATING_POINT(REAL || 'E0').
ON CONVERSION
   CALL EDIT_MESSAGE(122, REAL).
ON GREATER
   CALL FLOATING_POINT(REAL || 'E0').
PAGE 120
                                     SAVED ON: Jun 16, 1989 BY MCROO

PACKED_DECIMAL(REAL, DEC).
LOCAL INTEGER, FRACTION.

---------------------------------------------------------------
| SUMMARY    Convert a real number into a string of digits and a decimal |
| KEYWORDS   PACKED, DECIMAL, REAL                                       |
| UNIT       TRAN                                     LIBRARY  COMMON    |
---------------------------------------------------------------
```

DESCRIPTION

The condition DEC -< 0 is used to determine if the number has been scanned or not. If it has been scanned, DEC:0 and REAL will contain the entire textual representation of the number. If the number has not been scanned, REAL will contain a sequence of non-zero digits and DEC will indicate where the decimal place would be in the sequence (ie 0.0011 would appear as REAL=11 and DEC=4). The PAD is done to ensure that the text of the number has the right number of characters in it.

The assignment of the argument REAL to @TRANS_CONSTS.PACKED_NUMBER converts the sequence of characters in REAL to a packed number.

If the exception CONVERSION is raised, we know that the argument is an ill-formed number (4$, for example).

If the exception OVERFLOW is raised, we know that the number is too large to represent as a packed decimal -- in which case we try to represent it as a floating point number If the resulting string of digits is longer than can be held in a packed decimal, we again try to represent the number as a floating point

```
PAGE 121
                                                SAVED ON  Jul 8, 1988 BY MGROO
PARM(PNAME)

-----------------------------------------------------------------------------
| SUMMARY                                                                   |
| KEYWORDS                                                                  |
| UNIT       TRAN                                        LIBRARY   COMMON   |
-----------------------------------------------------------------------------

                                                          :
----------------------------------------------------------:------------------
GET SYMTAB WHERE KIND = 'PARM' & IDENT = PNAME            : 1
RETURN('Y')                                               : 2
----------------------------------------------------------:------------------
ON GETFAIL
   RETURN('N').
PAGE 122
                                                SAVED ON  Apr 15  1988 BY MGROO
PARM_NAME(ID, TYPE).

-----------------------------------------------------------------------------
| SUMMARY   PARSE A PARM NAME IN THE LIST THAT DEFINES A RULE PARMS         |
| KEYWORDS: PARSE, RULE, PARAMETER, NAME


| UNIT       TRAN                                        LIBRARY   COMMON   |
-----------------------------------------------------------------------------

NAME(TYPE).                                               | Y N
----------------------------------------------------------+------------------
CALL EDIT_MESSAGE(103  ID || ' PARAMETER')                |   1
HEADER.PARMS# = HEADER PARMS# + 1,                        | 1
CALL SYMTAB_DEFINE(ID, 'PARM', HEADER PARMS#, 0).         | 2
CALL MORE_PARMS(NEXT_TOKEN, CURR_TYPE).                   | 3
-----------------------------------------------------------------------------
PAGE 123
                                                SAVED ON  Mar 17  1989 BY MGROO
PARSE_COND_REL.

-----------------------------------------------------------------------------
| SUMMARY    Parse and gen code for a relation in a condition               |
| KEYWORDS   PARSE, GENERATE  CODE, CONDITION, RELATION                     |
| UNIT       TRAN                                        LIBRARY   COMMON   |
-----------------------------------------------------------------------------

EQ_TOKENS(CURR_TOKEN, CURR_TYPE, '=',                     | Y N N N N N N
  @TRANS_CONSTS OPERATOR),                                | Y N N N N N N
EQ_TOKENS(CURR_TOKEN, CURR_TYPE, '¬=',                    |   Y N N N N N
  @TRANS_CONSTS.OPERATOR),                                |   Y N N N N N
EQ_TOKENS(CURR_TOKEN  CURR_TYPE, '<=',                    |     Y N N N N
  @TRANS_CONSTS.OPERATOR);                                |     Y N N N N
EQ_TOKENS(CURR_TOKEN, CURR_TYPE, '>=',                    |       Y N N N
  @TRANS_CONSTS.OPERATOR);                                |       Y N N N
EQ_TOKENS(CURR_TOKEN, CURR_TYPE, '<',                     |         Y N N
  @TRANS_CONSTS.OPERATOR);                                |         Y N N
EQ_TOKENS(CURR_TOKEN, CURR_TYPE, '>',                     |           Y N
  @TRANS_CONSTS.OPERATOR);                                |           Y N
----------------------------------------------------------+------------------
CALL PARSE_NULL_EXPR(NEXT_TOKEN, CURR_TYPE);              | 1 1 1 1 1 1
```

```
CALL GEN_CODE('EQ      ', 0, 0);                          | 2
CALL GEN_CODE('NE      ', 0, 0);                          |   2
CALL GEN_CODE('LE      ', 0, 0);                          |     2
CALL GEN_CODE('GE      ', 0, 0);                          |       2
CALL GEN_CODE('LT      ', 0, 0);                          |         2
CALL GEN_CODE('GT      ', 0, 0);                          |           2
CALL EDIT_MESSAGE(106, CURR_TOKEN);                       |             1
-------------------------------------------------------------------------
PAGE 124
                                        SAVED ON  Mar 17, 1989 BY MGROO

PARSE_COND_REL;

-------------------------------------------------------------------------
| SUMMARY    Parse and gen code for a relation in a condition          |
| KEYWORDS   PARSE, GENERATE, CODE, CONDITION, RELATION                 |
| UNIT       TRAN                                     LIBRARY  COMMON   |
-------------------------------------------------------------------------

                              DESCRIPTION
                              -----------

        <Condition> ::=
              <LogicalValue>
              <Not> <LogicalValue>
              <Null_or_Expr> <Relop> <Null_or_Expr>

        PARSE_COND_REL  handles  the <Relop> <Null_or_Expr> portion
        of the third alternative
```

```
PAGE 125
                                        SAVED ON  Apr 15, 1988 BY MGROO

PARSE_CONDITIONS;

-------------------------------------------------------------------------
| SUMMARY    INITIATE THE TRANSLATION OF ALL CONDITIONS                 |
| KEYWORDS   PARSE, GENERATE, CODE, CONDITION                           |
| UNIT       TRAN                                     LIBRARY  COMMON   |
-------------------------------------------------------------------------

                                                          |
-------------------------------------------------------------------------
CALL NEXT_STATEMENT;                                      | 1
CALL CONDITION;                                           | 2
CALL PARSE_CONDITIONS;                                    | 3
-------------------------------------------------------------------------

ON ACTIONS_END
PAGE 126
                                        SAVED ON  Nov 10, 1988 BY MGROO

PARSE_EXPR(TOKEN, TYP);

-------------------------------------------------------------------------
| SUMMARY    Parse and generate code for an expression                  |
| KEYWORDS                                                              |
| UNIT       TRAN                                     LIBRARY  COMMON   |
-------------------------------------------------------------------------

EQ_TOKENS(TOKEN, TYP, '-', @TRANS_CONSTS.OPERATOR);       | Y N N
EQ_TOKENS(TOKEN, TYP, '+', @TRANS_CONSTS.OPERATOR);       |   Y N
-------------------------------------------------------------------------
CALL EXPR_TERM(NEXT_TOKEN, CURR_TYPE);                    | 1 1
CALL GEN_CODE('UNM     ', 0, 0);                          | 2
CALL EXPR_TERM(TOKEN, TYP);                               |     1
CALL CHECK_MORE_EXPR(CURR_TOKEN, CURR_TYPE);              | 3 2 2
-------------------------------------------------------------------------
PAGE 127
                                        SAVED ON: Mar 17, 1989 BY MGROO

PARSE_FCNCALL(TOKEN, TOKEN2, TYPE2);

-------------------------------------------------------------------------
| SUMMARY : Parse and generate code for a function call.                |
| KEYWORDS: PARSE, GENERATE, CODE, FUNCTION, CALL                       |
| UNIT    : TRAN                                      LIBRARY: COMMON   |
```

```
------------------------------------------------------------------------

EQ_TOKENS(TOKEN2, TYPE2,'(', @TRANS_CONSTS.SPECIAL_CHAR);        | Y N
-----------------------------------------------------------------+------
CALL PARSE_NULL_EXPR(NEXT_TOKEN, CURR_TYPE);                     | 1
CALL GEN_CODE('TEMP        0, 0);                                  2
CALL GEN_CODE('FN       ' MORE_ARGS(CURR_TOKEN, CURR_TYPE          2
  '), 0)
CALL GEN_CODE('FN       ' 0, 0);
CALL ADD_RELOC(INSTRUCTION_PTR - 2                                 4 2
  @TRANS_CONSTS.NAME_REF, SYNTAX_REFERENCE(TOKEN), 0);
------------------------------------------------------------------------
PAGE 128
                                       SAVED ON  Mar 17  1989 BY MGROO

PARSE_FCNCALL(TOKEN, TOKEN2  TYPE2)

------------------------------------------------------------------------
| SUMMARY   Parse and generate code for a function call              |
| KEYWORDS  PARSE, GENERATE  CODE, FUNCTION, CALL                    |
| UNIT      TRAN                                     LIBRARY  COMMON |
------------------------------------------------------------------------

                          DESCRIPTION
                          -----------

      A function call has the following syntax

      <Function Call>   :
          <Ident>
          <Ident> ( <Null_or_Expr> {, <Null_or_Expr> } )

      PARSE_FCNCALL handles the optional argument list
```

```
PAGE 129
                                       SAVED ON  Mar 17, 1989 BY MGROO

PARSE_FIELD_REF(TOKEN, TTYPE).
LOCAL TABLE_NAME, FIELD_NAME.

------------------------------------------------------------------------
| SUMMARY   Parse and generate code for a table field reference      |
| KEYWORDS  PARSE, GENERATE CODE, FIELD REFERENCE                    |
| UNIT      TRAN                                     LIBRARY  COMMON |
------------------------------------------------------------------------

- CURR_ISTBLREF.                                                | Y N N N
EQ_TOKENS(TOKEN, TTYPE, '*', @TRANS_CONSTS.OPERATOR)            |   Y N N
EQ_TOKENS(TOKEN, TTYPE, '.', @TRANS_CONSTS.SPECIAL_CHAR).       |     Y N
----------------------------------------------------------------+--------
CALL EDIT_MESSAGE(102, '');                                     | 1
CALL EDIT_MESSAGE(107, QUOTE('* FIELD REFERENCE')).             |   1
CALL INDIRECT_TREF(NEXT_TOKEN, CURR_TYPE)                       |     1
TABLE_NAME = TOKEN.                                             |       1
CALL ADVANCE_TOKEN.                                             |       2
CALL FIELD_PART(NEXT_TOKEN, CURR_TYPE).                         |       3
RETURN(ADD_FIELDREF(TABLE_NAME, FIELD_NAME)).                   |     2 4
------------------------------------------------------------------------
PAGE 130
                                       SAVED ON: Mar 17, 1989 BY MGROO

PARSE_FIELD_REF(TOKEN, TTYPE);
LOCAL TABLE_NAME, FIELD_NAME;

------------------------------------------------------------------------
| SUMMARY : Parse and generate code for a table.field reference.     |
| KEYWORDS: PARSE, GENERATE CODE, FIELD REFERENCE                    |
| UNIT    : TRAN                                     LIBRARY: COMMON |
------------------------------------------------------------------------

                          DESCRIPTION
                          -----------
```

```
table.field references come in 12 different flavours

1.  T F
2   T (P)
3.  T.(T F)
4.  (P) F
5   (P).(P)
6   (P) (T.F)
7   (T F) F
8   (T F).(P
9   (T F).(T F)

10  T *
11  (P  *
12  (T F) *

T  :  Table  name, F : Field name, (P) : Name in rule parm,
(T F)  :  Name  in field F of table T, * : Fields with same
name (assign by name).
```

```
PAGE 131
                                        SAVED ON  Nov 10, 1988 BY MGROO
PARSE_LOCALS(TOKEN, TYPE);

----------------------------------------------------------------------
| SUMMARY : Parse the definition of a rule's local variables         |
| KEYWORDS: PARSE, LOCAL, VARIABLE                                   |
| UNIT      TRAN                                     LIBRARY  COMMON |
----------------------------------------------------------------------

EQ_TOKENS(TOKEN, TYPE, 'LOCAL',                              | Y N


  @TRANS_CONSTS RESERVED_WORD),                              | Y N
----------------------------------------------------------------------
CALL EDIT_MESSAGE(100, TOKEN || ' LOCAL'),                   |   1
CALL LOCAL_NAME(NEXT_TOKEN, CURR_TYPE),                      | *
----------------------------------------------------------------------
```

```
PAGE 132
                                        SAVED ON  Nov 10, 1988 BY MGROO
PARSE_LOCALS(TOKEN, TYPE);

----------------------------------------------------------------------
| SUMMARY   Parse the definition of a rule's local variables         |
| KEYWORDS  PARSE, LOCAL, VARIABLE                                   |
| UNIT      TRAN                                     LIBRARY  COMMON |
----------------------------------------------------------------------

                          DESCRIPTION
                          -----------

     <LocalList>   : LOCAL <LocalName> { , <LocalName> }.

     PARSE_LOCALS  consumes LOCAL and calls LOCAL_NAME to handle
     the list of locals
```

```
PAGE 133
                                        SAVED ON: Apr 12, 1989 BY MGROO
PARSE_NULL_EXPR(TOKEN, TYPE);

----------------------------------------------------------------------
| SUMMARY : Parse and generate code for an expression or NULL.       |
| KEYWORDS:
```

```
| UNIT     . TRAN                                          LIBRARY  COMMON |
------------------------------------------------------------------------------

EQ_TOKENS(TOKEN, TYPE, 'NULL', @TRANS_CONSTS.RESERVED_WORD  | Y N
  ),                                                        | Y N
------------------------------------------------------------------------------
CALL GEN_CODE('CONST    ', 0, 0),                           | 1
CALL ADD_RELOC(INSTRUCTION_PTR - 2,                         | 2
  @TRANS_CONSTS.CONSTANT_REF, RET_CONST(GENBIN(0, 1))
  @TRANS_CONSTS.BINARY, 2, CURR_DEC), 0),
CALL ADVANCE_TOKEN,                                         | 2
CALL PARSE_EXPR(TOKEN, TYPE);
------------------------------------------------------------------------------
PAGE 134
                                     SAVED ON  Apr 12, 1989 BY MGROO

PARSE_NULL_EXPR(TOKEN, TYPE);

------------------------------------------------------------------------------
| SUMMARY  : Parse and generate code for an expression or NULL
| KEYWORDS
| UNIT     . TRAN                                          LIBRARY  COMMON |
------------------------------------------------------------------------------
```

DESCRIPTION

Some productions allow for either an expression or the keyword NULL. PARSE_NULL_EXPR is called from these places.

```
PAGE 135
                                     SAVED ON  May 26, 1989 BY MGROO

PARSE_NULLFLDREF(TOKEN, TTYPE),
LOCAL IGNORE_VALUE,

------------------------------------------------------------------------------
| SUMMARY    Parse and gen. code for the r.h.s of an assign by name stmnt |
| KEYWORDS   PARSE, GENERATE CODE, FIELD REFERENCE                         |
| UNIT       TRAN                                        LIBRARY  COMMON |
------------------------------------------------------------------------------

EQ_TOKENS(TOKEN, TTYPE, 'NULL                               | Y N
  @TRANS_CONSTS.RESERVED_WORD)                              | Y N
------------------------------------------------------------------------------
CALL GEN_CODE('CONST    ', 0, 0),                           | 1
CALL ADD_RELOC(INSTRUCTION_PTR - 2,                         | 2
  @TRANS_CONSTS.CONSTANT_REF, RET_CONST(GENBIN(0, 1))       |
  @TRANS_CONSTS.BINARY, 2, CURR_DEC), 0),                   |
CALL GEN_CODE('ABN      ', 0, 0),                           | 3
CALL CHECK_EOS(NEXT_TOKEN),                                 | 4
IGNORE_VALUE = PARSE_FIELD_REF(TOKEN, TTYPE),               |   1
CALL EDIT_MESSAGE(102, ''),                                 |   2
------------------------------------------------------------------------------
PAGE 136
                                     SAVED ON: May 26, 1989 BY MGROO

PARSE_NULLFLDREF(TOKEN, TTYPE);
LOCAL IGNORE_VALUE;

------------------------------------------------------------------------------
| SUMMARY  : Parse and gen. code for the r.h.s of an assign by name stmnt |
| KEYWORDS: PARSE, GENERATE CODE, FIELD REFERENCE                          |
| UNIT     : TRAN                                        LIBRARY: COMMON |
------------------------------------------------------------------------------
```

DESCRIPTION

One of the possible right hand sides in an assign by name statement is the keyword NULL. PARSE_NULLFLDREF handles this case directly and calls PARSE_FIELD_REF to handle the other possibilities.

```
PAGE 137
                                              SAVED ON  Mar 17, 1989 BY MCROO
PREFIX_LEN_LEN(LENGTH);

-------------------------------------------------------------------------------
| SUMMARY   Determine the length of the prefix length of a constant           |
| KEYWORDS                                                                    |
| UNIT      TRAN                                          LIBRARY   COMMON    |
-------------------------------------------------------------------------------

LENGTH <= 127                                                    | Y N
-----------------------------------------------------------------+-------------
RETURN(1);                                                       | 1
RETURN(2);                                                       |   1
-------------------------------------------------------------------------------
PAGE 138
                                              SAVED ON  Mar 17, 1989 BY MCROO
PREFIX_LEN_LEN(LENGTH)

-------------------------------------------------------------------------------
| SUMMARY   Determine the length of the prefix length of a constant           |
| KEYWORDS                                                                    |
| UNIT      TRAN                                          LIBRARY   COMMON    |
-------------------------------------------------------------------------------
```

DESCRIPTION

All constant values are preceded by a one or two byte length. One byte lengths are used if the length of the data is <= 127 bytes. Otherwise a two byte length is required.

```
PAGE 139
                                              SAVED ON  Mar 17, 1989 BY MCROO
PREFIX_LEN_VAL(LENGTH, VALUE);

-------------------------------------------------------------------------------
| SUMMARY   Return the value to be stored in a constant's length prefix       |
| KEYWORDS                                                                    |
| UNIT      TRAN                                          LIBRARY   COMMON    |
-------------------------------------------------------------------------------

LENGTH > 127;                                                    | Y N N
VALUE = GENBIN(0, 1);                                            |   Y N
-----------------------------------------------------------------+-------------
RETURN(LENGTH + @TRANS_CONSTS.MAX_2BYTE_BINARY + 1);             | 1
RETURN(0);                                                       |   1
RETURN(LENGTH);                                                  |     1
-------------------------------------------------------------------------------
PAGE 140
                                              SAVED ON: Mar 17, 1989 BY MCROO
PREFIX_LEN_VAL(LENGTH, VALUE);
```

```
-------------------------------------------------------------------------
| SUMMARY    Return the value to be stored in a constant's length prefix |
| KEYWORDS                                                               |
| UNIT     : TRAN                                     LIBRARY  COMMON   |
-------------------------------------------------------------------------
```

DESCRIPTION

```
All constants are preceded by a one or two byte length  If
the  length  of  the  constant  is  > 127 bytes  a two byte
length is used   This length will consist of the high order
bit being on, followed by the actual length in the other 15
bits.

All  other lengths are simply one byte long (since they are
<= 127  the  high order bit will be off)   If the value of
the constant is binary 0, this represents the keyword NULL,
and thus the length is zero
```

```
PAGE 141
                                        SAVED ON  Mar 17, 1985 BY MGROC

RELATIONAL_EXPR(TOKEN, TYP);

-------------------------------------------------------------------------
| SUMMARY    Parse and gen  code for a relational expr  in a condition   |
| KEYWORDS   PARSE, GENERATE, CODE, RELATIONAL, EXPRESSION               |
| UNIT       TRAN                                     LIBRARY  COMMON   |
-------------------------------------------------------------------------

                                                        |
--------------------------------------------------------|----------------
                                                        |
CALL PARSE_NULL_EXPR(TOKEN, TYP);                       | 1
CALL PARSE_COND_REL;                                    | 2
CALL CHECK_EOS(CURR_TOKEN);                             | 3
-------------------------------------------------------------------------
PAGE 142
                                        SAVED ON  Mar 17, 1989 BY MGROD


RELATIONAL_EXPR(TOKEN, TYP);

-------------------------------------------------------------------------
| SUMMARY    Parse and gen  code for a relational expr  in a condition   |
| KEYWORDS   PARSE, GENERATE, CODE, RELATIONAL  EXPRESSION               |
| UNIT       TRAN                                     LIBRARY  COMMON   |
-------------------------------------------------------------------------
```

DESCRIPTION

```
<Condition>   :
      <Logicalvalue>
      <Not> <Logicalvalue> .
      <Null_or_Expr> <Relop> <Null_or_Expr> .

RELATIONAL_EXPR drives the parsing of an entire condition
```

```
PAGE 143
                                        SAVED ON  Feb 28, 1980 BY MLL10

RESOLVE_ACALL(STATEMENT, SEQ_PARM);

-------------------------------------------------------------------------
| SUMMARY  : FILL IN THE DESTINATION OF AN "ACTION CALL"                 |
| KEYWORDS :                                                             |
| UNIT     : TRAN                                     LIBRARY: COMMON   |
-------------------------------------------------------------------------

                                                        |
--------------------------------------------------------|----------------
GET SEQUENCE#(SEQ_PARM) WHERE ROW = FIND_ROW(STATEMENT); | 1
CALL GENERATERULE(SEQUENCE#.ADDR, GENBIN(INSTRUCTION_PTR, | 2
  2), 2);                                               |
```

```
----------------------------------------------------------------------
ON GETFAIL
PAGE 144
                                          SAVED ON: JUL 8, 1988 BY MGROO

RESOLVE_ACALLS(STATEMENT).

----------------------------------------------------------------------
| SUMMARY    INITIATE THE RESOLUTION OF ALL ACTION CALLS                |
| KEYWORDS                                                              |
| UNIT       TRAN                                     LIBRARY  COMMON   |
----------------------------------------------------------------------

----------------------------------------------------------------------
FORALL ESSEO_MAP                                              |
   CALL RESOLVE_ACALL(STATEMENT, ESSEO_MAP PARMVAL).          |
   END.                                                       |
----------------------------------------------------------------------
PAGE 145
                                          SAVED ON  JUL 8, 1988 BY MGROO

RESOLVE_ACALLS(STATEMENT).

----------------------------------------------------------------------
| SUMMARY    INITIATE THE RESOLUTION OF ALL ACTION CALLS                |
| KEYWORDS                                                              |
| UNIT       TRAN                                     LIBRARY  COMMON   |
----------------------------------------------------------------------

                            DESCRIPTION

   WHEN WE TRANSLATE AND GENERATE CODE FOR CONDITIONS, CALLS TO
   EACH ACTION FOR A CONDITION ARE GENERATED - BUT THE DESTINATION
   OF THE CALLS IS NOT KNOWN

   NOW THAT WE ARE ABOUT TO GENERATE CODE FOR AN ACTION WE MUST
   RESOLVE ALL CALLS TO THIS ACTION.  ANY CONDITION WHICH EXECUTES
   THIS ACTION HAS THE DESTINATION OF THE CALL FILLED IN
PAGE 146
                                          SAVED ON  JUL 8, 1988 BY MGROO

RESOLVE_NAME(TOKEN);

----------------------------------------------------------------------
| SUMMARY                                                               |


| KEYWORDS                                                              |
| UNIT       TRAN                                     LIBRARY  COMMON   |
----------------------------------------------------------------------

                                                          | Y N
PARM(TOKEN).                                              |
----------------------------------------------------------------------
CALL GEN_CODE('PARM      ', SYMTAB.REF, 0).               | 1
GET SYMTAB WHERE KIND = 'LOCAL' & IDENT = TOKEN.          |   1
CALL GEN_CODE('FN        ', 0, SYMTAB.REF).               |   2
CALL ADVANCE_TOKEN.                                       | 2 3
----------------------------------------------------------------------
ON GETFAIL
   CALL PARSE_FCNCALL(TOKEN, NEXT_TOKEN, CURR_TYPE).
PAGE 147
                                          SAVED ON  NOV 10, 1988 BY MGROO

GET_CONST(TOKEN, TYPE, LEN, DEC);
LOCAL TOKEN_TEXT, SYNTAX, LENGTH, DECIMAL,

----------------------------------------------------------------------
| SUMMARY    Lookup a literal constant in the CONSTANTS table           |
| KEYWORDS                                                              |
| UNIT       TRAN                                     LIBRARY  COMMON   |
----------------------------------------------------------------------

TYPE = @TRANS_CONSTS.NUMBER,                              | Y N N N
TYPE = @TRANS_CONSTS.QUOTED_STRING,                       |   Y N N
TYPE = @TRANS_CONSTS.IDENTIFIER;                          |     Y N
----------------------------------------------------------------------
CALL CHOOSE_REP(TOKEN, DEC);                              | 1
TOKEN_TEXT = TOKEN;                                       |   1 1 1
SYNTAX = @TRANS_CONSTS.VARIABLE_CHAR;                     |   2
SYNTAX = @TRANS_CONSTS.FIXED_CHAR;                        |     2
SYNTAX = TYPE;                                            |       2
LENGTH = LEN;                                             |   3 3 3
DECIMAL = DEC;                                            |   4 4 4
GET CONSTANTS WHERE STRING = TOKEN_TEXT & SYNT = SYNTAX & | 2 5 5 5
```

```
  LEN = LENGTH & DEC = DECIMAL.
RETURN(CONSTANTS INDEX);                                         |  2 6 6 6
------------------------------------------------------------------------------
ON GETFAIL :
   RETURN(NEW_CONST(TOKEN_TEXT  SYNTAX, LENGTH, DECIMAL)).
```

PAGE 148

SAVED ON Nov 10, 1984 BY MGROC

```
RET_CONST(TOKEN, TYPE, LEN, DEC).
LOCAL TOKEN_TEXT, SYNTAX  LENGTH, DECIMAL.
```

```
------------------------------------------------------------------------------
: SUMMARY   Lookup a literal constant in the CONSTANTS table                 |
: KEYWORDS                                                                   |
. UNIT      TRAN                                          LIBRARY  COMMON    |
------------------------------------------------------------------------------
```

DESCRIPTION

If the constant is not in the table, insert it  Return the primary key which identifies this constant WRITE_CONSTANTS will produce the object code representation of the all the constants once the parsing is complete The scanner type for a token must be converted to the object code syntax which will be used to represent the value

PAGE 148

SAVED ON Nov 10, 1984 BY MGROO

```
RET_LEN(INTEGER);
```

```
------------------------------------------------------------------------------
| SUMMARY : Return the number of bytes needed to store this integer          |
| KEYWORDS: INTEGER, BINARY, NUMBER, BYTES

| UNIT      TRAN                                          LIBRARY  COMMON    |
------------------------------------------------------------------------------

INTEGER > @TRANS_CONSTS.MAX_2BYTE_BINARY.                          |  Y N
------------------------------------------------------------------------------
RETURN(4).                                                         |  *
RETURN(2).                                                         |    *
------------------------------------------------------------------------------
```

PAGE 150

SAVED ON Nov 10, 1984 BY MGROO

```
RET_LEN(INTEGER).
```

```
------------------------------------------------------------------------------
| SUMMARY   Return the number of bytes needed to store this integer          |
| KEYWORDS  INTEGER, BINARY, NUMBER, BYTES                                   |
| UNIT      TRAN                                          LIBRARY  COMMON    |
------------------------------------------------------------------------------
```

DESCRIPTION

Integers are stores as either 2 or 4 byte binary numbers

0      MAX_2BYTE_BINARY  can be represented in two bytes. MAX_2BYTE_BINARY  ..  MAX_4BYTE_BINARY  can be stored in 4 bytes.

The caller must ensure no attempt is made to represent an integer larger than MAX_4BYTE_BINARY as a binary number. Integers passed to RET_LEN must be non-negative.

PAGE 151

SAVED ON: Mar 17, 1988 BY MGROO

```
RHS_ASSIGN(TOKEN, TYP);
```

```
| SUMMARY  : Parse and gen code for the r.h.s of an assignment statement. |
| KEYWORDS : PARSE, GENERATE, CODE, ASSIGNMENT, STATEMENT                 |
| UNIT     : TRAN                                       LIBRARY: COMMON   |

EQ_TOKENS(TOKEN, TYP, ':=' @TRANS_CONSTS.OPERATOR),        | Y N
-----------------------------------------------------------+------------
CALL PARSE_NULL_EXPR(NEXT_TOKEN, CURR_TYPE),               | 1
CALL CHECK_EOS(CURR_TOKEN),                                | 2
CALL EDIT_MESSAGE(100, TOKEN || ' :='),                    |   1
------------------------------------------------------------------------
PAGE 152
                                      SAVED ON, Mar 17, 1989 BY MGROC

RHS_ASSIGN(TOKEN, TYP)

| SUMMARY    Parse and gen code for the r.h.s of an assignment statement |
| KEYWORDS   PARSE, GENERATE  CODE, ASSIGNMENT, STATEMENT                 |
| UNIT       TRAN                                        LIBRARY  COMMON  |
```

DESCRIPTION

```
The syntax for an assignment statement is

<Assignment> ::=
      <AssignTarget> := <Null_or_Expr>;

RHS_ASSIGN handles the := followed by the <Null_or_Expr> and
the ;.
```

```
PAGE 153
                                      SAVED ON  Apr 15, 1988 BY MGROO

SET_CURSOR(ROW, COL),

| SUMMARY    SET THE VARIABLES WHICH MAINTAIN THE CURSOR'S POSITION   |
| KEYWORDS                                                           |
| UNIT       TRAN                                    LIBRARY  COMMON |

                                                           |
-----------------------------------------------------------+------------
CURSOR_ROW := ROW,                                         | 1
CURSOR_COL := COL,                                         | 2
------------------------------------------------------------------------
PAGE 154
                                      SAVED ON  Apr 15, 1988 BY MGROO

SIGNAL_GREATER(X, Y),

| SUMMARY                                                            |
| KEYWORDS                                                           |
| UNIT       STE                                     LIBRARY  COMMON |

X > Y;                                                     | Y N
-----------------------------------------------------------+------------
SIGNAL GREATER;                                            | 1
------------------------------------------------------------------------
PAGE 155
                                      SAVED ON: Apr 15, 1988 BY MGROO

SYMTAB_DEFINE(NAME, KIND, INDEX, REF),

| SUMMARY  : DEFINE AN IDENTIFIER BY INSERTING IT INTO THE SYMBOL TABLE. |
| KEYWORDS : DEFINE, IDENTIFIER, SYMBOL, TABLE                           |
| UNIT     : TRAN                                      LIBRARY: COMMON   |

                                                           |
-----------------------------------------------------------+------------
SYMTAB.IDENT := NAME;                                      | 1
```

```
SYMTAB.KIND = KIND;                                          | 2
SYMTAB.INDEX = INDEX;                                        | 3
SYMTAB.REF = REF;                                            | 4
INSERT SYMTAB;                                               | 5
----------------------------------------------------------------------------
ON INSERTFAIL
   CALL EDIT_MESSAGE(112, NAME)
PAGE 156
                                          SAVED ON  JUL 8, 1988 BY MGROO

SYMTAB_LOOKUP(NAME);

-----------------------------------------------------------------------------
| SUMMARY                                                                   |
| KEYWORDS                                                                  |
| UNIT        TRAN                                      LIBRARY  COMMON     |
-----------------------------------------------------------------------------

-------------------------------------------------------------+---------------
GET SYMTAB WHERE IDENT = NAME;                               | 1
RETURN(SYMTAB.KIND);                                         | 2
-------------------------------------------------------------+---------------
ON GETFAIL
   RETURN('GLOBAL');
PAGE 157
                                          SAVED ON  JUL 8, 1988 BY MGROO

SYMTAB_REFERENCE(NAME);

-----------------------------------------------------------------------------
| SUMMARY                                                                   |
| KEYWORDS                                                                  |
| UNIT        TRAN                                      LIBRARY  COMMON     |
-----------------------------------------------------------------------------

-------------------------------------------------------------+---------------
GET SYMTAB WHERE IDENT = NAME;                               | 1
RETURN(SYMTAB.INDEX);                                        | 2
-------------------------------------------------------------+---------------

ON GETFAIL
   CALL SYMTAB_DEFINE(NAME, 'GLOBAL', GLOBAL_INDEX, 0)
   GLOBAL_INDEX = GLOBAL_INDEX + 1
   RETURN(SYMTAB.INDEX);
PAGE 158
                                          SAVED ON  Apr 15, 1988 BY MGROO

TABLE_ILLEGAL;

-----------------------------------------------------------------------------
| SUMMARY                                                                   |
| KEYWORDS                                                                  |
| UNIT        TRAN                                      LIBRARY  COMMON     |
-----------------------------------------------------------------------------

EXCEPTIONS.IDENT = 'ACCESSFAIL';                             | Y N N N N N N
EXCEPTIONS.IDENT = 'DELETEFAIL';                             |   Y N N N N N
EXCEPTIONS.IDENT = 'GETFAIL';                                |     Y N N N N
EXCEPTIONS.IDENT = 'INSERTFAIL';                             |       Y N N N
EXCEPTIONS.IDENT = 'REPLACEFAIL';                            |         Y N N
EXCEPTIONS.IDENT = 'DEFINITIONFAIL';                         |           Y N
-------------------------------------------------------------+---------------
RETURN('N');                                                 | 1 1 1 1 1 1
RETURN('Y');                                                 |             1
-----------------------------------------------------------------------------
PAGE 159
                                          SAVED ON  Apr 15, 1988 BY MGROO

TEXT_TO_SCREEN(ROW, COL);

-----------------------------------------------------------------------------
| SUMMARY : MAP A TEXT POSITION TO A SCREEN POSITION.                       |
| KEYWORDS: TEXT, SCREEN, POSITION                                          |
| UNIT    : TRAN                                        LIBRARY: COMMON     |
-----------------------------------------------------------------------------

ROW = 2;                                                     | Y N
-------------------------------------------------------------+---------------
CALL SET_CURSOR(ROW, COL + 2);                               | 1
```

```
CALL SET_CURSOR(ROW, COL + 4).                                  |  1
------------------------------------------------------------------------------
PAGE 180
                                            SAVED ON  May 16, 1989 BY MGROO

WRITE_CONSTANT(PREFIX_PTR, CONSTANT, SYNTAX, LENGTH, DECIMAL),
LOCAL LEN_LEN, LEN_VAL, DATA_PTR;

------------------------------------------------------------------------------
| SUMMARY   Write a constant's value in the list of constants               |
| KEYWORDS  GENERATE, CODE, CONSTANT, VALUE                                 |
| UNIT      TRAN                                        LIBRARY  COMMON     |
------------------------------------------------------------------------------

SYNTAX : @TRANS_CONSTS.BINARY.                                  | Y N N N N
SYNTAX : @TRANS_CONSTS.PACKED_DECIMAL.                          |   Y N N N
SYNTAX : @TRANS_CONSTS.FLOATING_POINT:                          |     Y N N
SYNTAX : @TRANS_CONSTS.VARIABLE_CHAR.                           |       Y N
------------------------------------------------------------------------------
LEN_LEN : PREFIX_LEN_LEN(LENGTH).                               | 1 1 1 1 1
LEN_VAL : PREFIX_LEN_VAL(LENGTH, CONSTANT).                     | 2 2 2 2 2
CALL GENERATERULE(PREFIX_PTR, GENBIN(LEN_VAL, LEN_LEN),         | 3 3 3 3 3
  LEN_LEN).
DATA_PTR : PREFIX_PTR + LEN_LEN.                                | 4 4 4 4 4
CALL GENERATERULE(DATA_PTR, GENNULLBIN(CONSTANT, LEN_VAL),      | 5
  LEN_VAL)
CALL GENERATERULE(DATA_PTR, GENPACK(CONSTANT  LENGTH,           |   5
  DECIMAL), LENGTH).
CALL GENERATERULE(DATA_PTR, GENFLOAT(CONSTANT, LENGTH),         |     5
  LENGTH).
CALL GENERATERULE(DATA_PTR, CONSTANT, LENGTH).                  |       5 5
INSTRUCTION_PTR : DATA_PTR + LEN_VAL;                           | 6
INSTRUCTION_PTR : DATA_PTR + LENGTH.                            |   6 6 6 6
------------------------------------------------------------------------------
PAGE 181
                                            SAVED ON  May 18, 1989 BY MGROO


WRITE_CONSTANT(PREFIX_PTR, CONSTANT, SYNTAX, LENGTH, DECIMAL),
LOCAL LEN_LEN, LEN_VAL, DATA_PTR;

------------------------------------------------------------------------------
| SUMMARY   Write a constant's value in the list of constants               |
| KEYWORDS  GENERATE, CODE, CONSTANT, VALUE                                 |
| UNIT      TRAN                                        LIBRARY  COMMON     |
------------------------------------------------------------------------------

                              DESCRIPTION
                              -----------

        Each  constant  is  preceded  by a one or two byte length
        First  generate  the  length  prefix,  then  generate  the
        constant's data.




PAGE 182
                                            SAVED ON  Nov 15, 1988 BY MGROO

WRITE_CONSTANTS;

------------------------------------------------------------------------------
| SUMMARY : Write the list of all constants which appear in the rule.      |
| KEYWORDS: GENERATE, CODE, CONSTANT                                        |
| UNIT    : TRAN                                       LIBRARY: COMMON      |
------------------------------------------------------------------------------

------------------------------------------------------------------------------
HEADER.CONST_OFF = INSTRUCTION_PTR;                             | 1
FORALL CONSTANTS :                                              | 2
   CALL WRITE_DESCRIPTOR(CONSTANTS.TYPE, CONSTANTS.SYNT,        |
```

```
    CONSTANTS.LEN, CONSTANTS DEC),
  CONSTANTS.REAL_ADDRESS = INSTRUCTION_PTR,
  REPLACE CONSTANTS,
  CALL WRITE_CONSTANT(CONSTANTS.REAL_ADDRESS +
    @TRANS_CONSTS.DATA_OFFSET, CONSTANTS.STRING,
    CONSTANTS.SYNT, CONSTANTS.LEN  CONSTANTS.DEC)
  END,
-----------------------------------------------------------------------
PAGE 163
                                        SAVED ON  Nov 15, 1988 BY MGROC

WRITE_CONSTANTS.

-----------------------------------------------------------------------
! SUMMARY   Write the list of all constants which appear in the rule
  KEYWORDS  GENERATE, CODE  CONSTANT
  UNIT      TRAN                                      LIBRARY  COMMON
-----------------------------------------------------------------------
```

DESCRIPTION

```
HEADER CONST_OFF  is  an offset to the start of this list
Each element in the list consists of a descriptor  followed
by the value
```

```
PAGE 164
                                        SAVED ON  Apr 14, 1989 BY MGROO

WRITE_DESCRIPTOR(TYPE, SYNTAX, LENGTH, DECIMAL),

-----------------------------------------------------------------------
| SUMMARY   Write a constant's descriptor
| KEYWORDS  GENERATE, CODE, CONSTANT, DESCRIPTOR
| UNIT      TRAN                                      LIBRARY  COMMON
-----------------------------------------------------------------------

SYNTAX = @TRANS_CONSTS VARIABLE_CHAR,                       | Y N
------------------------------------------------------------------------
CALL GENERATERULE(INSTRUCTION_PTR  TYPE,                    | 1 1
  @TRANS_CONSTS.TYPE_LENGTH),                               |
CALL GENERATERULE(INSTRUCTION_PTR +                         | 2 2
  @TRANS_CONSTS SYNTAX_OFFSET, SYNTAX,                      |
  @TRANS_CONSTS SYNTAX_LENGTH),                             |
CALL GENERATERULE(INSTRUCTION_PTR +                         | 3
  @TRANS_CONSTS LENGTH_OFFSET, GENBIN(LENGTH +              |
  @TRANS_CONSTS LENGTH_LENGTH, @TRANS_CONSTS LENGTH_LENGTH  |
  ), @TRANS_CONSTS LENGTH_LENGTH),                          |
CALL GENERATERULE(INSTRUCTION_PTR +                         |   3
  @TRANS_CONSTS LENGTH_OFFSET  GENBIN(LENGTH,               |
  @TRANS_CONSTS.LENGTH_LENGTH),                             |
  @TRANS_CONSTS.LENGTH_LENGTH),                             |
CALL GENERATERULE(INSTRUCTION_PTR +                         | 4 4
  @TRANS_CONSTS.DECIMAL_OFFSET, GENBIN(DECIMAL,             |
  @TRANS_CONSTS.DECIMAL_LENGTH),                            |
  @TRANS_CONSTS.DECIMAL_LENGTH);                            |
------------------------------------------------------------------------
PAGE 165
                                        SAVED ON  Apr 14, 1989 BY MGROO

WRITE_DESCRIPTOR(TYPE, SYNTAX, LENGTH, DECIMAL):

------------------------------------------------------------------------
| SUMMARY : Write a constant's descriptor.                              |
| KEYWORDS: GENERATE, CODE, CONSTANT, DESCRIPTOR                        |
| UNIT    : TRAN                                      LIBRARY: COMMON   |
------------------------------------------------------------------------
```

DESCRIPTION

*Preceding the value of a constant in the object code is a six byte descriptor. A descriptor contains the following information

```
 ------------------------------
 Type | Syntax : Len | Dec |
 ------------------------------
   1       1      2     2    (Num bytes)
 Type | Syntax | Len | Dec |
 ------------------------------
   1       1      2     2    (Num bytes)
```

```
PAGE 186
                                          SAVED ON: Feb 28, 1989 BY NLL10

WRITE_EXCEPTIONS.

---------------------------------------------------------------------------
| SUMMARY   Write the list of exceptions which are handled in this rule   |
| KEYWORDS  GENERATE CODE, EXCEPTION                                      |
| UNIT      TRAN                                        LIBRARY  COMMON   |
---------------------------------------------------------------------------

-----------------------------------------------------------:---------------

GET EXCEPTIONS.                                            | 1
FORALL EXCEPTIONS WHERE TABLENAME -= ''                    | 2
   CALL GENERATERULE(INSTRUCTION_PTR,                      |
     EXCEPTIONS TABLENAME, @TRANS_CONSTS NAME_LENGTH).     |

   EXCEPTIONS TABLEOFFSET : INSTRUCTION_PTR.               |
   REPLACE EXCEPTIONS,                                     |
   INSTRUCTION_PTR : INSTRUCTION_PTR +                     |
     @TRANS_CONSTS NAME_LENGTH                             |
   END.                                                    |
HEADER.ONCOND_OFF : INSTRUCTION_PTR.                       : 3
FORALL EXCEPTIONS                                          : 4
   CALL GENERATERULE(INSTRUCTION_PTR, EXCEPTIONS IDENT     |
     @TRANS_CONSTS NAME_LENGTH).                           |
   CALL GENERATERULE(INSTRUCTION_PTR +                     |
     @TRANS_CONSTS NAME_LENGTH, GENBIN(                     |
     EXCEPTIONS TABLEOFFSET, 2), 2).                       |
   CALL GENERATERULE(INSTRUCTION_PTR +                     |
     @TRANS_CONSTS NAME_LENGTH + 2  GENBIN(                 |
     EXCEPTIONS OFFSET, 2), 2).                            |
   INSTRUCTION_PTR : INSTRUCTION_PTR + 20.                 |
   END;                                                    |
CALL GENERATERULE(INSTRUCTION_PTR, GENBIN(0, 2), 2).       | 5
INSTRUCTION_PTR : INSTRUCTION_PTR + 2.                     | 6
---------------------------------------------------------------------------

PAGE 187
                                          SAVED ON: Feb 28, 1989 BY NLL10

WRITE_EXCEPTIONS;

---------------------------------------------------------------------------
| SUMMARY : Write the list of exceptions which are handled in this rule.  |
| KEYWORDS: GENERATE CODE, EXCEPTION                                      |
| UNIT    : TRAN                                        LIBRARY: COMMON   |
---------------------------------------------------------------------------

ON GETFAIL :
   HEADER.ONCOND_OFF = 0;
PAGE 188
                                          SAVED ON: Feb 28, 1989 BY NLL10
```

```
WRITE_EXCEPTIONS,

-------------------------------------------------------------------------
| SUMMARY   Write the list of exceptions which are handled in this rule. |
| KEYWORDS  GENERATE CODE, EXCEPTION                                     |
| UNIT      TRAN                                     LIBRARY   COMMON    |
-------------------------------------------------------------------------
```

DESCRIPTION

HEADER.ONCONC_OFF is an offset to the start of this list. Each element in the list consists of a 16 byte exception name followed by a two byte offset to a table name followed by another two byte offset to the code which handles the exception. The list is terminated by a two byte 0.

```
PAGE 169
                                           SAVED ON  Feb 28, 1989 BY NLLIO

WRITE_FIELDREF(TABLE  FIELD):
LOCAL TABLEFIELD_REF  TWO_NAME_LENGTH.

-------------------------------------------------------------------------
| SUMMARY   Generate the appropriate data for a table field reference.  |
| KEYWORDS                                                              |
| UNIT      TRAN                                     LIBRARY   COMMON   |
-------------------------------------------------------------------------

NEITHER_NULL(TABLE, FIELD).                                  | Y N
---------------------------------------------------------------------------
TABLEFIELD_REF : INSTRUCTION_PTR                             | 1
TABLEFIELD_REF : - DATA_AREA;                                |   1


CALL GENERATERULE(INSTRUCTION_PTR, TABLE,                    | 2
  @TRANS_CONSTS NAME_LENGTH),                                |
CALL GENERATERULE(INSTRUCTION_PTR +                          | 3
  @TRANS_CONSTS NAME_LENGTH, FIELD,                          |
  @TRANS_CONSTS NAME_LENGTH),                                |
TWO_NAME_LENGTH : @TRANS_CONSTS NAME_LENGTH * 2.             | 4 2
CALL GENERATERULE(INSTRUCTION_PTR + TWO_NAME_LENGTH,         | 5
  GENBIN(DATA_AREA, 2), 2),                                  |
INSTRUCTION_PTR : INSTRUCTION_PTR + TWO_NAME_LENGTH + 2.     | 6
DATA_AREA : DATA_AREA + 4.                                   | 7
DATA_AREA : DATA_AREA + TWO_NAME_LENGTH + 4.                 |   3
RETURN(TABLEFIELD_REF).                                      | 8 4
---------------------------------------------------------------------------
PAGE 170
                                           SAVED ON  Feb 28, 1989 BY NLLIO

WRITE_FIELDREF(TABLE  FIELD).
LOCAL TABLEFIELD_REF  TWO_NAME_LENGTH

-------------------------------------------------------------------------
| SUMMARY   Generate the appropriate data for a table.field reference   |
| KEYWORDS                                                              |
| UNIT      TRAN                                     LIBRARY   COMMON   |
-------------------------------------------------------------------------
```

DESCRIPTION

If both the table name and the field name appear as direct references in the source code, an entry is made in the table.field name list. This entry is comprised of a 16 byte table name, a 16 byte field name and a two byte offset into the data area. Room for a four byte pointer is also allocated in the data area.

If either (or both) of the table and field names appear as indirect references in the source code, a 36 (16 + 16 + 4) byte space is allocated in the data area. The negated offset to the start of this 36 byte space is returned. When the relocation information is generated, this negative offset will be inserted into the object code. The fact that it is negative indicates that the reference is indirect. At runtime the actual table and field names will be saved in the 32 bytes set aside in the data area.

The room for the 4 byte pointer which is allocated for both the direct and indirect case, will contain the address of the value of the table.field at runtime

```
PAGE 171                                    SAVED ON  Nov 15, 1988 BY MGROO

WRITE_FIELDREFS

--------------------------------------------------------------------------
| SUMMARY   Write the list of table.field refs which appear in this rule |
| KEYWORDS  GENERATE CODE  TABLE.FIELD REFERENCES                        |
| UNIT      TRAN                                        LIBRARY  COMMON  |
--------------------------------------------------------------------------
                                                              |
--------------------------------------------------------------+-----------
HEADER.FIELD_OFF = INSTRUCTION_PTR;                           | 1
FORALL TABLE_REFS                                             | 2
   TABLE_REFS.REAL_ADDRESS = WRITE_FIELDREF(                  |
     TABLE_REFS.TABLE_NAME, TABLE_REFS.FIELD_NAME);           |
   REPLACE TABLE_REFS;                                        |
   END;                                                       |
--------------------------------------------------------------------------
PAGE 172                                    SAVED ON  Nov 15, 1988 BY MGROO

WRITE_FIELDREFS

--------------------------------------------------------------------------
| SUMMARY   Write the list of table field refs which appear in this rule |
| KEYWORDS  GENERATE CODE, TABLE FIELD REFERENCES                        |
| UNIT      TRAN                                        LIBRARY  COMMON  |
--------------------------------------------------------------------------

                          DESCRIPTION
                          -----------

     HEADER.FIELD_OFF is an offset to the start of this list
```

```
PAGE 173                                    SAVED ON: Feb 28, 1989 BY NLLIO

WRITE_GLOBAL(NAME);
LOCAL NAME_REFERENCE;

--------------------------------------------------------------------------
| SUMMARY  : Generate the appropriate data for a global name.           |
| KEYWORDS :                                                             |
| UNIT     : TRAN                                       LIBRARY: COMMON  |
--------------------------------------------------------------------------

HEADSTRING(NAME, 1) = ' ';                                    | Y N
--------------------------------------------------------------+-----------
NAME_REFERENCE = - DATA_AREA;                                 | 1
DATA_AREA = DATA_AREA + @TRANS_CONSTS.NAME_LENGTH + 4;        | 2
```

```
NAME_REFERENCE = INSTRUCTION_PTR;                                      | 1
CALL GENERATERULE(INSTRUCTION_PTR, NAME,                               | 2
  @TRANS_CONSTS.NAME_LENGTH);
CALL GENERATERULE(INSTRUCTION_PTR +                                    | 3
  @TRANS_CONSTS.NAME_LENGTH, GENBIN(DATA_AREA, 2), 2).
INSTRUCTION_PTR = INSTRUCTION_PTR +                                    | 4
  @TRANS_CONSTS.NAME_LENGTH + 2
DATA_AREA = DATA_AREA + 4.                                             | 5
RETURN(NAME_REFERENCE).                                                | 2 6
---------------------------------------------------------------------------
PAGE 174
                                              SAVED ON  Feb 28  1989 BY NLL1C

WRITE_GLOBAL(NAME).
LOCAL NAME_REFERENCE.
---------------------------------------------------------------------------
| SUMMARY    Generate the appropriate data for a global name
| KEYWORDS
| UNIT     : TRAN                                          LIBRARY  COMMON
---------------------------------------------------------------------------
```

DESCRIPTION

If the global name is given directly in the source code an item is added to the global name list. Each item contains a 16 byte name followed by a two byte offset into the rule's data area. Room for a four byte pointer is also allocated in the data area.

If the global name is given indirectly in the source code a 20 (16 + 4) byte space is allocated in the data area. The negated offset of the space reserved in the data area is returned. When the relocation information is written out, this negative offset will be inserted into the object code. The fact that it is negative indicates that this is an indirect reference. At runtime the 16 byte area will be assigned the actual global name.

The room for the four byte pointer which is allocated in either case, will contain the address of the global object (rule or local variable) at runtime.

```
PAGE 175
                                              SAVED ON  Nov 15, 1988 BY MCROO

WRITE_GLOBALS.

---------------------------------------------------------------------------
| SUMMARY  : Write the list of all global symbols appearing in this rule  |
| KEYWORDS : GENERATE CODE, GLOBAL                                        |
| UNIT     : TRAN                                          LIBRARY  COMMON |
---------------------------------------------------------------------------

---------------------------------------------------------------------------
HEADER.NAMES_OFF = INSTRUCTION_PTR;                                    | 1
FORALL SYMTAB WHERE KIND = 'GLOBAL'                                    | 2
   SYMTAB.REF = WRITE_GLOBAL(SYMTAB.IDENT).                            |
   REPLACE SYMTAB;                                                     |
   END;                                                                |
---------------------------------------------------------------------------
PAGE 176
                                              SAVED ON  Nov 15  1988 BY MCROO

WRITE_GLOBALS;

---------------------------------------------------------------------------
| SUMMARY  : Write the list of all global symbols appearing in this rule  |
| KEYWORDS : GENERATE CODE, GLOBAL                                        |
| UNIT     : TRAN                                          LIBRARY  COMMON |
---------------------------------------------------------------------------
```

DESCRIPTION

HEADER.NAMES_OFF is an offset to the start of this list.

```
PAGE 177                                        SAVED ON  Mar 21, 1989 BY MCROO

WRITE_HEADER.

-------------------------------------------------------------------------------
| SUMMARY    Generate the rule's header and cause the rule to be saved        |
  KEYWORDS   GENERATE CODE  RULE HEADER
| UNIT       TRAN                                         LIBRARY  COMMON     |
-------------------------------------------------------------------------------

INSTRUCTION_PTR > @TRANS_CONSTS.MAX_RULE_LENGTH                       | Y N
-------------------------------------------------------------------------------
SIGNAL TOC_BIC.                                                        | 1
@RULESLIBRARY.DATE = JULIAN_DATE.                                      | .
@RULESLIBRARY.TIME = HOUR || MINUTE.                                   | 2
@RULESLIBRARY.RULENAME = HEADER.DVNAME.                                | 3
HEADER.DVLENGTH = INSTRUCTION_PTR - 26.                                | 4
CALL GENERATERULE(26, GENBIN(HEADER.PARMS#, 2), 2).                    | 5
CALL GENERATERULE(30, GENBIN(HEADER.PARMS_OFF, 2), 2).                 | 6
CALL GENERATERULE(32, GENBIN(HEADER.LOCALS#, 2), 2).                   | 7
CALL GENERATERULE(34, GENBIN(HEADER.LOCALS_OFF, 2), 2);                | 8
CALL GENERATERULE(36, GENBIN(HEADER.RULES, 2), 2).                     | 9
CALL GENERATERULE(38, GENBIN(HEADER.ACTION_OFF, 2), 2).                | A
CALL GENERATERULE(40, GENBIN(HEADER.ONCOND_OFF, 2), 2).                | B
CALL GENERATERULE(42, HEADER.DVFUNCT, 1).                              | C
CALL GENERATERULE(43, GENBIN(HEADER.FIELD_OFF, 2), 2).                 | D
CALL GENERATERULE(45, GENBIN(HEADER.CONST_OFF, 2), 2).                 | E
CALL GENERATERULE(47, GENBIN(HEADER.NAMES_OFF, 2), 2);                 | F
CALL GENERATERULE(49, GENBIN(1, 1), 1).                                | G


CALL GENERATERULE(50, GENBIN(DATA_AREA, 2), 2).                        | H
@RULESLIBRARY.RULEBODY = SGETCCHAR(TARGETRULE, 26,                     | I
  INSTRUCTION_PTR - 26).                                               |
REPLACE @RULESLIBRARY(LIBID).                                          | J
-------------------------------------------------------------------------------
ON REPLACEFAIL @RULESLIBRARY
PAGE 178                                        SAVED ON  Mar 21, 1989 BY MCROO

WRITE_HEADER.

-------------------------------------------------------------------------------
| SUMMARY    Generate the rule's header and cause the rule to be saved        |
| KEYWORDS   GENERATE CODE, RULE HEADER                   LIBRARY  COMMON     |
| UNIT       TRAN
-------------------------------------------------------------------------------

   INSERT @RULESLIBRARY(LIBID).
PAGE 179                                        SAVED ON  Mar 21, 1989 BY MCROO

WRITE_HEADER

-------------------------------------------------------------------------------
| SUMMARY    Generate the rule's header and cause the rule to be saved        |
| KEYWORDS   GENERATE CODE. RULE HEADER                   LIBRARY  COMMON     |
| UNIT       TRAN
-------------------------------------------------------------------------------
```

DESCRIPTION

The rule header looks as follows:

| Offset | Contents | Length |
|---|---|---|
| 0 | Rule Name | 16 |
| 16 | Date Translated | 6 |
| 22 | Time Translated | 4 |
| 26 | Rule Length | 2 |
| 28 | Num. Parms | 2 |
| 30 | Parm Offset | 2 |
| 32 | Num. Locals | 2 |
| 34 | Local Offset | 2 |
| 36 | Condition Offset | 2 |

```
38      Action Offset           2
40      Exception Offset        2
42      Function (Y/N)          1
43      T F Offset              2
45      Const Offset            2
47      Global Offset           2
49      Object code version     1
50      Data area length        2
```

```
PAGE 180
                                         SAVED ON: Mar 21, 1989 BY MGROO

WRITE_RELOC(REFADDR, REFTYPE, INDEX, OFFSET).
LOCAL OBJADDR.
-------------------------------------------------------------------------
| SUMMARY   Resolve a specific dummy reference to a data object          |
| KEYWORDS  GENERATE CODE, RELOCATION                                    |
| UNIT      TRAN                                      LIBRARY. COMMON    |
-------------------------------------------------------------------------

                                                   |
REFTYPE = @TRANS_CONSTS.CONSTANT_REF               | Y N N N N
REFTYPE = @TRANS_CONSTS.NAME_REF.                  |   Y N N N
REFTYPE = @TRANS_CONSTS.TABLEFIELD_REF.            |     Y N N
REFTYPE = @TRANS_CONSTS.TAMSTRING_REF.             |       Y N
---------------------------------------------------+---------------
GET CONSTANTS WHERE INDEX = INDEX.                 | 1       1
GET SYMTAB WHERE INDEX = INDEX & KIND = 'GLOBAL'.  |   1
GET TABLE_REFS WHERE INDEX = INDEX.                |     1
OBJADDR = CONSTANTS.REAL_ADDRESS.                  | 2
OBJADDR = SYMTAB.REF;                              |   2


OBJADDR = TABLE_REFS.REAL_ADDRESS.                 |     2
OBJADDR = OFFSET + PREFIX_LEN_LEN(CONSTANTS LEN).  |       2
CALL GENERATERULE(REFADDR, GENBIN(OBJADDR, 2), 2). | 3 3 3 3
CALL EDIT_MESSAGE(305, REFTYPE || ' RELOCATION').  |         1
-------------------------------------------------------------------------
PAGE 181
                                         SAVED ON: Nov 15, 1988 BY MGROO

WRITE_RELOCATION:
-------------------------------------------------------------------------
| SUMMARY   Resolve all dummy data references in the object code        |
| KEYWORDS  GENERATE CODE, RELOCATION                                    |
| UNIT      TRAN                                      LIBRARY  COMMON    |
-------------------------------------------------------------------------

                                                   |
---------------------------------------------------+---------------------
FORALL RELOCATION                                  | 1
   CALL WRITE_RELOC(RELOCATION OCCUR_ADDR,         |
     RELOCATION TYPE, RELOCATION TABLE_INDEX       |
     RELOCATION OFFSET)                            |
   END.                                            |
-------------------------------------------------------------------------
PAGE 182
                                         SAVED ON  Nov 15, 1988 BY MGROO

WRITE_RELOCATION.
-------------------------------------------------------------------------
| SUMMARY : Resolve all dummy data references in the object code         |
| KEYWORDS: GENERATE CODE, RELOCATION                                    |
| UNIT    : TRAN                                      LIBRARY: COMMON    |
-------------------------------------------------------------------------
```

DESCRIPTION

During the generation of the object code, dummy references to various data objects (namely constants, globals names, table.fields and TAM strings) have been made. This is necessary because these data objects are not allocated until all the object code statements have been generated. Once the data objects have been allocated, it is necessary to "resolve" all the dummy references.

```
PAGE 163
                                        SAVED ON  Jul 6, 1988 BY MGROO

MESSAGE(UTILITY, NUM, TEXT);

------------------------------------------------------------------------
  SUMMARY    RETURN A "CUSTOMIZED" MESSAGE FROM THE MESSAGES TABLE
  KEYWORDS   MESSAGE, WARNING, ERROR  INFORMATIVE
  UNIT       UTIL                                     LIBRARY  COMMON
------------------------------------------------------------------------


------------------------------------------------------------------------
                                                              :
GET MESSAGES(UTILITY) WHERE MESSAGE_NUM = NUM;                : 1
RETURN(SEARCH_REPLACE(MESSAGES.MESSAGE, '@', TEXT, ''));      : 2
------------------------------------------------------------------------

ON GETFAIL MESSAGES
   MESSAGES.MESSAGE_NUM = NUM;
   MESSAGES.HIGHLIGHT = 'N';
   MESSAGES.MESSAGE = 'MESSAGE NUMBER ' || NUM || ' FOR ' || UTILITY ||
     ' DOES NOT EXIST.';
   RETURN(MESSAGES.MESSAGE);
PAGE 184
                                        SAVED ON  Apr 21, 1989 BY JETIO

MIN(X, Y);

------------------------------------------------------------------------
| SUMMARY    Compare two values and return the smaller                 |
| KEYWORDS   MINIMUM, COMPARE, LESS


| UNIT       UTIL                                     LIBRARY  COMMON  |
------------------------------------------------------------------------

                                                              |
X < Y;                                                        | Y N
------------------------------------------------------------------------
RETURN(X);                                                    | 1
RETURN(Y);                                                    |   1
------------------------------------------------------------------------
PAGE 185
                                        SAVED ON  Apr 21, 1989 BY JETIO

MIN(X, Y);

------------------------------------------------------------------------
| SUMMARY    Compare two values and return the smaller                 |
| KEYWORDS   MINIMUM, COMPARE, LESS                                    |
| UNIT       UTIL                                     LIBRARY  COMMON  |
------------------------------------------------------------------------
```

DESCRIPTION

This rule simply returns the smaller of two given values

```
PAGE 186
                                        SAVED ON: Sep 8, 1988 BY MGROO
QUOTE(STRING);
```

```
SUMMARY   Return the argument STRING enclosed in quotes
KEYWORDS  QUOTE, STRING
UNIT      UTIL                                          LIBRARY  COMMON
```

```
RETURN(''' || QUOTE2(STRING, MATCH(STRING, ''''), || '''
  )
```

PAGE 187

SAVED ON Sep 2, 1982 BY MGROC

```
QUOTE(STRING);

SUMMARY   Return the argument STRING enclosed in quotes
KEYWORDS  QUOTE, STRING
UNIT      UTIL                                          LIBRARY  COMMON
```

DESCRIPTION

```
  The rule QUOTE returns STRING properly enclosed in quotes
  If STRING itself contains quotes these are doubled up.  For example

    RETURN ('a') returns a string which contains the single character a
    RETURN (QUOTE('a')) returns a three character string 'a'
    RETURN (QUOTE('pfkeys(''ste'')')) returns 17 characters 'pfkeys(''ste

  Remember, '''a''' = QUOTE('a') = ''''||'a'||''''
```

PAGE 188

SAVED ON Apr 15 1988 BY MGROC

```
WRITELN(VALUE);

SUMMARY   PRINT A MESSAGE IF DEBUGGING IS ON
KEYWORDS  DEBUG, MESSAGE
UNIT      UTIL                                          LIBRARY  COMMON

ESDVE_VARS.DEBUG;                                  | Y N
---------------------------------------------------+------------

CALL MSGLOG(VALUE)                                 | 1
----------------------------------------------------------------
```

ON UNASSIGNED
PAGE 189

SCREEN DEFINITIONS LISTINGS

THESE SCREEN DEFINITIONS ARE USED IN THE RULE PROGRAM TRANSLATE

PAGE 190

PRINTED BY BATCH ON September 01, 1989.

TABLE DEFINITION LISTINGS

THESE TABLE DEFINITION ARE USED IN THE RULE PROGRAM TRANSLATE

```
                                        PRINTED BY BATCH ON September 01  1995
PAGE 191
ABLE DEFINITION FOR  @INDIRECT_REFS

------------------------------ @INDIRECT_REFS ------------------------------
 SUMMARY :
 UNIT     : EDR
 KEYWORDS:

---------------------------------------------------------------------------

  Table: @INDIRECT_REFS              Type  TEM

  Parameter Name  Type Syntax Length Decimal



 ----------------     -      -      ---    ---

    Field Name     Type Syntax Length Decimal  Key Ord Req      Default
 ----------------    -      -    ----    ---     -   -   -   ---------------
 INDEX               C      B      2      0      *
 REFERENCE           C      B      2      0
 IR1_INSTRUCTION     S      C      8      0
 IR1                 C      B      2      0
 IR2_INSTRUCTION     S      C      8      0
 IR2                 C      B      2      0

    Event Rule    Type Access
 ----------------   -     -
PAGE 192
ABLE DEFINITION FOR  @RULESLIBRARY

------------------------------ @RULESLIBRARY ------------------------------
 SUMMARY :
 UNIT     : OIC
 KEYWORDS:

---------------------------------------------------------------------------

  Table. @RULESLIBRARY               Type  OBJ

  Parameter Name  Type Syntax Length Decimal
 ----------------   -      -     ---    ---
 LIBRARY            S      C      8      0

    Field Name     Type Syntax  Length Decimal Key Req      Default
 ----------------    -      -     ----    ---    -   -   ---------------
 RULENAME            S      C      16      0     P   Y
 DATE                S      C       6      0         Y
 TIME                S      C       4      0         Y
 RULEBODY            S      V     2200     0         Y
PAGE 193
ABLE DEFINITION FOR: BNF

----------------------------------- BNF -----------------------------------
 SUMMARY :
 UNIT     : EDR
 KEYWORDS:

---------------------------------------------------------------------------

  Table: BNF                         Type: TDS                     IDgen: N

  Parameter Name  Type Syntax Length Decimal
 ----------------   -      -     ---    ---
 STATEMENT          S      C      16     0
```

| Field Name | Type | Syntax | Length | Decimal | Key | Ord | Rqd | Default |
|---|---|---|---|---|---|---|---|---|
| ORDER | C | B | 2 | 0 | P | | N | |
| RULE_NAME | I | C | 16 | 0 | | | N | |

| Event Rule | Type | Access |
|---|---|---|

PAGE 194
ABLE DEFINITION FOR CONSTANTS

CONSTANTS

SUMMARY
UNIT EDR
KEYWORDS

Table. CONSTANTS Type TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| INDEX | | B | 4 | 0 | P | | N | |
| TYPE | S | C | 1 | 0 | | | N | |
| SYNT | S | C | 1 | 0 | | | N | |
| STRING | S | V | 150 | 0 | | | N | |
| LEN | C | P | 2 | 0 | | | N | |
| DEC | C | E | 2 | 0 | | | N | |
| PTR | | B | 4 | 0 | | | N | |
| REAL_ADDRESS | | B | 4 | 0 | | | N | |

| Event Rule | Type | Access |
|---|---|---|

PAGE 195
ABLE DEFINITION FOR ESATTRIBUTES

ESATTRIBUTES

SUMMARY
UNIT EDR
KEYWORDS

Table: ESATTRIBUTES Type TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| POSITION | C | B | 4 | 0 | P | | | |
| PROTECTION | S | V | 3 | 0 | | | | |
| INTENSITY | S | V | 3 | 0 | | | | |
| NUMERIC | S | V | 3 | 0 | | | | |

| Event Rule | Type | Access |
|---|---|---|

PAGE 196
ABLE DEFINITION FOR ESMAP

ESMAP

SUMMARY
UNIT EDR
KEYWORDS

Table: ESMAP Type TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| INDEX | | B | 2 | 0 | P | | | |
| ROW | C | B | 2 | 0 | | | | |
| COLUMN | C | B | 2 | 0 | | | | |
| TABLE | S | V | 18 | 0 | | | | |
| STMNT# | C | B | 2 | 0 | | | | |
| PARM_VALUE | C | B | 2 | 0 | | | | |
| TEXT | S | V | 134 | 0 | | | | |
| LINE_STATUS | S | V | 3 | 0 | | | | |
| FORALL_MEMBER | S | V | 3 | 0 | | | | |
| TERMINATOR | L | C | 1 | 0 | | | | |
| START | L | C | 1 | 0 | | | | |

| Event Rule | Type | Access |
|---|---|---|

PAGE 197
ABLE DEFINITION FOR: ESSEQ_MAP

ESSEQ_MAP

SUMMARY :
UNIT : EDR
KEYWORDS:

Table: ESSEQ_MAP Type: TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| COND# | C | B | 2 | 0 | P | | | |
| PARMVAL | C | B | 2 | 0 | | | | |
| ALTERED | L | C | 1 | 0 | | | | |

| Event Rule | Type | Access |
|---|---|---|

PAGE 198
ABLE DEFINITION FOR EXCEPTIONS

EXCEPTIONS

SUMMARY
UNIT EDR
KEYWORDS

Table EXCEPTIONS Type TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| EX_NUM | C | B | 2 | 0 | P | | | |
| IDENT | S | V | 16 | 0 | | | | |
| FORALL# | C | B | 2 | 0 | | | | |
| OFFSET | C | B | 2 | 0 | | | | |
| TABLENAME | S | V | 18 | 0 | | | | |
| TABLEOFFSET | C | B | 2 | 0 | | | | |

| Event Rule | Type | Access |
|---|---|---|

PAGE 199
ABLE DEFINITION FOR LONG_STRINGS

LONG_STRINGS

SUMMARY
UNIT EDR
KEYWORDS

Table LONG_STRINGS Type TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| INDEX | | B | 4 | 0 | P | | N | |
| STRING | S | V | 128 | 0 | | | N | |
| LEN | C | B | 4 | 0 | | | N | |
| TYPE | S | C | 1 | 0 | | | N | |

| Event Rule | Type | Access |
|---|---|---|

PAGE 200
ABLE DEFINITION FOR LOOP_STACK

LOOP_STACK

SUMMARY
UNIT EDR
KEYWORDS

Table LOOP_STACK Type TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| INDEX | C | B | 2 | 0 | P | | | |
| START | C | B | 2 | 0 | | | | |
| END | C | B | 2 | 0 | | | | |
| NUM | C | B | 2 | 0 | | | | |
| KIND | I | V | 7 | 0 | | | | |

| Event Rule | Type | Access |
|---|---|---|

PAGE 201
ABLE DEFINITION FOR: RELOCATION

RELOCATION

SUMMARY :
UNIT : EDR
KEYWORDS:

Table: RELOCATION Type: TEM

| Parameter Name | Type | Syntax | Length | Decimal |
|---|---|---|---|---|

| Field Name | Type | Syntax | Length | Decimal | Key | Ord | Req | Default |
|---|---|---|---|---|---|---|---|---|
| OCCUR_ADDR | | B | 4 | 0 | P | | N | |
| TYPE | S | C | 1 | 0 | | | N | |
| TABLE_INDEX | C | B | 2 | 0 | | | N | |
| OFFSET | C | B | 2 | 0 | | | N | |

Event Rule Type Access

PAGE 202
ABLE DEFINITION FOR SEQUENCE#

------------------------------- SEQUENCE# -------------------------------

SUMMARY
UNIT EDR
KEYWORDS

Table SEQUENCE# Type TEM

| Parameter Name | Type | Syntax | Length | Decimal |
|---|---|---|---|---|
| COND# | | B | 2 | 0 |

| Field Name | Type | Syntax | Length | Decimal | Key | Ord | Req | Default |
|---|---|---|---|---|---|---|---|---|
| ROW | | B | 2 | 0 | P | | | |
| SEQ# | C | B | 2 | 0 | | | | |
| STMNT# | C | B | 2 | 0 | | | | |
| ADDR | C | B | 2 | 0 | | | | |
| OFFSET | C | B | 2 | 0 | | | | |
| HIGHLIGHTED | L | C | 1 | 0 | | | | |

Event Rule Type Access

PAGE 203
ABLE DEFINITION FOR SYMTAB

------------------------------- SYMTAB -------------------------------

SUMMARY
UNIT EDR
KEYWORDS

Table SYMTAB Type TEM

Parameter Name Type Syntax Length Decimal

| Field Name | Type | Syntax | Length | Decimal | Key | Ord | Req | Default |
|---|---|---|---|---|---|---|---|---|
| IDENT | I | V | 18 | 0 | P | | | |
| KIND | S | C | 1 | 0 | | | | |
| REF | C | B | 2 | 0 | | | | |
| INDEX | C | B | 2 | 0 | | | | |

Event Rule Type Access

PAGE 204
ABLE DEFINITION FOR SYSSOPCODES

------------------------------- SYSSOPCODES -------------------------------

SUMMARY
UNIT EDR
KEYWORDS

Table SYSSOPCODES Type TDS IDgen: N

Parameter Name Type Syntax Length Decimal

| Field Name | Type | Syntax | Length | Decimal | Key | Ord | Req | Default |
|---|---|---|---|---|---|---|---|---|
| OPCODE | I | B | 2 | 0 | P | | | |
| NAME | S | C | 8 | 0 | | | | |
| SYMBOL | S | C | 16 | 0 | | | | |
| DET_TYPE | S | C | 1 | 0 | | | | |
| LEN | C | B | 2 | 0 | | | | |
| TOKEN_TYPE | S | C | 1 | 0 | | | | |
| FUNCTION | I | C | 16 | 0 | | | | |
| OPERAND | C | B | 2 | 0 | | | | |
| PRECEDENCE | C | B | 2 | 0 | | | | |
| XRF_SUB | I | C | 16 | 0 | | | | |
| FINAL_OP | L | C | 1 | 0 | | | | |

Event Rule Type Access

PAGE 205
ABLE DEFINITION FOR: TABLE_REFS

------------------------------- TABLE_REFS -------------------------------

SUMMARY :
UNIT : EDR
KEYWORDS:

Table: TABLE_REFS Type: TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| INDEX | | B | 4 | 0 | P | | N | |
| TABLE_NAME | S | C | 16 | 0 | | | N | |
| FIELD_NAME | S | C | 16 | 0 | | | N | |
| REAL_ADDRESS | | B | 4 | 0 | | | N | |

| Event Rule | Type | Access |
|---|---|---|

PAGE 206

ABLE DEFINITION FOR TOKENS

------------------------------- TOKENS -------------------------------

SUMMARY

UNIT EDR

KEYWORDS

Table TOKENS Type TEM

| Parameter Name | Type | Syntax | Length | Decimal |
|---|---|---|---|---|
| STMNT_SLOT | C | B | 2 | 0 |

| Field Name | Type | Syntax | Length | Decimal | Key | Ord | Rqd | Default |
|---|---|---|---|---|---|---|---|---|
| INDEX | | E | 2 | 0 | P | | | |
| STRING | S | V | 12 | C | | | | |
| LEN | C | B | 2 | 0 | | | | |
| TYPE | S | C | 1 | 0 | | | | 0 |
| DEC | C | B | 2 | 0 | | | | |
| TABREF_MARK | L | C | 1 | 0 | | | | |

| Event Rule | Type | Access |
|---|---|---|

PAGE 207

CROSS REFERENCE LISTING

OBJECTS CROSS REFERENCED FOR THE BASE RULE

TRANSLATE

PRINTED BY BATCH ON September 01, 1989

Y/N ***** SECTION OPTIONS *****:

- Y PRINT BASE & DESCENDENT RULES
- Y RULE CROSS REFERENCE
- Y LOCAL DECLARATION
- Y LOCAL CROSS REFERENCE
- Y SIGNAL CROSS REFERENCE
- Y EXCEPTION HANDLER
- Y SCREEN DEFINITIONS
- Y SCREEN CROSS REFERENCE
- Y TABLE DEFINITION
- Y TABLE CROSS REFERENCE
- Y PRINT ENTRY & VALIDATION RULES
- Y VALIDATION RULE CROSS REFERENCE
- Y LIST OF UNRESOLVED NAMES
- Y LIST ENTRY & VALIDATION RULES
- Y RULE CALLING STRUCTURE

PAGE 208

LIST OF UNRESOLVED NAMES.

| | |
|---|---|
| MSG | PARM_VALUE |
| VERT_SCROLL | |

PAGE 209

LIST ENTRY & VALIDATION RULES:

| | |
|---|---|
| MESSAGE | MIN |
| QUOTE | WRITELN |

PAGE 210

| ULE NAME | CALLED BY THE FOLLOWING RULES: |
|---|---|
| GETCCHAR | WRITE_HEADER |

| | | | | |
|---|---|---|---|---|
| INFIELD | GENERATERULE | | | |
| CTION | DO_ACTIONS | EXCEPT_ACTIONS | | |
| CTIONS | TRANSLATE | | | |
| DD_ATTR | HILITE_LINE | | | |
| DC_FIELDREF | INDIRECT_FREF | INDIRECT_TREF | PARSE_FIELD_REF | |
| DD_RELOC | ASSIGNMENT<br>PARSE_FCNCALL | EXPR_ITEM<br>PARSE_NULL_EXPR | GEN_CREF<br>PARSE_NULLFLDREF | LOGICAL_VALUE |
| DVANCE_TOKEN | CHECK_R_PAREN<br>FIELD_PART<br>OPT_TABLE_NAME | EXCEPT_NAME<br>INDIRECT_FREF<br>PARSE_FIELD_REF | EXCEPT_ON<br>INDIRECT_TREF<br>PARSE_NULL_EXPR | EXPR_ITEM<br>MORE_ARGS<br>RESOLVE_NAME |
| SSIGN_BY_NAME | ASSIGNMENT | | | |
| SSIGNMENT | DO_ACTIONS | EXCEPT_ACTIONS | | |
| INARY | CHOOSE_REF | | | |
| YNAME_FIELD | FIELD_PART | | | |

ALC_OFFSET CALC_OFFSET GEN_PARM

HECK_ASSIGNTARG ASSIGNMENT

HECK_COLON EXCEPT_NAME

HECK_ENDS ACTIONS EXCEPTIONS

```
HECK_EOS        ASSIGN_BY_NAME   LOGICAL_VALUE    NAME_AND_PARMS   PARSE_NULLFLDREF
                RELATIONAL_EXPR  RHS_ASSIGN
```

```
HECK_EXTRA_TOKS LOCALS           NEXT_STATEMENT
```

HECK_MORE_EXPR CHECK_MORE_EXPR PARSE_EXPR

HECK_MORE_TERM CHECK_MORE_TERM EXPR_TERM

HECK_PARMS NAME_AND_PARMS

HECK_R_PAREN CHECK_PARMS EXPR_ITEM

HK_MORE_FACTOR EXPR_FACTOR

MOOSE_REP RET_CONST

LEAR_TTABLES INIT_TRANSLATOR

ONDITION PARSE_CONDITIONS

ULE NAME CALLED BY THE FOLLOWING RULES·

ONDITIONS TRANSLATE

ONSTANT EXPR_ITEM

```
O_ACTIONS         ACTIONS           DO_ACTIONS

OIT_MESSAGE       ACTION            ADD_RELOC          ASSIGN_BY_NAME    ASSIGNMENT
                  BINARY            CHECK_ASSIGNTARG   CHECK_COLON       CHECK_ENDS
                  CHECK_EOS         CHECK_EXTRA_TOKS   CHECK_R_PAREN     CONDITION
                  EXCEPT_NAME       EXCEPT_ON          EXCEPTION         EXPR_ITEM
                  FLOATING_POINT    FOR_RESTRICT       GEN_CODE          HEADER
                  INDIRECT_FREF     INDIRECT_TREF      IR_POP            LOCAL_NAME
                  LOCALS            LOGICAL_VALUE      MORE_ARGS         MORE_LOCALS
                  NAME_AND_PARMS    OPT_TABLE_NAME     PACKED_DECIMAL    PARM_NAME
                  PARSE_COND_REL    PARSE_FIELD_REF    PARSE_LOCALS      PARSE_NULLFLOREF
                  RHS_ASSIGN        SYMTAB_DEFINE      WRITE_RELOC

O_TOKENS          ASSIGN_BY_NAME    CHECK_COLON        CHECK_EOS         CHECK_MORE_EXPR
                  CHECK_MORE_TERM   CHECK_PARMS        CHECK_R_PAREN     CHK_MORE_FACTOR
                  CONDITION         EXCEPT_ACTIONS     EXCEPT_ON         EXPR_ITEM
                  FIELD_PART        FOR_RESTRICT       INDIRECT_FREF     INDIRECT_TREF
                  MORE_ARGS         MORE_LOCALS        MORE_PARMS        PARSE_COND_REL
                  PARSE_EXPR        PARSE_FCNCALL      PARSE_FIELD_REF   PARSE_LOCALS
                  PARSE_NULL_EXPR   PARSE_NULLFLOREF   RHS_ASSIGN

XCEPT_ACTIONS     EXCEPT_ACTIONS    EXCEPTION

XCEPT_NAME        EXCEPT_ON

XCEPT_ON          EXCEPTION

XCEPTION          EXCEPTION         EXCEPTIONS

XCEPTIONS         TRANSLATE

XPR_FACTOR        CHECK_MORE_TERM   EXPR_TERM

XPR_ITEM          CHK_MORE_FACTOR   EXPR_FACTOR

XPR_TERM          CHECK_MORE_EXPR   PARSE_EXPR

IELD_PART         INDIRECT_TREF     PARSE_FIELD_REF

IND_ROW           RESOLVE_ACALL

INI_TRANSLATOR    TRANSLATE

LOATING_POINT     CHOOSE_REP        PACKED_DECIMAL

OCUS_ON_TARGET    EDIT_MESSAGE

OR_RESTRICT       ACTION

EN_ARETURN        DO_ACTIONS

EN_CODE           ACTIONS           ASSIGN_BY_NAME   ASSIGNMENT        CHECK_MORE_EXPR
PAGE 212

ULE NAME          CALLED BY THE FOLLOWING RULES
```

```
                  CHECK_MORE_TERM   CHK_MORE_FACTOR   CONDITION         CONDITIONS
                  EXCEPT_NAME       EXCEPTIONS        EXPR_ITEM         GEN_ARETURN
                  GEN_IREF          ISSUE_ACALLS      LOGICAL_VALUE     MORE_ARGS
                  PARSE_COND_REL    PARSE_EXPR        PARSE_FCNCALL     PARSE_NULL_EXPR
                  PARSE_NULLFLOREF  RESOLVE_NAME

EN_CODE2          GEN_CODE

EN_INDIRECTREF    ASSIGN_BY_NAME    ASSIGNMENT        EXPR_ITEM         LOGICAL_VALUE

EN_IREF           GEN_INDIRECTREF

EN_LOCAL          HEADER

EN_PARM           HEADER

ENBIN             CONDITION         GEN_CODE2         GEN_LOCAL         GENNULLBIN
                  INIT_TRANSLATOR   PARSE_NULL_EXPR   PARSE_NULLFLOREF  PREFIX_LEN_VAL
                  RESOLVE_ACALL     WRITE_CONSTANT    WRITE_DESCRIPTOR  WRITE_EXCEPTIONS
                  WRITE_FIELDREF    WRITE_GLOBAL      WRITE_HEADER      WRITE_RELOC

ENERATERULE       CONDITION         GEN_CODE2         GEN_LOCAL         GEN_PARM
                  RESOLVE_ACALL     WRITE_CONSTANT    WRITE_DESCRIPTOR  WRITE_EXCEPTIONS
                  WRITE_FIELDREF    WRITE_GLOBAL      WRITE_HEADER      WRITE_RELOC

ENFLOAT           WRITE_CONSTANT

ENNULLBIN         WRITE_CONSTANT

ENPACK            WRITE_CONSTANT

EADER             TRANSLATE

EADSTRING         PACKED_DECIMAL    WRITE_GLOBAL

ILITE_LINE        EDIT_MESSAGE      HILITE_LINES

ILITE_LINES       EDIT_MESSAGE

OUR               WRITE_HEADER

ND_TABLENAME      INDIRECT_FREF

NDIRECT_FREF      FIELD_PART

NDIRECT_TREF      PARSE_FIELD_REF

NIT_TRANSLATOR    TRANSLATE

R_POP             ASSIGN_BY_NAME    ASSIGNMENT        EXPR_ITEM         LOGICAL_VALUE

R_PUSH            ASSIGN_BY_NAME    ASSIGNMENT        EXPR_ITEM         LOGICAL_VALUE

S_NULL            NEITHER_NULL

SSUE_ACALLS       CONDITION         CONDITIONS

ULIAN_DATE        WRITE_HEADER
```

```
PAGE 213
ULE NAME           CALLED BY THE FOLLOWING RULES
___________

ENGTH              BYNAME_FIELD       FIELD_PART         INC_TABLENAME

IBID               WRITE_HEADER

OAD_BUFFER         ADVANCE_TOKEN      HEADER             LOCALS             NEXT_STATEMENT
                   NEXT_TOKEN

OCAL_NAME          MORE_LOCALS        PARSE_LOCALS

OCALS              HEADER

OGICAL_VALUE       CONDITION          LOOKAHEAD_EXPR

OOKAHEAD_EOS       LOOKAHEAD_EXPR

OOKAHEAD_EXPR      CONDITION

OOKAHEAD_FUNC      LOOKAHEAD_EXPR

OOKAHEAD_PAREN     LOOKAHEAD_FUNC     LOOKAHEAD_PAREN

OOKAHEAD_TABREF    LOOKAHEAD_EXPR

S_EMPTY            CHECK_ENDS         GEN_ARETURN        LS_ITEM

S_ITEM             FOR_RESTRICT

ATCH               CHOOSE_REP         PACKED_DECIMAL

ESSAGE             EDIT_MESSAGE

IN                 FOCUS_ON_TARGET

INUTE              WRITE_HEADER

ORE_ARGS           MORE_ARGS          PARSE_FCNCALL

ORE_LOCALS         LOCAL_NAME

ORE_PARMS          PARM_NAME

SG                 EDIT_MESSAGE

SGLOG              EDIT_MESSAGE

AME                DO_ACTIONS         EXCEPT_ACTIONS     EXCEPT_NAME        EXPR_ITEM
                   LOCAL_NAME         LOGICAL_VALUE      LOOKAHEAD_EXPR     NAME_AND_PARMS
                   OPT_TABLE_NAME     PARM_NAME

AME_AND_PARMS      HEADER

EGATE              NEITHER_NULL


EITHER_NULL        WRITE_FIELDREF

EW_CONST           RET_CONST

PAGE 214

ULE NAME           CALLED BY THE FOLLOWING RULES
___________

EW_FENTRY          ADD_FIELDREF

EXT_LEVEL          LOOKAHEAD_PAREN

EXT_STATEMENT      ACTIONS            DO_ACTIONS         EXCEPT_ACTIONS     EXCEPT_ON
                   EXCEPTIONS         PARSE_CONDITIONS

EXT_TOKEN          ASSIGN_BY_NAME     ASSIGNMENT         CHECK_MORE_EXPR    CHECK_MORE_TERM
                   CHECK_PARMS        CHK_MORE_FACTOR    CONDITION          EXPR_ITEM
                   FIELD_PART         INDIRECT_FREF      INDIRECT_TREF      LOCAL_NAME
                   MORE_ARGS          MORE_LOCALS        MORE_PARMS         NAME_AND_PARMS
                   PARM_NAME          PARSE_COND_REL     PARSE_EXPR         PARSE_FCNCALL
                   PARSE_FIELD_REF    PARSE_LOCALS       PARSE_NULLFLDREF   RESOLVE_NAME
                   RHS_ASSIGN

PT_TABLE_NAME      EXCEPT_NAME

ACKED_DECIMAL      BINARY             CHOOSE_REP

AD                 INIT_TRANSLATOR    PACKED_DECIMAL

ARM                INDIRECT_FREF      INDIRECT_TREF      LOOKAHEAD_EXPR     OPT_TABLE_NAME
                   RESOLVE_NAME

ARM_NAME           CHECK_PARMS        MORE_PARMS

ARM_VALUE          ADVANCE_TOKEN      CHECK_EXTRA_TOKS   EDIT_MESSAGE       HEADER
                   LOCALS             LOOKAHEAD_EOS      LOOKAHEAD_FUNC     LOOKAHEAD_PAREN
                   LOOKAHEAD_TABREF   NEXT_STATEMENT     NEXT_TOKEN

ARSE_COND_REL      RELATIONAL_EXPR

ARSE_CONDITIONS    CONDITIONS         PARSE_CONDITIONS

ARSE_EXPR          EXPR_ITEM          PARSE_NULL_EXPR

ARSE_FCNCALL       RESOLVE_NAME

ARSE_FIELD_REF     ASSIGNMENT         EXPR_ITEM          LOGICAL_VALUE      PARSE_NULLFLDREF

ARSE_LOCALS        LOCALS

ARSE_NULL_EXPR     MORE_ARGS          PARSE_COND_REL     PARSE_FCNCALL      RELATIONAL_EXPR
                   RHS_ASSIGN

ARSE_NULLFLDREF    ASSIGN_BY_NAME

REL                PACKED_DECIMAL

REFIX_LEN_LEN      WRITE_CONSTANT     WRITE_RELOC
```

```
REFIX_LEN_VAL    WRITE_CONSTANT

UOTE             ADD_RELOC          ASSIGN_BY_NAME     CHECK_EOS          INDIRECT_FREF
                 INDIRECT_TREF      LOCALS             MORE_ARGS          MORE_LOCALS
                 PARSE_FIELD_REF

ELATIONAL_EXPR   LOOKAHEAD_EXPR
PAGE 215

ULE NAME         CALLED BY THE FOLLOWING RULES
_______________

ESOLVE_ACALL     RESOLVE_ACALLS

ESOLVE_ACALLS    DO_ACTIONS

ESOLVE_NAME      EXPR_ITEM          LOGICAL_VALUE

ET_CONST         BYNAME_FIELD       EXPR_ITEM          FIELD_PART         IND_TABLENAME
                 PARSE_NULL_EXPR    PARSE_NULLFLDREF

ET_LEN           BINARY

HS_ASSIGN        ASSIGNMENT

CREENROW         FOCUS_ON_TARGET

ET_CURSOR        TEXT_TO_SCREEN

IGNAL_GREATER    PACKED_DECIMAL

YMTAB_DEFINE     LOCAL_NAME         PARM_NAME          SYMTAB_REFERENCE

YMTAB_LOOKUP     ASSIGNMENT

YMTAB_REFERENCE  ASSIGNMENT         PARSE_FCNCALL

ABLE_ILLEGAL     OPT_TABLE_NAME

AILSTRING        PACKED_DECIMAL

EXT_TO_SCREEN    FOCUS_ON_TARGET

OKEN             LOCALS
ERT_SCROLL       FOCUS_ON_TARGET

RITE_CONSTANT    WRITE_CONSTANTS

RITE_CONSTANTS   FINI_TRANSLATOR

RITE_DESCRIPTOR  WRITE_CONSTANTS

RITE_EXCEPTIONS  FINI_TRANSLATOR

RITE_FIELDREF    WRITE_FIELDREFS

RITE_FIELDREFS   FINI_TRANSLATOR


RITE_GLOBAL      WRITE_GLOBALS

RITE_GLOBALS     FINI_TRANSLATOR

RITE_HEADER      FINI_TRANSLATOR

RITE_RELOC       WRITE_RELOCATION

RITE_RELOCATION  FINI_TRANSLATOR

PAGE 216

ULE NAME         CALLED BY THE FOLLOWING RULES
_______________

RITELN           GEN_CODE2

PAGE 217

ULE NAME         LIST OF DESCENDENT RULES
_______________

CTION            EDIT_MESSAGE       FOR_RESTRICT

CTIONS           CHECK_ENDS         DO_ACTIONS         GEN_CODE           NEXT_STATEMENT

DD_FIELDREF      NEW_FENTRY

DD_RELOC         EDIT_MESSAGE       QUOTE

DVANCE_TOKEN     LOAD_BUFFER        PARM_VALUE

SSIGN_BY_NAME    CHECK_EOS          EDIT_MESSAGE       EQ_TOKENS          GEN_CODE
                 GEN_INDIRECTREF    IR_POP             IR_PUSH            NEXT_TOKEN
                 PARSE_NULLFLDREF   QUOTE

SSIGNMENT        ADD_RELOC          ASSIGN_BY_NAME     CHECK_ASSIGNTARG   EDIT_MESSAGE
                 GEN_CODE           GEN_INDIRECTREF    IR_POP             IR_PUSH
                 NEXT_TOKEN         PARSE_FIELD_REF    RHS_ASSIGN         SYMTAB_LOOKUP
                 SYMTAB_REFERENCE

INARY            EDIT_MESSAGE       PACKED_DECIMAL     RET_LEN

YNAME_FIELD      LENGTH             RET_CONST


ALC_OFFSET       CALC_OFFSET
```

HECK_ASSIGNTARG EDIT_MESSAGE

HECK_COLON EDIT_MESSAGE EQ_TOKENS

I

HECK_ENDS EDIT_MESSAGE LS_EMPTY

HECK_EOS EDIT_MESSAGE EO_TOKENS QUOTE -

HECK_EXTRA_TOKS EDIT_MESSAGE PARM_VALUE

HECK_MORE_EXPR CHECK_MORE_EXPR EQ_TOKENS EXPR_TERM .. GEN_CODE
NEXT_TOKEN

HECK_MORE_TERM CHECK_MORE_TERM EQ_TOKENS EXPR_FACTOR GEN_CODE
NEXT_TOKEN

HECK_PARMS CHECK_R_PAREN EQ_TOKENS NEXT_TOKEN PARM_NAME

I

HECK_R_PAREN ADVANCE_TOKEN EDIT_MESSAGE EO_TOKENS

MK_MORE_FACTOR EO_TOKENS EXPR_ITEM GEN_CODE NEXT_TOKEN

HOOSE_REP BINARY FLOATING_POINT MATCH PACKED_DECIMAL

LEAR_TTABLES DEL_TABLE

```
ONDITION        EDIT_MESSAGE    EO_TOKENS      GEN_CODE        GENBIN
                GENERATERULE    ISSUE_ACALLS   LOGICAL_VALUE   LOOKAHEAD_EXPR
                NEXT_TOKEN
```

```
ONDITIONS       GEN_CODE        ISSUE_ACALLS    PARSE_CONDITIONS
PAGE 216
```

| ULE NAME | LIST OF DESCENDENT RULES | | | |
|---|---|---|---|---|
| O_ACTIONS | ACTION<br>NAME | ASSIGNMENT<br>NEXT_STATEMENT | DO_ACTIONS<br>RESOLVE_ACALLS | GEN_ARETURN |
| DIT_MESSAGE | FOCUS_ON_TARGET<br>MSG | HILITE_LINE<br>MSGLOG | HILITE_LINES<br>PARM_VALUE | MESSAGE |
| XCEPT_ACTIONS | ACTION<br>NAME | ASSIGNMENT<br>NEXT_STATEMENT | EC_TOKENS | EXCEPT_ACTIONS |
| XCEPT_NAME | ADVANCE_TOKEN<br>NAME | CHECK_COLON<br>OPT_TABLE_NAME | EDIT_MESSAGE | GEN_CODE |
| XCEPT_ON | ADVANCE_TOKEN<br>NEXT_STATEMENT | EDIT_MESSAGE | EO_TOKENS | EXCEPT_NAME |
| XCEPTION | EDIT_MESSAGE | EXCEPT_ACTIONS | EXCEPT_ON | EXCEPTION |
| XCEPTIONS | CHECK_ENDS | EXCEPTION | GEN_CODE | NEXT_STATEMENT |
| XPR_FACTOR | CHK_MORE_FACTOR | EXPR_ITEM | | |
| XPR_ITEM | ADD_RELOC<br>EDIT_MESSAGE<br>IR_POP<br>PARSE_EXPR | ADVANCE_TOKEN<br>EO_TOKENS<br>IR_PUSH<br>PARSE_FIELD_REF | CHECK_F_PAREN<br>GEN_CODE<br>NAME<br>RESOLVE_NAME | CONSTANT<br>GEN_INDIRECTREF<br>NEXT_TOKEN<br>RET_CONST |
| XPR_TERM | CHECK_MORE_TERM | EXPR_FACTOR | | |
| IELD_PART | ADVANCE_TOKEN<br>LENGTH | BYNAME_FIELD<br>NEXT_TOKEN | EO_TOKENS<br>RET_CONST | INDIRECT_FREF |
| INI_TRANSLATOR | WRITE_CONSTANTS<br>WRITE_HEADER | WRITE_EXCEPTIONS<br>WRITE_RELOCATION | WRITE_FIELDREFS | WRITE_GLOBALS |
| LOATING_POINT | EDIT_MESSAGE | | | |
| OCUS_ON_TARGET | MIN | SCREENROW | TEXT_TO_SCREEN | VERT_SCROLL |
| OP_RESTRICT | EDIT_MESSAGE | EO_TOKENS | LS_ITEM | |
| EN_ARETURN | GEN_CODE | LS_EMPTY | | |
| EN_CODE | EDIT_MESSAGE | GEN_CODE2 | | |
| EN_CODE2 | GENBIN | GENERATERULE | WRITELN | |
| EN_INDIRECTREF | GEN_IREF | | | |
| EN_IREF | ADD_RELOC | GEN_CODE | | |
| EN_LOCAL | GENBIN | GENERATERULE | | |

| | | |
|---|---|---|
| EN_PARM | CALC_OFFSET | GENERATERULE |
| ENERATERULE | SINFIELD | |
| ENNULLBIN<br>PAGE 219 | GENBIN | |

| ULE NAME | LIST OF DESCENDENT RULES | | | |
|---|---|---|---|---|
| EADER | EDIT_MESSAGE<br>LOCALS | GEN_LOCAL<br>NAME_AND_PARMS | GEN_PARM<br>PARM_VALUE | LOAD_BUFFER |
| ILITE_LINE | ADD_ATTR | | | |
| ILITE_LINES | HILITE_LINE | | | |
| ND_TABLENAME | LENGTH | RET_CONST | | |
| NDIRECT_FREF | ADD_FIELDREF<br>IND_TABLENAME | ADVANCE_TOKEN<br>NEXT_TOKEN | EDIT_MESSAGE<br>PARM | EO_TOKENS<br>QUOTE |
| NDIRECT_TREF | ADD_FIELDREF<br>FIELD_PART | ADVANCE_TOKEN<br>NEXT_TOKEN | EDIT_MESSAGE<br>PARM | EO_TOKENS<br>QUOTE |
| NIT_TRANSLATOR | CLEAR_TTABLES | GENBIN | PAD | |
| R_POP | EDIT_MESSAGE | | | |
| SSUE_ACALLS | GEN_CODE | | | |
| OCAL_NAME | EDIT_MESSAGE<br>SYMTAB_DEFINE | MORE_LOCALS | NAME | NEXT_TOKEN |
| OCALS | CHECK_EXTRA_TOKS<br>PARSE_LOCALS | EDIT_MESSAGE<br>QUOTE | LOAD_BUFFER<br>TOKEN | PARM_VALUE |
| OGICAL_VALUE | ADD_RELOC<br>GEN_INDIRECTREF<br>PARSE_FIELD_REF | CHECK_EOS<br>IR_POP<br>RESOLVE_NAME | EDIT_MESSAGE<br>IR_PUSH | GEN_CODE<br>NAME |
| OOKAHEAD_EOS | PARM_VALUE | | | |
| OOKAHEAD_EXPR | LOGICAL_VALUE<br>NAME | LOOKAHEAD_EOS<br>PARM | LOOKAHEAD_FUNC<br>RELATIONAL_EXPR | LOOKAHEAD_TABREF |
| OOKAHEAD_FUNC | LOOKAHEAD_PAREN | PARM_VALUE | | |
| OOKAHEAD_PAREN | LOOKAHEAD_PAREN | NEXT_LEVEL | PARM_VALUE | |
| OOKAHEAD_TABREF | PARM_VALUE | | | |
| S_ITEM | LS_EMPTY | | | |
| ORE_ARGS | ADVANCE_TOKEN<br>MORE_ARGS | EDIT_MESSAGE<br>NEXT_TOKEN | EO_TOKENS<br>PARSE_NULL_EXPR | GEN_CODE<br>QUOTE |
| ORE_LOCALS | EDIT_MESSAGE | EO_TOKENS | LOCAL_NAME | NEXT_TOKEN |

| | | | | |
|---|---|---|---|---|
| | QUOTE | | | |
| ORE_PARMS | EQ_TOKENS | NEXT_TOKEN | PARM_NAME | |
| AME_AND_PARMS | CHECK_EOS<br>NEXT_TOKEN | CHECK_PARMS | EDIT_MESSAGE | NAME |
| EITHER_NULL | IS_NULL | NEGATE | | |

PAGE 220

| ULE NAME | LIST OF DESCENDENT RULES | | | |
|---|---|---|---|---|
| EXT_STATEMENT | CHECK_EXTRA_TOKS | LOAD_BUFFER | PARM_VALUE | |
| EXT_TOKEN | LOAD_BUFFER | PARM_VALUE | | |
| PT_TABLE_NAME | ADVANCE_TOKEN<br>TABLE_ILLEGAL | EDIT_MESSAGE | NAME | PARM |
| ACKED_DECIMAL | EDIT_MESSAGE<br>PAD | FLOATING_POINT<br>PEEL | HEADSTRING<br>SIGNAL_GREATER | MATCH<br>TAILSTRING |
| ARM_NAME | EDIT_MESSAGE<br>SYMTAB_DEFINE | MORE_PARMS | NAME | NEXT_TOKEN |
| ARSE_COND_REL | EDIT_MESSAGE<br>PARSE_NULL_EXPR | EQ_TOKENS | GEN_CODE | NEXT_TOKEN |
| ARSE_CONDITIONS | CONDITION | NEXT_STATEMENT | PARSE_CONDITIONS | |
| ARSE_EXPR | CHECK_MORE_EXPR<br>NEXT_TOKEN | EQ_TOKENS | EXPR_TERM | GEN_CODE |
| ARSE_FCNCALL | ADD_RELOC<br>NEXT_TOKEN | EQ_TOKENS<br>PARSE_NULL_EXPR | GEN_CODE<br>SYMTAB_REFERENCE | MORE_ARGS |
| ARSE_FIELD_REF | ADD_FIELDREF<br>FIELD_PART | ADVANCE_TOKEN<br>INDIRECT_TREF | EDIT_MESSAGE<br>NEXT_TOKEN | EQ_TOKENS<br>QUOTE |
| ARSE_LOCALS | EDIT_MESSAGE | EQ_TOKENS | LOCAL_NAME | NEXT_TOKEN |
| ARSE_NULL_EXPR | ADD_RELOC<br>GENBIN | ADVANCE_TOKEN<br>PARSE_EXPR | EQ_TOKENS<br>RET_CONST | GEN_CODE |
| ARSE_NULLFLDREF | ADD_RELOC<br>GEN_CODE<br>RET_CONST | CHECK_EOS<br>GENBIN | EDIT_MESSAGE<br>NEXT_TOKEN | EQ_TOKENS<br>PARSE_FIELD_REF |
| REFIX_LEN_VAL | GENBIN | | | |
| ELATIONAL_EXPR | CHECK_EOS | PARSE_COND_REL | PARSE_NULL_EXPR | |
| ESOLVE_ACALL | FIND_ROW | GENBIN | GENERATERULE | |
| ESOLVE_ACALLS | RESOLVE_ACALL | | | |
| ESOLVE_NAME | ADVANCE_TOKEN | GEN_CODE | NEXT_TOKEN | PARM |

| | | | | |
|---|---|---|---|---|
| | PARSE_FCNCALL | | | |
| ET_CONST | CHOOSE_REP | NEW_CONST | | |
| MS_ASSIGN | CHECK_EOS<br>PARSE_NULL_EXPR | EDIT_MESSAGE | EQ_TOKENS | NEXT_TOKEN |
| YMTAB_DEFINE | EDIT_MESSAGE | | | |
| YMTAB_REFERENCE | SYMTAB_DEFINE | | | |
| EXT_TO_SCREEN | SET_CURSOR | | | |

PAGE 221

| ULE NAME | LIST OF DESCENDENT RULES | | | |
|---|---|---|---|---|
| RANSLATE | ACTIONS<br>HEADER | CONDITIONS<br>INIT_TRANSLATOR | EXCEPTIONS | FINI_TRANSLATOR |
| RITE_CONSTANT | GENBIN<br>GENPACK | GENERATERULE<br>PREFIX_LEN_LEN | GENFLOAT<br>PREFIX_LEN_VAL | GENNULLBIN |
| RITE_CONSTANTS | WRITE_CONSTANT | WRITE_DESCRIPTOR | | |
| RITE_DESCRIPTOR | GENBIN | GENERATERULE | | |
| RITE_EXCEPTIONS | GENBIN | GENERATERULE | | |
| RITE_FIELDREF | GENBIN | GENERATERULE | NEITHER_NULL | |
| RITE_FIELDREFS | WRITE_FIELDREF | | | |
| RITE_GLOBAL | GENBIN | GENERATERULE | HEADSTRING | |
| RITE_GLOBALS | WRITE_GLOBAL | | | |
| RITE_HEADER | SGETCCHAR<br>JULIAN_DATE | GENBIN<br>LIBID | GENERATERULE<br>MINUTE | HOUR |
| RITE_RELOC | EDIT_MESSAGE | GENBIN | GENERATERULE | PREFIX_LEN_LEN |
| RITE_RELOCATION | WRITE_RELOC | | | |

```
OS RULES WITH DESCENDENTS REFERENCED.
PAGE 222

RANSLATE------------00
   INIT_TRANSLATOR----01
      |GENBIN.          |
      |PAD              |
      |CLEAR_TTABLES-------02
      |   |BEL_TABLE       |
      |   +----------------02
      +-----------------01
   HEADER--------------01
      |PARM_VALUE       |
      |LOAD_BUFFER      |
      |NAME_AND_PARMS------02
      |   |EDIT_MESSAGE<----|
      |   |NEXT_TOKEN------>|
      |   |CHECK_PARMS----->|
      |   |CHECK_EOS------->|
      |   |NAME             |
      |   +-----------------02
      |LOCALS---------------02
      |   |CHECK_EXTRA_TOKS>|
      |   |PARM_VALUE       |
      |   |LOAD_BUFFER      |
      |   |PARSE_LOCALS---->|
      |   |TOKEN            |
      |   |QUOTE            |
      |   |EDIT_MESSAGE<----|
      |   +-----------------02
      |GEN_PARM-------------02
      |   |CALC_OFFSET----->|
      |   |GENERATERULE---->|
      |   +-----------------02
      |GEN_LOCAL------------02
      |   |GENERATERULE<----|
      |   |GENBIN.          |
      |   +-----------------02
      |EDIT_MESSAGE---------02
      |   |MESSAGE          |
      |   |MSG              |
      |   |MSGLOG           |
      |   |PARM_VALUE       |
      |   |HILITE_LINES---->|
      |   |HILITE_LINE----->|
      |   |FOCUS_ON_TARGET->|
      |   +-----------------02
      +-----------------01
   CONDITIONS----------01
      |PARSE_CONDITIONS---02
      |   |NEXT_STATEMENT<--|
      |   |CONDITION------->|
      |   |PARSE_CONDITIONS<|
      |   +-----------------02
      |ISSUE_ACALLS--------02
      |   |GEN_CODE<--------|
      |   +-----------------02
      |GEN_CODE------------02
      |   |GEN_CODE2------->|


      |   |EDIT_MESSAGE<----|
      |   +-----------------02
      +-----------------01
   ACTIONS-------------01
      |NEXT_STATEMENT-----02
PAGE 223

      |   |CHECK_EXTRA_TOKS<|
      |   |PARM_VALUE       |
      |   |LOAD_BUFFER      |
      |   +-----------------02
      |DO_ACTIONS----------02
      |   |RESOLVE_ACALLS-->|
      |   |ASSIGNMENT------>|
      |   |ACTION---------->|
      |   |GEN_ARETURN----->|
      |   |NEXT_STATEMENT<--|
      |   |DO_ACTIONS<------|
      |   |NAME             |
      |   +-----------------02
      |CHECK_ENDS----------02
      |   |EDIT_MESSAGE<----|
      |   |LS_EMPTY         |
      |   +-----------------02
      |GEN_CODE<--------|
      +-----------------01
   EXCEPTIONS----------01
      |NEXT_STATEMENT<--|
      |EXCEPTION-----------02
      |   |EXCEPT_ON------->|
      |   |EXCEPT_ACTIONS-->|
      |   |EXCEPTION<-------|
      |   |EDIT_MESSAGE<----|
      |   +-----------------02
      |CHECK_ENDS<-------|
      |GEN_CODE<--------|
      +-----------------01
   FINI_TRANSLATOR----01
      |WRITE_EXCEPTIONS---02
      |   |GENERATERULE<----|
      |   |GENBIN.          |
      |   +-----------------02
      |WRITE_GLOBALS-------02
      |   |WRITE_GLOBAL---->|
      |   +-----------------02
      |WRITE_FIELDREFS-----02
      |   |WRITE_FIELDREF-->|
      |   +-----------------02
      |WRITE_CONSTANTS-----02
      |   |WRITE_DESCRIPTOR>|
      |   |WRITE_CONSTANT-->|
      |   +-----------------02
      |WRITE_RELOCATION---02
      |   |WRITE_RELOC----->|
      |   +-----------------02
      |WRITE_HEADER--------02
      |   |JULIAN_DATE.     |
      |   |HOUR.            |
      |   |MINUTE.          |
```

```
 |      |GENBIN.
 |      |GENERATERULE<-----|
 |      |SGETCCHAR.        |
 |      |LIBID             |
 |      +-----------------02
-------------------------00-01
PAGE 224

CTION-----------------03
   FOP_RESTRICT--------04
      |EDIT_MESSAGE<-----|
      |LS_ITEM-------------05
      |   |LS_EMPTY        |
      |   +----------------05
      |EQ_TOKENS        |
      +-----------------04
 --EDIT_MESSAGE<----03

SSIGNMENT-----------03
   PARSE_FIELD_REF-----04
      |EDIT_MESSAGE<-----|
      |QUOTE             |
      |NEXT_TOKEN<-------|
      |INDIRECT_TREF-------05
      :   |NEXT_TOKEN<-------|
      :   |ADD_FIELDREF<-----|
      :   |ADVANCE_TOKEN<----|
      :   |FIELD_PART<-------|
      :   |QUOTE             |
      :   |EDIT_MESSAGE<-----|
      :   |PARM              |
      :   |EQ_TOKENS         |
      :   +------------------05
      |ADVANCE_TOKEN<---|
      |FIELD_PART-----------05
      :   |ADVANCE_TOKEN<---|
      :   |BYNAME_FIELD--------06
      :   |   |LENGTH          |
      :   |   |RET_CONST<------|
      :   |   +----------------06
      :   |NEXT_TOKEN<------|
      :   |INDIRECT_PREF-------06
      |   |   |INC_TABLENAME-------07
      |   |   |   |LENGTH.         |
      |   |   |   |RET_CONST<------|
      |   |   |   +----------------07
      |   |   |NEXT_TOKEN<------|
      |   |   |ADD_FIELDREF<----|
      |   |   |ADVANCE_TOKEN<---|
      |   |   |QUOTE.           |
      |   |   |EDIT_MESSAGE<----|
      |   |   |PARM.            |
      |   |   |EQ_TOKENS.       |
      |   |   +-----------------06
      |   |LENGTH.          |
      |   |RET_CONST-----------06
      |   |   |CHOOSE_REP----------07
      |   |   |   |FLOATING_POINT-->|
      |   |   |   |PACKED_DECIMAL-->|
      |   |   |   |BINARY---------->|
      |   |   |   |MATCH            |
      |   |   |   +-----------------07
      |   |   |NEW_CONST.       |
      |   |   +-----------------06
      |   |EQ_TOKENS        |
      |   +-----------------05
      |ADD_FIELDREF--------05
PAGE 225

      |   |NEW_FENTRY       |
      |   +-----------------05
      |EQ_TOKENS        |
      +-----------------04
   IR_PUSH          |
   RHS_ASSIGN-----------04
      |NEXT_TOKEN<-------|
      |PARSE_NULL_EXPR-----05
```

```
|    |GEN_CODE<--------|
|    |GENEIN           |
|    |RET_CONST<-------|
|    |ADD_RELOC<-------|
|    |ADVANCE_TOKEN<---|
|    |PARSE_EXPR----------06
|    |    |NEXT_TOKEN<------|
|    |    |EXPR_TERM-----------07
|    |    |    |EXPR_FACTOR----->|
|    |    |    |CHECK_MORE_TERM->|
|    |    |    +-----------------07
|    |    |GEN_CODE<--------|
|    |    |CHECK_MORE_EXPR----07
|    |    |    |NEXT_TOKEN<------|
|    |    |    |EXPR_TERM<-------|
|    |    |    |GEN_CODE<--------|
|    |    |    |CHECK_MORE_EXPR<-|
|    |    |    |EC_TOKENS        |
|    |    |    +-----------------07
|    |    |EC_TOKENS          |
|    |    +-----------------06
|    |EC_TOKENS
|    +-----------------05
|CHECK_EOS<-------|
|EDIT_MESSAGE<----|
|EC_TOKENS
+-----------------04
GEN_INDIRECTREF----04
  |GEN_IREF------------05
  |    |GEN_CODE<--------
  |    |ADD_RELOC<-------|
  |    +-----------------05
  +-----------------04
GEN_CODE<--------|
ADD_RELOC------------04
  |QUOTE              |
  |EDIT_MESSAGE<----|
  +-----------------04
IR_POP--------------04
  |EDIT_MESSAGE<----|
  +-----------------04
SYMTAB_LOOKUP       |
CHECK_ASSIGNTARG---04
  |EDIT_MESSAGE<----|
  +-----------------04
NEXT_TOKEN<------|
SYMTAB_REFERENCE---04
  |SYMTAB_DEFINE------05
  |    |EDIT_MESSAGE<----|
  |    +-----------------05
  +-----------------04
ASSIGN_BY_NAME-----04
  |QUOTE               |
PAGE 226

  |EDIT_MESSAGE<----|
  |NEXT_TOKEN<------|
  |PARSE_NULLFLDREF---05
  |    |GEN_CODE<--------|


  |    |GENEIN           |
  |    |RET_CONST<-------|
  |    |ADD_RELOC<-------|
  |    |NEXT_TOKEN<------|
  |    |CHECK_EOS<-------|
  |    |PARSE_FIELD_REF<-|
  |    |EDIT_MESSAGE<----|
  |    |EC_TOKENS        |
  |    +-----------------05
  |EO_TOKENS         |
  |IP_PUSH           |
  |GEN_INDIRECTREF<--|
  |GEN_CODE<---------|
  |IR_POP<-----------|
  |CHECK_EOS<--------|
  +------------------04
--EDIT_MESSAGE<---03


ALC_OFFSET--------03
--CALC-OFFSET<-----03
```

```
HECK_EOS------------O3
   QUOTE               |
   EDIT_MESSAGE(-----  |
--EV_TOKENS---------O3
```

```
HECK_EXTRA_TOKS---O3
```

```
HECK_PARMS---------03
  NEXT_TOKEN<-------|
  PARM_NAME-----------04
     |EDIT_MESSAGE<----|
     |SYMTAB_DEFINE<---|
     |NEXT_TOKEN<------|
     |MORE_PARMS----------05
     |     |NEXT_TOKEN<-------|
     |     |PARM_NAME<--------|
     |     |EO_TOKENS         |
     |     -------------------05
     |NAME                 |
     ---------------------04
   CHECK_R_PAREN-------04
     |EDIT_MESSAGE<----|
     |ADVANCE_TOKEN<---|
     |EO_TOKENS        |
     ---------------------04
   EO_TOKENS          |
 PAGE 227

 ---------------------03
```

```
ONDITION------------03
  NEXT_TOKEN<-------|
```

```
 |PARSE_FIELD_REF<-|
 |IR_PUSH.         |
 |GEN_INDIRECTREF<-|
 |GEN_CODE<--------|
 |ADD_RELOC<-------|
 |IR_POP<----------|
 |RESOLVE_NAME-------05
 |   |GEN_CODE<--------|
 |   |ADVANCE_TOKEN<---|
 |   |PARM             |
 |   |NEXT_TOKEN<------|
 |   |PARSE_FCNCALL------06
 |   |   |NEXT_TOKEN<------|
 |   |   |PARSE_NULL_EXPR<-|
 |   |   |GEN_CODE<--------|
 |   |   |MORE_ARGS----------07
 |   |   |   |NEXT_TOKEN<------|
 |   |   |   |PARSE_NULL_EXPR<-|
 |   |   |   |GEN_CODE<--------|
 |   |   |   |MORE_ARGS<-------|
 |   |   |   |ADVANCE_TOKEN<---|
 |   |   |   |QUOTE            |
 |   |   |   |EDIT_MESSAGE<----|
 |   |   |   |EO_TOKENS        |
 |   |   |   +-----------------07
 |   |   |SYMTAB_REFERENCE<|
 |   |   |ADD_RELOC<-------|
 |   |   |EO_TOKENS        |
 |   |   +-----------------06
 |   +-----------------05
 |CHECK_EOS<-------|
 |EDIT_MESSAGE<----|
 |NAME             |
 +-----------------04
LOOKAHEAD_EXPR-----04
 |LOOKAHEAD_TABREF---05
 |   |PARM_VALUE.      |
 |   +-----------------05
 |LOOKAHEAD_FUNC-----05
 |   |PARM_VALUE       |
 |   |LOOKAHEAD_PAREN----06
 |   |   |PARM_VALUE       |
 |   |   |NEXT_LEVEL       |
 |   |   |LOOKAHEAD_PAREN<-|
 |   |   +-----------------06
 |   +-----------------05
 |LOOKAHEAD_EOS------05
 |   |PARM_VALUE       |
 |   +-----------------05
 |LOGICAL_VALUE<---|
 |RELATIONAL_EXPR----05
 |   |PARSE_NULL_EXPR<-|
 |   |PARSE_COND_REL-----06
 |   |   |NEXT_TOKEN<------|
 |   |   |PARSE_NULL_EXPR<-|
PAGE 228
```

```
 |   |   |GEN_CODE<--------|
 |   |   |EDIT_MESSAGE<----|
 |   |   |EO_TOKENS        |
 |   |   +-----------------06
 |   |CHECK_EOS<-------|
 |   +-----------------05
 |PARM.            |
 |NAME.            |
 +-----------------04
GEN_CODE<--------|
ISSUE_ACALLS<----|
GENBIN.          |
GENERATERULE<----|
EO_TOKENS.       |
--EDIT_MESSAGE<---03

XCEPT_ACTIONS-----03
  ASSIGNMENT<------|
  ACTION<----------|
  NEXT_STATEMENT<--|
  EXCEPT_ACTIONS<--|
  EO_TOKENS.       |
--NAME------------03

XCEPT_ON-----------03
  ADVANCE_TOKEN-------04
   |PARM_VALUE        |
   |LOAD_BUFFER       |
   +-----------------04
  EXCEPT_NAME---------04
   |EDIT_MESSAGE<----|
   |GEN_CODE<--------|
   |ADVANCE_TOKEN<---|
   |OPT_TABLE_NAME-----05
   |   |EDIT_MESSAGE<----|
   |   |ADVANCE_TOKEN<---|
   |   |PARM.            |
   |   |NAME.            |
   |   |TABLE_ILLEGAL.   |
   |   +-----------------05
   |CHECK_COLON--------05
   |   |EDIT_MESSAGE<----|
   |   |EO_TOKENS.       |
   |   +-----------------05
   |NAME.            |
   +-----------------04
  NEXT_STATEMENT<--|
  EDIT_MESSAGE<----|
--EO_TOKENS-------03

OCUS_ON_TARGET----03
  TEXT_TO_SCREEN------04
   |SET_CURSOR.      |
   +-----------------04
  VERT_SCROLL.     |
PAGE 229
```

```
  MIN                  |
--SCREENROW--------03

EN_ARETURN---------03
  GEN_CODE<--------|
--IS_EMPTY---------03

EN_CODE2-----------03
  GENBIN             |
  GENERATERULE<-----|
--WRITELN----------03

ENERATERULE--------03
--BINFIELD---------03

ILITE_LINE---------03
--ABS_ATTR---------03

ILITE_LINES--------03
--HILITE_LINE<-----03

EXT_TOKEN----------03
  PARM_VALUE         |
--LOAD_BUFFER------03

ARSE_LOCALS--------03
  EDIT_MESSAGE<----|
  NEXT_TOKEN<------|
  LOCAL_NAME----------04
     |EDIT_MESSAGE<----|
     |SYMTAB_DEFINE<---|
     |NEXT_TOKEN<------|
     |MORE_LOCALS---------05
     |    |NEXT_TOKEN<------|
     |    |LOCAL_NAME<------|
     |    |QUOTE             |
     |    |EDIT_MESSAGE<-----|
     |    |EQ_TOKENS.        |
     |    +-----------------05
     |NAME                |
     ------------------04
--EQ_TOKENS--------03

ESOLVE_ACALLS-----03
  RESOLVE_ACALL-------04
PAGE 230

     |FIND_ROW            |
     |GENBIN.             |


     |GENERATERULE<----|
---------------------03-04

RITE_CONSTANT-----03

   PREFIX_LEN_LEN.    |
   PREFIX_LEN_VAL-----04
     |GENBIN.           |
     ------------------04
   GENBIN.            |
   GENERATERULE<----|
   GENNULLBIN---------04
     |GENBIN            |
     ------------------04
   GENPACK            |
--GENFLOAT---------03

RITE_DESCRIPTOR---03

   GENERATERULE<----|
--GENBIN-----------03

RITE_FIELDREF-----03

   GENERATERULE<----|
   GENBIN            |
   NEITHER_NULL-------04
     |IS_NULL           |
     |NEGATE            |
---------------------03-04

RITE_GLOBAL--------03

   GENERATERULE<----|
   GENBIN            |
--HEADSTRING-------03

RITE_RELOC---------03

   PREFIX_LEN_LEN.   |
   GENBIN.           |
   GENERATERULE<----|
--EDIT_MESSAGE<----03

PAGE 231

INARY--------------03
   RET_LEN.          |
   PACKED_DECIMAL<--|
--EDIT_MESSAGE<----03


HECK_MORE_TERM----03
   NEXT_TOKEN<------|
```

```
  GEN_CODE<---------|
  CHECK_MORE_TERM<-|
--GO_TOKENS--------04

XPR_FACTOR---------04
  EXPR_ITEM-----------09
     |PARSE_FIELD_REF<-|
     |IR_PUSH          |
     |GEN_INDIRECTREF<-|
     |GEN_CODE<--------|
     |ADD_RELOC<-------|
     |IP_POP<----------|
     |RET_CONST<-------|
     |ADVANCE_TOKEN<---|
     |NEXT_TOKEN<------|
     |PARSE_EXPR<------|
     |CHECK_R_PAREN<---|
     |RESOLVE_NAME<----|
     |EDIT_MESSAGE<----|
     |CONSTANT         |
     |EC_TOKENS        |
     |NAME             |
     ------------------05
   CHK_MORE_FACTOR----05
      |NEXT_TOKEN<------|
      |EXPR_ITEM<-------|
      |GEN_CODE<--------|
      |EC_TOKENS
----------------------08-05

LOATING_POINT------02
--EDIT_MESSAGE<---04

ACKED_DECIMAL------02
   PAC                |
   MATCH              |
   HEADSTRING         |
   PEEL               |
   TAILSTRING         |
   SIGNAL_GREATER     |
   FLOATING_POINT<---|
--EDIT_MESSAGE<----04
```

PAGE 232

OCAL VARIABLE    DECLARED IN THE FOLLOWING RULES

ONST_INDEX       TRANSLATE

UMR_COMPONENT    TRANSLATE

URR_DEC TRANSLATE

URR_ISTBLREF TRANSLATE

URR_LEN TRANSLATE

URR_STMNT_NUM TRANSLATE

VAR_TOKEN TRANSLATE

VAR_TYPE TRANSLATE

| | | | |
|---|---|---|---|
| ATA_PTR | WRITE_CONSTANT | | |
| ECIMAL | RET_CONST | | |
| RR_ROW | EDIT_MESSAGE | | |
| XCEPT_NUM | TRANSLATE | | |
| IELD_NAME | PARSE_FIELD_REF | | |
| RACTION | PACKED_DECIMAL | | |
| LOBAL_INDEX | TRANSLATE | | |
| | LOOKAHEAD_FUNC | | |
| GNORE_VALUE | PARSE_NULLFLDREF | | |
| ND_INSTR1 | ASSIGNMENT | EXPR_ITEM | LOGICAL_VALUE |
| ND_INSTR2 | ASSIGNMENT | EXPR_ITEM | LOGICAL_VALUE |
| ND_REF1 | ASSIGNMENT | EXPR_ITEM | LOGICAL_VALUE |
| ND_REF2 | ASSIGNMENT | EXPR_ITEM | LOGICAL_VALUE |
| NSTRUCTION_PTR | TRANSLATE | | |
| NTEGER | PACKED_DECIMAL | | |
| EN_LEN | WRITE_CONSTANT | | |
| EN_VAL | WRITE_CONSTANT | | |
| ENGTH | RET_CONST | | |
| OCAL_NAME | ASSIGNMENT | | |
| OCALS_ADDR | ASSIGNMENT | | |

PAGE 233

OCAL VARIABLE DECLARED IN THE FOLLOWING RULES

| | |
|---|---|
| OOP_NUM | TRANSLATE |
| AME_REFERENCE | WRITE_GLOBAL |
| UM_CONDITIONS | CONDITIONS |
| UM_TAM_ARGS | ACTION |
| BJADDR | WRITE_RELOC |
| AREN_NESTING | LOOKAHEAD_FUNC |

| | | |
|---|---|---|
| AVE_INDEX | EDIT_MESSAGE | LOOKAHEAD_EXPR |
| AVE_ROW | FIND_ROW | |
| AVED_INSTP | CONDITION | |
| CROLL_ADJUST | FOCUS_ON_TARGET | |
| CROLL_AMT | FOCUS_ON_TARGET | |
| TMNT | LOCALS | |
| YNTAX | RET_CONST | |
| ABLE_NAME | PARSE_FIELD_REF | |
| ABLEFIELD_REF | WRITE_FIELDREF | |
| ABREF_INDEX | TRANSLATE | |
| ARGETRULE | TRANSLATE | |
| OKEN_TEXT | RET_CONST | |
| WO_NAME_LENGTH | WRITE_FIELDREF | |

PAGE 234

OCAL VARIABLE REFERENCED IN THE FOLLOWING RULES

| | | |
|---|---|---|
| ONST_INDEX | INIT_TRANSLATOR | NEW_CONST |

URR_COMPONENT ACTIONS CONDITIONS EXCEPTIONS HEADER
NEXT_STATEMENT

URR_DEC EXPR_ITEM LOAD_BUFFER PARSE_NULL_EXPR PARSE_NULLFLDREF

```
URR_ISTBLREF     ASSIGNMENT         DO_ACTIONS       EXCEPT_ACTIONS    EXPR_ITEM
                 LOAD_BUFFER        LOGICAL_VALUE    LOOKAHEAD_EXPR    OPT_TABLE_NAME
                 PARSE_FIELD_REF
```

```
URR_LEN          EXPR_ITEM          LOAD_BUFFER
```

```
URR_STMNT_NUM   ACTIONS          CONDITIONS       DO_ACTIONS       EXCEPTIONS
                NEXT_STATEMENT
```

```
URR_TOKEN       ACTION           ASSIGN_BY_NAME   ASSIGNMENT       CHECK_COLON
                CHECK MORE EXPR  CHECK MORE TERM  CHECK PARMS      CONDITION
```

```
EXPR_FACTOR      EXPR_ITEM        EXPR_TERM        HEADER
LOAD_BUFFER      LOCAL_NAME       LOCALS           LOGICAL_VALUE
MORE_ARGS        NAME_AND_PARMS   NEXT_TOKEN       OPT_TABLE_NAME
PARSE_COND_REL   PARSE_EXPR       PARSE_FCNCALL    RELATIONAL_EXPR
RHS_ASSIGN
```

```
URA_TYPE    ASSIGN_BY_NAME    ASSIGNMENT        CHECK_COLON      CHECK_EOS
            CHECK_MORE_EXPR   CHECK_MORE_TERM   CHECK_PARMS      CHECK_R_PAREN
            CHK_MORE_FACTOR   CONDITION         DO_ACTIONS       EXCEPT_ACTIONS
            EXCEPT_NAME       EXCEPT_ON         EXPR_FACTOR      EXPR_ITEM
            EXPR_TERM         FIELD_PART        FOR_RESTRICT     INDIRECT_FREF
            INDIRECT_TREF     LOAD_BUFFER       LOCAL_NAME       LOCALS
            MORE_ARGS         MORE_LOCALS       MORE_PARMS       NAME_AND_PARMS
            OPT_TABLE_NAME    PARM_NAME         PARSE_COND_REL   PARSE_EXPR
            PARSE_FCNCALL     PARSE_FIELD_REF   PARSE_LOCALS     RESOLVE_NAME
            RHS_ASSIGN
```

```
URSOR_COL   SET_CURSOR
```

| | | | | |
|---|---|---|---|---|
| URSOR_ROW | SET_CURSOR | | | |
| ATA_AREA | GEN_LOCAL<br>WRITE_HEADER | INIT_TRANSLATOR | WRITE_FIELDREF | WRITE_GLOBAL |
| ATA_PTR | WRITE_CONSTANT | | | |
| ECIMAL | BINARY | FLOATING_POINT | PACKED_DECIMAL | RET_CONST |
| RR_ROW | EDIT_MESSAGE | | | |
| RROR_FLAG | HILITE_LINE | | | |
| XCEPT_NUM | EXCEPT_NAME | INIT_TRANSLATOR | | |
| IELD_NAME | FIELD_PART | PARSE_FIELD_REF | | |
| RACTION | PACKED_DECIMAL | | | |
| PAGE 235 | | | | |
| OCAL VARIABLE | REFERENCED IN THE FOLLOWING RULES | | | |
| LOBAL_INDEX | INIT_TRANSLATOR | SYMTAB_REFERENCE | | |
| | LOOKAHEAD_FUNC | | | |
| GNORE_VALUE | PARSE_NULLFLDREF | | | |
| ND_INSTR1 | ASSIGN_BY_NAME<br>IND_TABLENAME | ASSIGNMENT<br>INDIRECT_TREF | BYNAME_FIELD<br>LOGICAL_VALUE | EXPR_ITEM |
| ND_INSTR2 | ASSIGN_BY_NAME<br>INDIRECT_FREF | ASSIGNMENT<br>LOGICAL_VALUE | EXPR_ITEM | FIELD_PART |
| ND_REF1 | ASSIGN_BY_NAME<br>IND_TABLENAME | ASSIGNMENT<br>INDIRECT_TREF | BYNAME_FIELD<br>LOGICAL_VALUE | EXPR_ITEM |
| ND_REF2 | ASSIGN_BY_NAME<br>INDIRECT_FREF | ASSIGNMENT<br>LOGICAL_VALUE | EXPR_ITEM | FIELD_PART |
| NSTRUCTION_PTR | ACTIONS<br>EXCEPT_NAME<br>GEN_LOCAL<br>LOGICAL_VALUE<br>RESOLVE_ACALL<br>WRITE_EXCEPTIONS<br>WRITE_GLOBALS | ASSIGNMENT<br>EXPR_ITEM<br>GEN_PARM<br>PARSE_FCNCALL<br>WRITE_CONSTANT<br>WRITE_FIELDREF<br>WRITE_HEADER | CONDITION<br>GEN_CODE2<br>INIT_TRANSLATOR<br>PARSE_NULL_EXPR<br>WRITE_CONSTANTS<br>WRITE_FIELDREFS | CONDITIONS<br>GEN_TREF<br>ISSUE_ACALLS<br>PARSE_NULLFLDREF<br>WRITE_DESCRIPTOR<br>WRITE_GLOBAL |
| NTEGER | PACKED_DECIMAL | | | |
| EN_LEN | WRITE_CONSTANT | | | |
| EN_VAL | WRITE_CONSTANT | | | |
| ENGTH | BINARY | FLOATING_POINT | PACKED_DECIMAL | RET_CONST |
| OCAL_NAME | ASSIGNMENT | | | |

```
OCALS_ADDR       ASSIGNMENT
SSP_NUM          INIT_TRANSLATOR
SG               EDIT_MESSAGE
AME_REFERENCE    WRITE_GLOBAL
UM_CONDITIONS    CONDITION          CONDITIONS
BJADDR           WRITE_RELOC
AREN_NESTING     LOOKAHEAD_FUNC     LOOKAHEAD_PAREN
ARM_VALUE        HEADER             LOCALS             NEXT_STATEMENT
AVE_INDEX        EDIT_MESSAGE       LOOKAHEAD_EXPR
AVE_ROW          FIND_ROW
AVED_INSTP       CONDITION
CROLL_ADJUST     FOCUS_ON_TARGET
PAGE 236
OCAL VARIABLE    REFERENCED IN THE FOLLOWING RULES
_____________

CROLL_AMT        FOCUS_ON_TARGET
TMNT             LOCALS
YNTAX            BINARY             FLOATING_POINT     PACKED_DECIMAL     RET_CONST
ABLE_NAME        SYNAME_FIELD       FIELD_PART         INDIRECT_FREF      PARSE_FIELD_REF
ABLEFIELD_REF    WRITE_FIELDREF
ABREF_INDEX      INIT_TRANSLATOR    NEW_FENTRY
ARGETRULE        GENERATERULE       INIT_TRANSLATOR    WRITE_HEADER
OKEN_TEXT        BINARY             FLOATING_POINT     PACKED_DECIMAL     RET_CONST
WO_NAME_LENGTH   WRITE_FIELDREF
PAGE 237
IGNAL NAME       SIGNALLED IN THE FOLLOWING RULES
_____________

CTIONS_END       NEXT_STATEMENT


ATASTROPHE       EDIT_MESSAGE
ENERIC_FIELD     SYNAME_FIELD
REATER           SIGNAL_GREATER
OOKAHEAD_FAILED  LOOKAHEAD_EOS
O_ACTIONS        ACTIONS
TACK_EMPTY       LS_ITEM
TMNT_END         ADVANCE_TOKEN      NEXT_TOKEN
OO_BIG           WRITE_HEADER
RANSLATOR_ERR    EDIT_MESSAGE
PAGE 236
XCEPTION NAME    HANDLED BY THE FOLLOWING RULES
_____________

CTIONS_END       ACTIONS            DO_ACTIONS         EXCEPTIONS         PARSE_CONDITIONS


ONVERSION        BINARY             FLOATING_POINT     PACKED_DECIMAL
```

```
ENERIC_FIELD      ASSIGN_BY_NAME     ASSIGNMENT         EXPR_ITEM

ETFAIL            ACTION             ADD_FIELDREF       ADVANCE_TOKEN      ASSIGNMENT
                  CHECK_EXTRA_TOKS   EDIT_MESSAGE       GEN_CODE           HEADER
                  HEADER             IR_POP             IR_PUSH            LOCALS
                  LOCALS             LOOKAHEAD_EOS      LOOKAHEAD_FUNC     LS_EMPTY
                  NEXT_STATEMENT     NEXT_TOKEN         PARM               RESOLVE_ACALL
                  RESOLVE_NAME       RET_CONST          SYNTAB_LOOKUP      SYNTAB_REFERENCE
                  WRITE_EXCEPTIONS

REATER            PACKED_DECIMAL

NSERTFAIL         ADD_ATTR           ADD_RELOC          SYNTAB_DEFINE

OOKAHEAD_FAILED   LOOKAHEAD_EXPR

VERFLOW           BINARY             FLOATING_POINT     PACKED_DECIMAL

EPLACEFAIL        WRITE_HEADER

TACK_EMPTY        FOR_RESTRICT

TMNT_END          ACTION             ASSIGNMENT         CONDITION          EXCEPTION
                  HEADER             LOCAL_NAME         MORE_ARGS

TRINGSIZE         EDIT_MESSAGE

NASSIGNED         CHECK_EXTRA_TOKS
PAGE 239

ABLE NAME         FIELD NAME         REFERENCED IN
______________    ________________

INDIRECTI         *DATA ACCESS*      DEL_TABLE

INDIRECT_REFS     *DATA ACCESS*      IR_POP             IR_PUSH
                  INDEX              IR_POP             IR_PUSH
                  IR1                GEN_INDIRECTREF    IR_PUSH
                  IR1_INSTRUCTION    GEN_INDIRECTREF    IR_PUSH
                  IR2                GEN_INDIRECTREF    IR_PUSH
                  IR2_INSTRUCTION    GEN_INDIRECTREF    IR_PUSH
                  REFERENCE          ASSIGNMENT         EXPR_ITEM          IR_PUSH
                                     LOGICAL_VALUE

RULESLIBRARY      *DATA ACCESS*      WRITE_HEADER
                  DATE               WRITE_HEADER


                  RULEBODY           WRITE_HEADER
                  RULENAME           WRITE_HEADER
                  TIME               WRITE_HEADER

TRANS_CONSTS      BINARY             BINARY             PARSE_NULL_EXPR    PARSE_NULLFLDREF
                                     WRITE_CONSTANT
                  BINARY_NUMBER      BINARY
                  CONSTANT_REF       EXPR_ITEM          GEN_IREF           PARSE_NULL_EXPR
                                     PARSE_NULLFLDREF   WRITE_RELOC
                  DATA_OFFSET        WRITE_CONSTANTS
                  DECIMAL_LENGTH     WRITE_DESCRIPTOR
                  DECIMAL_OFFSET     WRITE_DESCRIPTOR
                  FIXED_CHAR         BYNAME_FIELD       FIELD_PART         IND_TABLENAME
                                     RET_CONST
                  FLOAT_LENGTH       FLOATING_POINT
                  FLOAT_NUMBER       FLOATING_POINT
                  FLOATING_POINT     FLOATING_POINT     WRITE_CONSTANT
                  IDENTIFIER         NAME               RET_CONST
                  LENGTH_LENGTH      WRITE_DESCRIPTOR
                  LENGTH_OFFSET      WRITE_DESCRIPTOR
PAGE 240
ABLE NAME         FIELD NAME         REFERENCED IN
______________    ________________

                  LONG_STRING        LOAD_BUFFER
                  MAX_PACKED_LEN     PACKED_DECIMAL
                  MAX_RULE_LENGTH    INIT_TRANSLATOR    WRITE_HEADER
                  MAX_2BYTE_BINARY   PREFIX_LEN_VAL     RET_LEN
                  NAME_LENGTH        GEN_LOCAL          GEN_PARM           WRITE_EXCEPTIONS
                                     WRITE_FIELDREF     WRITE_GLOBAL
                  NAME_REF           ASSIGNMENT         PARSE_FCNCALL      WRITE_RELOC
                  NUMBER             CONSTANT           RET_CONST
                  OPERATOR           ASSIGN_BY_NAME     CHECK_MORE_EXPR    CHECK_MORE_TERM
                                     CHK_MORE_FACTOR    CONDITION          FIELD_PART
                                     PARSE_COND_REL     PARSE_EXPR         PARSE_FIELD_REF
```

| | | | | |
|---|---|---|---|---|
| | | RHS_ASSIGN | | |
| | PACKED_DECIMAL | PACKED_DECIMAL | WRITE_CONSTANT | |
| | PACKED_NUMBER | PACKED_DECIMAL | | |
| | QUOTED_STRING | CONSTANT | RET_CONST | |
| | RESERVED_WORD | EXCEPT_ACTIONS<br>PARSE_LOCALS | EXCEPT_ON<br>PARSE_NULL_EXPR | FOR_RESTRICT<br>PARSE_NULLFLDREF |
| | SPECIAL_CHAR | CHECK_COLON<br>CHECK_R_PAREN<br>INDIRECT_FREF<br>MORE_ARGS<br>PARSE_FCNCALL | CHECK_EOS<br>EXPR_ITEM<br>INDIRECT_TREF<br>MORE_LOCALS<br>PARSE_FIELD_REF | CHECK_PARMS<br>FIELD_PART<br>LOOKAHEAD_PAREN<br>MORE_PARMS |
| | SYNTAX_LENGTH | WRITE_DESCRIPTOR | | |
| | SYNTAX_OFFSET | WRITE_DESCRIPTOR | | |
| | TABLEFIELD_REF | ASSIGNMENT<br>LOGICAL_VALUE | EXPR_ITEM<br>WRITE_RELOC | GEN_IREF |
| | TAMSTRING_REF | WRITE_RELOC | | |
| | TYPE_LENGTH | WRITE_DESCRIPTOR | | |
| | VARIABLE_CHAR | RET_CONST | WRITE_CONSTANT | WRITE_DESCRIPTOR |
| HF | *DATA ACCESS* | ACTION | | |
| | RULE_NAME | ACTION | | |

| | | | | |
|---|---|---|---|---|
| ONSTANTS | *DATA ACCESS* | NEW_CONST<br>WRITE_RELOC | RET_CONST | WRITE_CONSTANTS |
| | DEC | NEW_CONST | WRITE_CONSTANTS | |

PAGE 241

| ABLE NAME | FIELD NAME | REFERENCED IN | | |
|---|---|---|---|---|
| | INDEX | NEW_CONST | RET_CONST | |
| | LEN | NEW_CONST | WRITE_CONSTANTS | WRITE_RELOC |
| | PTR | NEW_CONST | | |
| | REAL_ADDRESS | NEW_CONST | WRITE_CONSTANTS | WRITE_RELOC |
| | STRING | NEW_CONST | WRITE_CONSTANTS | |
| | SYNT | NEW_CONST | WRITE_CONSTANTS | |
| | TYPE | NEW_CONST | WRITE_CONSTANTS | |
| $ATTRIBUTES | *DATA ACCESS* | ADD_ATTR | | |
| | INTENSITY | ADD_ATTR | | |
| | NUMERIC | ADD_ATTR | | |
| | POSITION | ADD_ATTR | | |
| | PROTECTION | ADD_ATTR | | |
| $CONSTANTS | NOT_LEXED | LOCALS | | |
| $DVE_VARS | POS_MSEP | FOCUS_ON_TARGET | | |
| | SCROLL_AMT | FOCUS_ON_TARGET | | |
| $MAP | *DATA ACCESS* | EDIT_MESSAGE<br>HILITE_LINE<br>NEXT_STATEMENT | FIND_ROW<br>HILITE_LINES | HEADER<br>LOCALS |
| | COLUMN | HILITE_LINE | | |
| | INDEX | EDIT_MESSAGE | | |
| | LINE_STATUS | HILITE_LINE | | |
| | PARM_VALUE | HEADER | LOCALS | NEXT_STATEMENT |
| | ROW | EDIT_MESSAGE | FIND_ROW | HILITE_LINE |
| | STMNT# | HILITE_LINES | LOCALS | |

```
               TABLE             HILITE_LINES
               TEXT              LOCALS

SSEQ_MAP       *DATA ACCESS*     ISSUE_ACALLS       RESOLVE_ACALLS
               PARMVAL           ISSUE_ACALLS       RESOLVE_ACALLS
PAGE 242
ABLE NAME      FIELD NAME        REFERENCED IN
_________      __________

XCEPTIONS      *DATA ACCESS*     EXCEPT_NAME        WRITE_EXCEPTIONS
               EX_NUM            EXCEPT_NAME
               FORALL#           EXCEPT_NAME
               IDENT             EXCEPT_NAME        OPT_TABLE_NAME     TABLE_ILLEGAL
                                 WRITE_EXCEPTIONS
               OFFSET            EXCEPT_NAME        WRITE_EXCEPTIONS
               TABLENAME         OPT_TABLE_NAME     WRITE_EXCEPTIONS
               TABLEOFFSET       OPT_TABLE_NAME     WRITE_EXCEPTIONS

EADER          ACTION_OFF        ACTIONS            WRITE_HEADER
               CONST_OFF         WRITE_CONSTANTS    WRITE_HEADER
               DVFUNCT           WRITE_HEADER
               DVLENGTH          WRITE_HEADER
               DVNAME            NAME_AND_PARMS     WRITE_HEADER
               FIELD_OFF         WRITE_FIELDREFS    WRITE_HEADER
               LOCALS_OFF        GEN_LOCAL          WRITE_HEADER
               LOCALS#           GEN_LOCAL          LOCAL_NAME         LOCALS
                                 WRITE_HEADER
               NAMES_OFF         WRITE_GLOBALS      WRITE_HEADER
               ONCOND_OFF        WRITE_EXCEPTIONS   WRITE_HEADER
               PARMS_OFF         GEN_PARM           WRITE_HEADER
               PARMS#            CALC_OFFSET        GEN_PARM           NAME_AND_PARMS
                                 PARM_NAME          WRITE_HEADER
               RULES             CONDITIONS         WRITE_HEADER


ONG_STRINGS    *DATA ACCESS*     LOAD_BUFFER
               LEN               LOAD_BUFFER
               STRING            LOAD_BUFFER
               TYPE              LOAD_BUFFER

OOP_STACK      (INDIRECT)        LS_ITEM
               *DATA ACCESS*     LS_EMPTY
PAGE 243
ABLE NAME      FIELD NAME        REFERENCED IN
_________      __________

ESSAGES        HIGHLIGHT         EDIT_MESSAGE

ELOCATION      *DATA ACCESS*     ADD_RELOC          WRITE_RELOCATION
               OCCUR_ADDR        ADD_RELOC          WRITE_RELOCATION
               OFFSET            ADD_RELOC          WRITE_RELOCATION
               TABLE_INDEX       ADD_RELOC          WRITE_RELOCATION
               TYPE              ADD_RELOC          WRITE_RELOCATION

EQUENCE#       *DATA ACCESS*     ISSUE_ACALLS       RESOLVE_ACALL
               ADDR              ISSUE_ACALLS       RESOLVE_ACALL

YMTAB          *DATA ACCESS*     ASSIGNMENT         CALC_OFFSET        GEN_LOCAL
                                 GEN_PARM           PARM               RESOLVE_NAME
                                 SYMTAB_DEFINE      SYMTAB_LOOKUP      SYMTAB_REFERENCE
                                 WRITE_GLOBALS      WRITE_RELOC
               IDENT             CHECK_ASSIGNTARG   GEN_LOCAL          GEN_PARM
                                 SYMTAB_DEFINE      WRITE_GLOBALS
               INDEX             SYMTAB_DEFINE      SYMTAB_REFERENCE
               KIND              SYMTAB_DEFINE      SYMTAB_LOOKUP
               REF               ASSIGNMENT         CALC_OFFSET        GEN_LOCAL
                                 INDIRECT_FREF      INDIRECT_TREF      RESOLVE_NAME
                                 SYMTAB_DEFINE      WRITE_GLOBALS      WRITE_RELOC

YS$OPCODES     *DATA ACCESS*     GEN_CODE
               LEN               GEN_CODE2
               NAME              GEN_CODE2
```

```
            OPCODE          GEN_CODE2

ABLE_REFS   *DATA ACCESS*   ADD_FIELDREF      NEW_FENTRY        WRITE_FIELDREFS
                            WRITE_RELOC

            FIELD_NAME      NEW_FENTRY        WRITE_FIELDREFS

            INDEX           ADD_FIELDREF      NEW_FENTRY

            REAL_ADDRESS    NEW_FENTRY        WRITE_FIELDREFS   WRITE_RELOC

            TABLE_NAME      NEW_FENTRY        WRITE_FIELDREFS

PAGE 244

ABLE NAME   FIELD NAME      REFERENCED IN
---------   ----------
OKENS       *DATA ACCESS*   ADVANCE_TOKEN     CHECK_EXTRA_TOKS  HEADER
                            LOCALS            LOOKAHEAD_EOS     LOOKAHEAD_FUNC
                            LOOKAHEAD_PAREN   LOOKAHEAD_TABREF  NEXT_STATEMENT
                            NEXT_TOKEN

            DEC             LOAD_BUFFER

            INDEX           ADVANCE_TOKEN     CHECK_EXTRA_TOKS  LOOKAHEAD_EOS
                            LOOKAHEAD_EXPR    LOOKAHEAD_FUNC    LOOKAHEAD_PAREN
                            LOOKAHEAD_TABREF  NEXT_TOKEN

            LEN             LOAD_BUFFER

            STRING          LOAD_BUFFER       LOOKAHEAD_PAREN

            TABREF_MARK     LOAD_BUFFER

            TYPE            LOAD_BUFFER
            PRINT TREE LISTING FOR RULE. TRANSLATE
```

CONTENTS

```
ASE RULE  TRANSLATE ............................... 1

ESCENDENT RULES
 ACTION ........................................... 2
 ACTIONS .......................................... 3
 ADD_ATTR ......................................... 4
 ADD_FIELDREF ..................................... 5
 ADD_RELOC ........................................ 7
 ADVANCE_TOKEN .................................... 9
 ASSIGN_BY_NAME ................................... 10
 ASSIGNMENT ....................................... 12
 BINARY ........................................... 16
 BYNAME_FIELD ..................................... 17
 CALC_OFFSET ...................................... 18
 CHECK_ASSIGNTARG ................................. 19
 CHECK_COLON ...................................... 20
 CHECK_ENDS ....................................... 21
 CHECK_EOS ........................................ 23
 CHECK_EXTRA_TOKS ................................. 24
 CHECK_MORE_EXPR .................................. 25
 CHECK_MORE_TERM .................................. 26
 CHECK_PARMS ...................................... 27
 CHECK_R_PAREN .................................... 28
 CHK_MORE_FACTOR .................................. 29
 CHOOSE_REP ....................................... 30
 CLEAR_TTABLES .................................... 31
 CONDITION ........................................ 32
 CONDITIONS ....................................... 34
 CONSTANT ......................................... 35
 DEL_TABLE ........................................ 36
 DO_ACTIONS ....................................... 37
 EDIT_MESSAGE ..................................... 38
 EO_TOKENS ........................................ 39
 EXCEPT_ACTIONS ................................... 40
 EXCEPT_NAME ...................................... 41
 EXCEPT_ON ........................................ 42
 EXCEPTION ........................................ 43
 EXCEPTIONS ....................................... 44
 EXPR_FACTOR ...................................... 45
 EXPR_ITEM ........................................ 46
 EXPR_TERM ........................................ 48
 FIELD_PART ....................................... 49
 FIND_ROW ......................................... 51
 FINI_TRANSLATOR .................................. 52
 FLOATING_POINT ................................... 53
 FOCUS_ON_TARGET .................................. 55
 FOR_RESTRICT ..................................... 57
 GEN_ARETURN ...................................... 59
 GEN_CODE ......................................... 60
 GEN_CODE2 ........................................ 61
 GEN_INDIRECTREF .................................. 62
 GEN_IREF ......................................... 64
 GEN_LOCAL ........................................ 66
 GEN_PARM ......................................... 67
 GENERATERULE ..................................... 68
 GENNULLBIN ....................................... 70
            PRINT TREE LISTING FOR RULE: TRANSLATE
```

CONTENTS

| | |
|---|---|
| HEADER | 72 |
| HILITE_LINE | 73 |
| HILITE_LINES | 74 |
| IND_TABLENAME | 76 |
| INDIRECT_FREF | 78 |
| INDIRECT_TREF | 80 |
| INIT_TRANSLATOR | 81 |
| IR_POP | 82 |
| IR_PUSH | 83 |
| IS_NULL | 85 |
| ISSUE_ACALLS | 86 |
| LOAD_BUFFER | 88 |
| LOCAL_NAME | 89 |
| LOCALS | 90 |
| LOGICAL_VALUE | 91 |
| LOOKAHEAD_EOS | 92 |
| LOOKAHEAD_EXPR | 94 |
| LOOKAHEAD_FUNC | 95 |
| LOOKAHEAD_PAREN | 97 |
| LOOKAHEAD_TABREF | 98 |
| LS_EMPTY | 99 |
| LS_ITEM | 101 |
| MORE_ARGS | 103 |
| MORE_LOCALS | 104 |
| MORE_PARMS | 105 |
| NAME | 107 |
| NAME_AND_PARMS | 108 |
| NEGATE | 110 |
| NEITHER_NULL | 111 |
| NEW_CONST | 112 |
| NEW_FENTRY | 113 |
| NEXT_LEVEL | 114 |
| NEXT_STATEMENT | 116 |
| NEXT_TOKEN | 117 |
| OPT_TABLE_NAME | 118 |
| PACKED_DECIMAL | 119 |
| PARM | 121 |
| PARM_NAME | 122 |
| PARSE_COND_REL | 123 |
| PARSE_CONDITIONS | 125 |
| PARSE_EXPR | 126 |
| PARSE_FCNCALL | 127 |
| PARSE_FIELD_REF | 129 |
| PARSE_LOCALS | 131 |
| PARSE_NULL_EXPR | 133 |
| PARSE_NULLFLDREF | 135 |
| PREFIX_LEN_LEN | 137 |
| PREFIX_LEN_VAL | 139 |
| RELATIONAL_EXPR | 141 |
| RESOLVE_ACALL | 143 |
| RESOLVE_ACALLS | 144 |
| RESOLVE_NAME | 145 |
| RET_CONST | 147 |
| RET_LEN | 149 |
| RHS_ASSIGN | 151 |
| SET_CURSOR | 153 |

PRINT TREE LISTING FOR RULE TRANSLATE

CONTENTS

| | |
|---|---|
| SIGNAL_GREATER | 154 |
| SYMTAB_DEFINE | 155 |
| SYMTAB_LOOKUP | 156 |
| SYMTAB_REFERENCE | 157 |
| TABLE_ILLEGAL | 158 |
| TEXT_TO_SCREEN | 159 |
| WRITE_CONSTANT | 160 |
| WRITE_CONSTANTS | 162 |
| WRITE_DESCRIPTOR | 164 |
| WRITE_EXCEPTIONS | 166 |
| WRITE_FIELDREF | 169 |
| WRITE_FIELDREFS | 171 |
| WRITE_GLOBAL | 173 |
| WRITE_GLOBALS | 175 |
| WRITE_HEADER | 177 |
| WRITE_RELOC | 180 |
| WRITE_RELOCATION | 181 |
| NTRY & VALIDATION RULES | |
| MESSAGE | 183 |
| MIN | 184 |
| QUOTE | 186 |
| WRITELN | 188 |
| CREEN DEFINITIONS | |
| ABLE DEFINITION | |
| @INDIRECT_REFS | 191 |
| @RULESLIBRARY | 192 |
| BNF | 193 |
| CONSTANTS | 194 |
| ESATTRIBUTES | 195 |
| ESMAP | 196 |
| ESSEQ_MAP | 197 |
| EXCEPTIONS | 198 |
| LONG_STRINGS | 199 |
| LOOP_STACK | 200 |
| RELOCATION | 201 |
| SEQUENCE# | 202 |
| SYMTAB | 203 |
| SYSSOPCODES | 204 |
| TABLE_REFS | 205 |
| TOKENS | 206 |
| IST OF UNRESOLVED NAMES | 208 |
| IST ENTRY & VALIDATION RULES | 209 |
| ULE CROSS REFERENCE | 210 |
| ULE CALLING STRUCTURE | 217 |

ESCENDENT TREE . . . . 232
OCAL DECLARATION . . . . 232

PRINT TREE LISTING FOR RULE TRANSLATE

CONTENTS

OCAL CROSS REFERENCE . 234
IGNAL CROSS REFERENCE 237
XCEPTION HANDLER . . . 236
ABLE CROSS REFERENCE . . . 239

PRINT TREE LISTING

PRINTING ALL DESCENDENT RULES OF A BASE RULE

THE BASE RULE FOR THIS PRINT TREE IS

DETRAN

PRINTED BY BATCH ON September 01, 1989

```
Y/N ******* SECTION OPTIONS *******
 Y   PRINT BASE & DESCENDENT RULES
 Y   RULE CROSS REFERENCE
 Y   LOCAL DECLARATION
 Y   LOCAL CROSS REFERENCE
 Y   SIGNAL CROSS REFERENCE
 Y   EXCEPTION HANDLER
 Y   SCREEN DEFINITIONS
 Y   SCREEN CROSS REFERENCE
 Y   TABLE DEFINITION


 Y   TABLE CROSS REFERENCE
 Y   PRINT ENTRY & VALIDATION RULES
 Y   VALIDATION RULE CROSS REFERENCE
 Y   LIST OF UNRESOLVED NAMES
 Y   LIST ENTRY & VALIDATION RULES
 Y   RULE CALLING STRUCTURE
```

```
PAGE 1                                        SAVED ON  Mar 15  1989 BY NLLIO

DETRAN(RULE);
LOCAL DUMMY_LIBRARY, OPER1, OPER2, DET_STATE, SOURCERULE;
-------------------------------------------------------------------------------
| SUMMARY   Initiate the detranslation of a rule                              |
| KEYWORDS  DETRANSLATE, OBJECT, CODE  RULE                  LIBRARY  COMMON  |
| UNIT      DETRAN                                                            |
-------------------------------------------------------------------------------

-------------------------------------------------------------------------------
GET @TRANS_CONSTS;                                               | 1
DUMMY_LIBRARY = FIND_RULE(RULE)                                  | 2
SOURCERULE = PREFIX_RULEBODY;                                    | 3
CALL INITHEAD(RULE);                                             | 4
CALL INITGLOB;                                                   | 5
CALL RULEHEADER(HEADER.PARMS#);                                  | 6
CALL RULELOCALS(HEADER.LOCALS#);                                 | 7
CALL DETACT;                                                     | 8
CALL COND;                                                       | 9
CALL DET_EXCEPTIONS;                                             | A
CALL EPILOG;                                                     | B
-------------------------------------------------------------------------------
PAGE 2                                        SAVED ON: Jul 8, 1988 BY MCROO

ACTCALL;

-------------------------------------------------------------------------------
| SUMMARY : ESTABLISH THE SEQUENCE NUMBER OF A GIVEN ACTION.                  |
| KEYWORDS:                                                 LIBRARY: COMMON   |
| UNIT     : DETRAN                                                           |
-------------------------------------------------------------------------------
```

```
---------------------------------------------------------------------
GET DET_ACTION_OFF WHERE OFFSET = OPER',                          | 1
SEQUENCE#.ROW = DET_GLOBAL C_ORDER                                | 2
SEQUENCE#.SEQ# = DET_GLOBAL C_ORDER.                              | 3
SEQUENCE#.STMNT# = DET_ACTION_OFF STMT#                           | 4
INSERT SEQUENCE#(DET_GLOBAL COND# - 1);                           | 5
DET_GLOBAL C_ORDER = DET_GLOBAL C_ORDER -                         | 6
---------------------------------------------------------------------
PAGE 3
                                        SAVED ON  Apr 15, 1986 BY MGROC

ADD_ATTRPOS  P  :, N).

---------------------------------------------------------------------
| SUMMARY   PUT A NEW ENTRY INTO THE ESATTRIBUTES TABLE
| KEYWORDS
| UNIT      TRAN                                    LIBRARY  COMMON
---------------------------------------------------------------------

---------------------------------------------------------------------
ESATTRIBUTES.POSITION = POS.                                      | 1
ESATTRIBUTES.PROTECTION = P.                                      | 2
ESATTRIBUTES.INTENSITY = I.                                       | 3
ESATTRIBUTES.NUMERIC = N                                          | 4
INSERT ESATTRIBUTES.                                              | 5
---------------------------------------------------------------------

ON INSERTFAIL

   REPLACE ESATTRIBUTES.
PAGE 4
                                        SAVED ON  Mar 2, 1989 BY NLL10

APPENDCL.

---------------------------------------------------------------------
| SUMMARY   append colon to FORALL, UNTIL clause                     |
| KEYWORDS.                                                          |
| UNIT      DETRAN                                  LIBRARY: COMMON  |
---------------------------------------------------------------------


---------------------------------------------------------------------
CALL CHECK_UNTIL(SGETBINARY(SOURCERULE, DET_GLOBAL IC - 2,        | 1
  2) - 3);                                                        |
CALL INSTBL(SYSSOPCODES SYMBOL, SYSSOPCODES TOKEN_TYPE, 0         | 2
  ).                                                              |
CALL NEWSTMT.                                                     | 3
---------------------------------------------------------------------
PAGE 5
                                        SAVED ON  Mar 17, 1989 BY MGROO

ASSIGBN.

---------------------------------------------------------------------
| SUMMARY   Detranslate an assign by name statement                  |
| KEYWORDS  ASSIGN, BY NAME                                          |
| UNIT      DETRAN                                  LIBRARY  COMMON  |
---------------------------------------------------------------------

---------------------------------------------------------------------
CALL CNSTTOWA.                                                    | 1
CALL CNSTTOWA                                                     | 2
CALL WATOK_ABN.                                                   | 3
CALL INSTBL(SYSSOPCODES.SYMBOL  SYSSOPCODES.TOKEN_TYPE, 0         | 4
  ).                                                              |
CALL WATOK_ABN;                                                   | 5
CALL INSTBL(';', @TRANS_CONSTS.SPECIAL_CHAR, 0);                  | 6
CALL POPPRED(2);                                                  | 7
CALL NEWSTMT;                                                     | 8
---------------------------------------------------------------------
PAGE 6
                                        SAVED ON: Mar 17, 1988 BY MGROO

ASSIGBN;

---------------------------------------------------------------------
| SUMMARY : Detranslate an assign by name statement.                 |
| KEYWORDS: ASSIGN, BY NAME
```

```
| UNIT    : DETRAN                                      LIBRARY: COMMON |
-------------------------------------------------------------------------

                         DESCRIPTION
                         -----------

      Transfer the r.h.s and the l.h.s from the stack to the
      workarea. The first WATOK_ABN handles the left hand side,
      the second handles the right hand side
```

```
PAGE 7                                    SAVED ON Nov 2, 1988 BY MGROO

ASSIGIN.

---------------------------------------------------------------------
| SUMMARY:  Detranslate an assignment to a field of a table         |
| KEYWORDS: ASSIGN, FIELD                          LIBRARY: COMMON  |
| UNIT      DETRAN                                                  |
---------------------------------------------------------------------

CALL PRINTELM(DET_STACK.TYPE, DET_STACK.SUBTYPE,                 | 1
  DET_STACK.OFFSET, DET_STACK.ITEM),
CALL POPST(2),                                                   | 2
CALL INSTBL(SYS$OPCODES.SYMBOL, SYS$OPCODES TOKEN_TYPE, 0        | 3
  );
CALL PUSHWA('I', 'X', '0000', 0);                                | 4


CALL STTOWA.                                                     | 5
CALL WATOK.                                                      | 6
CALL INSTBL('.', @TRANS_CONSTS.SPECIAL_CHAR, 0).                 | 7
CALL POPPRED(2),                                                 | 8
CALL NEWSTMT.                                                    | 9
---------------------------------------------------------------------
PAGE 8                                    SAVED ON Mar 2, 1989 BY NLLIO

ASSIGLOC.

---------------------------------------------------------------------
| SUMMARY   Detranslate an assignment to a local variable           |
| KEYWORDS  ASSIGN, LOCAL                          LIBRARY  COMMON  |
| UNIT      DETRAN                                                  |
---------------------------------------------------------------------

CALL INSTBL(SGETVCHAR(SOURCERULE, OPER1,                         | 1
  @TRANS_CONSTS NAME_LENGTH), @TRANS_CONSTS.IDENTIFIER, 0
  ),
CALL INSTBL(SYS$OPCODES.SYMBOL, SYS$OPCODES TOKEN_TYPE, C        | 2
  );
CALL PUSHWA('I', 'X', '0000', 0);                                | 3
CALL STTOWA;                                                     | 4
CALL WATOK;                                                      | 5
CALL INSTBL(';', @TRANS_CONSTS.SPECIAL_CHAR, 0);                 | 6
CALL POPPRED(1);                                                 | 7
CALL NEWSTMT;                                                    | 8
---------------------------------------------------------------------
PAGE 9                                   SAVED ON: Nov 29, 1988 BY MGROO

CALL_OR_SCHED(INSTR_SYMBOL);

---------------------------------------------------------------------
| SUMMARY : Detranslate a CALL or SCHEDULE statement.               |
| KEYWORDS: CALL, SCHEDULE, DETRANSLATE            LIBRARY: COMMON  |
| UNIT    : DETRAN                                                  |
```

```
INSTR_SYMBOL = 'CALL'.                                  | Y N N N N N N
INSTR_SYMBOL = 'TRANSFERCALL'.                          |   Y N N N N N
INSTR_SYMBOL = 'EXECUTE'.                               |     Y N N N N
INSTR_SYMBOL = 'SCHEDULE'.                              |       Y N N N
INSTR_SYMBOL = 'PARM'                                   |         Y N N
INSTR_SYMBOL = 'FIELD'                                  |           Y N
--------------------------------------------------------------------------
CALL INSTBL(SYSSOPCODES.SYMBOL, SYSSOPCODES TOKEN_TYPE, C | 1 1 1

CALL PRSUBA(OPER2)                                      | 2 2 2
CALL WATOK                                              | 3 3 3
CALL PUSHWA('S'  ''       OPER2)                        |       1
                                                        |     2
CALL TESTOUE                                            |         1 1
CALL PUSHONE                                            |
DET_GLOBAL IC = GET_INSTRUCTION(DET_GLOBAL IC)          |         2 2
CALL CALL_OR_SCHED(SYSSOPCODES.SYMBOL)                  |         3 3
CALL EDIT_MESSAGE(305, 'CALL_OR_SCHED ' || DET_GLOBAL.IC), |           1
--------------------------------------------------------------------------
PAGE 10                                   SAVED ON, Nov 25, 1982 BY MGROO

CALL_OR_SCHED(INSTR_SYMBOL)

 -------------------------------------------------------------------------
| SUMMARY   Detranslate a CALL or SCHEDULE statement                      |
| KEYWORDS  CALL  SCHEDULE, DETRANSLATE                   LIBRARY COMMON  |
| UNIT      DETRAN                                                        |
 -------------------------------------------------------------------------

                              DESCRIPTION

     We must handle the case when the name of the rule to call

     is specified indirectly.  In this case, there will be an
     instruction to evaluate the name of the rule preceding the
     CALL, TRANSFERCALL, EXECUTE or SCHEDULE opcode


PAGE 11                                    SAVED ON  Apr 15, 1988 BY MGROO

CHECK_FOR_NEXT(OPCODE),

 -------------------------------------------------------------------------
| SUMMARY                                                                 |
| KEYWORDS                                                LIBRARY  COMMON |
| UNIT       DETRAN                                                       |
 -------------------------------------------------------------------------

OPCODE = 116,                                           | Y N
--------------------------------------------------------------------------
SIGNAL IS_NEXT;                                         | 1
--------------------------------------------------------------------------
PAGE 12                                    SAVED ON: Apr 15, 1988 BY MGROO

CHECK_UNTIL(OFFSET),

 -------------------------------------------------------------------------
| SUMMARY  :                                                              |
| KEYWORDS:                                               LIBRARY: COMMON |
| UNIT     : DETRAN                                                       |
 -------------------------------------------------------------------------

HEADER.ONCOND_OFF = 0;                                  | Y N
--------------------------------------------------------------------------
CALL LOOKUP_EXCEPTION('UNTIL', HEADER.ONCOND_OFF, OFFSET);  | 1
```

```
PAGE 13
                                        SAVED ON: Mar 21, 1988 BY MGROO

CHSTTOWA,
LOCAL DATA_PTR, LENGTH.

-------------------------------------------------------------------------
| SUMMARY : Push the top entry on the stack to the work area           |
| KEYWORDS                                                             |
| UNIT      DETRAN                              LIBRARY  COMMON        |
-------------------------------------------------------------------------

DET_STACK TYPE = 'C                                      | Y N N N
DET_STACK TYPE : 'P'.                                    |   Y N N
DET_STACK TYPE : 'F'                                     |     Y N
-------------------------------------------------------------------------
CALL PUSHWA('?'  'Y'  '000C', 2),                        | . . .
CALL CONST_PREFIX(DET_STACK.OFFSET)                      | 2
CALL PUSHWA('?'  @TRANS_CONSTS.IDENTIFIER. $GETCCHAR(    | 3
  SOURCERULE  DATA_PTR, LENGTH)  0).                     |
CALL PUSHWA('I'  @TRANS_CONSTS.SPECIAL_CHAR,'!'. 0).     |   2 2
CALL PUSHWA(':', @TRANS_CONSTS.IDENTIFIER, $GETVCHAR(    |   2
  SOURCERULE, HEADER.PARMS_OFF +(HEADER.PARMS# -         |
  DET_STACK.OFFSET - 1) * @TRANS_CONSTS.NAME_LENGTH,     |
  @TRANS_CONSTS.NAME_LENGTH), 0).                        |
CALL PUSHWA(':'  @TRANS_CONSTS.IDENTIFIER  $GETVCHAR(    |     3
  SOURCERULE. DET_STACK.OFFSET *                         |
  @TRANS_CONSTS NAME_LENGTH. @TRANS_CONSTS.NAME_LENGTH), 0 |
  ):                                                     |
CALL PUSHWA('I', @TRANS_CONSTS.SPECIAL_CHAR, ' '. 0).    |     4
CALL PUSHWA(')'. @TRANS_CONSTS.IDENTIFIER, $GETVCHAR(    |     5
  SOURCERULE, DET_STACK.OFFSET. @TRANS_CONSTS.NAME_LENGTH |
  ), 0),                                                 |
CALL PUSHWA('I'. @TRANS_CONSYS.SPECIAL_CHAR.'[', 0);     |   4 6


CALL POPST(2).                                           | 4 5 7
-------------------------------------------------------------------------
PAGE 14
                                        SAVED ON  Mar 21, 1989 BY MGROO

CHSTTOWA;
LOCAL DATA_PTR, LENGTH.

-------------------------------------------------------------------------
| SUMMARY   Push the top entry on the stack to the work area           |
| KEYWORDS                                                             |
| UNIT      DETRAN                              LIBRARY  COMMON        |
-------------------------------------------------------------------------

                          DESCRIPTION
                          -----------

      If the top entry on the stack is a parm (P) or a field (F),
      then push the appropriate tokens for an indirect reference.



PAGE 15
                                        SAVED ON: Apr 15, 1988 BY MGROO

COND;

-------------------------------------------------------------------------
| SUMMARY  : INITIATE THE DETRANSLATION OF CONDITIONS                  |
| KEYWORDS :                                                           |
| UNIT     : DETRAN                             LIBRARY: COMMON        |
-------------------------------------------------------------------------

HEADER.RULES > 0;                                        | Y N
```

```
--------------------------------------------------------------------------------
DET_GLOBAL.IC = HEADER.RULES,                                           | 1
DET_STATE = 'CONDITIONS';                                               | 2
DET_GLOBAL.C_ORDER = 1,                                                 | 3
DET_GLOBAL.STMT# = 1;                                                   | 4
DET_GLOBAL.I = 1,                                                       | 5
CALL PROCCOND                                                           | 6
--------------------------------------------------------------------------------

ON END_OF_COND
PAGE 16
                                          SAVED ON  May 18, 1989 BY MGROO

CONST_PREFIX(DESC_PTR).
LOCAL VL_PTR, LEN_LEN,

--------------------------------------------------------------------------------
| SUMMARY    Handle the descriptor prefix for all constant values          |
| KEYWORDS
| UNIT       DETRAN                                   LIBRARY  COMMON
--------------------------------------------------------------------------------

--------------------------------------------------------------------------------
VL_PTR = DESC_PTR + @TRANS_CONSTS.DATA_OFFSET,                          | 1
LEN_LEN = LEN_LEN_PREFIX(SGETBINARY(SOURCERULE, VL_PTR, 1)              | 2
  ).                                                                    |
LENGTH = LEN_VAL_PREFIX(SGETBINARY(SOURCERULE, VL_PTR                   | 3
  LEN_LEN)).                                                            |
DATA_PTR = VL_PTR + LEN_LEN,                                            | 4
--------------------------------------------------------------------------------
PAGE 17
                                          SAVED ON  May 18, 1989 BY MGROO

CONST_PREFIX(DESC_PTR).
LOCAL VL_PTR, LEN_LEN;

--------------------------------------------------------------------------------
| SUMMARY  : Handle the descriptor prefix for all constant values          |
| KEYWORDS :                                                               |
| UNIT     : DETRAN                                   LIBRARY: COMMON      |
--------------------------------------------------------------------------------

                              DESCRIPTION
                              -----------

All constant values look like this

-------- DESC_PTR
v
|----------------------------------------------------------|
| Type | Syntax | Length | Decimal | Length |    Data      |
|----------------------------------------------------------|
  (1)     (1)      (2)       (2)      (1/2)     (Length)

CONST_PREFIX is called with DESC_PTR as an argument and it
sets LENGTH to the value contained in the length attribute
preceding the data and it sets DATA_PTR to point to the
start of the data.

PAGE 18
                                          SAVED ON  Apr 15, 1982 BY MGROO

DET_EXCEPTIONS;

--------------------------------------------------------------------------------
| SUMMARY  : INITIATE DETRANSLATION OF EXCEPTION HANDLERS                  |
| KEYWORDS :                                                               |
| UNIT     : DETRAN                                   LIBRARY: COMMON      |
--------------------------------------------------------------------------------

HEADER.ONCOND_OFF > 0;                                                  | Y N
--------------------------------------------------------------------------------
DET_STATE = 'EXCEPTIONS';                                               | 1
DET_GLOBAL.STMT# = 1;                                                   | 2
DET_GLOBAL.I = 1;                                                       | 3
CALL PROC_EXCEPTION(HEADER.ONCOND_OFF, 1);                              | 4
--------------------------------------------------------------------------------
```

```
PAGE 19
                                        SAVED ON: Apr 15, 1988 BY MGROO

DETACT;

-------------------------------------------------------------------------
| SUMMARY :                                                             |
| KEYWORDS:                                                             |
| UNIT      DETRAN                                      LIBRARY  COMMON |
-------------------------------------------------------------------------

HEADER.ACTION_OFF > 0;                                    : Y N
----------------------------------------------------------:--------------
DET_GLOBAL.IC = HEADER.ACTION_OFF                         : 1
DET_ACTION_OFF.OFFSET = HEADER.ACTION_OFF;                : 2
DET_ACTION_OFF.SEQUENCE# = 1;                             : 3
DET_GLOBAL.STMT# = 1;                                     : 4
DET_GLOBAL.I = 1;                                         : 5
DET_ACTION_OFF.STMT# = DET_GLOBAL.STMT#                   : 6
DET_STATE = 'ACTIONS';                                    : 7
CALL PROCINS;                                             : 8
-------------------------------------------------------------------------

ON END_OF_ACTION :
   CALL NOOP;
PAGE 20
                                        SAVED ON  Apr 15, 1988 BY MGROO

DETRET;

-------------------------------------------------------------------------
| SUMMARY                                                               |
| KEYWORDS.                                                             |
| UNIT     . DETRAN                                     LIBRARY  COMMON |
-------------------------------------------------------------------------

DET_STATE = 'ACTIONS';                                    | Y N N N
DET_STATE = 'CONDITIONS';                                 |   Y N N
DET_STATE = 'EXCEPTIONS';                                 |     Y N
-------------------------------------------------------------------------



CALL RETACT;                                              | 1
CALL RETCOND;                                             |   1
CALL RET_EXCEPTION;                                       |     1
-------------------------------------------------------------------------
PAGE 21
                                        SAVED ON  Feb 20, 1989 BY NLL10

DETUNTIL;
LOCAL SYMBOL, TYPE;

-------------------------------------------------------------------------
| SUMMARY   INITIATE DETRANSLATION OF THE UNTIL STATEMENT               |
| KEYWORDS. UNTIL, STATEMENT, DETRANSLATE                               |
| UNIT      DETRAN                                      LIBRARY  COMMON |
-------------------------------------------------------------------------

                                                          :
----------------------------------------------------------:--------------
SYMBOL = SYS$OPCODES.SYMBOL;                              | 1
TYPE = SYS$OPCODES.TOKEN_TYPE;                            | 2
CALL UNTIL_STMT($GETBINARY(SOURCERULE, DET_GLOBAL.IC + 4, | 3
  2) - 3, $GETBINARY(SOURCERULE, DET_GLOBAL.IC + 2, 2));  |
CALL INSTBL(SYMBOL, TYPE, 0);                             | 4
CALL NEWSTMT;                                             | 5
-------------------------------------------------------------------------
PAGE 22
                                       SAVED ON: Jun 7, 1988 BY MGROO.

DISPLAY_CLAUSE;

-------------------------------------------------------------------------
| SUMMARY : DETRANSLATE THE DISPLAY CLAUSE OF AN UNTIL STATEMENT        |
| KEYWORDS: UNTIL, STATEMENT, DISPLAY, CLAUSE, DETRANSLAT               |
| UNIT    : DETRAN                                     LIBRARY: COMMON  |
-------------------------------------------------------------------------

                                                          |
----------------------------------------------------------+--------------
DET_GLOBAL.IC = GET_INSTRUCTION(DET_GLOBAL.IC);           | 1
CALL SYS$OPCODES.FUNCTION;                                | 2
DET_GLOBAL.IC = GET_INSTRUCTION(DET_GLOBAL.IC);           | 3
CALL SYS$OPCODES.FUNCTION;                                | 4
```

```
DET_GLOBAL IC = GET_INSTRUCTION(DET_GLOBAL IC).        | 5
CALL INDIRECT_NAME(SYS$OPCODES.NAME);                  | 6
CALL XFERTOWA(OPER1).                                  | 7
CALL TAMLIST(OPER1).                                   | 8
CALL POPPRED(OPER1).                                   | 9
-----------------------------------------------------------------
PAGE 23
                                   SAVED ON  JUL 2  1984 BY MGROC

EDIT_MESSAGE(NUM, TEXT).
LOCAL ERR_ROW, SAVE_INDEX

-----------------------------------------------------------------
| SUMMARY   GENERATE AN ERROR OR INFORMATIVE MESSAGE FOR THE RULE EDITOR
| KEYWORDS  ERROR, MESSAGE  INFORMATIVE  WARNING                 |
| UNIT      EDF                               LIBRARY  COMMON    |
-----------------------------------------------------------------

NUM >= 300                                             | Y N N N
NUM >= 200.                                            |   Y N
NUM >= 100;                                            |     Y N
-----------------------------------------------------------------
MSG = MESSAGE('EDITRULE', NUM, TEXT).                  | 1 1 1
CALL MSGLOG(MSG)                                       | 2
CALL MSGLOG('**** INTERNAL ERROR CONTACT SYSTEM REP').  | 3
SIGNAL CATASTROPHE.                                    | 4
SAVE_INDEX = ESMAP.INDEX;                              |   2
GET ESMAP WHERE PARM_VALUE = PARM_VALUE.               |   3 2
ERR_ROW = ESMAP ROW;                                   |   4 3
CALL HILITE_LINES(MESSAGES HIGHLIGHT).                 |     4
CALL HILITE_LINE.                                      |   5
GET ESMAP WHERE INDEX = SAVE_INDEX.                    |   6
CALL FOCUS_ON_TARGET(ERR_ROW, 0).                      |     5
SIGNAL TRANSLATOR_ERR;                                 |     6
-----------------------------------------------------------------


ON GETFAIL ESMAP
   SIGNAL TRANSLATOR_ERR;
ON STRINGSIZE
PAGE 24
                                   SAVED ON  APR 15, 1984 BY MGROO

ENDACT.

-----------------------------------------------------------------
| SUMMARY   AT THE END OF EACH ACTION SAVE INFO ABOUT THE ACTION |
| KEYWORDS                                                       |
| UNIT      DETRAN                            LIBRARY  COMMON    |
-----------------------------------------------------------------

-----------------------------------------------------------------
INSERT DET_ACTION_OFF.                                 | 1
DET_ACTION_OFF OFFSET = DET_GLOBAL IC.                 | 2
DET_ACTION_OFF.SEQUENCE# = DET_ACTION_OFF SEQUENCE# + 1. | 3
DET_ACTION_OFF.STMT# = DET_GLOBAL STMT#.               | 4
-----------------------------------------------------------------
PAGE 25
                                   SAVED ON  APR 15, 1984 BY MGROC

ENDCODE.

-----------------------------------------------------------------
| SUMMARY   PROCESS THE "AEND" OPCODE - END OF THE ACTIONS OR CONDITIONS |
| KEYWORDS  DETRANSLATE, ACTION, CONDITION                       |
| UNIT      DETRAN                            LIBRARY  COMMON    |
-----------------------------------------------------------------

DET_STATE = 'ACTIONS';                                 | Y N N
DET_STATE = 'CONDITIONS';                              |   Y N
-----------------------------------------------------------------
DET_GLOBAL.ACT_STMT# = DET_GLOBAL.STMT# - 1;           | 1
SIGNAL END_OF_ACTION;                                  | 2
SIGNAL END_OF_COND;                                    |   1
CALL EDIT_MESSAGE(309, 'ENDCODE ' || DET_GLOBAL.IC);   |     1
-----------------------------------------------------------------
PAGE 26
```

```
                                        SAVED ON  Apr 15, 1988 BY MGROO

EPILOG.

-----------------------------------------------------------------------
| SUMMARY    AT THE END OF DETRANSLATION PASS INFO THE THE EDITOR     |
| KEYWORDS                                                            |
| UNIT       DETRAN                               LIBRARY  COMMON     |
-----------------------------------------------------------------------

-----------------------------------------------------------------------
HEADER.CONDS# : DET_GLOBAL.COND#.                                | 1
HEADER ACTIONS# : DET_GLOBAL.ACT_STMT#.                          | 2
SCANNER_LINDEX : DET_GLOBAL.ILONG + 1.                           | 3
CALL WRITELN('SP    : ' || DET_GLOBAL.SP).                       | 4
CALL WRITELN('WAP   : ' || DET_GLOBAL.WAP).                      | 5
CALL WRITELN('PREDP:    || DET_GLOBAL PREDSP).                   | 6
CALL WRITELN('#COND   : ' || DET_GLOBAL.COND#).                  | 7
CALL WRITELN('#ONCOND: ' || DET_GLOBAL.ONCOND#).                 | 8
CALL WRITELN('#ACT_ST: ' || DET_GLOBAL.ACT_STMT#).               | 9
CALL WRITELN('#ITOKENS: ' ||(DET_GLOBAL ITOKENS - 1)).           | 6
-----------------------------------------------------------------------
PAGE 27
                                        SAVED ON  Mar 9, 1989 BY NLL10

FIND_RULE(NAME).

-----------------------------------------------------------------------
| SUMMARY    find LIBRARY for rule NAME                               |
| KEYWORDS.  GET, LIBRARY, RULE                                       |
| UNIT       DETRAN                               LIBRARY  COMMON     |
-----------------------------------------------------------------------

                                                                 |
FOUND_IN_DOC_LIB(LIBID, NAME);                                   | Y N N N
FOUND_IN_DOC_LIB(INSTALLIB, NAME);                               |   Y N N
FOUND_IN_DOC_LIB(SYSTEMLIB, NAME);                               |     Y N
-----------------------------------------------------------------------
RETURN(LIBID).                                                   | 1


RETURN(INSTALLIB)                                                |   1
RETURN(SYSTEMLIB).                                               |     1
SIGNAL NEW_RULE.                                                 |       1
-----------------------------------------------------------------------
PAGE 28
                                        SAVED ON  Mar 9, 1989 BY NLL10

FIND_RULE(NAME).

-----------------------------------------------------------------------
| SUMMARY    find LIBRARY for rule NAME                               |
| KEYWORDS   GET, LIBRARY, RULE                                       |
| UNIT       DETRAN                               LIBRARY  COMMON     |
-----------------------------------------------------------------------

                         DESCRIPTION
                         -----------

      Try to find rule NAME looking up libraries in the
   following   order   local   installation  &  system
   instantiating both @RULESDOCUMENT & @RULESLIBRARY

   ------------------------------------------------------
   *  It is the caller's reponsibility to save & restore the  *
   *  buffers for these two tables                            *
   *                                                          *
   ------------------------------------------------------

   1.  If successful return the library where they were found

   2.  If both fail raise NEW_RULE exception

   3.  If exactly one fails raise FIND_RULE_FAIL exception.


PAGE 29
                                        SAVED ON: Jul 8, 1988 BY MGROO

FLUSHSTA:

-----------------------------------------------------------------------
| SUMMARY : CAUSE EACH ITEM ON THE DETRAN STACK TO BE CONVERTED TO TEXT. |
| KEYWORDS: POP, STACK, TEXT                                          |
| UNIT    : DETRAN                               LIBRARY: COMMON      |
-----------------------------------------------------------------------
```

```
---------------------------------------------------------------------------
FORALL DET_STACK                                              |  1
   CALL PRINTELM(DET_STACK.TYPE, DET_STACK SUBTYPE,           |
     DET_STACK.OFFSET, DET_STACK.ITEM);                       |
   DELETE DET_STACK,                                          |
   END                                                        |
DET_GLOBAL.SP : 0.                                            |  2
---------------------------------------------------------------------------
PAGE 30
                                        SAVED ON  Mar 23, 1989 BY MGROC

FOCUS_ON_TARGET(ROW, COL:
LOCAL SCROLL_ADJUST, SCROLL_AMT.

---------------------------------------------------------------------------
  SUMMARY    Place the cursor on the token being searched for
  KEYWORDS   CURSOR, FIND, CHANGE, COMMAND, ERROR
  UNIT       EDR                                    LIBRARY  COMMON .
---------------------------------------------------------------------------

ROW <= ESDVE_VARS.POS_HSEP;                                   | Y N N N
ROW <= VERT_SCROLL - ESDVE_VARS.POS_HSEP,                     |   Y N N
ROW <= VERT_SCROLL - SCREENROW - 2;                           |     Y N
---------------------------------------------------------------------------
CALL TEXT_TO_SCREEN(ROW, COL).                                | 1
SCROLL_AMT : ROW -(VERT_SCROLL + ESDVE_VARS POS_HSEP)         |   1
SCROLL_ADJUST = MIN(VERT_SCROLL + SCROLL_AMT, 5).             |   2
ESDVE_VARS SCROLL_AMT : SCROLL_AMT - SCROLL_ADJUST.           |   3
CALL TEXT_TO_SCREEN(ESDVE_VARS.POS_HSEP + SCROLL_ADJUST       |   4
  COL).                                                       |
CALL TEXT_TO_SCREEN(ROW - VERT_SCROLL, COL).                  |     1
ESDVE_VARS.SCROLL_AMT : ROW -(VERT_SCROLL +                   |       1
  ESDVE_VARS.POS_HSEP + 6).                                   |
CALL TEXT_TO_SCREEN(ESDVE_VARS.POS_HSEP + 6, COL).            |       2
---------------------------------------------------------------------------
```

```
PAGE 31
                                        SAVED ON  Mar 23, 1989 BY MGROO

FOCUS_ON_TARGET(ROW, COL).
LOCAL SCROLL_ADJUST, SCROLL_AMT;

---------------------------------------------------------------------------
| SUMMARY    Place the cursor on the token being searched for             |
| KEYWORDS   CURSOR, FIND, CHANGE, COMMAND, ERROR                          |
| UNIT       EDR                                    LIBRARY  COMMON        |
---------------------------------------------------------------------------

                          DESCRIPTION
                          -----------

        Cause scrolling to be initiated, if the token is not on the
        screen
```

```
PAGE 32
                                        SAVED ON: Mar 15, 1989 BY MLL10

FOUND_IN_DOC_LIB(LIBRARY, NAME);

---------------------------------------------------------------------------
| SUMMARY : get both @RULESDOCUMENT, @RULESLIBRARY for a given library     |
| KEYWORDS:                                                               |
| UNIT    : GETRAN                                    LIBRARY: COMMON     |
---------------------------------------------------------------------------

FOUND_RULE_TABLE(LIBRARY, '@RULESDOCUMENT', 'DOC', NAME);    | Y N N
FOUND_RULE_TABLE(LIBRARY, '@RULESLIBRARY', 'LIB', NAME);     |   Y N
---------------------------------------------------------------------------
```

```
GET @RULESLIBRARY(LIBRARY) WHERE RULENAME = NAME.      | 1
RETURN('Y');                                           | 2
SIGNAL FIND_RULE_FAIL;                                 |   1
RETURN('N').                                           |     1
-------------------------------------------------------------------

ON GETFAIL @RULESLIBRARY

   SIGNAL FIND_RULE_FAIL
PAGE 33
                                   SAVED ON  Mar 15, 1989 BY NLL10

FOUND_IN_DOC_LIB(LIBRARY NAME).

-------------------------------------------------------------------
: SUMMARY   get both @RULESDOCUMENT, @RULESLIBRARY for a given library :
: KEYWORDS                                                         :
: UNIT      DETRAN                              LIBRARY  COMMON    :
-------------------------------------------------------------------

                         DESCRIPTION
                         ___________

      ->   If successful return Y
      ->   If both fail return N
      ->   If exactly one fails raise FIND_RULE_FAIL exception
```

```
PAGE 34
                                   SAVED ON  Mar 15, 1989 BY NLL10

FOUND_RULE_TABLE(LIBRARY, TABLE, TABLE_TYPE, NAME).

-------------------------------------------------------------------
| SUMMARY   as generic a get as possible on table @RULES*          :
| KEYWORDS                                                         :
| UNIT      DETRAN                              LIBRARY  COMMON    :
-------------------------------------------------------------------

                                                       :
TABLE_TYPE = 'LIB'.                                    : Y N
                                                       :
-------------------------------------------------------------------
GET TABLE(LIBRARY) WHERE RULENAME = NAME.              | 1
GET TABLE(LIBRARY) WHERE NAME = NAME                   |   .
RETURN('Y').                                           | 2 2
-------------------------------------------------------------------

ON GETFAIL

   RETURN('N').
PAGE 35
                                   SAVED ON  Mar 15, 1989 BY NLL10

FOUND_RULE_TABLE(LIBRARY  TABLE, TABLE_TYPE, NAME).

-------------------------------------------------------------------
| SUMMARY   as generic a get as possible on table @RULES*          |
| KEYWORDS                                                         |
| UNIT      DETRAN                              LIBRARY  COMMON    :
-------------------------------------------------------------------

                         DESCRIPTION
                         ___________

           Currently * is either DOCUMENT or LIBRARY.
           Would work for any table with field named NAME.
      ->   If successful return Y.
      ->   If not return N.
```

```
PAGE 36                                        SAVED ON: Feb 21, 1989 BY NLLIC

GET_INSTRUCTION(INST_COUNT):

-------------------------------------------------------------------------------
| SUMMARY   "LOAD" THE CURRENT INSTRUCTION INTO THE DETRANSLATOR
| KEYWORDS  DETRANSLATE, INSTRUCTION
  UNIT      DETRAN                                          LIBRARY  COMMON
-------------------------------------------------------------------------------


-------------------------------------------------------------------------------

GET SYSSOPCODES WHERE OPCODE = UNSIGNED_1BYTE(SGETBINARY(

  SOURCERULE, INST_COUNT, 1));

RETURN(GET_OPERANDS(INST_COUNT));
-------------------------------------------------------------------------------

ON GETFAIL

   CALL EDIT_MESSAGE(309, 'GET_INSTRUCTION ' || INST_COUNT)
PAGE 37                                        SAVED ON  Feb 14, 1989 BY NLLIC

GET_OPERANDS(INST_COUNT);

-------------------------------------------------------------------------------
| SUMMARY   GET THE ONE OR TWO OPERANDS THAT GO WITH THIS OPCODE
| KEYWORDS
| UNIT      DETRAN                                          LIBRARY  COMMON
-------------------------------------------------------------------------------

                                                              | Y N N
SYSSOPCODES.OPERAND = 0.                                      |
SYSSOPCODES.OPERAND = 1.                                      |   Y N
--------------------------------------------------------------+----------------
OPER1 = SGETBINARY(SOURCERULE  INST_COUNT + 1, 2);            |   1 1
OPER2 = SGETBINARY(SOURCERULE, INST_COUNT + 3, 2);            |     2
OPER1 = 0;                                                    | 1
OPER2 = 0.                                                    | 2 2



RETURN(INST_COUNT + 1 + SYSSOPCODES OPERAND * 2).             | 3 3 3
-------------------------------------------------------------------------------
PAGE 38                                        SAVED ON  Mar 21, 1989 BY MGROO

GETWARG(I):
LOCAL STK_TYPE, STK_SUBTYPE, STK_ITEM, STK_OFFSET, DATA_PTR, LENGTH.
-------------------------------------------------------------------------------
| SUMMARY   Detranslate a call by name argument list
| KEYWORDS
| UNIT      DETRAN                                          LIBRARY  COMMON |
-------------------------------------------------------------------------------

                                                              | Y N N
I = OPER1.                                                    |
I < OPER1.                                                    |   Y N
--------------------------------------------------------------+----------------
CALL POPINDNAME(I);                                           | 1 1
STK_TYPE = DET_STACK.TYPE.                                    | 2 2
STK_SUBTYPE = DET_STACK.SUBTYPE.                              | 3 3
STK_ITEM = DET_STACK.ITEM;                                    | 4 4
STK_OFFSET = DET_STACK.OFFSET.                                | 5 5
CALL POPST(2);                                                | 6 6
CALL STTOWA.                                                  | 7 7
CALL PUSHWA('I'  @TRANS_CONSTS.OPERATOR, '*', 0);             | 8 8
CALL CONST_PREFIX(STK_OFFSET).                                | 9 9
CALL PUSHWA('I', @TRANS_CONSTS.IDENTIFIER, SGETCCHAR(         | A A
  SOURCERULE, DATA_PTR, LENGTH), 0);
CALL PUSHWA(SYSSOPCODES.DET_TYPE, SYSSOPCODES.TOKEN_TYPE,     | B
  SYSSOPCODES.SYMBOL, 0);
CALL POPPRED(2);                                              | C B
CALL PUSHWA('I', @TRANS_CONSTS.OPERATOR, '&', 0);             |   C
CALL GETWARG(I + 1);                                          |   D
-------------------------------------------------------------------------------
PAGE 39                                        SAVED ON: Apr 15, 1988 BY MGROO

HILITE_LINE:
```

```
SUMMARY    GIVE A SINGLE LINE THE "HIGHLIGHT" ATTRIBUTE.
KEYWORDS.  ERROR, HIGHLIGHT, ATTRIBUTE                          LIBRARY  COMMON
UNIT       TRAN

CALL ADD_ATTR(ESMAP ROW + 10C + ESMAP COLUMN, 'U'  'H'
   'A').                                                        2
ESMAP.LINE_STATUS : 'E'                                         3
REPLACE ESMAP;                                                  4
ERROR_FLAG : 'Y'
PAGE 40                                      SAVED ON  JUL 2, 1988 BY MGROO

HILITE_LINES(HIGHLIGHT)

SUMMARY    GIVE ONE OR MORE LINES THE "HIGHLIGHT" ATTRIBUTE.
KEYWORDS   ERROR, HIGHLIGHT, ATTRIBUTE                          LIBRARY  COMMON
UNIT       TRAN

                                                                Y N
HIGHLIGHT.
                                                                1
FORALL ESMAP WHERE STMNT# : ESMAP.STMNT# & TABLE :
    ESMAP TABLE
  CALL HILITE_LINE.
  END;
PAGE 41                                      SAVED ON  JUL 8, 1988 BY MGROO

HILITE_LINES(HIGHLIGHT);

SUMMARY    GIVE ONE OR MORE LINES THE "HIGHLIGHT" ATTRIBUTE.
KEYWORDS   ERROR, HIGHLIGHT, ATTRIBUTE                          LIBRARY. COMMON
UNIT       TRAN

                              DESCRIPTION

  FOR EACH LINE, ADD AN 'H' (HIGHLIGHTED) ATTRIBUTE ENTRY
PAGE 42                                      SAVED ON  Nov 8, 1988 BY MGROO

IFREF.

SUMMARY    Detranslate an indirect field reference
KEYWORDS                                                        LIBRARY  COMMON
UNIT       DETRAN

                                                                1
DET_I_FLDREF.FTYPE : DET_STACK.TYPE.                            2
DET_I_FLDREF.FLDREF : DET_STACK OFFSET.                         3
DET_I_FLDREF.OFFSET : OPER1;                                    4
CALL POPST(2).                                                  5
CALL POPPRED(1).                                                6
INSERT DET_I_FLDREF;

ON INSERTFAIL
   REPLACE DET_I_FLDREF;
PAGE 43                                      SAVED ON: Jun 7, 1988 BY MGROO

INDIRECT_NAME(INSTR_NAME);

SUMMARY  : CHECK IF THE SCREEN NAME IS AN UNTIL..DISPLAY IS INDIRECT
KEYWORDS : SCREEN, NAME, DISPLAY, UNTIL, STATEMENT              LIBRARY: COMMON
UNIT     : DETRAN

                                                                Y N
INSTR_NAME : 'TAM';
```

```
CALL SYSSOPCODES.FUNCTION;                                  | 1
DET_GLOBAL.IC = GET_INSTRUCTION(DET_GLOBAL.IC).             | 2
CALL SYSSOPCODES.FUNCTION;                                  | 3
DET_GLOBAL.IC = GET_INSTRUCTION(DET_GLOBAL.IC).             | 4
--------------------------------------------------------------------------
PAGE 44                                 SAVED ON  Apr 15, 1986 BY MCROO

INITGLOB.

--------------------------------------------------------------------------
 SUMMARY    INITIALIZE THE DETRANSLATOR'S GLOBAL DATA
 KEYWORDS                                              LIBRARY  COMMON
 UNIT       DETRAN
--------------------------------------------------------------------------

                                                            |
------------------------------------------------------------+-------------
DET_GLOBAL.SP = 0.                                          | 1
DET_GLOBAL.WAP = 0                                          | 2
DET_GLOBAL.COND# = 0.                                       | 3
DET_GLOBAL.ONCOND# = 0                                      | 4
DET_GLOBAL.STMT# = 0.                                       | 5
DET_GLOBAL.ILONG = 0;                                       | 6
DET_GLOBAL.PREDSP = 0.                                      | 7
DET_GLOBAL.ITOKENS = 1                                      | 8
--------------------------------------------------------------------------
PAGE 45                                 SAVED ON  Feb 20, 1989 BY NLLIC

INITHEAD(RULE).

--------------------------------------------------------------------------
| SUMMARY   Initialize the table which holds the rule header info        |
| KEYWORDS: INITIALIZE, RULE, HEADER                    LIBRARY  COMMON |
| UNIT      DETRAN
--------------------------------------------------------------------------

                                                            |
------------------------------------------------------------+-------------
HEADER.DVNAME = RULE;                                       | 1

HEADER.DVDATE = SGETCCHAR(SOURCERULE.                       | 2
  @TRANS_CONSTS.NAME_LENGTH, 6).                            |
HEADER.DVTIME = SGETCCHAR(SOURCERULE, 22, 4).               | 3
HEADER.DVLENGTH = SGETBINARY(SOURCERULE, 26  2).            | 4
HEADER PARMS# = SGETBINARY(SOURCERULE, 28, 2).              | 5
HEADER PARMS_OFF = SGETBINARY(SOURCERULE, 30, 2).           | 6
HEADER.LOCALS# = SGETBINARY(SOURCERULE, 32, 2).             | 7
HEADER.LOCALS_OFF = SGETBINARY(SOURCERULE, 34, 2).          | 8
HEADER RULES = SGETBINARY(SOURCERULE, 36, 2).               | 9
HEADER.ACTION_OFF = SGETBINARY(SOURCERULE, 38, 2);          | A
HEADER.ONCOND_OFF = SGETBINARY(SOURCERULE, 40, 2);          | B
HEADER.DVFUNCT = SGETCCHAR(SOURCERULE, 42, 1).              | C
--------------------------------------------------------------------------
PAGE 46                                 SAVED ON: Nov 10, 1988 BY MCROO

INSCON(ITEM, TYPE, DEC);

--------------------------------------------------------------------------
| SUMMARY   Insert a constant into the TOKENS table during detranslation |
| KEYWORDS: CONSTANT, LITERAL                           LIBRARY  COMMON |
| UNIT      DETRAN
--------------------------------------------------------------------------

                                                            | Y N
LENGTH(ITEM) <= 16;                                         |
------------------------------------------------------------+-------------
CALL INSTBL(ITEM, TYPE, DEC);                               | 1
DET_GLOBAL.ILONG = DET_GLOBAL.ILONG + 1;                    |   1
LONG_STRINGS.INDEX = DET_GLOBAL.ILONG;                      |   2
LONG_STRINGS.STRING = ITEM;                                 |   3
LONG_STRINGS.LEN = LENGTH(ITEM);                            |   4
LONG_STRINGS.TYPE = TYPE;                                   |   5
INSERT LONG_STRINGS;                                        |   6
CALL INSTBL(' ', @TRANS_CONSTS.LONG_STRING,                 |   7
  DET_GLOBAL.ILONG);                                        |
```

```
PAGE 47                                         SAVED ON: Nov 10, 1988 BY MGROO

INSCON(ITEM, TYPE, DEC);

 SUMMARY   Insert a constant into the TOKENS table during detranslation
 KEYWORDS  CONSTANT, LITERAL
 UNIT      DETRAN                                         LIBRARY  COMMON
```

DESCRIPTION

A constant is either a number or a quoted string. If the constant is too long to fit into the TOKENS table, put it in the LONG_STRINGS table

```
PAGE 48                                         SAVED ON: Apr 14  1989 BY MGROO

INSNULLCON(PREFIX_LEN);

 SUMMARY : Insert a number or the keyword NULL, depending on the length
 KEYWORDS: NULL, CONSTANT, LITERAL
 UNIT    : DETRAN                                         LIBRARY: COMMON

PREFIX_LEN = 0;                                          | Y N

CALL INSCON('NULL', @TRANS_CONSTS.RESERVED_WORD, 0).     :  1
CALL INSCON(SGETBINARY(SOURCERULE, DATA_PTR, PREFIX_LEN).   :    1
  @TRANS_CONSTS.NUMBER, 0).                              :

PAGE 49                                         SAVED ON  Apr 14  1989 BY MGROO

INSNULLCON(PREFIX_LEN);

 SUMMARY : Insert a number or the keyword NULL, depending on the length
 KEYWORDS: NULL, CONSTANT, LITERAL
 UNIT      DETRAN                                         LIBRARY  COMMON
```

DESCRIPTION

The keyword NULL is translated into a constant value. All constant values are preceded by a descriptor and a one or two byte length prefix. NULL is distinguished from all other values by having a syntax of BINARY (checked for in PRCONA) and a length of 0.

```
PAGE 50                                         SAVED ON: Nov 10, 1988 BY MGROO

INSTOL(ITEM, ITYPE, IDEC);

 SUMMARY : Insert a token into the TOKENS table during detranslation.
 KEYWORDS: TOKEN
 UNIT    : DETRAN                                         LIBRARY: COMMON
```

```
ITYPE = @TRANS_CONSTS.LONG_STRING;                          | Y N
------------------------------------------------------------+-------------
TOKENS.INDEX = DET_GLOBAL.I,                                | 1 1
TOKENS.STRING = ITEM                                        | 2 2
TOKENS.LEN = MAX(LENGTH(ITEM), IDEC)                        |   3
TOKENS.LEN = IDEC,                                          | 3
TOKENS.DEC = 0,                                             | 4
TOKENS.DEC = IDEC,                                          |   4
TOKENS.TYPE = ITYPE                                         | 5 5
TOKENS.TABREF_MARK = 'N',                                   | 6 6
INSERT TOKENS(DET_GLOBAL.ITOKENS)                           | 7 7
DET_GLOBAL.I = DET_GLOBAL.I + 1                             | 8 8
--------------------------------------------------------------------------
PAGE 51
                                      SAVED ON  Nov 10, 1988 BY MGROO

INSTBL2(ITEM, ITYPE, IDEC, IMARK),

--------------------------------------------------------------------------
  SUMMARY   Insert a token into the TOKENS table
  KEYWORDS:
  UNIT       DETRAN                                   LIBRARY  COMMON
--------------------------------------------------------------------------

                                                            |
------------------------------------------------------------+-------------
TOKENS.INDEX = DET_GLOBAL.I,                                | 1
TOKENS.STRING = ITEM,                                       | 2
TOKENS.LEN = LENGTH(TOKENS.STRING);                         | 3
TOKENS.TYPE = ITYPE;                                        | 4
TOKENS.DEC = IDEC;                                          | 5
TOKENS.TABREF_MARK = IMARK,                                 | 6
INSERT TOKENS(DET_GLOBAL.ITOKENS),                          | 7
DET_GLOBAL.I = DET_GLOBAL.I + 1,                            | 8


--------------------------------------------------------------------------
PAGE 52
                                      SAVED ON  Nov 10, 1988 BY MGROO

ITREF.

--------------------------------------------------------------------------
  SUMMARY   Detranslate an indirect table reference
  KEYWORDS
  UNIT       DETRAN                                   LIBRARY  COMMON
--------------------------------------------------------------------------

                                                            |
------------------------------------------------------------+-------------
DET_I_FLDREF.TTYPE = DET_STACK.TYPE,                        | 1
DET_I_FLDREF.TBLREF = DET_STACK.OFFSET,                     | 2
DET_I_FLDREF.OFFSET = OPER1,                                | 3
CALL POPST(2),                                              | 4
CALL POPPRED(1),                                            | 5
INSERT DET_I_FLDREF,                                        | 6
--------------------------------------------------------------------------
ON INSERTFAIL

   REPLACE DET_I_FLDREF,
PAGE 53
                                      SAVED ON  May 16, 1989 BY MGROO

LEN_LEN_PREFIX(LEN),

--------------------------------------------------------------------------
| SUMMARY  : Return the length of the length prefix for a value.         |
| KEYWORDS :                                                             |
| UNIT     : DETRAN                                  LIBRARY: COMMON     |
--------------------------------------------------------------------------

LEN < 0;                                                    | Y N
------------------------------------------------------------+-------------
RETURN(2);                                                  | 1
RETURN(1);                                                  |   1
--------------------------------------------------------------------------
PAGE 54
                                      SAVED ON: May 16, 1989 BY MGROO
```

```
LEN_LEN_PREFIX(LEN);

-------------------------------------------------------------------
| SUMMARY  . Return the length of the length prefix for a value.  |
| KEYWORDS                                       LIBRARY. COMMON  |
| UNIT     . DETRAN                                               |
-------------------------------------------------------------------

                         DESCRIPTION
                         -----------

    The length of the length is one or two bytes long  If the
    high order bit is on (making the len look negative, the
    length is actually two byter long.  Otherwise it is a one
    byte lenght
```

```
PAGE 55                                 SAVED ON: May 12  1989 BY MGROO

LEN_VAL_PREFIX(LENGTH).

-------------------------------------------------------------------
| SUMMARY    Return the value of the length prefix for a value.   |
| KEYWORDS                                       LIBRARY: COMMON  |
| UNIT       DETRAN                                               |
-------------------------------------------------------------------

                                                          | Y N
LENGTH < 0.                                               |
----------------------------------------------------------+--------
RETURN(LENGTH + @TRANS_CONSTS.MAX_2BYTE_BINARY + 1);      | 1
RETURN(LENGTH);                                           |   1
```

```
-------------------------------------------------------------------
PAGE 56                                 SAVED ON  May 16, 1989 BY MGROO

LEN_VAL_PREFIX(LENGTH).

-------------------------------------------------------------------
| SUMMARY  · Return the value of the length prefix for a value    |
| KEYWORDS                                       LIBRARY  COMMON  |
| UNIT       DETRAN                                               |
-------------------------------------------------------------------

                         DESCRIPTION
                         -----------

    All lengths are either one or two bytes long.  Lengths <=
    127 are stored in one byte, those > 127 are stored in two
    bytes with the high order bit turned on (to indicate that
    this is actually a two byte length)  Thus we must turn the
    high order bit off to obtain the real length.
```

```
PAGE 57                                 SAVED ON: Feb 20, 1989 BY NLL10

LOOKUP_EXCEPTION(SYMBOL, EXC_OFFSET, OFFSET);

-------------------------------------------------------------------
| SUMMARY  : Search exception list looking for one with this code offset. |
| KEYWORDS :                                     LIBRARY: COMMON  |
| UNIT     : DETRAN                                               |
-------------------------------------------------------------------

                                                          | Y N N
SEETBINARY(SOURCERULE, EXC_OFFSET, 2) = 0;                |
SEETBINARY(SOURCERULE, EXC_OFFSET +                       |   Y N
```

```
 @TRANS_CONSTS NAME_LENGTH + 2, 2) + OFFSET:              | Y N
----------------------------------------------------------+-----------
CALL INSTBL(SYMBOL, @TRANS_CONSTS.RESERVED_WORD, 0);      |  1
CALL INSTBL(SGETVCHAR(SOURCERULE, EXC_OFFSET,             |  2
  @TRANS_CONSTS.NAME_LENGTH), @TRANS_CONSTS.IDENTIFIER, 0 |
  ).                                                      |
CALL LOOKUP_TBL_NAME(SGETBINARY(SOURCERULE, EXC_OFFSET +  |  3
  @TRANS_CONSTS.NAME_LENGTH, 2)).                         |
CALL LOOKUP_EXCEPTION('OR', EXC_OFFSET +                  |  4
  @TRANS_CONSTS.NAME_LENGTH + 4, OFFSET).                 |
CALL LOOKUP_EXCEPTION(SYMBOL, EXC_OFFSET +                |    1
  @TRANS_CONSTS.NAME_LENGTH + 4, OFFSET).                 |
----------------------------------------------------------------------
PAGE 58                                 SAVED ON  Feb 15  1989 BY NLLIC

LOOKUP_TBL_NAME(TBL_OFFSET).

----------------------------------------------------------------------
: SUMMARY    Does this exception have a corresponding table name?    :
: KEYWORDS                                           LIBRARY  COMMON :
: UNIT       DETRAN                                                  :
----------------------------------------------------------------------

                                                          | Y N
TBL_OFFSET < 0                                            |
----------------------------------------------------------+-----------
CALL INSTBL(SGETVCHAR(SOURCERULE, TBL_OFFSET,             |  1
  @TRANS_CONSTS NAME_LENGTH), @TRANS_CONSTS.IDENTIFIER, 0 |
  ):                                                      |
----------------------------------------------------------------------
PAGE 59                                 SAVED ON: Apr 15, 1988 BY MCROO

NEWSTMT.

----------------------------------------------------------------------
| SUMMARY                                                            |
| KEYWORDS                                           LIBRARY  COMMON |
| UNIT       DETRAN                                                  |

----------------------------------------------------------------------

                                                          |
----------------------------------------------------------+-----------
DET_GLOBAL STMT# = DET_GLOBAL STMT# + 1.                  | 1
DET_GLOBAL I = 1.                                         | 2
DET_GLOBAL ITOKENS = DET_GLOBAL.ITOKENS + 1.              | 3
----------------------------------------------------------------------
PAGE 60                                 SAVED ON  Nov 10, 1988 BY MCROO

OPO.

----------------------------------------------------------------------
| SUMMARY    Detranslate an @NEXT opcode                             |
| KEYWORDS   DETRANSLATE, END, STATEMENT                LIBRARY  COMMON |
| UNIT       DETRAN                                                  |
----------------------------------------------------------------------

                                                          |
----------------------------------------------------------+-----------
CALL INSTBL(SYS$OPCODES.SYMBOL, SYS$OPCODES TOKEN_TYPE, 0 | 1
  ).                                                      |
CALL INSTBL(':', @TRANS_CONSTS.SPECIAL_CHAR, 0).          | 2
CALL NEWSTMT.                                             | 3
----------------------------------------------------------------------
PAGE 61                                 SAVED ON: Nov 10, 1988 BY MCROO

OP1PREF;

----------------------------------------------------------------------
| SUMMARY  : Detranslate a unary prefix operator.                    |
| KEYWORDS :                                         LIBRARY: COMMON |
| UNIT     : DETRAN                                                  |
----------------------------------------------------------------------

                                                          | Y N
SYS$OPCODES.PRECEDENCE < DET_PRED_ST.PRED;                |
----------------------------------------------------------+-----------
CALL PUSHWA('1', 'X', '@@@@', 0);                         | 1 1
CALL PUSHWA('I', @TRANS_CONSTS.SPECIAL_CHAR,')', 0);      |   2
```

```
CALL STTOWA;                                                   | 2 3
CALL PUSHWA('I', @TRANS_CONSTS.SPECIAL_CHAR,'(', 0);           |   4
CALL PUSHST('1', 'N', '0000', 0);                              | 3 5
CALL PUSHST('I', SYSSOPCODES.TOKEN_TYPE,                       | 4 6
  SYSSOPCODES.SYMBOL, 0),
CALL WATOST;                                                   | 5 7
CALL POPPRED(1).                                                 5 8
CALL PUSHPRED(SYSSOPCODES PRECEDENCE).                           - 9
---------------------------------------------------------------------
PAGE 52                                 SAVED ON  NOV 10  1988 BY MGROO

OP1SCHED.

---------------------------------------------------------------------
. SUMMARY    Detranslate a SCHEDULE statement                        :
. KEYWORDS                                          LIBRARY   COMMON
: UNIT       DETRAN
---------------------------------------------------------------------

                                                              Y N
OPER1 ' O.
---------------------------------------------------------------------
CALL XPERTOWA(OPER1).                                        :
CALL PUSHST('I'  'X', '000C', 0);                            : 2 1
CALL PUSHST('S', '', '', OPER2);                             : 2 2
CALL PUSHST('I', @TRANS_CONSTS.SPECIAL_CHAR,'('  0).         . 4
CALL XFERTOST(OPER1);                                          5
CALL PUSHST('I', @TRANS_CONSTS.SPECIAL_CHAR,')', 0).         . 6
CALL PUSHST('1', @TRANS_CONSTS.SPECIAL_CHAR,'.'  0).         : 7 3
CALL POPPRED(OPER1);                                         . 8
CALL PUSHWA('1', 'X', '0000', 0).                            | 3 4
CALL STTOWA.                                                 : 4 5
CALL TESTQUE;                                                | 8 6
CALL NEWSTMT.                                                | C 7
---------------------------------------------------------------------


PAGE 63                                 SAVED ON  Mar 21, 1989 BY MGROO

OP1SIG,
LOCAL DATA_PTR, LENGTH,
---------------------------------------------------------------------
| SUMMARY    Detranslate a SIGNAL statement                         |
| KEYWORDS                                          LIBRARY  COMMON |
| UNIT       DETRAN
---------------------------------------------------------------------
                                                             !
-------------------------------------------------------------!-------
CALL INSTBL(SYSSOPCODES SYMBOL, SYSSOPCODES TOKEN_TYPE, 0    | 1
  ).                                                         |
CALL CONST_PREFIX(DET_STACK.OFFSET).                         | 2
CALL INSTBL(SGETCCHAR(SOURCERULE, DATA_PTR, LENGTH).         | 3
  @TRANS_CONSTS IDENTIFIER, 0).                              |
CALL INSTBL(',', @TRANS_CONSTS.SPECIAL_CHAR, 0);             | 4
CALL POPST(2).                                               : 5
CALL POPPRED(1).                                             | 6
CALL NEWSTMT.                                                | 7
---------------------------------------------------------------------
PAGE 64                                 SAVED ON  Mar 21, 1989 BY MGROO

OP1SIG,
LOCAL DATA_PTR, LENGTH;
---------------------------------------------------------------------
| SUMMARY  : Detranslate a SIGNAL statement.                        |
| KEYWORDS:                                        LIBRARY: COMMON  |
| UNIT     : DETRAN
---------------------------------------------------------------------
```

DESCRIPTION

A SIGNAL statement is translated into the pushing of a constant value (the exception name) followed by an @SIGNAL opcode.

```
PAGE 65
                                        SAVED ON  Apr 15  1986 BY MGROC
OP2

-----------------------------------------------------------------------
| SUMMARY
| KEYWORDS
| UNIT      DETRAN                                   LIBRARY  COMMON
-----------------------------------------------------------------------

-----------------------------------------------------------------------
CALL OP2RIGHT(SYS$OPCODES.PRECEDENCE).                        | 1
CALL PUSHWA(SYS$OPCODES.DET_TYPE, SYS$OPCODES.TOKEN_TYPE,     | 2
  SYS$OPCODES.SYMBOL, 0).
CALL OP2LEFT(SYS$OPCODES PRECEDENCE)                          | 3
CALL PUSHST('?', 'Y , '0000  0).                              | 4
CALL WATOST.                                                  | 5
CALL PUSHPRED(SYS$OPCODES.PRECEDENCE:                         | 6
-----------------------------------------------------------------------
PAGE 66
                                        SAVED ON  Apr 15, 1986 BY MGROC
OP2LEFT(PRECEDENCE).

-----------------------------------------------------------------------
| SUMMARY
| KEYWORDS.
| UNIT      DETRAN                                   LIBRARY: COMMON |
-----------------------------------------------------------------------

PRECEDENCE <= DET_PRED_ST.PRED.                               | Y N
-----------------------------------------------------------------------
CALL PUSHWA('I', 'S','}', 0).                                 |   1
CALL STTOWA.                                                  | 1 2
CALL PUSHWA('!', 'S','!', 0).                                 |   3
CALL POPPRED(1).                                              | 2 4
-----------------------------------------------------------------------
PAGE 67
                                        SAVED ON  Apr 15, 1986 BY MGROC
OP2RIGHT(PRECEDENCE).

-----------------------------------------------------------------------
| SUMMARY   VISIT THE RIGHT HAND SIDE OF A TWO OPERAND OPERATOR
| KEYWORDS  OPERATOR
| UNIT      DETRAN                                   LIBRARY  COMMON
-----------------------------------------------------------------------

PRECEDENCE >= DET_PRED_ST PRED;                               | Y N
-----------------------------------------------------------------------
CALL PUSHWA('I', 'X', '0000', 0).                             | 1 1
CALL PUSHWA('I', 'S','}', 0).                                 | 2
CALL STTOWA                                                   | 3 2
CALL PUSHWA('I', 'S','!', 0).                                 | 4
CALL POPPRED(1).                                              | 5 3
-----------------------------------------------------------------------
PAGE 68
                                        SAVED ON: Nov 10, 1988 BY MGROO
PCALL;

-----------------------------------------------------------------------
| SUMMARY : Detranslate a CALL statement.
| KEYWORDS:
| UNIT    : DETRAN                                   LIBRARY: COMMON |
-----------------------------------------------------------------------

OPER1 > 0;                                                    | Y N
-----------------------------------------------------------------------
```

```
CALL INSTBL(SYS$OPCODES.SYMBOL, SYS$OPCODES.TOKEN_TYPE, 0        | 1 1
  );                                                             |
CALL PRSUBA(OPER2).                                              | 2 2
CALL INSTBL('(', @TRANS_CONSTS.SPECIAL_CHAR, 0);                 | 3
CALL XFERTOWA(OPER1).                                            | 4
CALL XFRWATOK(OPER1);                                            | 5
CALL INSTBL(')', @TRANS_CONSTS.SPECIAL_CHAR, 0);                 | 6
CALL INSTBL('.', @TRANS_CONSTS.SPECIAL_CHAR, 0).                 | 7 3
CALL POPPRED(OPER1);                                             | 8
CALL NEWSTMT.                                                    | 9 4
-------------------------------------------------------------------------
PAGE 69
                                         SAVED ON: Feb 15, 1989 BY NLL10

PFUNC.

-------------------------------------------------------------------------
| SUMMARY   Detranslate a function call.                                |
| KEYWORDS                                                              |
| UNIT      DETRAN                                      LIBRARY: COMMON |
-------------------------------------------------------------------------

OPER1 > 0;                                                       | Y N
-------------------------------------------------------------------------
CALL XFERTOWA(OPER1)                                             | 1
CALL PUSHST(':', 'X', '0000', 0);                                | 2 1
CALL PUSHST('I', @TRANS_CONSTS.IDENTIFIER, $GETVCHAR(            | 3 2
  SOURCERULE, OPER2, @TRANS_CONSTS.NAME_LENGTH), 0);             |
CALL PUSHST('(', @TRANS_CONSTS.SPECIAL_CHAR,'(', 0);             | 4
CALL XFERTOST(OPER1).                                            | 5
CALL PUSHST(')', @TRANS_CONSTS.SPECIAL_CHAR,')', 0).             | 6
CALL POPPRED(OPER1).                                             | 7
CALL PUSHPRED(10);                                               | 8 3
-------------------------------------------------------------------------
PAGE 70


                                         SAVED ON: Nov 10, 1988 BY MCROO

POPINDNAME(I);

-------------------------------------------------------------------------
| SUMMARY   Pop an indirect rule name during detran of by name arguments |
| KEYWORDS                                                              |
| UNIT      DETRAN                                      LIBRARY: COMMON |
-------------------------------------------------------------------------

I -= 1;                                                          | Y N N N
DET_STACK.TYPE = 'P'.                                            |   Y N N
DET_STACK.TYPE = 'F'.                                            |     Y N
-------------------------------------------------------------------------
CALL POPST(2).                                                   |   1 1
CALL POPPRED(1).                                                 |   2 2
-------------------------------------------------------------------------
PAGE 71
                                         SAVED ON: Nov 10, 1988 BY MCROO

POPINDNAME(I).

-------------------------------------------------------------------------
| SUMMARY   Pop an indirect rule name during detran of by name arguments |
| KEYWORDS                                                              |
| UNIT    . DETRAN                                      LIBRARY. COMMON |
-------------------------------------------------------------------------
```

DESCRIPTION

For an indirect table name with arguments passed by name, the code will will look like this:

```
<code to push arguments>
<code to push rule name>
@WARG #args, -N
```

We are at the @WARG opcode and must pop the indirect rule name [in the case of a direct rule name, the name of the rule is referenced in the second argument of the @WARG opcode] and there is no need to pop anything.

```
PAGE 72                                          SAVED ON. JUL 8, 1988 BY MGROC

POPPREDIN;

-----------------------------------------------------------------------------
: SUMMARY
: KEYWORDS
: UNIT      DETRAN                                        LIBRARY  COMMON
-----------------------------------------------------------------------------

N > 0.                                                  | Y N N
DET_GLOBAL PREDSP > 0.                                  |   Y N
--------------------------------------------------------+--------------------
DELETE DET_PRED_ST WHERE INDEX = DET_GLOBAL PREDSP,     | 1
DET_GLOBAL.PREDSP = DET_GLOBAL.PREDSP - 1               | 2
CALL POPPREDIN - 1).                                    | 3
GET DET_PRED_ST WHERE INDEX = DET_GLOBAL.PREDSP         |   1
DET_PRED_ST.INDEX = DET_GLOBAL.PREDSP                   |     1
DET_PRED_ST.PREG = 9999;                                |     2
-----------------------------------------------------------------------------
PAGE 73                                          SAVED ON: JUL 8, 1988 BY MGROC

POPSTIN;

-----------------------------------------------------------------------------
| SUMMARY
: KEYWORDS
| UNIT      DETRAN                                        LIBRARY  COMMON |
-----------------------------------------------------------------------------

N > 0.                                                  | Y N N
DET_GLOBAL.SP > 0.                                      |   Y N
--------------------------------------------------------+--------------------
                                                        |

DELETE DET_STACK WHERE INDEX = DET_GLOBAL SP.           | 1
DET_GLOBAL.SP = DET_GLOBAL.SP - 1.                      | 2
CALL POPSTIN - 1).                                      | 3
GET DET_STACK WHERE INDEX = DET_GLOBAL SP               |   1
DET_STACK.INDEX = DET_GLOBAL SP.                        |     1
DET_STACK.ITEM = '@#$%'.                                |     2
-----------------------------------------------------------------------------
PAGE 74                                          SAVED ON  JUL 8, 1988 BY MGROO

POPWA.

-----------------------------------------------------------------------------
| SUMMARY
| KEYWORDS.
| UNIT      DETRAN                                        LIBRARY  COMMON |
-----------------------------------------------------------------------------

DET_GLOBAL.WAP > 1.                                     | Y N
--------------------------------------------------------+--------------------
DELETE DET_WORKAREA WHERE INDEX = DET_GLOBAL WAP.       | 1 1
DET_GLOBAL.WAP = DET_GLOBAL.WAP - 1.                    | 2 2
GET DET_WORKAREA WHERE INDEX = DET_GLOBAL WAP           | 3
DET_WORKAREA.INDEX = DET_GLOBAL.WAP.                    |   3
DET_WORKAREA.ITEM = '@#$%';                             |   4
-----------------------------------------------------------------------------
PAGE 75                                          SAVED ON: Apr 18, 1989 BY MGROO

PRCONA(DESC_PTR, SYNTAX);
LOCAL DATA_PTR, LENGTH;

-----------------------------------------------------------------------------
| SUMMARY : Detranslate a literal constant.
| KEYWORDS: CONSTANT, LITERAL
| UNIT    : DETRAN                                        LIBRARY: COMMON |
-----------------------------------------------------------------------------

SYNTAX = @TRANS_CONSTS.FIXED_CHAR;                      | Y N N N N N
SYNTAX = @TRANS_CONSTS.VARIABLE_CHAR;                   |   Y N N N N
```

```
SYNTAX = @TRANS_CONSTS.BINARY;                                 |    Y N N N
SYNTAX = @TRANS_CONSTS.PACKED_DECIMAL;                         |      Y N N
SYNTAX = @TRANS_CONSTS.FLOATING_POINT;                         |        Y N
---------------------------------------------------------------+------------
CALL CONST_PREFIX(DESC_PTR);                                   | 1 1 1 1 1
CALL INSCON($GETCCHAR(SOURCERULE, DATA_PTR, LENGTH),           | 2
  @TRANS_CONSTS.IDENTIFIER, 0);                                |
CALL INSCON($GETCCHAR(SOURCERULE, DATA_PTR, LENGTH),           |   2
  @TRANS_CONSTS.QUOTED_STRING, 0)                              |
CALL INSNULLCON(LENGTH)                                        |     2
CALL INSCON($GETPACKED(SOURCERULE, DATA_PTR, LENGTH),          |       2
  @TRANS_CONSTS.NUMBER, $GETBINARY(SOURCERULE, DESC_PTR +      |
  @TRANS_CONSTS.DECIMAL_OFFSET,                                |
  @TRANS_CONSTS.DECIMAL_LENGTH)),                              |
CALL INSCON($GETFLOAT(SOURCERULE, DATA_PTR, LENGTH),           |         2
  @TRANS_CONSTS.NUMBER, 0);                                    |
CALL EDIT_MESSAGE(309, 'PRCONA ' || DESC_PTR);                 |           1
----------------------------------------------------------------------------
PAGE 76
                                          SAVED ON  Apr 16, 1989 BY MGROG

PRCONA(DESC_PTR, SYNTAX)
LOCAL DATA_PTR  LENGTH

----------------------------------------------------------------------------
| SUMMARY    Detranslate a literal constant                                |
| KEYWORDS   CONSTANT, LITERAL                                             |
| UNIT       DETRAN                                     LIBRARY: COMMON    |
----------------------------------------------------------------------------
```

DESCRIPTION

PRCONA knows that NULL is represented by a BINARY constant
INSNULLCON is called to handle this possibly NULL value

```
PAGE 77
                                          SAVED ON: Mar 1, 1988 BY NLL10

PREFIX_RULEBODY;

----------------------------------------------------------------------------
| SUMMARY    prefix header information to RULEBODY                         |
| KEYWORDS                                                                 |
| UNIT       DETRAN                                     LIBRARY  COMMON    |
----------------------------------------------------------------------------

---------------------------------------------------------------+------------
RETURN(PAD(@RULESLIBRARY.RULENAME, 16, ' ', 'L') ||            | 1
  @RULESLIBRARY.DATE || @RULESLIBRARY.TIME || GENBIN(          |
  LENGTH(@RULESLIBRARY.RULEBODY), 2) ||                        |
  @RULESLIBRARY.RULEBODY);                                     |
----------------------------------------------------------------------------
PAGE 78
                                          SAVED ON: Mar 1, 1988 BY NLL10

PREFIX_RULEBODY;

----------------------------------------------------------------------------
| SUMMARY  : prefix header information to RULEBODY                         |
| KEYWORDS :                                                               |
| UNIT     : DETRAN                                     LIBRARY: COMMON    |
----------------------------------------------------------------------------
```

DESCRIPTION

Create a string identical to the whole occurrence of @RULESLIBRARY.

```
PAGE 79
                                        SAVED ON  Mar 1, 1989 BY NLL10

PRFLDA(OFF).

------------------------------------------------------------------------
 SUMMARY   Detranslate a table.field reference                         |
 KEYWORDS                                                               |
 UNIT      DETRAN                               LIBRARY  COMMON        |
------------------------------------------------------------------------

                                                        | Y N
OFF < 0.                                                |
--------------------------------------------------------+---------------
GET DET_I_FLDREF WHERE OFFSET = OFF.                    | 1
CALL PRTBLREF(DET_I_FLDREF.TTYPE, DET_I_FLDREF.TBLREF). | 2
CALL PRFLDREF(DET_I_FLDREF.FTYPE, DET_I_FLDREF.FLDREF). | 3
CALL INSTBL2(SGETVCHAR(SOURCERULE, OFF,                 |   1
  @TRANS_CONSTS.NAME_LENGTH), @TRANS_CONSTS.IDENTIFIER, 0,
  'Y').                                                 |
CALL INSTBL('.', @TRANS_CONSTS.SPECIAL_CHAR, 0).        |   2
CALL INSTBL2(SGETVCHAR(SOURCERULE, OFF +                |   3
  @TRANS_CONSTS.NAME_LENGTH, @TRANS_CONSTS.NAME_LENGTH),|
  @TRANS_CONSTS.IDENTIFIER, 0, 'Y').                    |
```

```
------------------------------------------------------------------------
PAGE 80
                                        SAVED ON  Mar 1, 1989 BY NLL10

PRFLDA(OFF).

------------------------------------------------------------------------
| SUMMARY   Detranslate a table.field reference                        |
| KEYWORDS                                                             |
| UNIT      DETRAN                              LIBRARY  COMMON        |
------------------------------------------------------------------------
```

DESCRIPTION

Indirect table.field references are denoted by a negative offset

```
PAGE 81
                                        SAVED ON: Mar 21, 1989 BY MGROO

PRFLDREF(TYPE, REF);
LOCAL DATA_PTR, LENGTH;

------------------------------------------------------------------------
| SUMMARY : Detranslate the field part of an indirect table.field ref. |
| KEYWORDS:                                                            |
| UNIT    : DETRAN                              LIBRARY: COMMON        |
------------------------------------------------------------------------

                                                        | Y N
TYPE = 'C';                                             |
--------------------------------------------------------+---------------
```

```
CALL INSTBL('(', @TRANS_CONSTS.SPECIAL_CHAR, 0).          |   1
CALL PRINTELM(TYPE, '', REF, '').                         |   2
CALL INSTBL2(')', @TRANS_CONSTS.SPECIAL_CHAR, 0, 'Y').    |   3
CALL CONST_PREFIX(REF).                                   |  1
CALL INSTBL2($GETVCHAR(SOURCERULE, DATA_PTR, LENGTH),     |  2
  @TRANS_CONSTS.IDENTIFIER, 0, 'Y').                      |
----------------------------------------------------------------------
PAGE 62                               SAVED ON Mar 21, 1989 BY MGROO

PRFLDREF(TYPE, REF)
LOCAL DATA_PTR, LENGTH
----------------------------------------------------------------------
| SUMMARY    Detranslate the field part of an indirect table field ref |
| KEYWORDS                                         LIBRARY   COMMON    |
| UNIT       DETRAN                                                    |
----------------------------------------------------------------------
```

DESCRIPTION

Type : C indicates that this field name is a constant value. Such a case arises when we have an indirect table name with a direct field name

```
PAGE 63                               SAVED ON Mar 21, 1989 BY MGROO

PRINTELM(TYP, SUBTYP, OFF, IT).

----------------------------------------------------------------------
| SUMMARY    Initiate the detranslation of an element                  |
| KEYWORDS:  DETRANSLATE                            LIBRARY: COMMON    |
| UNIT       DETRAN                                                    |
----------------------------------------------------------------------

TYP = 'I',                                      | Y N N N N N
TYP = 'F';                                      |   Y N N N N
TYP = 'P',                                      |     Y N N N
TYP = 'C',                                      |       Y N N
TYP = 'S';                                      |         Y N
----------------------------------------------------------------------
CALL PRINTITM(IT, SUBTYP).                      | 1
CALL PRFLDA(OFF);                               |   1
CALL PRPARM(OFF).                               |     1
CALL PRCONA(OFF, $GETCCHAR(SOURCERULE, OFF +    |
  @TRANS_CONSTS.SYNTAX_OFFSET  @TRANS_CONSTS.SYNTAX_LENGTH
  )).                                           |
CALL PRSUBA(OFF).                               |           1
CALL EDIT_MESSAGE(303, 'PRINTELM ' || DET_GLOBAL (C).  |      1
----------------------------------------------------------------------
PAGE 64                               SAVED ON Mar 21, 1989 BY MGROO

PRINTELM(TYP, SUBTYP, OFF, IT).
----------------------------------------------------------------------
| SUMMARY  : Initiate the detranslation of an element.                 |
| KEYWORDS : DETRANSLATE                            LIBRARY: COMMON    |
| UNIT     : DETRAN                                                    |
----------------------------------------------------------------------
```

DESCRIPTION

An element can be one of:

I - Name

```
F - Field reference
P - Rule parameter
C - Literal constant
S - Indirect name
```

```
PAGE 85
                                            SAVED ON  Nov 10, 1988 BY MGROO

PRINTITM(ITEM, SUBTYPE).

---------------------------------------------------------------------------
| SUMMARY : Detranslate an item
| KEYWORDS  TOKEN, TEXT
| UNIT      DETRAN                                      LIBRARY  COMMON
---------------------------------------------------------------------------

                                                         | Y N N
SUBTYPE = 'F'.                                           |
SUBTYPE = 'P'.                                           |   Y N
---------------------------------------------------------+-----------------
CALL INSTBL2('*', @TRANS_CONSTS.OPERATOR, 0, 'Y').       |   1
CALL INSTBL(' ' @TRANS_CONSTS.SPECIAL_CHAR, 0).          |   2
CALL INSTBL2(ITEM, @TRANS_CONSTS IDENTIFIER, 0, 'Y');    |   3
CALL INSTBL(ITEM, SUBTYPE, 0).                           |     1
---------------------------------------------------------------------------
```

```
PAGE 86
                                            SAVED ON  Nov 10, 1988 BY MGROO

PRINTITM(ITEM, SUBTYPE).

---------------------------------------------------------------------------
| SUMMARY : Detranslate an item                                           |
| KEYWORDS  TOKEN, TEXT                                                   |
| UNIT     : DETRAN                                     LIBRARY: COMMON   |
---------------------------------------------------------------------------
```

DESCRIPTION

Subtype : '*' denotes a * F reference The textual image is produced by inserting a * and a before the name of the field

```
PAGE 87
                                            SAVED ON: Feb 20, 1989 BY NLL10

PROC_EXCEPTION(OFFSET, I).

---------------------------------------------------------------------------
| SUMMARY : Detranslate each exception handler in the rule.               |
| KEYWORDS                                                                |
| UNIT     : DETRAN                                     LIBRARY: COMMON   |
---------------------------------------------------------------------------

                                                         | Y N
$GETBINARY(SOURCERULE, OFFSET, 2) ¬= 0;                  |
---------------------------------------------------------+-----------------
DET_GLOBAL.IC = $GETBINARY(SOURCERULE, OFFSET +          |   1
  @TRANS_CONSTS.NAME_LENGTH + 2, 2);                     |
CALL CHECK_FOR_NEXT($GETBINARY(SOURCERULE, DET_GLOBAL.IC,|   2
  1));                                                   |
CALL INSTBL('ON', @TRANS_CONSTS.RESERVED_WORD, 0);       |   3
CALL INSTBL($GETVCHAR(SOURCERULE, OFFSET,                |   4
  @TRANS_CONSTS.NAME_LENGTH), @TRANS_CONSTS.IDENTIFIER, 0|
```

```
  );
CALL LOOKUP_TBL_NAME(SGETBINARY(SOURCERULE, OFFSET +          | 5
  @TRANS_CONSTS.NAME_LENGTH, 2));                             |
CALL INSTBL(':', @TRANS_CONSTS.SPECIAL_CHAR, 0),              | 6
CALL NEWSTMT,                                                 | 7
CALL PROCINS,                                                 | 8
---------------------------------------------------------------------------
ON NEXT_EXCEPTION
   CALL PROC_EXCEPTION(OFFSET - @TRANS_CONSTS.NAME_LENGTH - 4, I - 1),
ON IS_NEXT
   CALL PROC_EXCEPTION(OFFSET + @TRANS_CONSTS.NAME_LENGTH - 4, I - 1),
PAGE 88
                                      SAVED ON: Apr 15, 1988 BY MGROO

PROCCOND,

---------------------------------------------------------------------------
| SUMMARY
| KEYWORDS.
| UNIT     : DETRAN                                   LIBRARY  COMMON |
---------------------------------------------------------------------------

DET_GLOBAL.IC < HEADER.ACTION_OFF,                            | Y N
---------------------------------------------------------------------------
DET_GLOBAL.IC = GET_INSTRUCTION(DET_GLOBAL.IC),               |
CALL SYSSOPCODES.FUNCTION,                                    | 2
CALL PROCCOND;                                                | 3
---------------------------------------------------------------------------
PAGE 89
                                      SAVED ON: Apr 15, 1988 BY MGROO

PROCINS;

---------------------------------------------------------------------------
| SUMMARY :
| KEYWORDS.
| UNIT     : DETRAN                                   LIBRARY. COMMON |
---------------------------------------------------------------------------

---------------------------------------------------------------------------
DET_GLOBAL.IC = GET_INSTRUCTION(DET_GLOBAL.IC),               | 1
CALL SYSSOPCODES.FUNCTION;                                    | 2
CALL PROCINS;                                                 | 3
---------------------------------------------------------------------------
PAGE 90
                                      SAVED ON: Mar 21, 1989 BY MGROO

PRPARM(OFF),

---------------------------------------------------------------------------
| SUMMARY    Detranslate a rule parameter                                |
| KEYWORDS:
| UNIT       DETRAN                                   LIBRARY  COMMON |
---------------------------------------------------------------------------

---------------------------------------------------------------------------
CALL INSTBL(SGETVCHAR(SOURCERULE, HEADER.PARMS_OFF +(         | 1
  HEADER.PARMS# - OFF - 1) * @TRANS_CONSTS NAME_LENGTH,       |
  @TRANS_CONSTS.NAME_LENGTH), @TRANS_CONSTS IDENTIFIER, 0     |
  ),                                                          |
---------------------------------------------------------------------------
PAGE 91
                                      SAVED ON: Mar 21, 1989 BY MGROO

PRPARM(OFF);

---------------------------------------------------------------------------
| SUMMARY  : Detranslate a rule parameter.                               |
| KEYWORDS:
| UNIT     : DETRAN                                   LIBRARY: COMMON |
---------------------------------------------------------------------------
```

DESCRIPTION

Rule parameters appear in a list which starts at HEADER.PARM_OFF from the start of the rule. Each element in the list is simply the parameter's name. Each reference to a parm in the code is made by an offset into this list.

```
PAGE 92
                                          SAVED ON  Feb 15, 1989 BY NLLIC

PRSUBA(OFF)

-----------------------------------------------------------------------
: SUMMARY   Detranslate a possibly indirect name                      :
' KEYWORDS                                                            :
. UNIT      DETRAN                              LIBRARY   COMMON      .
-----------------------------------------------------------------------

OFF . O,                                                 | Y N
                                                         |
---------------------------------------------------------+-------------
CALL PRINTELM(DET_STACK.TYPE  '', DET_STACK.OFFSET  '');  | 1
CALL POPST(2).                                           | 2
CALL POPPRED(1).                                         | 3
CALL INSTBL(SGETVCHAR(SOURCERULE, OFF,                   |   1
  @TRANS_CONSTS.NAME_LENGTH) @TRANS_CONSTS.IDENTIFIER  C |
  ),                                                     |
-----------------------------------------------------------------------
PAGE 93
                                          SAVED ON  Mar 21, 1989 BY MGROO

PRTBLREF(TYPE, REF).
LOCAL DATA_PTR, LENGTH,

-----------------------------------------------------------------------
| SUMMARY  : Detranslate the table part of an indirect table field ref. |
| KEYWORDS .                                                           |
| UNIT     : DETRAN                              LIBRARY  COMMON       |
-----------------------------------------------------------------------

                                                          |

TYPE = 'C';                                               | Y N
                                                          |
----------------------------------------------------------+------------
CALL INSTBL2('(', @TRANS_CONSTS.SPECIAL_CHAR, O, 'Y'),    |   1
CALL PRINTELM(TYPE, ''  REF, '');                         |   2
CALL INSTBL(')', @TRANS_CONSTS.SPECIAL_CHAR, O)           |   3
CALL CONST_PREFIX(REF);                                   | 1
CALL INSTBL2(SGETVCHAR(SOURCERULE, DATA_PTR, LENGTH),     | 2
  @TRANS_CONSTS IDENTIFIER, O, 'Y');                      |
CALL INSTBL(' ', @TRANS_CONSTS.SPECIAL_CHAR, O).          | 3 4
-----------------------------------------------------------------------
PAGE 94
                                          SAVED ON: Mar 21, 1989 BY MGROO

PRTBLREF(TYPE, REF).
LOCAL DATA_PTR, LENGTH,

-----------------------------------------------------------------------
| SUMMARY   Detranslate the table part of an indirect table.field ref  |
| KEYWORDS                                                             |
; UNIT      DETRAN                              LIBRARY  COMMON        |
-----------------------------------------------------------------------

                             DESCRIPTION

        Type : C indicates that the table name is a constant value
        Such a case arises when we have a direct table name with an
        indirect field name.
```

```
PAGE 95                                          SAVED ON: Feb 15, 1989 BY HLL10

PUSHONE;

-------------------------------------------------------------------------------
| SUMMARY  : Push a value onto the stack.                                      |
| KEYWORDS                                                                     |
| UNIT     : DETRAN                                          LIBRARY  COMMON   |
-------------------------------------------------------------------------------

                                                               Y N
OPER: < 0.
-------------------------------------------------------------------------------
CALL ITREF.                                                    1
CALL IPREF                                                     2
CALL PUSHST('1', 'X', '0000', 0);                              3 1
CALL PUSHST(SYSSOPCODES.DET_TYPE, SYSSOPCODES.TOKEN_TYPE       4 2
   '' OPER1).
CALL PUSHPRED(10).                                             5 3
-------------------------------------------------------------------------------
PAGE 96                                          SAVED ON  Feb 15, 1989 BY HLL10

PUSHONE.

-------------------------------------------------------------------------------
| SUMMARY    Push a value onto the stack                                       |
| KEYWORDS:                                                                    |
| UNIT     . DETRAN                                          LIBRARY  COMMON   |
-------------------------------------------------------------------------------

                                 DESCRIPTION

      If the item is an indirect table.field reference, pop the
      references to the table and field and save them in the
      DET_1_FLDREF table
```

```
PAGE 97                                          SAVED ON: Apr 15, 1988 BY MGROO

PUSHPRED(X).

-------------------------------------------------------------------------------
| SUMMARY                                                                      |
| KEYWORDS.                                                                    |
| UNIT       DETRAN                                          LIBRARY  COMMON   |
-------------------------------------------------------------------------------

-------------------------------------------------------------------------------
DET_GLOBAL.PREDSP = DET_GLOBAL.PREDSP + 1;                     | 1
DET_PRED_ST.INDEX = DET_GLOBAL.PREDSP;                         | 2
DET_PRED_ST.PRED = X.                                          | 3
INSERT DET_PRED_ST.                                            | 4
-------------------------------------------------------------------------------
PAGE 98                                          SAVED ON  Apr 15, 1988 BY MGROO

PUSHST(XTYPE, XSUBTYPE, IT, OFF).

-------------------------------------------------------------------------------
| SUMMARY  :                                                                   |
| KEYWORDS:                                                                    |
| UNIT     : DETRAN                                         LIBRARY: COMMON    |
-------------------------------------------------------------------------------

-------------------------------------------------------------------------------
DET_GLOBAL.SP = DET_GLOBAL.SP + 1;                             | 1
DET_STACK.INDEX = DET_GLOBAL.SP;                               | 2
DET_STACK.TYPE = XTYPE;                                        | 3
DET_STACK.SUBTYPE = XSUBTYPE;                                  | 4
```

```
DET_STACK.OFFSET = OFF;                                   | 5
DET_STACK.ITEM = IT;                                      | 6
INSERT DET_STACK.                                         | 7
---------------------------------------------------------------------
PAGE 99
                                    SAVED ON  JUL 8, 1988 BY MGROO

PUSHTAMS(I, XTYPE, XSUBTYPE, IT, OFF  PREC  PARM).

---------------------------------------------------------------------
: SUMMARY   PUSH ANC ENTRY ONTO THE DETRANSLATOR'S TAM STACK
: KEYWORDS  PUSH, TAM  STACK
: UNIT      DETRAN                               LIBRARY  COMMON
---------------------------------------------------------------------

                                                          |
----------------------------------------------------------+----------
DET_TAM_ST.INDEX = I                                      | 1
DET_TAM_ST TYPE = XTYPE.                                  | 2
DET_TAM_ST.SUBTYPE = XSUBTYPE                             | 3
DET_TAM_ST.OFFSET = OFF.                                  | 4
DET_TAM_ST ITEM = IT.                                     | 5
DET_TAM_ST.PRECEDENCE = PRED,                             | 6
INSERT DET_TAM_ST(PARM).                                  | 7
---------------------------------------------------------------------
PAGE 100
                                    SAVED ON  Apr 15, 1988 BY MGROC

PUSHWA(XTYPE  XSUBTYPE, IT, OFF).

---------------------------------------------------------------------
: SUMMARY                                                           |
: KEYWORDS
: UNIT      : DETRAN                             LIBRARY: COMMON   :
---------------------------------------------------------------------

                                                          |
----------------------------------------------------------+----------
DET_GLOBAL.WAP = DET_GLOBAL.WAP + 1;                      | 1
DET_WORKAREA.INDEX = DET_GLOBAL.WAP.                      | 2
DET_WORKAREA.TYPE = XTYPE;                                | 3


DET_WORKAREA.SUBTYPE = XSUBTYPE.                          | 4
DET_WORKAREA.OFFSET = OFF.                                | 5
DET_WORKAREA ITEM = IT.                                   | 6
INSERT DET_WORKAREA.                                      | 7
---------------------------------------------------------------------
PAGE 101
                                    SAVED ON  Apr 15, 1988 BY MGROO

RET_EXCEPTION.

---------------------------------------------------------------------
| SUMMARY                                                           |
| KEYWORDS
| UNIT      DETRAN                               LIBRARY  COMMON
---------------------------------------------------------------------

DET_GLOBAL.SP <= 0;                                       | Y N
----------------------------------------------------------+----------
DET_GLOBAL.ONCOND# = DET_GLOBAL.ONCOND# + 1;              | 1
SIGNAL NEXT_EXCEPTION.                                    | 2
CALL RETACT.                                              |   1
---------------------------------------------------------------------
PAGE 102
                                    SAVED ON  Nov 10, 1988 BY MGROO

RETACT:

---------------------------------------------------------------------
| SUMMARY  : Detranslate a RETURN statement.                        |
| KEYWORDS :
| UNIT     : DETRAN                              LIBRARY: COMMON    |
---------------------------------------------------------------------

                                                          |
----------------------------------------------------------+----------
CALL PUSHWA(']', 'X', '0000', 0);                         | 1
CALL STTOWA;                                              | 2
CALL INSTBL(SYSSOPCODES.SYMBOL, SYSSOPCODES.TOKEN_TYPE, 0 | 3
  );
CALL INSTBL('(', @TRANS_CONSTS.SPECIAL_CHAR, 0);          | 4
```

```
CALL WATOK,
CALL POPPRED(1);
CALL INSTBL(')', @TRANS_CONSTS.SPECIAL_CHAR, 0).
CALL INSTBL(':', @TRANS_CONSTS.SPECIAL_CHAR  0).
CALL NEWSTMT,
-------------------------------------------------------------------------------
PAGE 103
                                          SAVED ON  Nov 15, 1988 BY MCROO

RETCONC

-------------------------------------------------------------------------------
| SUMMARY   Detranslate an implicit RETURN from a sequence of conditions   |
| KEYWORDS                                                                  |
| UNIT      DETRAN                                         LIBRARY: COMMON |
-------------------------------------------------------------------------------

DET_GLOBAL.SF : C                                                  Y N
-------------------------------------------------------------------------------
DET_GLOBAL.C_ORDEP = 1,
CALL PUSHST(':', @TRANS_CONSTS SPECIAL_CHAR,   0;
CALL FLUSHSTA,
CALL POPPRED(1),
CALL NEWSTMT,
DET_GLOBAL.COND# = DET_GLOBAL.COND# + 1,
-------------------------------------------------------------------------------
PAGE 104
                                          SAVED ON  Nov 15  1988 BY MCROO

RETCOND.

-------------------------------------------------------------------------------
| SUMMARY   Detranslate an implicit RETURN from a sequence of conditions   |
| KEYWORDS                                                                  |
| UNIT    : DETRAN                                         LIBRARY: COMMON |
-------------------------------------------------------------------------------
```

DESCRIPTION

The @RETURN opcode is generated in two possible ways

1 When a rule contains a RETURN statement in the actions or exceptions

2 In the conditions after @ACALLs to all actions for the condition have been generated

```
PAGE 105
                                          SAVED ON  Jul 6, 1988 BY MCROO

ROP(OP);

-------------------------------------------------------------------------------
| SUMMARY    IS THIS A RELATIONAL OPERATOR OR NOT                           |
| KEYWORDS.  RELATIONAL OPERATOR                                            |
| UNIT     : DETRAN                                        LIBRARY: COMMON |
-------------------------------------------------------------------------------

-------------------------------------------------------------------------------
GET SYS$OPCODES WHERE OPCODE = OP & PRECEDENCE = 2;
RETURN('Y');
-------------------------------------------------------------------------------
ON GETFAIL SYS$OPCODES :
   GET SYS$OPCODES WHERE OPCODE = OP;
   RETURN('N');
PAGE 106
                                          SAVED ON: Nov 15, 1988 BY MCROO

RULEHEADER(NUM_PARMS);

-------------------------------------------------------------------------------
| SUMMARY : Detranslate the rule name and its optional list of formals.    |
| KEYWORDS:                                                                 |
```

```
| UNIT    : DETRAN                                          LIBRARY: COMMON |
-------------------------------------------------------------------------------

                                                             |
NUM_PARMS : 0.                                               | Y N
                                                             |
-------------------------------------------------------------+-----------------
                                                             |
GET_GLOBAL.I : 1.                                            | 1 1
CALL INSTBL(HEADER.DYNAME, @TRANS_CONSTS.IDENTIFIER, 0).     | 2 2
CALL RULEPARMS(1, NUM_PARMS, HEADER.PARMS_OFF)               |   3
CALL INSTBL('.', @TRANS_CONSTS.SPECIAL_CHAR, 0)              | 3 4
CALL NEWSTMT                                                 | 4 5
-------------------------------------------------------------------------------
PAGE 107
                                          SAVED ON  Feb 15, 1989 BY NLL10
```

```
RULELOCAL(LOCAL_NUM, NUM_LOCALS, LOCAL_OFFSET).

-------------------------------------------------------------------------------
| SUMMARY    Detranslate the local variables declared in this rule           |
| KEYWORDS                                                                    |
| UNIT       DETRAN                                        LIBRARY  COMMON    |
-------------------------------------------------------------------------------

                                                             |
LOCAL_NUM : 1;                                               | Y N N
LOCAL_NUM > NUM_LOCALS.                                      |   Y N
                                                             |
-------------------------------------------------------------+-----------------
CALL INSTBL('LOCAL', @TRANS_CONSTS.RESERVED_WORD, 0).        | 1
CALL INSTBL(' ', @TRANS_CONSTS.SPECIAL_CHAR, 0).             |     1
CALL INSTBL(SGETVCHAR(SOURCERULE, LOCAL_OFFSET,              | 2   2
  @TRANS_CONSTS.NAME_LENGTH), @TRANS_CONSTS.IDENTIFIER, 0    |
  ).                                                         |
CALL RULELOCAL(LOCAL_NUM + 1, NUM_LOCALS, LOCAL_OFFSET +     | 3   3
  @TRANS_CONSTS.NAME_LENGTH + 2).                            |
CALL INSTBL(';', @TRANS_CONSTS.SPECIAL_CHAR, 0).             |   1
-------------------------------------------------------------------------------
PAGE 108
                                          SAVED ON: Nov 15, 1988 BY MGROO
```

```
RULELOCALS(NUM_LOCALS).

-------------------------------------------------------------------------------
| SUMMARY    Detranslate the optional list of local variables                |
| KEYWORDS                                                                    |
| UNIT       DETRAN                                        LIBRARY  COMMON    |
-------------------------------------------------------------------------------

                                                             |
NUM_LOCALS : 0.                                              | Y N
                                                             |
-------------------------------------------------------------+-----------------
CALL RULELOCAL(1, NUM_LOCALS, HEADER.LOCALS_OFF).            |   1
CALL NEWSTMT.                                                | 1 2
-------------------------------------------------------------------------------
PAGE 109
                                          SAVED ON  Feb 15, 1989 BY NLL10
```

```
RULEPARMS(PARAM_NUM, NUM_PARAMS, PARAM_OFFSET).

-------------------------------------------------------------------------------
| SUMMARY    Detranslate a rule's list of formal parameters                  |
| KEYWORDS                                                                    |
| UNIT       DETRAN                                        LIBRARY  COMMON    |
-------------------------------------------------------------------------------

                                                             |
PARAM_NUM = 1.                                               | Y N N
PARAM_NUM > NUM_PARAMS.                                      |   Y N
                                                             |
-------------------------------------------------------------+-----------------
CALL INSTBL('(', @TRANS_CONSTS.SPECIAL_CHAR, 0);             | 1
CALL INSTBL(')', @TRANS_CONSTS.SPECIAL_CHAR, 0).             |   1
CALL INSTBL(',', @TRANS_CONSTS.SPECIAL_CHAR, 0);             |     1
CALL INSTBL(SGETVCHAR(SOURCERULE, PARAM_OFFSET,              | 2   2
  @TRANS_CONSTS.NAME_LENGTH), @TRANS_CONSTS.IDENTIFIER, 0    |
  );                                                         |
CALL RULEPARMS(PARAM_NUM + 1, NUM_PARAMS, PARAM_OFFSET +     | 3   3
  @TRANS_CONSTS.NAME_LENGTH);                                |
-------------------------------------------------------------------------------
PAGE 110
                                          SAVED ON: Feb 21, 1989 BY NLL10
```

```
SELOP(LEN, PTR);

----------------------------------------------------------------------
| SUMMARY  : HANDLE AN OPERATOR IN A SELECTION STRING                |
| KEYWORDS : SELECTION, OPERATOR                                     |
| UNIT     . DETRAN                                  LIBRARY: COMMON |
----------------------------------------------------------------------

@OP(UNSIGNED_@BYTE(@GETBINARY(SOURCERULE, PTR, 1))).         | Y N
-------------------------------------------------------------+--------
CALL SYSSOPCODES.FUNCTION.                                   | 1 1
CALL SELTERM(LEN - 1, PTR + 1).                              |   2
CALL TSELLIST(LEN - 1, PTR + 1).                             | 2
----------------------------------------------------------------------
PAGE 111
                                     SAVED ON  Nov 17, 1988 BY JCT20

SELOP1(OP).

----------------------------------------------------------------------
| SUMMARY    Detranslate a unary logical operator                    |
| KEYWORDS.  PUSH, STACK  LOGICAL, OPERATOR                          |
| UNIT       DETRAN                                  LIBRARY: COMMON |
----------------------------------------------------------------------

                                                             |
-------------------------------------------------------------+--------
GET SYSSOPCODES WHERE SYMBOL = OP;                           | 1
CALL PUSHWA('I', 'X'  '0000', 0).                            | 2
CALL PUSHWA('I', @TRANS_CONSTS.SPECIAL_CHAR,')', 0).         | 3
CALL STTOWA.                                                 | 4
CALL PUSHWA('I', @TRANS_CONSTS.SPECIAL_CHAR,'(', 0).         | 5
CALL PUSHST('I', 'X'  '0000', 0);                            | 6
CALL PUSHST('I', SYSSOPCODES.TOKEN_TYPE, OP  0).             | 7
CALL WATOST.                                                 | 8
CALL POPPRED(1);                                             | 9
CALL PUSHPRED(SYSSOPCODES PRECEDENCE).                       | A
----------------------------------------------------------------------
PAGE 112

                                     SAVED ON  Nov 15, 1988 BY MGROO

SELOP2(OP).

----------------------------------------------------------------------
| SUMMARY  · Detranslate a binary logical operator                   |
| KEYWORDS   PUSH  STACK  LOGICAL, OPERATOR                          |
| UNIT     · DETRAN                                   LIBRARY COMMON |
----------------------------------------------------------------------

                                                             |
-------------------------------------------------------------+--------
GET SYSSOPCODES WHERE SYMBOL = OP.                           | 1
CALL OP2RIGHT(SYSSOPCODES PRECEDENCE).                       | 2
CALL PUSHWA('I', SYSSOPCODES TOKEN_TYPE, OP, 0).             | 3
CALL OP2LEFT(SYSSOPCODES PRECEDENCE).                        | 4
CALL PUSHST('I', 'X', '0000', 0).                            | 5
CALL WATOST.                                                 | 6
CALL PUSHPRED(SYSSOPCODES PRECEDENCE).                       | 7
----------------------------------------------------------------------
PAGE 113
                                     SAVED ON  Mar 21, 1989 BY MGROO

SELTERM(LEN, PTR)

----------------------------------------------------------------------
| SUMMARY    Detranslate an item in a selection string.              |
| KEYWORDS : SELECTION, ITEM                                         |
| UNIT     : DETRAN                                  LIBRARY: COMMON |
----------------------------------------------------------------------

@GETBINARY(SOURCERULE, PTR, 1) = 88;                         | Y N N
@GETBINARY(SOURCERULE, PTR, 1) = 72;                         |   Y N
-------------------------------------------------------------+--------
CALL PUSHST('I', 'X', '0000', 0);                            | 1 1
CALL PUSHST('I', '=', @GETVCHAR(SOURCERULE, PTR + 1,         | 2
  @TRANS_CONSTS.NAME_LENGTH), 0);                            |
CALL TAMTOST(PTR - STR_START + 1);                           |   2
CALL PUSHPRED(10);                                           | 3
```

```
CALL SELTERM(LEN - @TRANS_CONSTS.NAME_LENGTH - 1, PTR +        | 4
  @TRANS_CONSTS.NAME_LENGTH + 1);
CALL SELTERM(LEN - 5, PTR + 5);                                |   3
CALL SELOP(LEN, PTR);                                          |     1
-------------------------------------------------------------------------
PAGE 114
                                          SAVED ON: Mar 21, 1989 BY MGROO

SELTERM(LEN, PTR);

-------------------------------------------------------------------------
| SUMMARY    Detranslate an item in a selection string
  KEYWORDS   SELECTION  ITEM
| UNIT       DETRAN                                     LIBRARY  COMMON
-------------------------------------------------------------------------
```

DESCRIPTION

```
An item is one of the following
6L - a field reference (i.e. - field name)
7L - a constant value
?? - an operator, either arithmetic or relational
```

```
PAGE 115
                                          SAVED ON: Apr 15, 1988 BY MGROO

SET_CURSOR(ROW, COL);

-------------------------------------------------------------------------
| SUMMARY  : SET THE VARIABLES WHICH MAINTAIN THE CURSOR'S POSITION     |
| KEYWORDS :
| UNIT     : TRAN                                       LIBRARY: COMMON |

-------------------------------------------------------------------------

                                                       |
-------------------------------------------------------+-----------------
CURSOR_ROW = ROW;                                      | 1
CURSOR_COL = COL;                                      | 2
-------------------------------------------------------------------------
PAGE 116
                                          SAVED ON: Jun 10, 1988 BY MGROO

STTAMST(I, TAMST_PARM);

-------------------------------------------------------------------------
| SUMMARY    TRANSFER AN ENTRY ON THE DETRAN STACK TO THE TAM STACK     |
| KEYWORDS   PUSH, POP, TAM, STACK
| UNIT       DETRAN                                     LIBRARY: COMMON |
-------------------------------------------------------------------------

DET_STACK.ITEM = '0000'                                | Y N
-------------------------------------------------------+-----------------
CALL PUSHTAMS(1, DET_STACK.TYPE, DET_STACK.SUBTYPE,    |   1
  DET_STACK.ITEM, DET_STACK.OFFSET, DET_PRED_ST.PRED,  |
  TAMST_PARM);                                         |
CALL POPST(1);                                         | 1 2
CALL STTAMST(I + 1, TAMST_PARM);                       |   3
-------------------------------------------------------------------------
PAGE 117
                                          SAVED ON: Jun 10, 1988 BY MGROO

STTAMST(I, TAMST_PARM);

-------------------------------------------------------------------------
| SUMMARY  : TRANSFER AN ENTRY ON THE DETRAN STACK TO THE TAM STACK     |
| KEYWORDS : PUSH, POP, TAM, STACK
| UNIT     : DETRAN                                     LIBRARY: COMMON |
-------------------------------------------------------------------------
```

DESCRIPTION

AN ENTRY ON THE DETRAN STACK IS TERMINATED BY A MARKER WITH ITEM EQUAL TO '0000'.

```
PAGE 118                                    SAVED ON: Apr 15, 1988 BY MCROO

STTOWA;

-----------------------------------------------------------------------
| SUMMARY :                                                           |
| KEYWORDS:                                                           |
| UNIT      DETRAN                                  LIBRARY  COMMON   |
-----------------------------------------------------------------------

DET_STACK.ITEM : '0000'.                                     | Y N
-------------------------------------------------------------+---------
CALL PUSHWA(DET_STACK.TYPE, DET_STACK.SUBTYPE,               |   1
  DET_STACK.ITEM, DET_STACK.OFFSET);                         |
CALL POPST(1).                                               | 1 2
CALL STTOWA                                                  |   3
-----------------------------------------------------------------------
PAGE 119                                    SAVED ON  Apr 15, 1988 BY MCROO

TAMCALL,

-----------------------------------------------------------------------
| SUMMARY   DETRANSLATE A TAM CALL                                    |
| KEYWORDS:                                                           |
| UNIT      DETRAN                                  LIBRARY  COMMON   |
-----------------------------------------------------------------------

                                                             |
-------------------------------------------------------------+---------
CALL XPERTOWA(OPER1).                                        | 1
CALL TAMLIST(OPER1);                                         | 2
CALL TAMCOLON;                                               | 3
CALL POPPRED(OPER1).                                         | 4
-----------------------------------------------------------------------
PAGE 120                                    SAVED ON: Nov 15, 1988 BY MCROO

TAMCOLON;

-----------------------------------------------------------------------
| SUMMARY : Detranslate the last part of a table access statement.    |


| KEYWORDS                                                            |
| UNIT      DETRAN                                  LIBRARY: COMMON   |
-----------------------------------------------------------------------

DET_TAM_OPCODE.OPCODE : 'A'.                                 | Y N
-------------------------------------------------------------+---------
CALL INSTBL(';', @TRANS_CONSTS.SPECIAL_CHAR, 0);             |   1
CALL NEWSTMT;                                                |   2
-----------------------------------------------------------------------
PAGE 121                                    SAVED ON: Apr 15, 1988 BY MCROO

TAMLIST(NUM).

-----------------------------------------------------------------------
| SUMMARY :                                                           |
| KEYWORDS:                                                           |
| UNIT      DETRAN                                  LIBRARY. COMMON   |
-----------------------------------------------------------------------

NUM : 1;                                                     | Y N N N N N
NUM : 2.                                                     |   Y N N N N
NUM : 3;                                                     |     Y N N N
NUM : 4;                                                     |       Y N N
NUM : 5;                                                     |         Y N
-------------------------------------------------------------+-------------
CALL TAMOP;                                                  | 1 1 1 1 1
CALL TAMTBL;                                                 |   2 2 2 2
CALL TAMPARM;                                                |     3 3 3
CALL TAMSEL;                                                 |       4 4
CALL TAMORDER;                                               |         5
---------------------------------------------------------------------------
PAGE 122                                    SAVED ON: Mar 21, 1988 BY MCROO

TAMOP;
LOCAL DATA_PTR, LENGTH;

-----------------------------------------------------------------------
| SUMMARY : Detranslate the TAM operation code for a table access stmnt. |
```

```
| KEYWORDS:
| UNIT     : DETRAN                                         LIBRARY  COMMON |
----------------------------------------------------------------------------
                                                          |
----------------------------------------------------------+-----------------
CALL CONST_PREFIX(DET_WORKAREA.OFFSET);                   | 1
GET DET_TAM_OPCODE WHERE OPCODE = $GETCCHAR(SOURCERULE,   | 2
  DATA_PTR, LENGTH);                                      |
CALL INSTBL(DET_TAM_OPCODE.SYMBOL,                        | 3
  @TRANS_CONSTS.RESERVED_WORD  0);                        |
CALL POPWA;                                               | 4
CALL POPWA;                                               | 5
----------------------------------------------------------------------------
PAGE 123
                                        SAVED ON  Mar 21, 1988 BY MGROO

TAMOP;
LOCAL DATA_PTR  LENGTH;

----------------------------------------------------------------------------
| SUMMARY  : Detranslate the TAM operation code for a table access stmnt
| KEYWORDS:
| UNIT     : DETRAN                                         LIBRARY  COMMON
----------------------------------------------------------------------------
```

DESCRIPTION

There is a unique TAM operation code for each kind of table access statement: FORALL, GET, INSERT, DELETE, REPLACE, DISPLAY, DISPLAY..UNTIL, COMMIT and ROLLBACK

```
PAGE 124
                                        SAVED ON  Mar 17, 1988 BY MGROO

TAMORDER:
LOCAL DATA_PTR, LENGTH.

----------------------------------------------------------------------------
| SUMMARY  : Detranslate the opt. ORDERED clause on a table access stmnt  |
| KEYWORDS:                                                                |
| UNIT     : DETRAN                                        LIBRARY: COMMON |
----------------------------------------------------------------------------
                                                          |
----------------------------------------------------------+-----------------
CALL CONST_PREFIX(DET_WORKAREA.OFFSET);                   | 1
CALL TORDLIST(LENGTH, DATA_PTR);                          | 2
CALL POPWA;                                               | 3
CALL POPWA;                                               | 4
----------------------------------------------------------------------------
PAGE 125
                                        SAVED ON  Jun 10, 1988 BY MGROO

TAMP;

----------------------------------------------------------------------------
| SUMMARY  : SAVE AN EXPRESSION ON THE DETRANSLATOR'S TAM STACK            |
| KEYWORDS: EXPRESSION, SELECTION STRING, PARAMETER LIST                   |
| UNIT     : DETRAN                                        LIBRARY: COMMON |
----------------------------------------------------------------------------
                                                          |
----------------------------------------------------------+-----------------
CALL STTAMST(1, OPER1);                                   | 1
CALL POPPRED(1);                                          | 2
----------------------------------------------------------------------------
PAGE 126
                                        SAVED ON: Jun 10, 1988 BY MGROO

TAMP;

----------------------------------------------------------------------------
| SUMMARY  : SAVE AN EXPRESSION ON THE DETRANSLATOR'S TAM STACK.           |
| KEYWORDS: EXPRESSION, SELECTION STRING, PARAMETER LIST                   |
| UNIT     : DETRAN                                        LIBRARY: COMMON |
```

```
----------------------------------------------------------------------

                         DESCRIPTION
                         -----------

   TAMP DETRANSLATES THE @TAMP OPCODE   THE @TAMP OPCODE SAVES A
   POINTER TO A VALUE INSIDE A STRING

   THE DETRANSLATION OF THE @TAMP OPCODE. REQUIRES AN EXPRESSION
   BE SAVED ON THE DETRANSLATOR'S TAM STACK   THE EXPRESSION'S
   PRECEDENCE IS ALSO SAVED
PAGE 127
                                           SAVED ON  Mar 17  1989 BY MGROO

TAMPARM.
LOCAL STR_START  DATA_PTR  LENGTH.

----------------------------------------------------------------------
| SUMMARY   Detranslate the opt  table parm list in a table access stmnt |
| KEYWORDS  TABLE  PARAMETER LIST                                         |
| UNIT      DETRAN                                       LIBRARY  COMMON |
----------------------------------------------------------------------


----------------------------------------------------------------------
STR_START : DET_WORKAREA.OFFSET +                           | 1
  @TRANS_CONSTS.DATA_OFFSET.                                |
CALL CONST_PREFIX(DET_WORKAREA.OFFSET)                      | 2
CALL TAMTPAR(LENGTH / 4. DATA_PTR).                         | 3
CALL POPWA.                                                 | 4
CALL POPWA.                                                 | 5
----------------------------------------------------------------------
PAGE 128
                                           SAVED ON  Mar 17, 1989 BY MGROO

TAMSEL:
LOCAL DATA_PTR. LENGTH;

----------------------------------------------------------------------
| SUMMARY : Detranslate the opt. WHERE clause in a table access stmnt |
| KEYWORDS. WHERE CLAUSE. SELECTION                                    |
| UNIT    : DETRAN                                    LIBRARY  COMMON |
----------------------------------------------------------------------

                                                            |
----------------------------------------------------------------------
CALL CONST_PREFIX(DET_WORKAREA.OFFSET);                     | 1



CALL TAMSEL2.                                               | 2
----------------------------------------------------------------------
PAGE 129
                                           SAVED ON  Mar 17, 1989 BY MGROO

TAMSEL2:
LOCAL STR_START.

----------------------------------------------------------------------
| SUMMARY . Detranslate the opt. WHERE clause in a table access stmnt |
| KEYWORDS: WHERE CLAUSE. SELECTION                                    |
| UNIT    : DETRAN                                    LIBRARY: COMMON |
----------------------------------------------------------------------

LENGTH > 2.                                                 | Y N
----------------------------------------------------------------------
CALL INSTBL('WHERE'. @TRANS_CONSTS.RESERVED_WORD. 0).       | 1
STR_START = DET_WORKAREA.OFFSET +                           | 2
  @TRANS_CONSTS.DATA_OFFSET.                                |
CALL TSELLIST(LENGTH. DATA_PTR).                            | 3
CALL POPWA;                                                 | 4 1
CALL POPWA,                                                 | 5 2
----------------------------------------------------------------------
PAGE 130
                                           SAVED ON  Mar 17, 1989 BY MGROO

TAMTBL.

----------------------------------------------------------------------
| SUMMARY : Detranslate a table name in a table access statement.     |
| KEYWORDS: TABLE NAME                                                 |
| UNIT    : DETRAN                                    LIBRARY: COMMON |
----------------------------------------------------------------------

DET_WORKAREA.TYPE = 'C';                                    | Y N N N
DET_WORKAREA.TYPE = 'P';                                    |   Y N N
DET_WORKAREA.TYPE = 'F';                                    |     Y N
----------------------------------------------------------------------
CALL PRCONA(DET_WORKAREA.OFFSET, @TRANS_CONSTS.FIXED_CHAR   | 1
  );                                                        |
```

```
CALL PRPARM(DET_WORKAREA.OFFSET).                    |   1
CALL PRFLDA(DET_WORKAREA.OFFSET).                    |     1
CALL PBPWA;                                          | 2 2 2
CALL PBPWA.                                          | 3 3 3
------------------------------------------------------------------
PAGE 131
                                 SAVED ON  Mar 17  1989 BY MGROO

TAMTEL.

------------------------------------------------------------------
| SUMMARY   Detranslate a table name in a table access statement |
| KEYWORDS  TABLE NAME                                           |
| UNIT      DETRAN                              LIBRARY  COMMON  |
------------------------------------------------------------------
```

DESCRIPTION

```
Type : 'C' is a direct table name
Type :  'R'  is  an indirect table name with the name in a
rule parm.
Type :  'F'  is  an indirect table name with the name in a
field of a table
```

```
PAGE 132
                                 SAVED ON: Jul 8, 1988 BY MGROO

TAMTOK(TAMST_PARM);

------------------------------------------------------------------
| SUMMARY : CAUSE EACH ELEMENT ON THE TAM STACK TO BE CONVERTED TO TEXT |
| KEYWORDS: POP, STACK, TEXT

| UNIT      DETRAN                              LIBRARY  COMMON  |
------------------------------------------------------------------

------------------------------------------------------------------
FORALL DET_TAM_ST(TAMST_PARM) ORDERED DESCENDING INDEX   | 1
   CALL PRINTELM(DET_TAM_ST TYPE, DET_TAM_ST SUBTYPE,    |
     DET_TAM_ST.OFFSET, DET_TAM_ST ITEM).                |
   DELETE DET_TAM_ST(TAMST_PARM).                        |
   END;                                                  |
------------------------------------------------------------------
PAGE 133
                                 SAVED ON  Jul 8, 1988 BY MGROO

TAMTOST(TAMST_PARM).

------------------------------------------------------------------
| SUMMARY   TRANSFER ALL ITEMS ON TAM STACK TO DETRAN STACK      |
| KEYWORDS. PUSH, POP, STACK                                     |
| UNIT      DETRAN                              LIBRARY  COMMON  |
------------------------------------------------------------------

------------------------------------------------------------------
FORALL DET_TAM_ST(TAMST_PARM) ORDERED DESCENDING INDEX   | 1
   CALL PUSHST(DET_TAM_ST.TYPE, DET_TAM_ST.SUBTYPE,      |
     DET_TAM_ST ITEM, DET_TAM_ST.OFFSET).                |
   CALL PUSHPRED(DET_TAM_ST.PRECEDENCE);                 |
   DELETE DET_TAM_ST(TAMST_PARM);                        |
   END;                                                  |
------------------------------------------------------------------
PAGE 134
                                 SAVED ON: Nov 15, 1988 BY MGROO

TAMTPAR(N, PARMPTR);

------------------------------------------------------------------
| SUMMARY : Detranslate a table parm list in a table access statement. |
| KEYWORDS:                                                      |
| UNIT     : DETRAN                             LIBRARY: COMMON  |
------------------------------------------------------------------
```

```
                                                            | Y N
N > 0;                                                      |
------------------------------------------------------------+--------------
CALL INSTBL('(', @TRANS_CONSTS.SPECIAL_CHAR, 0).            | 1
CALL TPARLIST(N, PARMPTR).                                  | 2
CALL INSTBL(')', @TRANS_CONSTS.SPECIAL_CHAR, 0).            | 3
---------------------------------------------------------------------------
PAGE 135                                  SAVED ON  Mar 17, 1989 BY MGROO

TESTOUE.
LOCAL DATA_PTR, LENGTH;
---------------------------------------------------------------------------
| SUMMARY   Detranslate the optional TO clause in a SCHEDULE statement   |
| KEYWORDS                                              LIBRARY  COMMON  |
| UNIT      DETRAN                                                        |
---------------------------------------------------------------------------

------------------------------------------------------------+--------------
CALL CONST_PREFIX(DET_STACK.OFFSET).                        | 1
CALL TESTOUE2.                                              | 2
---------------------------------------------------------------------------
PAGE 136                                  SAVED ON  Mar 21, 1989 BY MGROO

TESTOUE2.
---------------------------------------------------------------------------
| SUMMARY   Detranslate the optional TO clause in a SCHEDULE statement   |
| KEYWORDS                                              LIBRARY  COMMON  |
| UNIT      DETRAN                                                        |
---------------------------------------------------------------------------

                                                            | Y N N
DET_STACK.TYPE -= 'C'.                                      |
SGETCCHAR(SOURCERULE, DATA_PTR, 1) -= ' '.                  |   Y N
------------------------------------------------------------+--------------
CALL STTOWA.                                                | 1 1
CALL POPST(2).                                              |     1
CALL POPPRED(1).                                            | 2 2 2
CALL INSTBL(SYS$OPCODES.SYMBOL, SYS$OPCODES.TOKEN_TYPE, 0   | 3 3 3


  ).
CALL INSTBL('TO', @TRANS_CONSTS.RESERVED_WORD, 0).          | 4 4
CALL WATOK.                                                 | 5 5 4
---------------------------------------------------------------------------
PAGE 137                                  SAVED ON  Apr 15, 1988 BY MGROO

TEXT_TO_SCREEN(ROW, COL).
---------------------------------------------------------------------------
| SUMMARY   MAP A TEXT POSITION TO A SCREEN POSITION                      |
| KEYWORDS  TEXT, SCREEN, POSITION                      LIBRARY: COMMON  |
| UNIT      TRAN                                                          |
---------------------------------------------------------------------------

                                                            | Y N
ROW = 2;                                                    |
------------------------------------------------------------+--------------
CALL SET_CURSOR(ROW, COL + 2).                              | 1
CALL SET_CURSOR(ROW, COL + 4).                              |   1
---------------------------------------------------------------------------
PAGE 138                                  SAVED ON  Feb 15, 1989 BY NLL10

TORD(PTR):
---------------------------------------------------------------------------
| SUMMARY   Detranslate the direction in an ORDERED clause.               |
| KEYWORDS: DETRANSLATE, TABLE, ORDER, FORALL, STATEMENT  LIBRARY: COMMON |
| UNIT    : DETRAN                                                        |
---------------------------------------------------------------------------

                                                            | Y N N
SGETCCHAR(SOURCERULE, PTR, 1) = 'A';                        |
SGETCCHAR(SOURCERULE, PTR, 1) = 'D';                        |   Y N
------------------------------------------------------------+--------------
CALL INSTBL('ASCENDING', @TRANS_CONSTS.RESERVED_WORD, 0);   | 1
CALL INSTBL('DESCENDING', @TRANS_CONSTS.RESERVED_WORD, 0);  |   1
CALL EDIT_MESSAGE(309, 'TORD ' || DET_GLOBAL.IC);           |     1
---------------------------------------------------------------------------
PAGE 139                                  SAVED ON: Feb 16, 1989 BY NLL10
```

```
TORDLIST(LEN, PTR);

--------------------------------------------------------------------------
| SUMMARY   Detranslate an ORDERED clause in a table access statement    |
| KEYWORDS                                                               |
| UNIT      DETRAN                                     LIBRARY: COMMON   |
--------------------------------------------------------------------------

                                                               | Y N N
LEN <= 0                                                       |
LEN = @TRANS_CONSTS.NAME_LENGTH + 1                            |   Y N
---------------------------------------------------------------+----------
CALL INSTBL('ORDERED', @TRANS_CONSTS.RESERVED_WORD, 0);        |   1 1
CALL TORD(PTR + @TRANS_CONSTS.NAME_LENGTH);                    |   2 2
CALL INSTBL(SGETVCHAR(SOURCERULE, PTR,                         |   3 3
  @TRANS_CONSTS.NAME_LENGTH), @TRANS_CONSTS.IDENTIFIER, 0      |
  );                                                           |
CALL INSTBL(',', @TRANS_CONSTS.OPERATOR, 0);                   |     4
CALL TORDLIST(LEN - @TRANS_CONSTS.NAME_LENGTH - 1, PTR +       |     5
  @TRANS_CONSTS.NAME_LENGTH + 1);                              |
--------------------------------------------------------------------------
PAGE 140
                                          SAVED ON: Nov 15, 1988 BY MGROO

TPARLIST(N, PARMPTR);

--------------------------------------------------------------------------
| SUMMARY   Detranslate an item in a table's parameter list.             |
| KEYWORDS  TABLE, PARAMETER                                             |
| UNIT      DETRAN                                     LIBRARY: COMMON   |
--------------------------------------------------------------------------

                                                               | Y N N
N = 1,                                                         |
N > 1,                                                         |   Y N
---------------------------------------------------------------+----------
CALL TAMTOK(PARMPTR - STR_START);                              | 1 1
CALL INSTBL(',', @TRANS_CONSTS.SPECIAL_CHAR, 0);               |   2
CALL TPARLIST(N - 1, PARMPTR + 4);                             |   3

--------------------------------------------------------------------------
PAGE 141
                                          SAVED ON: Feb 15, 1989 BY MLL10

TSELLIST(LEN, PTR);

--------------------------------------------------------------------------
| SUMMARY   Detranslate a relation in a WHERE clause                     |
| KEYWORDS  RELATION, SELECTION                                          |
| UNIT      DETRAN                                     LIBRARY: COMMON   |
--------------------------------------------------------------------------

                                                               | Y N N N N N
LEN <= 0,                                                      |
SGETBINARY(SOURCERULE, PTR, 1) = 68,                           |   Y N N N N
SGETBINARY(SOURCERULE, PTR, 1) = 56,                           |     Y N N N
SGETBINARY(SOURCERULE, PTR, 1) = 60;                           |       Y N N
SGETBINARY(SOURCERULE, PTR, 1) = 64,                           |         Y N
---------------------------------------------------------------+--------------
CALL PUSHWA('I', 'Z', '0000', 0),                              | 1
CALL STTOWA,                                                   | 2
CALL WATOF,                                                    | 3
CALL PUSHST('I', 'Z', '000C', 0),                              |   1
CALL PUSHST('I', @TRANS_CONSTS.IDENTIFIER, SGETVCHAR(          |   2
  SOURCERULE, PTR + 1, @TRANS_CONSTS.NAME_LENGTH), 0),         |
CALL PUSHPRED(10);                                             |   3
CALL SELTERM(LEN - @TRANS_CONSTS.NAME_LENGTH - 1, PTR +        |   4
  @TRANS_CONSTS.NAME_LENGTH + 1);                              |
CALL SELOP2('&');                                              |     1
CALL SELOP2('|');                                              |       1
CALL SELOP1('¬');                                              |         1
CALL TSELLIST(LEN - 1, PTR + 1);                               |     2 2 2
CALL EDIT_MESSAGE(309, 'TSELLIST ' || PTR);                    |           1
--------------------------------------------------------------------------
PAGE 142
                                          SAVED ON: Feb 15, 1989 BY MLL10
```

```
TSELLIST(LEN, PTR);

-----------------------------------------------------------------
| SUMMARY   Detranslate a relation in a WHERE clause             |
| KEYWORDS  RELATION, SELECTION                                  |
| UNIT      DETRAN                              LIBRARY: COMMON  |
-----------------------------------------------------------------

                         DESCRIPTION

      A relation may begin with one of the following
      66 - A field reference (i.e.  a field name)
      5E - A logical AND (&)
      4O - A logical OR (|)
      84 - A logical NOT (~)


PAGE 143                              SAVED ON  Mar 1, 1988 BY NLL10

UNSIGNED_1BYTE(N):

-----------------------------------------------------------------
| SUMMARY   CONVERT TO UNSIGNED A NUMBER contained in A SINGLE BYTE |
| KEYWORDS                                                       |
| UNIT      DETRAN                              LIBRARY: COMMON  |
-----------------------------------------------------------------

                                                   | Y N N N
N > 255,                                           |
N < - 128;                                         |   Y N N
N >= 0;                                            |     Y N
---------------------------------------------------+-----------
                                                   |


RETURN(N).                                         |     1
RETURN(256 + N).                                   |       1
SIGNAL BYTE_OVERFLOW.                              | 1 1
----------------------------------------------------------------
PAGE 144                              SAVED ON  Mar 1, 1989 BY NLL10

UNSIGNED_1BYTE(N).

-----------------------------------------------------------------
| SUMMARY   CONVERT TO UNSIGNED A NUMBER contained in A SINGLE BYTE |
| KEYWORDS                                                       |
| UNIT      DETRAN                              LIBRARY: COMMON  |
-----------------------------------------------------------------

                         DESCRIPTION

        Consider  a given number as unsigned.  Hence, if it is
      negative add 256 to it.  Check whether the number is in the
      range [-128,256]


PAGE 145                              SAVED ON: Apr 15, 1988 BY MGR00

UNTIL_STMT(OFFSET, UNTIL_DISPLAY);

-----------------------------------------------------------------
| SUMMARY : DETRANSLATE THE EXCEPTION LIST OF AN UNTIL STATEMENT. |
| KEYWORDS: UNTIL, STATEMENT, DETRANSLATE, EXCEPTION, LIS        |
| UNIT    : DETRAN                              LIBRARY: COMMON  |
-----------------------------------------------------------------
```

```
UNTIL_DISPLAY = 1.                                              | Y N
----------------------------------------------------------------+------------
CALL LOOKUP_EXCEPTION('UNTIL', HEADER.SECOND_OFF, OFFSET);      | 1 1
CALL DISPLAY_CLAUSE.                                            | 2
-----------------------------------------------------------------------------
PAGE 146
                                          SAVED ON  Apr 15, 1988 BY MGROO

UNTIL_STMT(OFFSET, UNTIL_DISPLAY);

-----------------------------------------------------------------------------
: SUMMARY   DETRANSLATE THE EXCEPTION LIST OF AN UNTIL STATEMENT           :
  KEYWORDS  UNTIL  STATEMENT, DETRANSLATE, EXCEPTION, LIS
: UNIT      DETRAN                                        LIBRARY  COMMON .
-----------------------------------------------------------------------------
```

DESCRIPTION

THE FIRST ARGUMENT IS THE OFFSET (FROM THE START OF THE RULE) TO THE END OF THE UNTIL LOOP. ANY EXCEPTIONS WHICH ARE IN THE UNTIL'S EXCEPTION LIST WILL HAVE THEIR OFFSET EQUAL TO THIS ARGUMENT. THE SECOND ARGUMENT IS THE SECOND OPERAND OF THE UNTIL OPCODE. IT INDICATES WHETHER THE UNTIL HAS A DISPLAY CLAUSE OR NOT.

```
PAGE 147
                                          SAVED ON. Apr 15, 1988 BY MGROO

WATOK.

-----------------------------------------------------------------------------
: SUMMARY                                                                  :
: KEYWORDS                                                                 :
: UNIT      DETRAN                                        LIBRARY  COMMON :
-----------------------------------------------------------------------------

DET_WORKAREA.ITEM = '0000'.                                     | Y N
----------------------------------------------------------------+------------
CALL PRINTELM(DET_WORKAREA.TYPE, DET_WORKAREA.SUBTYPE,          |   1
  DET_WORKAREA.OFFSET, DET_WORKAREA.ITEM);                      |
CALL POPWA;                                                     | 1 2
CALL WATOK.                                                     |   3



                                                                |
-----------------------------------------------------------------------------
PAGE 148
                                          SAVED ON  Mar 17, 1989 BY MGROO

WATOK_ABN.

-----------------------------------------------------------------------------
| SUMMARY   Detranslate one side of an assign by name statement.           |
| KEYWORDS
| UNIT      DETRAN                                        LIBRARY  COMMON |
-----------------------------------------------------------------------------

DET_WORKAREA.ITEM = ''.                                         | Y N
----------------------------------------------------------------+------------
CALL INSCON('NULL', @TRANS_CONSTS.RESERVED_WORD, 0);            | 1
CALL INSTBL2(DET_WORKAREA.ITEM, DET_WORKAREA.SUBTYPE, 0,        |   1
  'Y');                                                         |
CALL POPWA.                                                     | 2 2
CALL WATOK.                                                     | 3 3
CALL INSTBL(' ', @TRANS_CONSTS.SPECIAL_CHAR, 0);                |   4
CALL INSTBL2('=', @TRANS_CONSTS.OPERATOR, 0, 'Y');              |   5
-----------------------------------------------------------------------------
PAGE 149
                                          SAVED ON  Mar 17, 1989 BY MGROO

WATOK_ABN.

-----------------------------------------------------------------------------
| SUMMARY : Detranslate one side of an assign by name statement.           |
| KEYWORDS:
| UNIT    : DETRAN                                        LIBRARY: COMMON |
-----------------------------------------------------------------------------
```

DESCRIPTION

WATOK_ABN is able to handle both the left and right hand sides of an assign by name statement. The name of the table is on the workarea stack and it is moved to the tokens table (unless the DET_WORKAREA.ITEM is '', in which case the keyword NULL is inserted in the tokens table).

```
DET_WORKAREA ITEM = '' should only ever be true for the
rhs  of and assign by name.
```

```
PAGE 150
                                         SAVED ON  Apr 15, 1988 BY MGROO
WATOST,
---------------------------------------------------------------------------
| SUMMARY                                                                 |
| KEYWORDS:                                                               |
| UNIT     : DETRAN                                       LIBRARY: COMMON |
---------------------------------------------------------------------------

DET_WORKAREA.ITEM  '0000' .                                   | 1 N
--------------------------------------------------------------+------------
CALL PUSHST(DET_WORKAREA.TYPE, DET_WORKAREA.SUBTYPE,          |  1
  DET_WORKAREA.ITEM  DET_WORKAREA.OFFSET).                    |
CALL POPWA,                                                   | 1 2
CALL WATOST;                                                  |  3
---------------------------------------------------------------------------
PAGE 151
                                         SAVED ON  Nov 15, 1988 BY MGROO
WCALL;
---------------------------------------------------------------------------
| SUMMARY : Detranslate a list of actuals passed by name                  |
| KEYWORDS:                                                               |
| UNIT     : DETRAN                                       LIBRARY: COMMON |
---------------------------------------------------------------------------
                                                              |
--------------------------------------------------------------+------------
CALL PUSHWA('I', 'E', '0000', 0);                             | 1


CALL PUSHWA('I', @TRANS_CONSTS.SPECIAL_CHAR,'.', 0);          | 2
CALL GETWARG(1),                                              | 3
DET_GLOBAL.IC = GET_INSTRUCTION(DET_GLOBAL IC);               | 4
CALL CALL_OR_SCHED(SYSSOPCODES.SYMBOL),                       | 5
CALL NEWSTMT;                                                 | 6
---------------------------------------------------------------------------
PAGE 152
                                         SAVED ON: Nov 15, 1988 BY MGROO
WCALL,
---------------------------------------------------------------------------
| SUMMARY   Detranslate a list of actuals passed by name.                 |
| KEYWORDS:                                                               |
| UNIT      DETRAN                                        LIBRARY: COMMON |
---------------------------------------------------------------------------

                         DESCRIPTION
                         -----------

       Also detranslate the following @CALL or @SCHED opcode




PAGE 153
                                         SAVED ON: Nov 15, 1988 BY MGROO
XPERTEST(N);
---------------------------------------------------------------------------
```

```
| SUMMARY : Transfer N items from the workarea to the stack              |
| KEYWORDS:                                                              |
| UNIT     : BETRAN                                     LIBRARY: COMMON |
--------------------------------------------------------------------------

                                                          |
N = 1;                                                    | Y N N
N > 1;                                                    |   Y N
----------------------------------------------------------+---------------
CALL WATOST                                               | 1 1
CALL PUSHST('I', @TRANS_CONSTS.SPECIAL_CHAR   ', 0);      |   2
CALL XFERTOST(N - 1)                                      |   3
----------------------------------------------------------+---------------
PAGE 154
                                          SAVED ON  Apr 15, 1988 BY MGROO

XFERTOWA(N);

--------------------------------------------------------------------------
: SUMMARY
: KEYWORDS
| UNIT       BETRAN                                     LIBRARY  COMMON :
--------------------------------------------------------------------------

N > 0,                                                    | Y N
----------------------------------------------------------+---------------
CALL PUSHWA('I', 'X', '0000'  0);                         | 1
CALL STTOWA,                                              | 2
CALL XFERTOWA(N - 1).                                     | 3
----------------------------------------------------------+---------------
PAGE 155
                                          SAVED ON  Nov 15, 1988 BY MGROO

XFRWATOK(N),

--------------------------------------------------------------------------
| SUMMARY  : Transfer N items from the work area to the TOKENS table     |
| KEYWORDS :                                                             |
| UNIT     : BETRAN                                     LIBRARY  COMMON |
--------------------------------------------------------------------------

N = 1;                                                    | Y N N



N > 1;                                                    |   Y N
----------------------------------------------------------+---------------
CALL WATOK,                                               | 1 1
CALL INSTBL('.', @TRANS_CONSTS.SPECIAL_CHAR, 0),          |   2
CALL XFRWATOK(N - 1).                                     |   3
----------------------------------------------------------+---------------
PAGE 156
                                          SAVED ON  Apr 21, 1989 BY JET10

MAX(X, Y);

--------------------------------------------------------------------------
| SUMMARY  : take two arguments and return the larger                    |
| KEYWORDS . MAXIMUM, COMPARE                                            |
| UNIT     : UTIL                                       LIBRARY  COMMON |
--------------------------------------------------------------------------

X < Y;                                                    | Y N
----------------------------------------------------------+---------------
RETURN(Y),                                                | 1
RETURN(X);                                                |   1
----------------------------------------------------------+---------------
PAGE 157
                                          SAVED ON  Apr 21, 1989 BY JET10

MAX(X, Y);

--------------------------------------------------------------------------
| SUMMARY  : take two arguments and return the larger.                   |
| KEYWORDS : MAXIMUM, COMPARE                                            |
| UNIT     : UTIL                                       LIBRARY: COMMON |
--------------------------------------------------------------------------
```

DESCRIPTION

This rule simply returns the larger of two given values.

```
PAGE 158
                                         SAVED ON  JUL 5  1988 BY MGROO

MESSAGE(UTILITY, NUM, TEXT).

--------------------------------------------------------------------------
| SUMMARY   RETURN A "CUSTOMIZED" MESSAGE FROM THE MESSAGES TABLE        |
| KEYWORDS  MESSAGE, WARNING, ERROR, INFORMATIVE                         |
| UNIT      UTIL                                       LIBRARY: COMMON   |
--------------------------------------------------------------------------

--------------------------------------------------------------------------

GET MESSAGES(UTILITY) WHERE MESSAGE_NUM = NUM

RETURN(SEARCH_REPLACE(MESSAGES.MESSAGE, '%', TEXT  '')).
--------------------------------------------------------------------------

ON GETFAIL MESSAGES

   MESSAGES.MESSAGE_NUM = NUM

   MESSAGES.HIGHLIGHT = 'N'.

   MESSAGES.MESSAGE = 'MESSAGE NUMBER  || NUM ||  FOR  || UTILITY ||

     ' DOES NOT EXIST  .

   RETURN(MESSAGES.MESSAGE).
PAGE 159
                                         SAVED ON  Apr 21, 1989 BY JET10

MIN(X, Y).

--------------------------------------------------------------------------
| SUMMARY : Compare two values and return the smaller                    |
| KEYWORDS: MINIMUM, COMPARE, LESS                                       |
| UNIT    : UTIL                                       LIBRARY: COMMON   |
--------------------------------------------------------------------------


                                                          |
X < Y;                                                    | Y N
--------------------------------------------------------------------------

RETURN(X);

RETURN(Y).
--------------------------------------------------------------------------
PAGE 160
                                         SAVED ON  Apr 21  1989 BY JET10

MIN(X, Y).

--------------------------------------------------------------------------
| SUMMARY   Compare two values and return the smaller                    |
| KEYWORDS  MINIMUM, COMPARE, LESS                                       |
| UNIT      UTIL                                       LIBRARY  COMMON   |
--------------------------------------------------------------------------

                          DESCRIPTION
                          -----------

     This rule simply returns the smaller of two given values




PAGE 161
                                         SAVED ON: Apr 15, 1988 BY MGROO

WRITELN(VALUE);

--------------------------------------------------------------------------
```

```
| SUMMARY : PRINT A MESSAGE IF DEBUGGING IS ON                 |
| KEYWORDS: DEBUG, MESSAGE                                     |
| UNIT    : UTIL                              LIBRARY  COMMON  |
----------------------------------------------------------------

ESDVE_VARS.DEBUG,                                    | Y N
-----------------------------------------------------+----------
CALL MSGLOG(VALUE).                                  |  *
----------------------------------------------------------------

ON UNASSIGNED
PAGE 162
```

SCREEN DEFINITIONS LISTINGS

THESE SCREEN DEFINITIONS ARE USED IN THE RULE PROGRAM   DETRAN

```
                                   PRINTED BY BATCH ON September 01, 1989
PAGE 163
```

TABLE DEFINITION LISTINGS

THESE TABLE DEFINITION ARE USED IN THE RULE PROGRAM   DETRAN

```
                                   PRINTED BY BATCH ON September 01, 1989.
PAGE 164
ABLE DEFINITION FOR: @RULESLIBRARY

------------------------------ @RULESLIBRARY ---------------------------------
```

SUMMARY .
UNIT : DIC
KEYWORDS :

Table. @RULESLIBRARY Type OBJ

| Parameter Name | Type | Syntax | Length | Decimal |
|---|---|---|---|---|
| LIBRARY | S | C | 8 | 0 |

| Field Name | Type | Syntax | Length | Decimal | Key | Rqd | Default |
|---|---|---|---|---|---|---|---|
| RULENAME | S | C | 16 | 0 | P | Y | |
| DATE | S | C | 6 | 0 | | Y | |
| TIME | S | C | 4 | 0 | | Y | |
| RULEBODY | S | V | 2200 | 0 | | Y | |

PAGE 185
ABLE DEFINITION FOR @TRANS_CONSTS

@TRANS_CONSTS

SUMMARY
UNIT EDR
KEYWORDS

Table @TRANS_CONSTS Type TDS IDgen: N

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| IDENTIFIER | S | C | 1 | 0 | P | | | I |
| RESERVED_WORD | S | C | 1 | 0 | | | | R |
| NUMBER | S | C | 1 | 0 | | | | N |
| QUOTED_STRING | S | C | 1 | 0 | | | | Q |
| LONG_STRING | S | C | 1 | 0 | | | | L |
| SPECIAL_CHAR | S | C | 1 | 0 | | | | S |
| OPERATOR | S | C | 1 | 0 | | | | O |
| BINARY | S | C | 1 | 0 | | | | B |
| PACKED_DECIMAL | S | C | 1 | 0 | | | | P |
| FLOATING_POINT | S | C | 1 | 0 | | | | F |
| VARIABLE_CHAR | S | C | 1 | 0 | | | | V |
| FIXED_CHAR | S | C | 1 | 0 | | | | C |
| TYPE_OFFSET | C | B | 2 | 0 | | | | 0 |
| TYPE_LENGTH | C | B | 2 | 0 | | | | 1 |
| SYNTAX_OFFSET | C | B | 2 | 0 | | | | 1 |
| SYNTAX_LENGTH | C | B | 2 | 0 | | | | 1 |
| LENGTH_OFFSET | C | B | 2 | 0 | | | | 2 |
| LENGTH_LENGTH | C | B | 2 | 0 | | | | 2 |
| DECIMAL_OFFSET | C | B | 2 | 0 | | | | 4 |
| DECIMAL_LENGTH | C | B | 2 | 0 | | | | 2 |
| DATA_OFFSET | C | B | 2 | 0 | | | | 6 |
| MAX_2BYTE_BINARY | C | B | 2 | 0 | | | | 32767 |
| MAX_RULE_LENGTH | C | B | 2 | 0 | | | | 1850 |
| MAX_PACKED_LEN | C | B | 2 | 0 | | | | 15 |
| NAME_LENGTH | C | B | 2 | 0 | | | | 16 |
| FLOAT_LENGTH | C | B | 2 | 0 | | | | 16 |
| CONSTANT_REF | S | C | 1 | 0 | | | | C |
| TAMSTRING_REF | S | C | 1 | 0 | | | | T |
| NAME_REF | S | C | 1 | 0 | | | | N |
| TABLEFIELD_REF | S | C | 1 | 0 | | | | R |
| BINARY_NUMBER | | B | 4 | 0 | | | | |
| PACKED_NUMBER | | P | 8 | 1 | | | | |
| FLOAT_NUMBER | | F | 16 | 0 | | | | |

| Event Rule | Type | Access |
|---|---|---|

PAGE 186
ABLE DEFINITION FOR DET_ACTION_OFF

DET_ACTION_OFF

SUMMARY
UNIT EDR
KEYWORDS.

Table DET_ACTION_OFF Type TEM

| Parameter Name | Type | Syntax | Length | Decimal |
|---|---|---|---|---|

| Field Name | Type | Syntax | Length | Decimal | Key | Ord | Rqd | Default |
|---|---|---|---|---|---|---|---|---|
| OFFSET | | B | 2 | 0 | P | | | |
| SEQUENCE# | C | B | 2 | 0 | | | | |
| STMT# | C | B | 2 | 0 | | | | |

| Event Rule | Type | Access |
|---|---|---|

PAGE 187
ABLE DEFINITION FOR: DET_I_FLOREF

DET_I_FLOREF

SUMMARY :
UNIT : EDR
KEYWORDS:

Table: DET_I_FLOREF Type: TEM

```
 Parameter Name   Type Syntax Length Decimal
----------------   -      -     ---    ---

   Field Name      Type Syntax Length Decimal  Key Ord Req     Default
----------------   -      -     ----   ---      -   -   -  ----------------
OFFSET             C      B      4      0       P
TTYPE              S      C      1      0
TELREF             C      B      2      0
FTYPE              S      C      1      0
FLOREF             C      B      2      0

   Event Rule    Type Access
----------------  -     -
PAGE 168
ABLE DEFINITION FOR  DET_PRED_ST

------------------------------ DET_PRED_ST ---------------------------------
SUMMARY
UNIT        EDR
KEYWORDS

----------------------------------------------------------------------------

 Table: DET_PRED_ST                  Type  TEM

 Parameter Name   Type Syntax Length Decimal
----------------   -      -     ---    ---

   Field Name      Type Syntax Length Decimal  Key Ord Req     Default
----------------   -      -     ----   ---      -   -   -  ----------------
INDEX              I      B      2      0       P
PRED               C      B      2      0

   Event Rule    Type Access
----------------  -     -
PAGE 169
ABLE DEFINITION FOR: DET_STACK

------------------------------ DET_STACK -----------------------------------
SUMMARY
UNIT        EDR
KEYWORDS:

----------------------------------------------------------------------------

 Table: DET_STACK                    Type: TEM

 Parameter Name   Type Syntax Length Decimal



----------------   -      -     ---    ---

   Field Name      Type Syntax Length Decimal  Key Ord Req     Default
----------------   -      -     ----   ---      -   -   -  ----------------
INDEX              I      B      2      0       P
TYPE               S      C      1      0
OFFSET             C      B      4      0
ITEM               S      V      18     0
SUBTYPE            S      C      1      0

   Event Rule    Type Access
----------------  -     -
PAGE 170
ABLE DEFINITION FOR: DET_TAM_OPCODE

------------------------------ DET_TAM_OPCODE ------------------------------
SUMMARY
UNIT        EDR
KEYWORDS

----------------------------------------------------------------------------

 Table: DET_TAM_OPCODE               Type: TDS                      IOgen  N

 Parameter Name   Type Syntax Length Decimal
----------------   -      -     ---    ---

   Field Name      Type Syntax Length Decimal  Key Ord Req     Default
----------------   -      -     ----   ---      -   -   -  ----------------
OPCODE                    C      1      0       P
SYMBOL                    V      10     0

   Event Rule    Type Access
----------------  -     -
PAGE 171
ABLE DEFINITION FOR: DET_TAM_ST

------------------------------ DET_TAM_ST ----------------------------------
SUMMARY  :
UNIT     : EDR
KEYWORDS:

----------------------------------------------------------------------------

 Table: DET_TAM_ST                   Type: TEM

 Parameter Name   Type Syntax Length Decimal
----------------   -      -     ---    ---
OFFSET                    B      2      0
```

| Field Name | Type | Syntax | Length | Decimal | Key | Ord | Rqd | Default |
|---|---|---|---|---|---|---|---|---|
| INDEX | I | B | 2 | 0 | P | | | |
| TYPE | S | C | 1 | 0 | | | | |
| OFFSET | C | B | 4 | 0 | | | | |
| ITEM | S | V | 18 | 0 | | | | |
| SUBTYPE | S | C | 1 | 0 | | | | |
| PRECEDENCE | C | B | 2 | 0 | | | | |

Event Rule Type Access

PAGE 172
ABLE DEFINITION FOR. DET_WORKAREA

DET_WORKAREA

SUMMARY
UNIT EDR
KEYWORDS

Table DET_WORKAREA Type: TEM

Parameter Name Type Syntax Length Decimal

| Field Name | Type | Syntax | Length | Decimal | Key | Ord | Rqd | Default |
|---|---|---|---|---|---|---|---|---|
| INDEX | I | B | 2 | 0 | P | | | |
| TYPL | S | C | 1 | 0 | | | | |
| OFFSET | C | B | 4 | 0 | | | | |
| ITEM | S | V | 18 | 0 | | | | |
| SUBTYPE | S | C | 1 | 0 | | | | |

Event Rule Type Access

PAGE 173
ABLE DEFINITION FOR: ESATTRIBUTES

ESATTRIBUTES

SUMMARY :
UNIT : EDR
KEYWORDS :

Table: ESATTRIBUTES Type: TEM

Parameter Name Type Syntax Length Decimal

| Field Name | Type | Syntax | Length | Decimal | Key | Ord | Rqd | Default |
|---|---|---|---|---|---|---|---|---|
| POSITION | C | B | 4 | 0 | P | | | |
| PROTECTION | S | V | 3 | 0 | | | | |
| INTENSITY | S | V | 3 | 0 | | | | |
| NUMERIC | S | V | 3 | 0 | | | | |

Event Rule Type Access

PAGE 174
ABLE DEFINITION FOR ESMAP

ESMAP

SUMMARY :
UNIT . EDR
KEYWORDS :

Table: ESMAP Type: TEM

Parameter Name Type Syntax Length Decimal

| Field Name | Type | Syntax | Length | Decimal | Key | Ord | Rqd | Default |
|---|---|---|---|---|---|---|---|---|
| INDEX | | B | 2 | 0 | P | | | |
| ROW | C | B | 2 | 0 | | | | |
| COLUMN | C | B | 2 | 0 | | | | |
| TABLE | S | V | 18 | 0 | | | | |
| STMNT# | C | B | 2 | 0 | | | | |
| PARM_VALUE | C | B | 2 | 0 | | | | |
| TEXT | S | V | 134 | 0 | | | | |
| LINE_STATUS | S | V | 3 | 0 | | | | |
| FORALL_MEMBER | S | V | 3 | 0 | | | | |
| TERMINATOR | L | C | 1 | 0 | | | | |
| START | L | C | 1 | 0 | | | | |

Event Rule Type Access

PAGE 175
ABLE DEFINITION FOR: LONG_STRINGS

LONG_STRINGS

SUMMARY :
UNIT : EDR
KEYWORDS :

Table: LONG_STRINGS Type: TEM

```
 Parameter Name   Type Syntax Length Decimal
 ---------------   -     -     ---     ---

   Field Name     Type Syntax Length Decimal  Key Ord Req    Default
 ---------------   -     -    ----    ---     -   -   -  ---------------
 INDEX                   B      4      0      P       N
 STRING             S    V    128      0              N
 LEN                C    B      4      0              N
 TYPE               S    C      1      0              N

    Event Rule    Type Access
 ---------------   -     -
PAGE 176
ABLE DEFINITION FOR  SEQUENCE#

-------------------------------- SEQUENCE# --------------------------------
 SUMMARY                                                                    |
 UNIT       EDR                                                             |
 KEYWORDS                                                                   |

----------------------------------------------------------------------------

  Table  SEQUENCE#                  Type  TEM

 Parameter Name   Type Syntax Length Decimal
 ---------------   -     -     ---     ---
 COND#                   B      2       0

   Field Name     Type Syntax Length Decimal  Key Ord Req    Default
 ---------------   -     -    ----    ---     -   -   -  ---------------
 ROW                     B      2      0      P
 SEQ#               C    B      2      0
 STMNT#             C    B      2      0
 ADDR               C    B      2      0
 OFFSET             C    B      2      0
 HIGHLIGHTED        L    C      1      0

    Event Rule    Type Access
 ---------------   -     -
PAGE 177
ABLE DEFINITION FOR: SYS$OPCODES

------------------------------- SYS$OPCODES -------------------------------
 SUMMARY ..                                                                 |
 UNIT     . EDR                                                             |
 KEYWORDS:                                                                  |

----------------------------------------------------------------------------

  Table. SYS$OPCODES                Type: TDS                    IDgen: N



 Parameter Name   Type Syntax Length Decimal
 ---------------   -     -     ---     ---

   Field Name     Type Syntax Length Decimal  Key Ord Req    Default
 ---------------   -     -    ----    ---     -   -   -  ---------------
 OPCODE             I    B      2      0      P
 NAME               S    C      8      0
 SYMBOL             S    C     16      0
 DET_TYPE           S    C      1      0
 LEN                C    B      2      0
 TOKEN_TYPE         S    C      1      0
 FUNCTION           I    C     16      0
 OPERAND            C    B      2      0
 PRECEDENCE         C    B      2      0
 XRF_SUB            I    C     16      0
 FINAL_OP           L    C      1      0

    Event Rule    Type Access
 ---------------   -     -
PAGE 178
ABLE DEFINITION FOR: TOKENS

--------------------------------- TOKENS ----------------------------------
 SUMMARY :                                                                  |
 UNIT     · EDR                                                             |
 KEYWORDS:                                                                  |

----------------------------------------------------------------------------

  Table· TOKENS                     Type  TEM

 Parameter Name   Type Syntax Length Decimal
 ---------------   -     -     ---     ---
 STMNT_SLOT         C    B      2       0

   Field Name     Type Syntax Length Decimal  Key Ord Req    Default
 ---------------   -     -    ----    ---     -   -   -  ---------------
 INDEX                   B      2      0      P
 STRING             S    V     16      0
 LEN                C    B      2      0
 TYPE               S    C      1      0
 DEC                C    B      2      0                 0
 TABREF_MARK        L    C      1      0

    Event Rule    Type Access
 ---------------   -     -
PAGE 179
```

CROSS REFERENCE LISTING

OBJECTS CROSS REFERENCED FOR THE BASE RULE

DETRAN

PRINTED BY BATCH ON September 01 1985

Y/N SECTION OPTIONS

- PRINT BASE & DESCENDENT RULES
- RULE CROSS REFERENCE
- Y LOCAL DECLARATION
- Y LOCAL CROSS REFERENCE
- SIGNAL CROSS REFERENCE
- EXCEPTION HANDLER
- Y SCREEN DEFINITIONS
- Y SCREEN CROSS REFERENCE
- TABLE DEFINITION
- TABLE CROSS REFERENCE
- PRINT ENTRY & VALIDATION RULES
- VALIDATION RULE CROSS REFERENCE
- LIST OF UNRESOLVED NAMES
- LIST ENTRY & VALIDATION RULES
- RULE CALLING STRUCTURE

PAGE 180

LIST OF UNRESOLVED NAMES

| | |
|---|---|
| MSG<br>VERT_SCROLL | PARM_VALUE |

PAGE 181

LIST ENTRY & VALIDATION RULES

| | |
|---|---|
| MAX<br>MIN | MESSAGE<br>WRITELN |

PAGE 182

| ULE NAME | CALLED BY THE FOLLOWING RULES: | | | |
|---|---|---|---|---|
| GETBINARY | APPENDCL<br>GET_OPERANDS<br>PRCONA<br>TSELLIST | CONST_PREFIX<br>INITHEAD<br>PROC_EXCEPTION | DETUNTIL<br>INSNULLCON<br>SELOP | GET_INSTRUCTION<br>LOOKUP_EXCEPTION<br>SELTERM |
| GETCCHAR | CHSTTOWA<br>PRCONA<br>TORD | GETWARG<br>PRINTELM | INITHEAD<br>TAMOP | OPISIC<br>TESTOUE2 |
| GETFLOAT | PRCONA | | | |
| GETPACKED | PRCONA | | | |
| GETVCHAR | ASSIGLOC<br>PFUNC<br>PRPARM<br>RULEPARMS | CHSTTOWA<br>PRFLDA<br>PRSUBA<br>SELTERM | LOOKUP_EXCEPTION<br>PRFLDREF<br>PRTBLREF<br>TORDLIST | LOOKUP_TBL_NAME<br>PROC_EXCEPTION<br>RULELOCAL<br>TSELLIST |
| CTCALL | DISPLAY_CLAUSE<br>SELOP | INDIRECT_NAME | PROCCOND | PROCINS |
| DO_ATTR | HILITE_LINE | | | |
| PPENDCL | DISPLAY_CLAUSE<br>SELOP | INDIRECT_NAME | PROCCOND | PROCINS |
| SSIGBN | DISPLAY_CLAUSE<br>SELOP | INDIRECT_NAME | PROCCOND | PROCINS |
| SSIGIN | DISPLAY_CLAUSE<br>SELOP | INDIRECT_NAME | PROCCOND | PROCINS |
| SSIGLOC | DISPLAY_CLAUSE<br>SELOP | INDIRECT_NAME | PROCCOND | PROCINS |

ALL_BR_SCHED CALL_BR_SCHED WCALL

HECK_FOR_NEXT PROC_EXCEPTION

HECK_UNTIL APPENDCL

HSTTOWA ASSIGBN

GND BETRAN

```
ONST_PREFIX       CNSTTOWA          GETWARG           OP1SIC            PRCONA
                  PRFLBREF          PRTBLREF          TAMOP             TAMORDER
                  TAMPARM           TAMSEL            TESTOUE

ET_EXCEPTIONS     DETRAN

ETACT             DETRAN

ETRET             DISPLAY_CLAUSE    INDIRECT_NAME     PROCCOND          PROCINS
                  SELOP

PAGE 183

ULE NAME          CALLED BY THE FOLLOWING RULES·
_______________

ETUNTIL           DISPLAY_CLAUSE    INDIRECT_NAME     PROCCOND          PROCINS
                  SELOP

ISPLAY_CLAUSE     UNTIL_STMT

DIT_MESSAGE       CALL_OR_SCHED     ENDCODE           GET_INSTRUCTION   PRCONA
                  PRINTELM          TORD              TSELLIST

NDACT             DISPLAY_CLAUSE    INDIRECT_NAME     PROCCOND          PROCINS
                  SELOP

NDCODE            DISPLAY_CLAUSE    INDIRECT_NAME     PROCCOND          PROCINS
                  SELOP

PILLOG            DETRAN

IND_RULE          DETRAN

LUSHSTA           RETCONC

OCUS_ON_TARGET    EDIT_MESSAGE

OUND_IN_DOC_LIB   FIND_RULE

OUND_RULE_TABLE   FOUND_IN_DOC_LIB

ENBIN             PREFIX_RULEBODY

ET_INSTRUCTION    CALL_OR_SCHED     DISPLAY_CLAUSE    INDIRECT_NAME     PROCCONC
                  PROCINS           WCALL

ET_OPERANDS       GET_INSTRUCTION

ETWARG            GETWARG           WCALL

ILITE_LINE        EDIT_MESSAGE      HILITE_LINES

ILITE_LINES       EDIT_MESSAGE

PREF              PUSHONE

NDIRECT_NAME      DISPLAY_CLAUSE
```

```
NITGLOB         DETRAN

NITHEAD         DETRAN

NSCON           INSNULLCON       PRCONA           WATOK_ABN

NSNULLCON       PRCONA

NSTALLIB        FIND_RULE

NSTBL           APPENDCL         ASSIGBN          ASSIGIN          ASSIGLOC
                CALL_OR_SCHED    DETUNTIL         INSCON           LOOKUP_EXCEPTION
                LOOKUP_TBL_NAME  OPC              OP1SIG           PCALL
                PRFLDA           PRFLDREF         PRINTITM         PROC_EXCEPTION
                PRPARM           PRSUBA           PRTBLREF         RETACT
PAGE 184

ULE NAME        CALLED BY THE FOLLOWING RULES
_____________

                RULEHEADER       RULELOCAL        RULEPARMS        TAMCOLON
                TAMOP            TAMSEL2          TAMTPAR          TESTOUE2
                TORD             TORDLIST         TPARLIST         WATOK_ABN
                IFRWATOK

NSTBL2          PRFLDA           PRFLDREF         PRINTITM         PRTBLREF
                WATOK_ABN

TREF            PUSHONE

EN_LEN_PREFIX   CONST_PREFIX

EN_VAL_PREFIX   CONST_PREFIX

ENGTH           INSTBL           INSTBL2          PREFIX_RULEBODY

IBID            FIND_RULE

OOKUP_EXCEPTION CHECK_UNTIL      LOOKUP_EXCEPTION UNTIL_STMT

OOKUP_TBL_NAME  LOOKUP_EXCEPTION PROC_EXCEPTION

AX              INSTBL

ESSAGE          EDIT_MESSAGE

IN              FOCUS_ON_TARGET

SG              EDIT_MESSAGE

SGLOC           EDIT_MESSAGE

EWSTMT          APPENDCL         ASSIGBN          ASSIGIN          ASSIGLOC
                DETUNTIL         OPO              OP1SCHED         OP1SIG
                PCALL            PROC_EXCEPTION   RETACT           RETCOND
                RULEHEADER       RULELOCALS       TAMCOLON         WCALL

OOP             DETACT           DISPLAY_CLAUSE   INDIRECT_NAME    PROCCOND
                PROCINS          SELOP


PO              DISPLAY_CLAUSE   INDIRECT_NAME    PROCCOND         PROCINS
                SELOP

P1PREF          DISPLAY_CLAUSE   INDIRECT_NAME    PROCCOND         PROCINS
                SELOP

P1SCHED         DISPLAY_CLAUSE   INDIRECT_NAME    PROCCOND         PROCINS
                SELOP

P1SIG           DISPLAY_CLAUSE   INDIRECT_NAME    PROCCOND         PROCINS
                SELOP

P2              DISPLAY_CLAUSE   INDIRECT_NAME    PROCCOND         PROCINS
                SELOP

P2LEFT          OP2              SELOP2

P2RIGHT         OP2              SELOP2
PAGE 185

ULE NAME        CALLED BY THE FOLLOWING RULES
_____________

AD              PREFIX_RULEBODY

ARM_VALUE       EDIT_MESSAGE

CALL            DISPLAY_CLAUSE   INDIRECT_NAME    PROCCOND         PROCINS
                SELOP

FUNC            DISPLAY_CLAUSE   INDIRECT_NAME    PROCCOND         PROCINS
                SELOP

OPINDNAME       GETWARG

OPPRED          ASSIGBN          ASSIGIN          ASSIGLOC         DISPLAY_CLAUSE
                GETWARG          IFREF            ITREF            OP1PREF
                OP1SCHED         OP1SIG           OP2LEFT          OP2RIGHT
                PCALL            PFUNC            POPINDNAME       POPPRED
                PRSUBA           RETACT           RETCOND          SELOP1
                TAMCALL          TAMP             TESTOUE2

OPST            ASSIGIN          CNSTTOWA         GETWARG          IFREF
                ITREF            OP1SIG           POPINDNAME       POPST
                PRSUBA           STTAMST          STTOWA           TESTOUE2

OPWA            TAMOP            TAMORDER         TAMPARM          TAMSEL2
                TAMTBL           WATOK            WATOK_ABN        WATOST

RCONA           PRINTELM         TAMTBL

REFIX_RULEBODY  DETRAN

RFLDA           PRINTELM         TAMTBL

RFLDREF         PRFLDA
```

| | | | | |
|---|---|---|---|---|
| RINTELM | ASSIGIN<br>PRTBLREF | FLUSHSTA<br>TAMTOK | PRPLDREF<br>WATOK | PRSUBA |
| RINTITM | PRINTELM | | | |
| ROC_EXCEPTION | DET_EXCEPTIONS | PROC_EXCEPTION | | |
| ROCCOND | COND | PROCCOND | | |
| ROCINS | DETACT | PROC_EXCEPTION | PROCINS | |
| RPARM | PRINTELM | TAMTBL | | |
| RSUBA | CALL_OR_SCHED | PCAL: | PRINTELM | |
| RTBLREF | PRFLDA | | | |
| USHONE | CALL_OR_SCHED<br>PROCINS | DISPLAY_CLAUSE<br>SELOP | INDIRECT_NAME | PROCCOND |
| USHPRED | OP1PREF<br>SELOP1<br>TSELLIST | OP:<br>SELOP: | PFUNC<br>SELTERM | PUSHONE<br>TAMTOST |

PAGE 186

| ULE NAME | CALLED BY THE FOLLOWING RULES | | | |
|---|---|---|---|---|
| USHST | OP1PREF<br>PUSHONE<br>SELTERM<br>XFERTOST | OP1SCHED<br>RETCOND<br>TAMTOST | OP2<br>SELOP1<br>TSELLIST | PFUNC<br>SELOP2<br>WATOST |
| USHTAMS | STTAMST | | | |
| USHWA | ASSIGIN<br>GETWARG<br>OP2LEFT<br>SELOP2<br>XFERTOWA | ASSIGLOC<br>OP1PREF<br>OP2RIGHT<br>STTOWA | CALL_OR_SCHED<br>OP1SCHED<br>RETACT<br>TSELLIST | CHSTTOWA<br>OP:<br>SELOP1<br>WCALL |
| ET_EXCEPTION | DETRET | | | |
| ETACT | DETRET | RET_EXCEPTION | | |
| ETCOND | DETRET | | | |
| OP | SELOP | | | |
| ULEHEADER | DETRAN | | | |
| ULELOCAL | RULELOCAL | RULELOCALS | | |
| ULELOCALS | DETRAN | | | |
| ULEPARMS | RULEHEADER | RULEPARMS | | |
| CREENROW | FOCUS_ON_TARGET | | | |
| ELOP | SELTERM | | | |
| ELOP1 | TSELLIST | | | |
| ELOP2 | TSELLIST | | | |
| ELTERM | SELOP | SELTERM | TSELLIST | |
| ET_CURSOR | TEXT_TO_SCREEN | | | |
| TTAMST | STTAMST | TAMP | | |
| TTOWA | ASSIGIN<br>OP1SCHED<br>SELOP1<br>XFERTOWA | ASSIGLOC<br>OP2LEFT<br>STTOWA | GETWARG<br>OP2RIGHT<br>TESTOUE2 | OP1PREF<br>RETACT<br>TSELLIST |
| YSTEMLIB | FIND_RULE | | | |
| AMCALL | DISPLAY_CLAUSE<br>SELOP | INDIRECT_NAME | PROCCOND | PROCINS |
| AMCOLON | TAMCALL | | | |
| AMLIST | DISPLAY_CLAUSE | TAMCALL | | |

PAGE 187

| ULE NAME | CALLED BY THE FOLLOWING RULES | | | |
|---|---|---|---|---|
| AMOP | TAMLIST | | | |
| AMORDER | TAMLIST | | | |
| AMP | DISPLAY_CLAUSE<br>SELOP | INDIRECT_NAME | PROCCOND | PROCINS |
| AMPARM | TAMLIST | | | |
| AMSEL | TAMLIST | | | |
| AMSEL2 | TAMSEL | | | |
| AMTBL | TAMLIST | | | |
| AMTOK | TPARLIST | | | |
| AMTOST | SELTERM | | | |
| AMTPAR | TAMPARM | | | |
| ESTOUE | CALL_OR_SCHED | OP1SCHED | | |
| ESTOUE2 | TESTOUE | | | |
| EXT_TO_SCREEN | FOCUS_ON_TARGET | | | |

```
GRO              TORDLIST
ORDLIST          TAMORDER            TORDLIST
PARLIST          TAMTPAR             TPARLIST
SELLIST          SELOP               TAMSEL2            TSELLIST
NSIGNED_1BYTE    GET_INSTRUCTION     SELOP
NTIL_STMT        DETUNTIL
ERT_SCROLL       FOCUS_ON_TARGET
ATOK             ASSIGIN             ASSIGLOC           CALL_OR_SCHED      RETACT
                 TESTQUE2            TSELLIST           WATOK              WATOK_ABN
                 XFRWATOK
ATOK_ABN         ASSIGBN
ATOST            OP1PREF             OP2                SELOP1             SELOP2
                 WATOST              XFERTOST
CAL.             DISPLAY_CLAUSE      INDIRECT_NAME      PROCCOND           PROCINS
                 SELOP
RITELN           EPILOC
FERTOST          OPISCHED            PFUNC              XFERTOST
FERTOWA          DISPLAY_CLAUSE      OPISCHED           PCALL              PFUNC
PAGE 188
ULE NAME         CALLED BY THE FOLLOWING RULES
_____________

                 TAMCALL             XFERTOWA
FRWATOK          PCALL               XFRWATOK
PAGE 189
ULE NAME         LIST OF DESCENDENT RULES.
_____________

PPENDCL          SGETBINARY          CHECK_UNTIL        INSTBL             NEWSTMT
SSIGBN           CHSTTOWA            INSTBL             NEWSTMT            POPPRED
                 WATOK_ABN
SSIGIN           INSTBL              NEWSTMT            POPPRED            POPST
                 PRINTELM            PUSHWA             STTOWA             WATOK
SSIGLOC          SGETYCHAR           INSTBL             NEWSTMT            POPPRED
                 PUSHWA              STTOWA             WATOK
ALL_OR_SCHED     CALL_OR_SCHED       EDIT_MESSAGE       GET_INSTRUCTION    INSTBL
                 PRSUBA              PUSHONE            PUSHWA             TESTQUE
                 WATOK
```

```
HECK_UNTIL       LOOKUP_EXCEPTION
```

```
HSTTOWA      $GETCCHAR      $GETVCHAR      CONST_PREFIX      POPST
             PUSHWA

END          PROCEND
```

```
ONST_PREFIX      SGETBINARY         LEN_LEN_PREFIX    LEN_VAL_PREFIX

ET_EXCEPTIONS    PROC_EXCEPTION

ETACT            NOOP               PROCINS

ETRAN            COND               DET_EXCEPTIONS    DETACT            EPILOG
                 FIND_RULE          INITGLOB          INITHEAD          PREFIX_RULEBODY
                 RULEHEADER         RULELOCALS

ETRET            RET_EXCEPTION      RETACT            RETCOND

ETUNTIL          SGETBINARY         INSTBL            NEWSTMT           UNTIL_STMT

ISPLAY_CLAUSE    ACTCALL            APPENDCL          ASSIGBN           ASSIGIN
                 ASSIGLOC           DETRET            DETUNTIL          ENDACT
                 ENDCODE            GET_INSTRUCTION   INDIRECT_NAME     NOOP
                 OPO                OP1PREF           OP1SCHED          OP1SIG
                 OP2                PCALL             PFUNC             POPPRED
                 PUSHONE            TAMCALL           TAMLIST           TAMP
                 WCALL              XFERTOWA

DIT_MESSAGE      FOCUS_ON_TARGET    HILITE_LINE       HILITE_LINES      MESSAGE
                 MSG                MSGLOC            PARM_VALUE

NDCODE           EDIT_MESSAGE

PILOG            WRITELN

IND_RULE         FOUND_IN_DOC_LIB   INSTALLIB         LIBID             SYSTEMLIB

LUSHSTA          PRINTELM

OCUS_ON_TARGET   MIN                SCREENROW         TEXT_TO_SCREEN    VERT_SCROLL
PAGE 190

ULE NAME         LIST OF DESCENDENT RULES:
_______________

OUND_IN_DOC_LIB  FOUND_RULE_TABLE

ET_INSTRUCTION   SGETBINARY         EDIT_MESSAGE      GET_OPERANDS      UNSIGNED_1BYTE

ET_OPERANDS      SGETBINARY

ETWARG           SGETCCHAR          CONST_PREFIX      GETWARG           POPINDNAME
                 POPPRED            POPST             PUSHWA            STTOWA

ILITE_LINE       ADD_ATTR

ILITE_LINES      HILITE_LINE

PREF             POPPRED            POPST

NDIRECT_NAME     ACTCALL            APPENDCL          ASSIGBN           ASSIGIN
                 ASSIGLOC           DETRET            DETUNTIL          ENDACT
                 ENDCODE            GET_INSTRUCTION   NOOP              OPO
                 OP1PREF            OP1SCHED          OP1SIG            OP2
```

```
                 PCALL             PFUNC             PUSHONE           TAMCALL
                 TAMP              WCALL

RITHEAD          SGETBINARY        SGETCCHAR

NSCON            INSTBL

NSNULLCON        SGETBINARY        INSCON

NSTBL            LENGTH            MAX

NSTBL2           LENGTH

TREF             POPPRED           POPST

OOKUP_EXCEPTION  SGETBINARY        SGETVCHAR         INSTBL            LOOKUP_EXCEPTION
                 LOOKUP_TBL_NAME

OOKUF_TBL_NAME   SGETVCHAR         INSTBL

PC               INSTBL            NEWSTMT

P1PREF           POPPRED           PUSHPRED          PUSHST            PUSHWA
                 STTOWA            WATOST

P1SCHED          NEWSTMT           POPPRED           PUSHST            PUSHWA
                 STTOWA            TESTOUE           XFERTOST          XFERTOWA

P1SIC            SGETCCHAR         CONST_PREFIX      INSTBL            NEWSTMT
                 POPPRED           POPST

P2               OP2LEFT           OP2RIGHT          PUSHPRED          PUSHST
                 PUSHWA            WATOST

P2LEFT           POPPRED           PUSHWA            STTOWA

P2RIGHT          POPPRED           PUSHWA            STTOWA

PAGE 191

ULE NAME         LIST OF DESCENDENT RULES
________________

CALL             INSTBL            NEWSTMT           POPPRED           PRSUBA
                 XFERTOWA          XFRWATOK

FUNC             SGETVCHAR         POPPRED           PUSHPRED          PUSHST
                 XFERTOST          XFERTOWA

OPINDNAME        POPPRED           POPST

OPPRED           POPPRED

OPST             POPST

RCONA            SGETBINARY        SGETCCHAR         SGETFLOAT         SGETPACKED
                 CONST_PREFIX      EDIT_MESSAGE      INSCON            INSNULLCON

REFIX_RULEBODY   GENBIN            LENGTH            PAD



RFLOA            SGETVCHAR         INSTBL            INSTBL2           PRFLOREF
                 PRTBLREF

RFLOREF          SGETVCHAR         CONST_PREFIX      INSTBL            INSTBL2
                 PRINTELM

RINTELM          SGETCCHAR         EDIT_MESSAGE      PRCONA            PRFLOA
                 PRINTITM          PRPARM            PRSUBA

RINTITM          INSTBL            INSTBL2

ROC_EXCEPTION    SGETBINARY        SGETVCHAR         CHECK_FOR_NEXT    INSTBL
                 LOOKUP_TBL_NAME   NEWSTMT           PROC_EXCEPTION    PROCINS

ROCCOND          ACTCALL           APPENDCL          ASSIGBN           ASSIGIN
                 ASSIGLOC          DETRET            DETUNTIL          ENDACT
                 ENDCODE           GET_INSTRUCTION   NOOP              OPO
                 OP1PREF           OP1SCHED          OP1SIC            OP2
                 PCALL             PFUNC             PROCCOND          PUSHONE
                 TAMCALL           TAMP              WCALL

ROCINS           ACTCALL           APPENDCL          ASSIGBN           ASSIGIN
                 ASSIGLOC          DETRET            DETUNTIL          ENDACT
                 ENDCODE           GET_INSTRUCTION   NOOP              OPO
                 OP1PREF           OP1SCHED          OP1SIC            OP2
                 PCALL             PFUNC             PROCINS           PUSHONE
                 TAMCALL           TAMP              WCALL

RPARM            SGETVCHAR         INSTBL

RSUBA            SGETVCHAR         INSTBL            POPPRED           POPST
                 PRINTELM

RTBLREF          SGETVCHAR         CONST_PREFIX      INSTBL            INSTBL2
                 PRINTELM

USHONE           IFREF             ITREF             PUSHPRED          PUSHST

ET_EXCEPTION     RETACT

ETACT            INSTBL            NEWSTMT           POPPRED           PUSHWA
PAGE 192

ULE NAME         LIST OF DESCENDENT RULES:
________________

                 STTOWA            WATOK

ETCOND           FLUSHSTA          NEWSTMT           POPPRED           PUSHST

ULEHEADER        INSTBL            NEWSTMT           RULEPARMS

ULELOCAL         SGETVCHAR         INSTBL            RULELOCAL

ULELOCALS        NEWSTMT           RULELOCAL

ULEPARMS         SGETVCHAR         INSTBL            RULEPARMS
```

| | | | | |
|---|---|---|---|---|
| ELOP | SGETBINARY<br>ASSIGIN<br>ENDACT<br>OP1PREF<br>PCALL<br>SELTERM<br>UNSIGNED_1BYTE | ACTCALL<br>ASSIGLOC<br>ENDCODE<br>OP1SCHED<br>PFUNC<br>TAMCALL<br>WCALL | APPENDCL<br>DETRET<br>NOOP<br>OP1SIC<br>PUSHONE<br>TAMP | ASSIGON<br>DETUNTIL<br>OPO<br>OP2<br>ROP<br>TSELLIST |
| ELOP1 | POPPRED<br>STTOWA | PUSHPRED<br>WATOST | PUSHST | PUSHWA |
| ELOP2 | OP2LEFT<br>PUSHWA | OP2RIGHT<br>WATOST | PUSHPRED | PUSHST |
| ELTERM | SGETBINARY<br>SELOP | SGETYCHAR<br>SELTERM | PUSHPREL<br>TAMTOST | PUSHST |
| TTAMST | POPST | PUSHTAMS | STTAMST | |
| TTOWA | POPST | PUSHWA | STTOWA | |
| AMCALL | POPPRED | TAMCOLON | TAMLIST | XFERTOWA |
| AMCOLON | INSTBL | NEWSTMT | | |
| AMLIST | TAMOP<br>TAMTBL | TAMORDER | TAMPARM | TAMSEL |
| AMOP | SGETCCHAR | CONST_PREFIX | INSTBL | POPWA |
| AMORDER | CONST_PREFIX | POPWA | TORDLIST | |
| AMP | POPPRED | STTAMST | | |
| AMPARM | CONST_PREFIX | POPWA | TAMTPAR | |
| AMSEL | CONST_PREFIX | TAMSEL2 | | |
| AMSEL2 | INSTBL | POPWA | TSELLIST | |
| AMTBL | POPWA | PRCONA | PRPLDA | PRPARM |
| AMTOK | PRINTELM | | | |
| AMTOST | PUSHPRED | PUSHST | | |

PAGE 193

ULE NAME LIST OF DESCENDENT RULES

| | | | | |
|---|---|---|---|---|
| AMTPAR | INSTBL | TPARLIST | | |
| ESTOUE | CONST_PREFIX | TESTOUE2 | | |
| ESTOUE2 | SGETCCHAR<br>STTOWA | INSTBL<br>WATOK | POPPRED | POPST |
| EXT_TO_SCREEN | SET_CURSOR | | | |
| ORD | SGETCCHAR | EDIT_MESSAGE | INSTBL | |
| ORDLIST | SGETYCHAR | INSTBL | TORD | TORDLIST |
| PARLIST | INSTBL | TAMTOK | TPARLIST | |
| SELLIST | SGETBINARY<br>PUSHST<br>SELTERM | SGETYCHAR<br>PUSHWA<br>STTOWA | EDIT_MESSAGE<br>SELOP1<br>TSELLIST | PUSHPRED<br>SELOP2<br>WATOK |
| NTIL_STMT<br>ATOK | DISPLAY_CLAUSE<br>POPWA | LOOKUP_EXCEPTION<br>PRINTELM | WATOK | |
| ATOK_ABN | INSCON | INSTBL | INSTBL2 | POPWA |
| ATOST | WATOK<br>POPWA | PUSHST | WATOST | |
| CALL | CALL_OR_SCHED | GET_INSTRUCTION | GETWARG | NEWSTMT |
| | PUSHWA | | | |
| FERTOST | PUSHST | WATOST | XFERTOST | |
| FERTOWA | PUSHWA | STTOWA | XFERTOWA | |
| FRWATOK | INSTBL | WATOK | XFRWATOK | |

```
03 RULES WITH DESCENDENTS REFERENCED
PAGE 184

ETRAN---------------00
  FIND_RULE-----------01
     |LISTB.                |
     |INSTALLIB             |
     |SYSTEMLIB             |
     |FOUND_IN_DOC_LIB---02
     |   |FOUND_RULE_TABLE. |
     |   +-----------------02
     +-----------------01
  PREFIX_RULEBODY----01
     |PAC                  |
     |LENGTH               |
     |GENBIN               |
     +-----------------01
  INITHEAD-----------01
     |SGETCCHAR            |
     |SGETBINARY           |
     +-----------------01
  INITGLUE                |
  RULEHEADER---------01
     |INSTBL--------------02
     |    |LENGTH          |
     |    |MAX             |
     |    +---------------02
     |RULEPARMS----------02
     |    |INSTBL<---------|
     |    |SGETYCHAR.      |
     |    |RULEPARMS<------|
     |    +---------------02
     |NEWSTMT            |
     +-----------------01
  RULELOCALS---------01
     |RULELOCAL----------02
     |    |INSTBL<---------|
     |    |SGETYCHAR.      |
     |    |RULELOCAL<------|
     |    +---------------02
     |NEWSTMT            |
     +-----------------01
  SETACT-------------01
     |PROCINS------------02
     |    |GET_INSTRUCTION->|
     |    |OP2------------->|
     |    |OP1PREF--------->|
     |    |PCALL----------->|
     |    |PFUNC----------->|
     |    |SETRET---------->|
     |    |SETUNTIL-------->|
     |    |PUSHONE--------->|
     |    |NOOP             |
     |    |ENDCODE--------->|
     |    |ASSIGIN--------->|
     |    |ASSIGBN--------->|
     |    |OP1SCHED-------->|
     |    |OPO------------->|
     |    |APPENDCL-------->|

     |    |TAMCALL--------->|
     |    |TAMP------------>|
     |    |OP1SIG---------->|
     |    |ACTCALL.         |
     |    |ENDACT.          |
PAGE 185

     |    |ASSIGLOC-------->|
     |    |WCALL----------->|
     |    |PROCINS<---------|
     |    +---------------02
     |NOOP               |
     +-----------------01
  COND---------------01
     |PROCCOND-----------02
     |    |GET_INSTRUCTION<-|
     |    |OP2<-------------|
     |    |OP1PREF<---------|
     |    |PCALL<-----------|
     |    |PFUNC<-----------|
     |    |SETRET<----------|
     |    |SETUNTIL<--------|
     |    |PUSHONE<---------|
     |    |NOOP.            |
     |    |ENDCODE<---------|
     |    |ASSIGIN<---------|
     |    |ASSIGBN<---------|
     |    |OP1SCHED<--------|
     |    |OPO<-------------|
     |    |APPENDCL<--------|
     |    |TAMCALL<---------|
     |    |TAMP<------------|
     |    |OP1SIG<----------|
     |    |ACTCALL          |
     |    |ENDACT           |
     |    |ASSIGLOC<--------|
     |    |WCALL<-----------|
     |    |PROCCOND<--------|
     |    +---------------02
     +-----------------01
  DET_EXCEPTIONS-----01
     |PROC_EXCEPTION-----02
     |    |SGETBINARY.      |
     |    |CHECK_FOR_NEXT.  |
     |    |INSTBL<----------|
     |    |SGETYCHAR.       |
     |    |LOOKUP_TBL_NAME->|
     |    |NEWSTMT.         |
     |    |PROCINS<---------|
     |    |PROC_EXCEPTION<--|
     |    +---------------02
     +-----------------01
  EPILOG-------------01
     |WRITELN.           |
----+--------------00-01
PAGE 186

PPENDCL-----------03
  SGETBINARY.      |
  CHECK UNTIL---------04
```

```
    |   |INSTBL<-----------|
    |   |SGETVCHAR.        |
    |   |SGETBINARY.       |
    |   |LOOKUP_TBL_NAME<- |
    |   |LOOKUP_EXCEPTION< |
    |   +------------------05
    +-----------------04
  INSTBL<----------|
--NEWSTMT----------03

SSIGON--------------03
   CNSTTOWA-----------04
     |PUSHWA           |
     |CONST_PREFIX<----|
     |SGETCCHAR        |
     |SGETVCHAR        |
     |POPST<-----------|
     +-----------------04
   WATOK_ABN----------04
     |INSCON--------------05
     |   |INSTBL<----------|
     |   +----------------05
     |INSTBL2-------------05
     |   |LENGTH           |
     |   +----------------05
     |POPWA             |
     |WATOK<------------|
     |INSTBL<-----------|
     +-----------------04
   INSTBL<-----------|
   POPPRED------------04
     |POPPRED<---------|
     +-----------------04
--NEWSTMT----------03

SSIGIN--------------03
   PRINTELM-----------04
     |PRINTITM-------------05
     |   |INSTBL2<----------|
     |   |INSTBL<-----------|
     |   +-----------------05
     |PRFLDA---------------05
     |   |PRTBLREF-------------06
     |   |   |INSTBL2<----------|
     |   |   |PRINTELM<---------|
     |   |   |INSTBL<-----------|
     |   |   |CONST_PREFIX<-----|
     |   |   |SGETVCHAR.        |
     |   |   +-----------------06
     |   |PRFLDREF-------------06
     |   |   |INSTBL<-----------|
     |   |   |PRINTELM<---------|
     |   |   |INSTBL2<----------|
PAGE 127

     |   |   |CONST_PREFIX<-----|
     |   |   |SGETVCHAR.        |
     |   |   +-----------------06
     |   |SGETVCHAR.        |
     |   |INSTBL2<----------|
     |   |INSTBL<-----------|
     |   +-----------------05
     |PRPARM---------------05
     |   |SGETVCHAR.        |
     |   |INSTBL<-----------|
     |   +-----------------05
     |SGETCCHAR.         |
     |PRCONA---------------05
     |   |CONST_PREFIX<-----|
     |   |SGETCCHAR.        |
     |   |INSCON<-----------|
     |   |INSNULLCON-----------06
     |   |   |INSCON<-----------|
     |   |   |SGETBINARY        |
     |   |   +-----------------06
     |   |SGETPACKED        |
     |   |SGETBINARY        |
     |   |SGETFLOAT         |
     |   |EDIT_MESSAGE<-----|
     |   +-----------------05
     |PRSUBA<-----------|
     |EDIT_MESSAGE<-----|
     +-----------------04
   POPST---------------04
     |POPST<------------|
     +-----------------04
   INSTBL<-----------|
   PUSHWA.
   STTOWA--------------04
     |PUSHWA.           |
     |POPST<------------|
     |STTOWA<-----------|
     +-----------------04
   WATOK---------------04
```

```
      |PRINTELM<---------|
      |POPWA             |
      |WATOK<------------|
      +-----------------04
  POPPRED<----------|
--NEWSTMT----------03

SSIGLOC------------03
  SGETYCHAR          |
  INSTBL<-----------|
  PUSHWA             |
  STTOWA<-----------|
  WATOK<------------|
  POPPRED<----------|
--NEWSTMT----------03

ETRET--------------03
  RETACT--------------04
PAGE 198

      |PUSHWA            |
      |STTOWA<-----------|
      |INSTBL<-----------|
      |WATOK<------------|
      |POPPRED<----------|
      |NEWSTMT           |
      +-----------------04
   RETCOND-------------04
      |PUSHST            |
      |FLUSHSTA--------------05
      |    |PRINTELM<--------|
      |    +-----------------05
      |POPPRED<----------|
      |NEWSTMT           |
      +-----------------04
   RET_EXCEPTION-------04
      |RETACT<-----------|
-----+-----------------03-04

ETUNTIL------------03
  SGETBINARY         |
  UNTIL_STMT----------04
     |LOOKUP_EXCEPTION<|
     |DISPLAY_CLAUSE------05
     |     |GET_INSTRUCTION<--|
     |     |OP2<--------------|
     |     |OP1PREF<----------|
     |     |PCALL<------------|
     |     |PFUNC<------------|
     |     |BETRET<-----------|
     |     |BETUNTIL<---------|
     |     |PUSHONE<----------|
     |     |NOOP              |
     |     |ENDCODE<----------|
     |     |ASSIGIN<----------|
     |     |ASSIGON<----------|
     |     |OP1SCHED<---------|
     |     |OPO<--------------|
     |     |APPENDCL<---------|
     |     |TAMCALL<----------|
     |     |TAMP<-------------|
     |     |OP1SIG<-----------|
     |     |ACTCALL           |
     |     |ENDACT.           |
```

```
  |    |ASSIGLOC<---------|
  |    |WCALL<------------|
  |    |INDIRECT_NAME-------06
  |    |    |OP2<--------------|
  |    |    |OP1PREF<----------|
  |    |    |PCALL<------------|
  |    |    |PFUNC<------------|
  |    |    |DETRET<-----------|
  |    |    |DETUNTIL<---------|
  |    |    |PUSHONE<----------|
  |    |    |NOOP              |
  |    |    |ENDCODE<----------|
  |    |    |ASSIGTN<----------|
  |    |    |ASSIGBN<----------|
  |    |    |OP1SCHED----------|
PAGE 199

  |    |    |OPO<--------------|
  |    |    |APPENDCL<---------|
  |    |    |TANCALL<----------|
  |    |    |TAMP<-------------|
  |    |    |OP1SIG<-----------|
  |    |    |ACTCAL.           |
  |    |    |ENDACT            |
  |    |    |ASSIGLOC<---------|
  |    |    |WCALL<------------|
  |    |    |GET_INSTRUCTION<--
  |    |    +-----------------06
  |    |XFERTOWA<---------|
  |    |TAMLIST<----------|
  |    |POPPRED<----------|
  |    +-----------------05
  +-----------------04
   INSTBL<-----------|
--NEWSTMT-----------03

NDCODE-------------03
   EDIT_MESSAGE--------04
      |MESSAGE         |
      |MSG.            |
      |MSGLOC.         |
      |PARM_VALUE      |
      |HILITE_LINES--------05
      |   |HILITE_LINE<------|
      |   +-----------------05
      |HILITE_LINE---------05
      |   |ADD_ATTR          |
      |   +-----------------05
      |FOCUS_ON_TARGET-----05
      |   |TEXT_TO_SCREEN------06
      |   |   |SET_CURSOR.        |
      |   |   +-----------------06
      |   |VERT_SCROLL.      |
      |   |MIN.              |
      |   |SCREENROW.        |
      |   +-----------------05
----+-----------------03-04


ET_INSTRUCTION----03
   SGETBINARY       |
   UNSIGNED_1BYTE   |
   GET_OPERANDS--------04
      |SGETBINARY        |
      +-----------------04
--EDIT_MESSAGE<----03

OOKUP_TBL_NAME----03
   SGETVCHAR        |
--INSTBL<----------03

PAGE 200

PO-----------------03
   INSTBL<---------|
--NEWSYMT----------03

P1PREF-------------03
   PUSHWA.          |
   STTOWA<----------|
   PUSHST.          |
   WATOST--------------04
      |PUSHST.         |
      |POPWA.          |
      |WATOST<---------|
      +---------------04
   POPPRED<--------|
--PUSHPRED---------03

P1SCHED------------03
   XFERTOWA------------04
      |PUSHWA.          |
      |STTOWA<----------|
      |XFERTOWA<--------|
      +----------------04
   PUSHST.           |
   XFERTOST------------04
      |WATOST<----------|
      |PUSHST.          |
      |XFERTOST<--------|
      +----------------04
   POPPRED<----------|
   PUSHWA.           |
   STTOWA<-----------|
   TESTQUE-------------04
      |CONST_PREFIX<----|
      |TESTQUE2-------------05
      |   |STTOWA<-----------|
      |   |POPST<------------|
      |   |POPPRED<----------|
      |   |INSTBL<-----------|
      |   |WATOK<------------|
      |   |SGETCCHAR.        |
```

```
     |   +-----------------05
     +-----------------04
--NEWSTMT----------03

P1SIG--------------03
  INSTBL<-----------|
  CONST_PREFIX--------04
    |SGETBINARY          |
    |LEN_LEN_PREFIX      |
    |LEN_VAL_PREFIX      |
    +------------------04
  SGETCCHAR           |
  POPST<-----------   |
  POPPRED<----------|
  NEWSTMT             |
PAGE 201

------------------03

P2-----------------02
  OP2RIGHT------------04
    |PUSHWA              |
    |STTOWA<-----------|
    |POPPRED<----------|
    +------------------04
  PUSHWA
  OP2LEFT-------------04
    |PUSHWA.
    |STTOWA<-----------|
    |POPPRED<----------|
    +------------------04
  PUSHST             |
  WATOST<-----------|
--PUSHPRED--------03

CALL---------------03
  INSTBL<-----------|
  PRSUBA--------------04
    |PRINTELM<---------|
    |POPST<------------|
    |POPPRED<----------|
    |SGETVCHAR.         |
    |INSTBL<-----------|
    +------------------04
  XFERTOWA<---------|
  XFRWATOK-----------04
    |WATOK<------------|
    |INSTBL<-----------|
    |XFRWATOK<---------|
    +------------------04
  POPPRED<----------|
--NEWSTMT----------03

FUNC---------------03
  XFERTOWA<---------|
  PUSHST.            |


  SGETVCHAR.         |
  XFERTOST<---------|
  POPPRED<---------|
--PUSHPRED--------03

USHONE-------------03
  ITREF---------------04
    |POPST<------------|
    |POPPRED<----------|
    +------------------04
  IFREF---------------04
    |POPST<------------|
    |POPPRED<----------|
    +------------------04
  PUSHST             |
PAGE 202

--PUSHPRED--------03

AMCALL-------------03
  XFERTOWA<---------|
  TAMLIST-------------04
   |TAMOP-----------------05
   |    |CONST_PREFIX<----|
   |    |SGETCCHAR          |
   |    |INSTBL<----------|
   |    |POPWA.             |
   |    +-----------------05
   | TAMTBL---------------05
   |    |PRCONA<-----------|
   |    |PRPARM<-----------|
   |    |PRPLOA<-----------|
   |    |POPWA.             |
   |    +-----------------05
   | TAMPARM--------------05
   |    |CONST_PREFIX<----|
   |    |TAMTPAR--------------06
   |    |    |INSTBL<----------|
   |    |    |TPARLIST-------------07
   |    |    |    |TAMTOK<---------->|
   |    |    |    |INSTBL<----------|
   |    |    |    |TPARLIST<--------|
   |    |    |    +------------------07
   |    |    +------------------06
   |    |POPWA.               |
   |    +-----------------05
   | TAMSEL---------------05
   |    |CONST_PREFIX<----|
   |    |TAMSEL2--------------06
   |    |    |INSTBL<----------|
   |    |    |TSELLIST-------------07
   |    |    |    |PUSHWA.             |
   |    |    |    |STTOWA<-----------|
   |    |    |    |WATOK<------------|
   |    |    |    |PUSHST.             |
   |    |    |    |SGETVCHAR.          |
   |    |    |    |PUSHPRED.           |
```

```
 |   |   |   |SELTERM---------->|
 |   |   |   |SELOP2----------->|
 |   |   |   |SELOP1----------->|
 |   |   |   |TSELLIST<---------|
 |   |   |   |EDIT_MESSAGE<-----|
 |   |   |   |SCETBINARY.       |
 |   |   |   +-----------------07
 |   |   |POPWA              |
 |   |   +-----------------06
 |   +-----------------05
 |TAMORDER-----------05
 |   |CONST_PREFIX<----|
 |   |TORDLIST-----------06
 |   |   |INSTBL<----------|
 |   |   |TORD---------------07
 |   |   |   |INSTBL<----------|
 |   |   |   |EDIT_MESSAGE<----|
 |   |   |   |SCETCCHAR        |
 |   |   |   +-----------------07
PAGE 203

 |   |   |SCETYCHAR          |
 |   |   |TORDLIST<----------|
 |   |   +-----------------06
 |   |POPWL              |
 |   +-----------------05
 +-----------------04
TAMCOLON-------------04
 |INSTBL<------------|
 |NEWSTMT            |
 +-----------------04
--POPPRED<---------03

AMP-----------------03
  STTAMST-------------04
   |PUSHTAMS          |
   |POPST<------------|
   |STTAMST<----------|
   +-----------------04
--POPPRED<---------03

CALL----------------02

  PUSHWA.            |
  GETWARG-------------04
   |POPINDNAME----------05
   |   |POPST<------------|
   |   |POPPRED<----------|
   |   +-----------------05
   |POPST<------------|
   |STTOWA<-----------|
   |PUSHWA            |
   |CONST_PREFIX<-----|
   |SGETCCHAR.        |
   |POPPRED<----------|
   |GETWARG<----------|
   +-----------------04
 GET_INSTRUCTION<-|


  CALL_OR_SCHED-------04
   |INSTBL<-----------|
   |PRSUBA<-----------|
   |WATOK<------------|
   |PUSHWA.           |
   |TESTOUE<----------|
   |PUSHONE<----------|
   |GET_INSTRUCTION<--|
   |CALL_OR_SCHED<----|
   |EDIT_MESSAGE<-----|
   +-----------------04
--NEWSTMT----------03

PAGE 204

ELOP1---------------08
  PUSHWA             |
  STTOWA<------------|
  PUSHST.            |
  WATOST<------------|
  POPPRED<-----------|
--PUSHPRED---------08

ELOP2---------------08
  OP2RIGHT<----------|
  PUSHWA.            |
  OP2LEFT<-----------|
  PUSHST.            |
  WATOST<------------|
--PUSHPRED---------08

ELTERM--------------08
  PUSHST             |
  SCETYCHAR          |
  TAMTOST---------------09
   |PUSHST.            |
   |PUSHPRED           |
   +-------------------09
  PUSHPRED.           |
  SELTERM<------------|
  SELOP-----------------09
   |OP2<----------------|
   |OP1PREF<------------|
   |PCALL<--------------|
   |PFUNC<--------------|
   |DETRET<-------------|
   |SETUNTIL<-----------|
   |PUSHONE<------------|
   |NOOP.               |
   |ENDCUBE<------------|
   |ASSIBIN<------------|
   |ASSIBUN<------------|
   |OP1SCHED<-----------|
   |OPO<----------------|
   |APPENDCL<-----------|
   |TAMCALL<------------|
```

```
 |TAMP<-------------|
 |OP1SIG<-----------|
 |ACTCALL.          |
 |ENDACT.           |
 |ASSIGLOC<---------|
 |WCALL<------------|
 |SELTERM<----------|
 |TSELLIST<---------|
 |SGETBINARY        |
 |UNSIGNED_1BYTE    |
 |ROP               |
 -------------------03
--SGETBINARY-------04

PAGE 205

AMTOK--------------04
--PRINTERM---------04

PAGE 206
OCAL VARIABLE   DECLARED IN THE FOLLOWING RULES
_______________

ATA_PTR         TESTOUE        PRCONA         PRFLDREF       PRTBLREF
                GETWARG        OP1SIG         TAMORDER       TAMSEL
                TAMPARM        TAMOP          CHSTTOWG

ET_STATE        DETRAN

UMMY_LIBRARY    DETRAN

RR_ROW          EDIT_MESSAGE

EN_LEN          CONST_PREFIX

ENGTH           TESTOUE        PRCONA         PRFLDREF       PRTBLREF
                GETWARG        OP1SIG         TAMORDER       TAMSEL
                TAMPARM        TAMOP          CHSTTOWG

PER1            DETRAN

PER2            DETRAN

AVE_INDEX       EDIT_MESSAGE

CROLL_ADJUST    FOCUS_ON_TARGET

CROLL_AMT       FOCUS_ON_TARGET

OURCERULE       DETRAN

TK_ITEM         GETWARG

TK_OFFSET       GETWARG


TK_SUBTYPE      GETWARG

TK_TYPE         GETWARG

TR_START        TAMSEL2        TAMPARM

YMBOL           DETUNTIL

YPE             DETUNTIL
L_PTR           CONST_PREFIX

PAGE 207

OCAL VARIABLE   REFERENCED IN THE FOLLOWING RULES:
_______________


URSOR_COL       SET_CURSOR
```

```
URSOR_ROW        SET_CURSOR

ATA_PTR          CHSTTOWA          CONST_PREFIX      GETWARG            INSNULLCON
                 OP1SIG            PRCONA            PRFLDREF           PRTBLREF
                 TAMOP             TAMORDER          TAMPARM            TAMSEL2
                 TESTQUE2

ET_STATE         COND              DET_EXCEPTIONS    DETACT             DETRET
                 ENDCODE

UMMY_LIBRARY     DETRAN

RR_ROW           EDIT_MESSAGE

RROR_FLAG        HILITE_LINE

EN_LEN           CONST_PREFIX

ENGTH            CHSTTOWA          CONST_PREFIX      GETWARG            INSCON
                 OP1SIG            PRCONA            PRFLDREF           PRTBLREF
                 TAMOP             TAMORDER          TAMPARM            TAMSEL2

SG               EDIT_MESSAGE

PER1             ACTCALL           ASSIGLOC          DISPLAY_CLAUSE     GET_OPERANDS
                 GETWARG           IFREF             ITREF              OP1SCHED
                 PCALL             PFUNC             PUSHONE            TAMCALL
                 TAMP

PER2             CALL_OR_SCHED     GET_OPERANDS      OP1SCHED           PCALL
                 PFUNC

AVE_INDEX        EDIT_MESSAGE

CANNER_LINDEX    EPILOG

CROLL_ADJUST     FOCUS_ON_TARGET

CROLL_AMT        FOCUS_ON_TARGET

OURCERULE        APPENDCL          ASSIGLOC          CHSTTOWA           CONST_PREFIX
                 DETRAN            DETUNTIL          GET_INSTRUCTION    GET_OPERANDS
                 GETWARG           INITHEAD          INSNULLCON         LOOKUP_EXCEPTION
                 LOOKUP_TBL_NAME   OP1SIG            PFUNC              PRCONA
                 PRFLDA            PRFLDREF          PRINTELM           PROC_EXCEPTION
                 PRPARM            PRSUBA            PRTBLREF           RULELOCAL
                 RULEPARMS         SELOP             SELTERM            TAMOP
                 TESTQUE2          TORD              TORDLIST           TSELLIST

TK_ITEM          GETWARG

TK_OFFSET        GETWARG

TK_SUBTYPE       GETWARG

PAGE 206

OCAL VARIABLE    REFERENCED IN THE FOLLOWING RULES:
```

```
TR_TYPE         GETWARE
TR_START        SELTERM          TAMPARM          TAMSEL2          TPARLIST
YMBOL           GETUNTIL
YPE             GETUNTIL
L_PTR           CONST_PREFIX
PAGE 209
IGNA. NAME      SIGNALLED IN THE FOLLOWING RULES
______________

YTE_OVERFLOW    UNSIGNED_1BYTE
```

```
ATASTROPHE      EDIT_MESSAGE
NO_OF_ACTION    ENDCODE
NO_OF_COND      ENDCODE
IND_RULE_FAIL   FOUND_IN_DOC_LIB
S_NEXT          CHECK_FOR_NEXT
EW_RULE         FIND_RULE
EXT_EXCEPTION   RET_EXCEPTION
RANSLATOR_ERR   EDIT_MESSAGE
PAGE 210
XCEPTION NAME   HANDLED BY THE FOLLOWING RULES.
______________

NO_OF_ACTION    DETACT
NO_OF_COND      COND
ETFAIL          EDIT_MESSAGE     FOUND_IN_DOC_LIB FOUND_RULE_TABLE GET_INSTRUCTION
                ROP
NSERTFAIL       ADD_ATTR         IFREF            ITREF
S_NEXT          PROC_EXCEPTION
EXT_EXCEPTION   PROC_EXCEPTION
TRINGSIZE       EDIT_MESSAGE
PAGE 211
ABLE NAME       FIELD NAME       REFERENCED IN:
______________  _______________

(INDIRECT)      *DATA ACCESS*    FOUND_RULE_TABLE

RULESLIBRARY    *DATA ACCESS*    FOUND_IN_DOC_LIB
                DATE             PREFIX_RULEBODY
                RULEBODY         PREFIX_RULEBODY
                RULENAME         PREFIX_RULEBODY
                TIME             PREFIX_RULEBODY

TRANS_CONSTS    *DATA ACCESS*    GETRAN
                BINARY           PRCONA
```

| | | | | |
|---|---|---|---|---|
| | DATA_OFFSET | CONST_PREFIX | TAMPARM | TAMSEL2 |
| | DECIMAL_LENGTH | PRCONA | | |
| | DECIMAL_OFFSET | PRCONA | | |
| | FIXED_CHAR | PRCONA | TAMTBL | |
| | FLOATING_POINT | PRCONA | | |
| | IDENTIFIER | ASSIGLOC<br>LOOKUP_EXCEPTION<br>PFUNC<br>PRFLDREF<br>PRPARM<br>RULEHEADER<br>TORDLIST | CHSTTOWA<br>LOOKUP_TBL_NAME<br>PRCONA<br>PRINTITM<br>PRSUBA<br>RULELOCAL<br>TSELLIST | GETWARC<br>OPISIC<br>PRFLDA<br>PROC_EXCEPTION<br>PRTBLREF<br>RULEPARMS |
| | LONG_STRING | INSCON | INSTBL | |
| | MAX_2BYTE_BINARY | LEN_VAL_PREFIX | | |
| | NAME_LENGTH | ASSIGLOC<br>LOOKUP_EXCEPTION<br>PRFLDA<br>PRSUBA<br>SELTERM | CHSTTOWA<br>LOOKUP_TBL_NAME<br>PROC_EXCEPTION<br>RULELOCAL<br>TORDLIST | INITHEAD<br>PFUNC<br>PRPARM<br>RULEPARMS<br>TSELLIST |
| | NUMBER | INSNULLCON | PRCONA | |
| | OPERATOR | GETWARC<br>WATOK_ABN | PRINTITM | TORDLIST |
| | PACKED_DECIMAL | PRCONA | | |
| | QUOTED_STRING | PRCONA | | |
| | RESERVED_WORD | INSNULLCON<br>RULELOCAL<br>TESTQUE2 | LOOKUP_EXCEPTION<br>TAMOP<br>TORD | PROC_EXCEPTION<br>TAMSEL2<br>TORDLIST |

PAGE 212

| ABLE NAME | FIELD NAME | REFERENCED IN. | | |
|---|---|---|---|---|
| | | WATOK_ABN | | |
| | SPECIAL_CHAR | ASSIGAN<br>CHSTTOWA<br>OPISCHED<br>PFUNC<br>PRINTITM<br>RETACT<br>RULELOCAL<br>TAMCOLON<br>WATOK_ABN<br>XFRWATOK | ASSIGIN<br>OPO<br>OPISIC<br>PRFLDA<br>PROC_EXCEPTION<br>RETCOND<br>RULEPARMS<br>TAMTPAR<br>WCALL | ASSIGLOC<br>OPIPREF<br>PCALL<br>PRFLDREF<br>PRTBLREF<br>RULEHEADER<br>SELOP1<br>TPARLIST<br>XFERTOST |
| | SYNTAX_LENGTH | PRINTELM | | |
| | SYNTAX_OFFSET | PRINTELM | | |
| | VARIABLE_CHAR | PRCONA | | |
| ET_ACTION_OF* | *DATA ACCESS* | ACTCALL | ENDACT | |
| | OFFSET | DETACT | ENDACT | |
| | SEQUENCE# | DETACT | ENDACT | |
| | STMT# | ACTCALL | DETACT | ENDACT |
| ET_GLOBAL | ACT_STMT# | ENDCODE | EPILOG | |
| | C_ORDER | ACTCALL | COND | RETCOND |
| | COND# | ACTCALL<br>RETCOND | EPILOG | INITGLOB |
| | I | COND<br>INSTBL<br>RULEHEADER | DET_EXCEPTIONS<br>INSTBL2 | DETACT<br>NEWSTMT |
| | IC | APPENDCL<br>DETACT<br>ENDACT<br>PRINTELM<br>PROCINS | CALL_OR_SCHED<br>DETUNTIL<br>ENDCODE<br>PROC_EXCEPTION<br>TORD | COND<br>DISPLAY_CLAUSE<br>INDIRECT_NAME<br>PROCCOND<br>WCALL |
| | ILONG | EPILOG | INITGLOB | INSCON |
| | ITOKENS | EPILOG<br>INSTBL2 | INITGLOB<br>NEWSTMT | INSTBL |
| | ONCOND# | EPILOG | INITGLOB | RET_EXCEPTION |
| | PREDS# | EPILOG<br>PUSHPRED | INITGLOB | POPPRED |
| | SP | EPILOG<br>POPST<br>RETCOND | FLUSHSTA<br>PUSHST | INITGLOB<br>RET_EXCEPTION |

PAGE 213

| ABLE NAME | FIELD NAME | REFERENCED IN: | | |
|---|---|---|---|---|
| | STMT# | COND<br>ENDACT<br>NEWSTMT | DET_EXCEPTIONS<br>ENDCODE | DETACT<br>INITGLOB |
| | WAP | EPILOG<br>PUSHWA | INITGLOB | POPWA |
| ET_I_FLDREF | *DATA ACCESS* | IFREF | ITREF | PRFLDA |

| | | | | |
|---|---|---|---|---|
| | FLDREF | IFREF | PRFLDA | |
| | PTYPE | IFREF | PRFLDA | |
| | OFFSET | IFREF | ITREF | |
| | TBLREF | ITREF | PRFLDA | |
| | TTYPE | ITREF | PRFLDA | |
| ET_PREC_ST | *DATA ACCESS* | POPPRED | PUSHPRED | |
| | INDEX | POPPREC | PUSHPRED | |
| | PREC | OP1PREF<br>POPPREC | OP2LEFT<br>PUSHPRED | OP2RIGHT<br>STTAMST |
| ET_STACK | *DATA ACCESS* | FLUSHSTA | POPST | PUSHST |
| | INDEX | POPST | PUSHST | |
| | ITEM | ASSIGIN<br>POPST<br>STTOWA | FLUSHSTA<br>PUSHST | GETWARC<br>STTAMST |
| | OFFSET | ASSIGIN<br>GETWARC<br>OP1SIC<br>STTAMST | CHSTTOWA<br>IFREF<br>PRSUBA<br>STTOWA | FLUSHSTA<br>ITREF<br>PUSHST<br>TESTOUE |
| | SUBTYPE | ASSIGIN<br>PUSHST | FLUSHSTA<br>STTAMST | GETWARG<br>STTOWA |
| | TYPE | ASSIGIN<br>GETWARC<br>POPINDNAME<br>STTAMST | CHSTTOWA<br>IFREF<br>PRSUBA<br>STTOWA | FLUSHSTA<br>ITREF<br>PUSHST<br>TESTOUE2 |
| ET_TAM_OPCODE | *DATA ACCESS* | TAMOP | | |
| | OPCODE | TAMCOLON | | |
| | SYMBOL | TAMOP | | |

PAGE 214

| TABLE NAME | FIELD NAME | REFERENCED IN | | |
|---|---|---|---|---|
| ET_TAM_ST | *DATA ACCESS* | PUSHTAMS | TAMTOK | TAMTOST |
| | INDEX | PUSHTAMS | | |
| | ITEM | PUSHTAMS | TAMTOK | TAMTOST |
| | OFFSET | PUSHTAMS | TAMTOK | TAMTOST |
| | PRECEDENCE | PUSHTAMS | TAMTOST | |
| | SUBTYPE | PUSHTAMS | TAMTOK | TAMTOST |
| | TYPE | PUSHTAMS | TAMTOK | TAMTOST |
| ET_WORKAREA | *DATA ACCESS* | POPWA | PUSHWA | |
| | INDEX | POPWA | PUSHWA | |
| | ITEM | POPWA<br>WATOK_ABN | PUSHWA<br>WATOST | WATOK |
| | OFFSET | PUSHWA<br>TAMPARM<br>TAMTBL | TAMOP<br>TAMSEL<br>WATOK | TAMORDER<br>TAMSEL2<br>WATOST |
| | SUBTYPE | PUSHWA<br>WATOST | WATOK | WATOK_ABN |
| | TYPE | PUSHWA<br>WATOST | TAMTBL | WATOK |
| SATTRIBUTES | *DATA ACCESS* | ADD_ATTR | | |
| | INTENSITY | ADD_ATTR | | |
| | NUMERIC | ADD_ATTR | | |
| | POSITION | ADD_ATTR | | |
| | PROTECTION | ADD_ATTR | | |
| SOVE_VARS | POS_HSEP | FOCUS_ON_TARGET | | |
| | SCROLL_AMT | FOCUS_ON_TARGET | | |
| SMAP | *DATA ACCESS* | EDIT_MESSAGE | HILITE_LINE | HILITE_LINES |
| | COLUMN | HILITE_LINE | | |
| | INDEX | EDIT_MESSAGE | | |
| | LINE_STATUS | HILITE_LINE | | |
| | ROW | EDIT_MESSAGE | HILITE_LINE | |

PAGE 215

| TABLE NAME | FIELD NAME | REFERENCED IN: |
|---|---|---|
| | STMNT# | HILITE_LINES |
| | TABLE | HILITE_LINES |

| | | | | |
|---|---|---|---|---|
| EADER | ACTION_OFF | DETACT | INITHEAD | PROCCOND |
| | ACTIONS* | EPILOC | | |
| | CONDS* | EPILOC | | |
| | DVDATE | INITHEAD | | |
| | DVFUNCT | INITHEAD | | |
| | DVLENGTH | INITHEAD | | |
| | DVNAME | INITHEAD | RULEHEADER | |
| | DVTIME | INITHEAD | | |
| | LOCALS_OFF | INITHEAD | RULELOCALS | |
| | LOCALS* | DETRAN | INITHEAD | |
| | ONCOND_OFF | CHECK_UNTIL<br>UNTIL_STMT | DET_EXCEPTIONS | INITHEAD |
| | PARMS_OFF | CHSTTOWS<br>RULEHEADER | INITHEAD | PRPARM |
| | PARMS* | CHSTTOWS<br>PRPARM | DETRAN | INITHEAD |
| | RULES | COND | INITHEAD | |
| ONC_STRINGS | *DATA ACCESS* | INSCON | | |
| | INDEX | INSCON | | |
| | LEN | INSCON | | |
| | STRING | INSCON | | |
| | TYPE | INSCON | | |
| ESSAGES | HIGHLIGHT | EDIT_MESSAGE | | |
| EQUENCE* | *DATA ACCESS* | ACTCALL | | |
| | ROW | ACTCALL | | |
| | SEQ* | ACTCALL | | |
| | STMNT* | ACTCALL | | |

PAGE 215

| ABLE NAME | FIELD NAME | REFERENCED IN: | | |
|---|---|---|---|---|
| YSSOPCODES | *DATA ACCESS* | GET_INSTRUCTION<br>SELOP2 | ROP | SELOP1 |
| | DET_TYPE | GETWARG | OP2 | PUSHONE |
| | FUNCTION | DISPLAY_CLAUSE<br>PROCINS | INDIRECT_NAME<br>SELOP | PROCCOND |
| | NAME | DISPLAY_CLAUSE | | |
| | OPERAND | GET_OPERANDS | | |
| | PRECEDENCE | OP1PREF<br>SELOP2 | OP2 | SELOP1 |
| | SYMBOL | APPENDCL<br>ASSIGLOC<br>GETWARG<br>OP1SIG<br>RETACT | ASSIGEN<br>CALL_OR_SCHED<br>OPO<br>OP2<br>TESTDUE2 | ASSIGIN<br>DETUNTIL<br>OP1PREF<br>PCALL<br>WCALL |
| | TOKEN_TYPE | APPENDCL<br>ASSIGLOC<br>GETWARG<br>OP1SIG<br>PUSHONE<br>SELOP2 | ASSIGEN<br>CALL_OR_SCHED<br>OPO<br>OP2<br>RETACT<br>TESTDUE2 | ASSIGIN<br>DETUNTIL<br>OP1PREF<br>PCALL<br>SELOP1 |
| OKENS | *DATA ACCESS* | INSTBL | INSTBL2 | |
| | DEC | INSTBL | INSTBL2 | |
| | INDEX | INSTBL | INSTBL2 | |
| | LEN | INSTBL | INSTBL2 | |
| | STRING | INSTBL | INSTBL2 | |
| | TABREF_MARK | INSTBL | INSTBL2 | |
| | TYPE | INSTBL | INSTBL2 | |

PRINT TREE LISTING FOR RULE: DETRAN

CONTENTS

ASE RULE: DETRAN ........ 1

ESCENDENT RULES:
ACTCALL ........ 2
ADD_ATTR ........ 3
APPENDCL ........ 4
ASSIGEN ........ 5
ASSIGIN ........ 7
ASSIGLOC ........ 8
CALL_OR_SCHED ........ 9

CHECK_UNTIL ........ 12
CHSTTOWA ........ 13
COND ........ 15
CONST_PREFIX ........ 16
DET_EXCEPTIONS ........ 18
DETACT ........ 19
DETRET ........ 20
DETUNTIL ........ 21
DISPLAY_CLAUSE ........ 22
EDIT_MESSAGE ........ 23
ENDACT ........ 24
ENDCODE ........ 25
EPILOG ........ 26
FIND_RULE ........ 27
FLUSHSTA ........ 29
FOCUS_ON_TARGET ........ 30
FOUND_IN_DOC_LIB ........ 32
FOUND_RULE_TABLE ........ 34
GET_INSTRUCTION ........ 36
GET_OPERANDS ........ 37
GETWARG ........ 38
HILITE_LINE ........ 39
HILITE_LINES ........ 40
IPREF ........ 42
INDIRECT_NAME ........ 43
INITGLOB ........ 44
INITHEAD ........ 45
INSCON ........ 46
INSNULLCON ........ 48
INSTBL ........ 50
INSTBL2 ........ 51
ITREF ........ 52
LEN_LEN_PREFIX ........ 53
LEN_VAL_PREFIX ........ 55
LOOKUP_EXCEPTION ........ 57
LOOKUP_TBL_NAME ........ 58
NEWSTMT ........ 59
OP0 ........ 60
OP1PREF ........ 61
OP1SCHED ........ 62
OP1STG ........ 63
OP2 ........ 65
OP2LEFT ........ 66
OP2RIGHT ........ 67
PCALL ........ 68

PRINT TREE LISTING FOR RULE DETRAN

CONTENTS

PFUNC ........ 69
POPINDNAME ........ 70
POPPRED ........ 72
POPST ........ 73
POPWA ........ 74
PRCONA ........ 75
PREFIX_RULEBODY ........ 77
PRFLDA ........ 78
PRFLDREF ........ 81
PRINTELM ........ 83
PRINTITM ........ 85
PROC_EXCEPTION ........ 87
PROCCOND ........ 88
PROCINS ........ 89
PRPARM ........ 90
PRSUBA ........ 92
PRTBLREF ........ 93
PUSHONE ........ 95
PUSHPRED ........ 97
PUSHST ........ 98
PUSHTAMS ........ 99
PUSHWA ........ 100
RET_EXCEPTION ........ 101
RETACT ........ 102
RETCOND ........ 103
ROP ........ 105
RULEHEADER ........ 106
RULELOCAL ........ 107
RULELOCALS ........ 108
RULEPARMS ........ 109
SELOP ........ 110
SELOP1 ........ 111
SELOP2 ........ 112
SELTERM ........ 113
SET_CURSOR ........ 115
STTAMST ........ 116
STTOWA ........ 118
TAMCALL ........ 119
TAMCOLON ........ 120
TAMLIST ........ 121
TAMOP ........ 122
TAMORDER ........ 124
TAMP ........ 125
TAMPARM ........ 127
TAMSEL ........ 128
TAMSEL2 ........ 129
TAMTBL ........ 130
TAMTOK ........ 132
TAMTOST ........ 133
TAMTPAR ........ 134
TESTQUE ........ 135
TESTQUE2 ........ 136
TEXT_TO_SCREEN ........ 137
TORD ........ 138
TORDLIST ........ 139
TPARLIST ........ 140

PRINT TREE LISTING FOR RULE: BETRAN

CONTENTS

TSELLIST . . . 141
UNSIGNED_1BYTE . . . 142
UNTIL_STMT . . . 145
WATCH . . . 147
WATCH_ABS . . . 148
WATCST . . . 150
WCALL . . . 151
XFERTOST . . . 152
XFERTOWS . . . 154
XFRWATCH . . . 155

NTRY & VALIDATION RULES:
MAX . . . 156
MESSAGE . . . 158
MIN . . . 159
WRITELN . . . 161

CREEN DEFINITIONS

ABLE DEFINITION
#RULESLIBRARY . . . 164
#TRANS_CONSTS . . . 165
DET_ACTION_OFF . . . 166
DET_:_FLDREF . . . 167
DET_PRED_ST . . . 168
DET_STACK . . . 169
DET_TAM_OPCODE . . . 170
DET_TAM_ST . . . 171
DET_WORKAREA . . . 172
ESATTRIBUTES . . . 173
ESMAP . . . 174
LONG_STRINGS . . . 175
SEQUENCE# . . . 176
SYSSOPCODES . . . 177
TOKENS . . . 178

IST OF UNRESOLVED NAMES . . . 180

IST ENTRY & VALIDATION RULES . . . 181

ULE CROSS REFERENCE . . . 182

ULE CALLING STRUCTURE . . . 189

ESCENDENT TREE . . . 194

OCAL DECLARATION . . . 206

OCAL CROSS REFERENCE . . . 207

IGNAL CROSS REFERENCE . . . 209

XCEPTION HANDLER . . . 210

ABLE CROSS REFERENCE . . . 211

PYM8ØPRT

551 M S

J9199 A

END JOB 9199 PYM8ØPRT PETER MERRYWEATHER M/S 551 PRT2 09/01/89 13.37.28 SYS CC47 SYSOUT A AMDAHL CORPORATE COMPUTER CENTER

What is claimed is:

1. A computer apparatus for creating and modifying object rules stored in a computer system to be executed by said computer system, said object rules being in an object rule language which is executable by said computer system, said computer apparatus comprising:

a) means for retrieving from said computer system a first object rule to be modified;

b) a text editor including i) means for translating the retrieved said first object rule into a first token rule in a token source code language;

ii) means for translating said first token rule into a first source rule in a source code language where said source rule is a line by line textual representation of said first object rule, said source code language being defined in accordance with grammatical criteria;

iii) means for modifying said lines of said source code language for said first source rule in accordance with said grammatical criteria for said source code language to form a modified first source rule;

iv) means for generating new lines of source code in accordance with said grammatical criteria for said source code language to form a new source rule;

v) means for performing lexical analysis for determining the grammatical validity of said new source rule and each said modified line of said modified first source rule;

vi) means translating, when valid, said new source rule into a new token rule in said token source code language and said modified first source rule into a modified token rule in said token source code language; and vii) means for translating said new token rule into a new object rule in said object code language said modified first token rule into a modified object rule in said object code language; and c) means for storing in said computer system said new object rule and said modified first object rule in place of said first object rule that was modified thereby maintaining within said computer system only the most current version of said object rules, in said object code language, to provide version control for said object rules stored in said computer system.

2. The computer apparatus of claim 1 further comprising:

means for displaying the current said line or lines of said source code for said new source rule being generated or said line or lines of source code for said modified source rule being modified.

3. The computer apparatus of claim 1 further comprising:

means for entering into said text editor data to generate said lines of said source code for said new source rule to modify at least one line of said source code for said modified first source rule.

4. The computer apparatus of claim 1 wherein said text editor further comprising:

means for deleting from said text editor said new source rule and said new token rule after said new object rule has been stored in said computer system and said modified first source rule and said modified first token rule after said modified first object rule has been stored in said computer system.

* * * * *